United States Patent
Saphier et al.

(10) Patent No.: US 12,521,213 B2
(45) Date of Patent: Jan. 13, 2026

(54) VIEWING TRAJECTORY FOR 3D DENTAL MODEL

(71) Applicant: Align Technology, Inc., San Jose, CA (US)

(72) Inventors: Ofer Saphier, Rechovot (IL); Shai Ayal, Shoham (IL); Sergei Ozerov, Moscow (RU); Maayan Moshe, Ramat Hasharon (IL); Sergey Chezhin, Moscow (RU); Konstantin Kryzhanovsky, Moscow (RU); Pavel Agniashvili, Moscow (RU); Sergey Gagarin, Moscow (RU); Ilya Arkhipovskiy, Moscow (RU); Avi Kopelman, Palo Alto, CA (US); Leon Rasovsky, Mountain View, CA (US); Michael Sabina, Campbell, CA (US); Adi Levin, Nes Tziona (IL)

(73) Assignee: Align Technology, Inc., San Jose, CA (US)

( * ) Notice: Subject to any disclaimer, the term of this patent is extended or adjusted under 35 U.S.C. 154(b) by 539 days.

(21) Appl. No.: 17/894,096

(22) Filed: Aug. 23, 2022

(65) Prior Publication Data

US 2023/0068727 A1 Mar. 2, 2023

Related U.S. Application Data

(60) Provisional application No. 63/237,759, filed on Aug. 27, 2021.

(51) Int. Cl.
*A61C 9/00* (2006.01)
*G06T 5/50* (2006.01)
(Continued)

(52) U.S. Cl.
CPC .............. *A61C 9/0073* (2013.01); *G06T 5/50* (2013.01); *G06T 5/70* (2024.01); *G06T 7/0012* (2013.01);
(Continued)

(58) Field of Classification Search
CPC ..... A61C 9/0073; A61C 9/006; A61C 9/0053; G06T 5/50; G06T 5/70; G06T 7/0012;
(Continued)

(56) References Cited

U.S. PATENT DOCUMENTS 6,099,314 A 8/2000 Kopelman et al.
6,334,772 B1 1/2002 Taub et al.
(Continued)

OTHER PUBLICATIONS

Isola, et al. "Image-to-image translation with conditional adversarial networks." Proceedings of IEEE conference on computer vision and pattern recognition; 2017; pp. 1125-1134.

*Primary Examiner* — Kee M Tung
*Assistant Examiner* — Xiaoming Wei
(74) *Attorney, Agent, or Firm* — Lowenstein Sandler LLP

(57) ABSTRACT

Embodiments relate to techniques for real-time and post-scan visualization of intraoral scan data, which may include 3D images, 3D scans, 3D surfaces and/or 3D models. In one embodiment, an intraoral scanning system comprises a plurality of image sensors to periodically generate a set of intraoral two-dimensional (2D) images, wherein for each set of intraoral 2D images each image sensor of the plurality of image sensors is to generate an intraoral 2D image, and wherein relative positions and orientations of the plurality of image sensors are known. The intraoral scanning system further comprises a computing device, wherein the computing device is to perform the following for each set of intraoral 2D images: generate a combined intraoral image based on merging the set of intraoral 2D images together
(Continued)

during scanning; and output the combined intraoral image to a display.

29 Claims, 41 Drawing Sheets

(51) Int. Cl.
*G06T 5/70* (2024.01)
*G06T 7/00* (2017.01)
*G06T 7/70* (2017.01)
*G06T 17/20* (2006.01)

(52) U.S. Cl.
CPC ............... *G06T 7/70* (2017.01); *G06T 17/20* (2013.01); *G06T 2200/04* (2013.01); *G06T 2207/20221* (2013.01); *G06T 2207/30036* (2013.01); *G06T 2210/41* (2013.01)

(58) Field of Classification Search
CPC ....... G06T 7/70; G06T 17/20; G06T 2200/04; G06T 2207/20221; G06T 2207/30036; G06T 2210/41; G06T 2207/10028; G06T 3/08; G06T 3/4038; G06T 17/00
See application file for complete search history.

(56) References Cited

U.S. PATENT DOCUMENTS

| | | |
|---|---|---|
| 6,334,853 B1 | 1/2002 | Kopelman et al. |
| 6,463,344 B1 | 10/2002 | Pavlovskaia et al. |
| 6,542,249 B1 | 4/2003 | Kofman et al. |
| 6,633,789 B1 | 10/2003 | Nikolskiy et al. |
| 6,664,986 B1 | 12/2003 | Kopelman et al. |
| 6,697,164 B1 | 2/2004 | Babayoff et al. |
| 6,845,175 B2 | 1/2005 | Kopelman et al. |
| 6,979,196 B2 | 12/2005 | Nikolskiy et al. |
| 7,030,383 B2 | 4/2006 | Babayoff et al. |
| 7,202,466 B2 | 4/2007 | Babayoff et al. |
| 7,255,558 B2 | 8/2007 | Babayoff et al. |
| 7,286,954 B2 | 10/2007 | Kopelman et al. |
| 7,319,529 B2 | 1/2008 | Babayoff |
| 7,373,286 B2 | 5/2008 | Nikolskiy et al. |
| 7,507,088 B2 | 3/2009 | Taub et al. |
| 7,545,372 B2 | 6/2009 | Kopelman et al. |
| 7,698,068 B2 | 4/2010 | Babayoff |
| 7,916,911 B2 | 3/2011 | Kaza et al. |
| 8,108,189 B2 | 1/2012 | Chelnokov et al. |
| 8,244,028 B2 | 8/2012 | Kuo et al. |
| 8,587,582 B2 | 11/2013 | Matov et al. |
| 8,948,482 B2 | 2/2015 | Levin |
| D742,518 S | 11/2015 | Barak et al. |
| 9,192,305 B2 | 11/2015 | Levin |
| 9,261,356 B2 | 2/2016 | Lampert et al. |
| 9,261,358 B2 | 2/2016 | Atiya et al. |
| 9,299,192 B2 | 3/2016 | Kopelman |
| D760,901 S | 7/2016 | Barak et al. |
| 9,393,087 B2 | 7/2016 | Moalem |
| 9,408,679 B2 | 8/2016 | Kopelman |
| 9,431,887 B2 | 8/2016 | Boltanski |
| 9,439,568 B2 | 9/2016 | Atiya et al. |
| 9,451,873 B1 | 9/2016 | Kopelman et al. |
| D768,861 S | 10/2016 | Barak et al. |
| D771,817 S | 11/2016 | Barak et al. |
| 9,491,863 B2 | 11/2016 | Boltanski |
| D774,193 S | 12/2016 | Makmel et al. |
| 9,510,757 B2 | 12/2016 | Kopelman et al. |
| 9,660,418 B2 | 5/2017 | Atiya et al. |
| 9,668,829 B2 | 6/2017 | Kopelman |
| 9,675,430 B2 | 6/2017 | Verker et al. |
| 9,693,839 B2 | 7/2017 | Atiya et al. |
| 9,717,402 B2 | 8/2017 | Lampert et al. |
| 9,724,177 B2 | 8/2017 | Levin |
| 9,844,426 B2 | 12/2017 | Atiya et al. |
| 10,076,389 B2 | 9/2018 | Wu et al. |
| 10,098,714 B2 | 10/2018 | Kuo |
| 10,108,269 B2 | 10/2018 | Sabina et al. |
| 10,111,581 B2 | 10/2018 | Makmel |
| 10,111,714 B2 | 10/2018 | Kopelman et al. |
| 10,123,706 B2 | 11/2018 | Elbaz et al. |
| 10,136,972 B2 | 11/2018 | Sabina et al. |
| 10,380,212 B2 | 8/2019 | Elbaz et al. |
| 10,390,913 B2 | 8/2019 | Sabina et al. |
| 10,453,269 B2 | 10/2019 | Furst |
| 10,456,043 B2 | 10/2019 | Atiya et al. |
| 10,499,793 B2 | 12/2019 | Ozerov et al. |
| 10,504,386 B2 | 12/2019 | Levin et al. |
| 10,507,087 B2 | 12/2019 | Elbaz et al. |
| 10,517,482 B2 | 12/2019 | Sato et al. |
| 10,695,150 B2 | 6/2020 | Kopelman et al. |
| 10,708,574 B2 | 7/2020 | Furst et al. |
| 10,772,506 B2 | 9/2020 | Atiya et al. |
| 10,813,727 B2 | 10/2020 | Sabina et al. |
| 10,888,399 B2 | 1/2021 | Kopelman et al. |
| 10,952,816 B2 | 3/2021 | Kopelman |
| 10,980,613 B2 | 4/2021 | Shanjani et al. |
| 11,013,581 B2 | 5/2021 | Sabina et al. |
| D925,739 S | 7/2021 | Shalev et al. |
| 11,096,765 B2 | 8/2021 | Atiya et al. |
| 11,238,586 B2 | 2/2022 | Minchenkov et al. |
| 11,367,192 B2 | 6/2022 | Kopelman et al. |
| 11,455,727 B2 | 9/2022 | Minchenkov et al. |
| 11,478,132 B2 | 10/2022 | Kopelman et al. |
| 2005/0043837 A1* | 2/2005 | Rubbert .................. A61C 7/00 700/118 |
| 2009/0298017 A1* | 12/2009 | Boerjes ................ G06T 1/0007 433/214 |
| 2015/0320320 A1* | 11/2015 | Kopelman ............. A61B 6/032 433/215 |
| 2016/0217708 A1* | 7/2016 | Levin ................... G06T 1/0007 |
| 2017/0061687 A1* | 3/2017 | Hong .................. G06F 3/04845 |
| 2017/0289523 A1* | 10/2017 | Lee ....................... H04N 13/207 |
| 2018/0168781 A1* | 6/2018 | Kopelman ............. G16H 30/20 |
| 2019/0029784 A1 | 1/2019 | Moalem et al. |
| 2019/0269485 A1* | 9/2019 | Elbaz .................. A61C 9/0053 |
| 2019/0388193 A1 | 12/2019 | Saphier et al. |
| 2020/0281702 A1 | 9/2020 | Kopelman et al. |
| 2020/0404243 A1 | 12/2020 | Saphier et al. |
| 2021/0030503 A1 | 2/2021 | Shalev et al. |
| 2021/0059796 A1 | 3/2021 | Weiss et al. |
| 2021/0068773 A1 | 3/2021 | Moshe et al. |
| 2021/0073998 A1 | 3/2021 | Brown et al. |
| 2021/0121049 A1 | 4/2021 | Rudnitsky et al. |
| 2021/0128281 A1 | 5/2021 | Peleg |
| 2021/0137653 A1 | 5/2021 | Saphier et al. |
| 2021/0196152 A1 | 7/2021 | Saphier et al. |
| 2021/0321872 A1 | 10/2021 | Saphier et al. |
| 2021/0375031 A1* | 12/2021 | Lee ........................ G16H 30/40 |

* cited by examiner

Generate training dataset from 3D surfaces (optionally with associated AOI and/or treatment information) with labels comprising viewing trajectories 3222

Train machine learning model to generate viewing trajectories for 3D surfaces based on training dataset 3224

FIG. 32B  3220

Determine identity of user 3232

Determine treatment to be performed on at least one tooth of the dental site 3234

Determine one or more properties of dental site 3236

Determine viewing preferences of user 3238

Determine trajectory based at least in part on user identity, viewing preferences, treatment, and/or properties of dental site 3240

Select trajectory from a set of available trajectories based on at least one of the identity of the user, the treatment to be performed, or the one or more properties of the dental site 3242

Input data for 3D model into trained machine learning model 3252

Receive output from trained machine learning model that includes the trajectory 3254

FIG. 32D

VIEWING TRAJECTORY FOR 3D DENTAL MODEL

RELATED APPLICATIONS

This application claims the benefit of U.S. Provisional Application No. 63/237,759, filed Aug. 27, 2021, the entire content of which is hereby incorporated by reference.

TECHNICAL FIELD

Embodiments of the present disclosure relate to the field of dentistry and, in particular, to a graphic user interface that provides visualizations during intraoral scanning and after intraoral scanning.

BACKGROUND

In prosthodontic procedures designed to implant a dental prosthesis in the oral cavity, the dental site at which the prosthesis is to be implanted in many cases should be measured accurately and studied carefully, so that a prosthesis such as a crown, denture or bridge, for example, can be properly designed and dimensioned to fit in place. A good fit enables mechanical stresses to be properly transmitted between the prosthesis and the jaw, and to prevent infection of the gums via the interface between the prosthesis and the dental site, for example.

Some procedures also call for removable prosthetics to be fabricated to replace one or more missing teeth, such as a partial or full denture, in which case the surface contours of the areas where the teeth are missing need to be reproduced accurately so that the resulting prosthetic fits over the edentulous region with even pressure on the soft tissues.

In some practices, the dental site is prepared by a dental practitioner, and a positive physical model of the dental site is constructed using known methods. Alternatively, the dental site may be scanned to provide 3D data of the dental site. In either case, the virtual or real model of the dental site is sent to the dental lab, which manufactures the prosthesis based on the model. However, if the model is deficient or undefined in certain areas, or if the preparation was not optimally configured for receiving the prosthesis, the design of the prosthesis may be less than optimal. For example, if the insertion path implied by the preparation for a closely-fitting coping would result in the prosthesis colliding with adjacent teeth, the coping geometry has to be altered to avoid the collision, which may result in the coping design being less optimal. Further, if the area of the preparation containing a finish line lacks definition, it may not be possible to properly determine the finish line and thus the lower edge of the coping may not be properly designed. Indeed, in some circumstances, the model is rejected and the dental practitioner then re-scans the dental site, or reworks the preparation, so that a suitable prosthesis may be produced.

In orthodontic procedures it can be important to provide a model of one or both jaws. Where such orthodontic procedures are designed virtually, a virtual model of the oral cavity is also beneficial. Such a virtual model may be obtained by scanning the oral cavity directly, or by producing a physical model of the dentition, and then scanning the model with a suitable scanner.

Thus, in both prosthodontic and orthodontic procedures, obtaining a three-dimensional (3D) model of a dental site in the oral cavity is an initial procedure that is performed. When the 3D model is a virtual model, the more complete and accurate the scans of the dental site are, the higher the quality of the virtual model, and thus the greater the ability to design an optimal prosthesis or orthodontic treatment appliance(s).

SUMMARY

In a first implementation, an intraoral scanning system comprises: an intraoral scanner comprising a plurality of image sensors to periodically generate a set of intraoral two-dimensional (2D) images, wherein for each set of intraoral 2D images each image sensor of the plurality of image sensors is to generate an intraoral 2D image, and wherein relative positions and orientations of the plurality of image sensors are known; and a computing device, wherein the computing device is to perform the following for each set of intraoral 2D images: generate a combined intraoral image based on merging the set of intraoral 2D images together during scanning; and output the combined intraoral image to a display.

A second implementation may further extend the first implementation. In the second implementation, the computing device is further to perform the following for each set of intraoral 2D images: project the set of intraoral 2D images onto at least one surface, wherein the combined intraoral image is generated based on merging the set of projected intraoral 2D images together.

A third implementation may further extend the second implementation. In the third implementation, the computing device is further to: approximate a first distance between the intraoral scanner and the dental site at a first time associated with a first set of intraoral 2D images, wherein the approximated first distance is used for a first surface onto which a first set of intraoral 2D images are projected; and approximate a second distance between the intraoral scanner and the dental site at a second time associated with a second set of intraoral 2D images, wherein the approximated second distance is used for a second surface onto which a first set of intraoral 2D images are projected.

A fourth implementation may further extend the third implementation. In the fourth implementation, the computing device is further to: perform a smoothing operation by integrating approximated distances between the intraoral scanner and the dental site over time.

A fifth implementation may further extend the third or fourth implementation. In the fifth implementation, the intraoral scanner is further to generate at least one first three-dimensional scan of the dental site, wherein the at least one first three-dimensional scan is used to approximate the first distance; and the intraoral scanner is further to later generate at least one second three-dimensional scan of the dental site, wherein the at least one second three-dimensional scan is used to approximate the second distance.

A sixth implementation may further extend the fifth implementation. In the sixth implementation, the at least one first three-dimensional scan comprises a first plurality of three-dimensional scans generated prior to the first time, wherein the at least one second three-dimensional scan comprises a second plurality of three-dimensional scans generated after the first time and prior to the second time, and wherein the computing device is further to: determine at least one of a first change in distance or a first rate of change in distance between the intraoral scanner and the dental site over the first plurality of three-dimensional scans; project at least one of the first change in distance or the first rate of change in distance between the intraoral scanner and the dental site to the first time to approximate the first distance between the intraoral scanner and the dental site at the first time; determine at least one of a second change in distance or a second rate of change in distance between the intraoral scanner and the dental site over the second plurality of three-dimensional scans; and project at least one of the second change in distance or the second rate of change in distance between the intraoral scanner and the dental site to the second time to approximate the second distance between the intraoral scanner and the dental site at the second time.

A seventh implementation may further extend any of the second through sixth implementations. In the seventh implementation, the computing device is further to: determine first projection parameters for projecting a first intraoral 2D image of the set of intraoral 2D images from a first image sensor of the plurality of image sensors based at least in part on the at least one surface and a known orientation of the first image sensor; and determine second projection parameters for projecting a second intraoral 2D image of the set of intraoral 2D images from a second image sensor of the plurality of image sensors based at least in part on the at least one surface and a known orientation of the second image sensor.

An eighth implementation may further extend any of the second through seventh implementations. In the eighth implementation, the intraoral scanner is further to generate one or more three-dimensional scans of the dental site; and the computing device is further to: estimate an average distance of a surface of the dental site from the intraoral scanner based on the one or more three-dimensional scans of the dental site; and determine the at least one surface based on the average distance of the surface of the dental site from the intraoral scanner.

A ninth implementation may further extend the eighth implementation. In the ninth implementation, the computing device is further to: estimate an average slope of the surface of the dental site relative to the intraoral scanner based on the one or more three-dimensional scans of the dental site; and determine a slope of the at least one surface based on the estimated slope of the surface of the dental site.

A $10^{th}$ implementation may further extend any of the second through ninth implementations. In the $10^{th}$ implementation, the intraoral scanner is further to generate one or more three-dimensional scans of the dental site; and the computing device is further to: determine distances of a plurality of points on a surface of the dental site from the intraoral scanner based on the one or more three-dimensional scans of the dental site; determine a distance associated with a threshold percentile of the distances of the plurality of points; and determine the at least one surface based on the distance associated with the threshold percentile.

An $11^{th}$ implementation may further extend the $10^{th}$ implementation. In the $11^{th}$ implementation, the threshold percentile is between a $50^{th}$ percentile and a $90^{th}$ percentile.

A $12^{th}$ implementation may further extend any of the second through $11^{th}$ implementations. In the $12^{th}$ implementation, the intraoral scanner is further to generate a plurality of three-dimensional scans of the dental site; and the computing device is further to determine a three-dimensional surface of the dental site using the plurality of three-dimensional scans, wherein the at least one surface onto which the set of intraoral 2D images is projected comprises the three-dimensional surface.

A $13^{th}$ implementation may further extend the $12^{th}$ implementation. In the $13^{th}$ implementation, the three-dimensional surface is an approximated three-dimensional surface, and wherein to determine the approximated three-dimensional surface the computing device is further to: create a distance field on a voxel grid using the plurality of three-dimensional scans; and generate the three-dimensional surface using the distance field.

A $14^{th}$ implementation may further extend any of the second through $13^{th}$ implementations. In the $14^{th}$ implementation, the at least one surface comprises a plane or surface having a shape of a smooth function.

A $15^{th}$ implementation may further extend any of the second through $14^{th}$ implementations. In the $15^{th}$ implementation, the at least one surface has a pre-set distance of 1 to 15 mm from the intraoral scanner.

A $16^{th}$ implementation may further extend any of the second through $15^{th}$ implementations. In the $16^{th}$ implementation, the computing device is further to: determine image boundaries of each intraoral 2D image of the set of intraoral 2D images that has been projected onto the at least one surface; determine one or more image boundaries in a first intraoral 2D image of the set of intraoral 2D images that fail to line up in an overlapping region with one or more image boundaries in an adjacent second intraoral 2D image of the set of intraoral 2D images; and adjust at least one of the first intraoral 2D image or the adjacent second intraoral 2D image to cause the one or more image boundaries in the first intraoral 2D image to line up with the one or more image boundaries in the adjacent second intraoral 2D image.

A $17^{th}$ implementation may further extend any of the first through $16^{th}$ implementations. In the $17^{th}$ implementation, the combined intraoral image is generated without using three-dimensional surface data of the dental site.

An $18^{th}$ implementation may further extend any of the first through $17^{th}$ implementations. In the $18^{th}$ implementation, two or more of the plurality of image sensors have overlapping fields of view, and wherein the computing device is further to: determine overlapping regions of two or more intraoral 2D images of the set of intraoral 2D images; and blend the overlapping regions of the two or more intraoral 2D images together.

A $19^{th}$ implementation may further extend the $18^{th}$ implementation. In the $19^{th}$ implementation, the computing device is further to: determine one or more averages of the overlapping regions, wherein the one or more averages of the overlapping regions are used to blend the overlapping regions.

A $20^{th}$ implementation may further extend the $18^{th}$ or $18^{th}$ implementations. In the $20^{th}$ implementation, the computing device is further to perform the following for each set of intraoral 2D images: project the set of intraoral 2D images onto at least one surface, wherein the at least one surface has a distance from the intraoral scanner, and wherein the overlapping regions are determined based at least in part on known fields of view, known positions of the plurality of image sensors, known orientations of the plurality of image sensors, and the distance from the intraoral scanner.

A $21^{st}$ implementation may further extend any of the first through $20^{th}$ implementations. In the $21^{st}$ implementation, the combined intraoral image is a viewfinder image that is updated every 20-100 milliseconds.

A $22^{nd}$ implementation may further extend any of the first through $21^{st}$ implementations. In the $21^{st}$ implementation, the computing device is further to perform the following for each set of intraoral 2D images: project the set of intraoral 2D images onto a plurality of surfaces, each surface of the plurality of surfaces having a different distance from the intraoral scanner; determine, for each surface of the plurality of surfaces, an alignment of edges between intraoral 2D images of the set of intraoral 2D images; and select, from the plurality of surfaces, a surface having a maximal alignment of the edges between the intraoral 2D images of the set of intraoral 2D images.

A 23$^{rd}$ implementation may further extend any of the first through 22$^{nd}$ implementations. In the 23$^{rd}$ implementation, two or more of the plurality of image sensors have overlapping fields of view, and wherein the computing device is further to perform the following for each set of intraoral 2D images: project the set of intraoral 2D images onto a plurality of surfaces, each surface of the plurality of surfaces having a different distance from the intraoral scanner; determine, for each surface of the plurality of surfaces, overlapping regions of two or more projected intraoral 2D images of the set of intraoral 2D images; and analyze the overlapping regions associated with each of the plurality of surfaces to determine which of the plurality of surfaces to use.

A 24$^{th}$ implementation may further extend any of the first through 23$^{rd}$ implementations. In the 24$^{th}$ implementation, the computing device is further to perform the following for one or more set of intraoral 2D images: input intraoral data into a trained machine learning model, the intraoral data comprising at least one of a) one or more intraoral 2D images of the set of intraoral 2D images or b) one or more intraoral scans of the dental site, wherein the trained machine learning model outputs one or more parameters for at least one surface, the one or more parameters comprising at least one of one or more distance between the at least one surface and the intraoral scanner, a shape of the at least one surface, or an orientation of the at least one surface relative to the intraoral scanner; and project the set of intraoral 2D images onto at least one surface, wherein the combined intraoral image is generated based on merging the set of projected intraoral 2D images together.

A 25$^{th}$ implementation may further extend any of the first through 24$^{th}$ implementations. In the 25$^{th}$ implementation, the computing device is further to perform the following for one or more set of intraoral 2D images: project the set of intraoral 2D images onto a plurality of surfaces, each surface of the plurality of surfaces having a different distance from the intraoral scanner; and input projections of the set of intraoral 2D images onto each of the plurality of surfaces into a trained machine learning model, wherein the trained machine learning model generates the combined intraoral image.

A 26$^{th}$ implementation may further extend any of the first through 25$^{th}$ implementations. In the 26$^{th}$ implementation, for at least one set of intraoral 2D images a first region of one or more intraoral 2D images of the at least one set of intraoral 2D images is projected onto a first surface having a first distance from the intraoral scanner and a second region of the one or more intraoral 2D images is projected onto a second surface having a second distance from the intraoral scanner.

A 27$^{th}$ implementation may further extend any of the first through 26$^{th}$ implementations. In the 27$^{th}$ implementation, a computer readable storage medium comprises instructions that, when executed by a processing device, cause the processing device to perform the method of any of the first through 26$^{th}$ implementations.

A 28$^{th}$ implementation may further extend any of the first through 26$^{th}$ implementations. In the 28$^{th}$ implementation, a system comprises a memory to store instructions, and a processing device to execute the instructions to perform the method of any of the first through 26$^{th}$ implementations.

In a 29$^{th}$ implementation, a method comprises: receiving a plurality of intraoral scans of a dental site generated by an intraoral scanner; generating a three-dimensional (3D) surface of the dental site using the plurality of intraoral scans; determining a first view of the 3D surface, the 3D surface having at least one of a first position or a first orientation in the first view; outputting the first view of the 3D surface to a display; receiving an additional intraoral scan; updating the 3D surface of the dental site based on the additional intraoral scan; determining at least one of a position or an orientation of a probe head of the intraoral scanner relative to the 3D surface of the dental site based at least in part on the additional intraoral scan; determining a trajectory of the intraoral scanner between the plurality of intraoral scans and the additional intraoral scan; determining an update to the first view of the 3D surface based at least in part on the trajectory and at least one of the position or the orientation of the probe head of the intraoral scanner relative to the 3D surface, the 3D surface having at least one of a second position or a second orientation in the update to the first view; and outputting the update to the first view of the 3D surface to the display.

A 30$^{th}$ implementation may further extend the 29$^{th}$ implementation. In the 30$^{th}$ implementation, determining the trajectory comprises: determining a time difference between when one or more intraoral scans of the plurality of intraoral scans were generated and when the additional intraoral scan was generated; determining at least one of a position difference or an orientation difference for a portion of the dental site between the one or more intraoral scans and the additional intraoral scan; and estimating the trajectory based on the time difference and at least one of the position difference or the orientation difference.

A 31$^{st}$ implementation may further extend the 29$^{th}$ or 30$^{th}$ implementation. In the 31$^{st}$ implementation, the trajectory is determined based at least in part on data from an inertial measurement unit of the intraoral scanner.

A 32$^{nd}$ implementation may further extend any of the 29$^{th}$ through 31$^{st}$ implementations. In the 32$^{nd}$ implementation, the method further comprises: performing a smoothing operation on the trajectory.

A 33$^{rd}$ implementation may further extend any of the 29$^{th}$ through 32$^{nd}$ implementations. In the 33$^{rd}$ implementation, the method further comprises: interpolating an intermediate update to the first view of the 3D surface, wherein in the intermediate update to the first view the 3D surface has at least one of a) a third position that is between the first position and the second position or b) a third orientation that is between the first orientation and the second orientation.

A 34$^{th}$ implementation may further extend any of the 29$^{th}$ through 33$^{rd}$ implementations. In the 34$^{th}$ implementation, the method further comprises: determining an active region of the 3D surface, wherein the active region corresponds to a region captured in the additional intraoral scan; using a first visualization for the active region of the 3D surface in the update to the first view; and using a different second visualization for a remainder of the 3D surface in the update to the first view.

A 35$^{th}$ implementation may further extend any of the 29$^{th}$ through 34$^{th}$ implementations. In the 35$^{th}$ implementation, the first visualization comprises at least one of a first color, a first transparency level, a first line type, or a first zoom level; and the second visualization comprises at least one of a second color, a second transparency level, a second line type, or a second zoom level.

A 36$^{th}$ implementation may further extend any of the 29$^{th}$ through 35$^{th}$ implementations. In the 36$^{th}$ implementation, the method further comprises outputting a representation of the probe head of the intraoral scanner at the determined position relative to the 3D surface of the dental site as shown in the update to the first view of the 3D surface.

A 37$^{th}$ implementation may further extend the 36$^{th}$ implementation. In the 37$^{th}$ implementation, the representation of the probe head is at least one of partially transparent or a wire frame representation.

A 38$^{th}$ implementation may further extend the 36$^{th}$ or 37$^{th}$ implementation. In the 38$^{th}$ implementation, the method further comprises: determining a capture volume of the intraoral scanner relative to the 3D surface of the dental site; and outputting a representation of the capture volume of the intraoral scanner relative to the 3D surface of the dental site as shown in the update to the first view of the 3D surface.

A 39$^{th}$ implementation may further extend any of the 26$^{th}$ through 38$^{th}$ implementations. In the 39$^{th}$ implementation, the method further comprises: determining a suggested next position of the probe head of the intraoral scanner relative to the 3D surface of the dental site; and outputting a new representation of the probe head of the intraoral scanner at the suggested next position relative to the 3D surface of the dental site as shown in the update to the first view of the 3D surface, wherein the representation of the probe head is shown using a first visualization and the new representation of the probe head is concurrently shown using a second visualization that is different from the first visualization.

A 40$^{th}$ implementation may further extend any of the 29$^{th}$ through 39$^{th}$ implementations. In the 40$^{th}$ implementation, the 3D surface has a first zoom setting in the first view of the 3D surface, the method further comprising: determining a second view of the 3D surface, the 3D surface having at least one of a third position, a third orientation, or a second zoom setting in the second view; and outputting the second view of the 3D surface to the display concurrently to the first view of the 3D surface being output to the display, wherein the first view is output to a first region of the display and the second view is output to a second region of the display.

A 41$^{st}$ implementation may further extend the 40$^{th}$ implementation. In the 41$^{st}$ implementation, the first view is a full jaw view and the second view is a zoomed-in partial jaw view.

A 42$^{nd}$ implementation may further extend the 40$^{th}$ or 41$^{st}$ implementation. In the 42$^{nd}$ implementation, the dental site comprises an upper dental arch and a lower dental arch, and wherein the first view is of a first one of the upper dental arch or the lower dental arch and the second view is a second one of the upper dental arch or the lower dental arch.

A 43$^{rd}$ implementation may further extend the 42$^{nd}$ implementation. In the 43$^{rd}$ implementation, the method further comprises: determining a bite view that shows a bite relationship between the upper dental arch and the lower dental arch; and outputting the bite view to the display concurrently to the first view of the 3D surface and the second view of the 3D surface being output to the display.

A 44$^{th}$ implementation may further extend any of the 40$^{th}$ through 43$^{rd}$ implementations. In the 44$^{th}$ implementation, the first view is a dynamic view and the second view is a static view.

A 45$^{th}$ implementation may further extend any of the 40$^{th}$ through 44$^{th}$ implementations. In the 45$^{th}$ implementation, the method further comprises: classifying a current position of the intraoral scanner in a patient's oral cavity; and outputting an indication of the current position of the intraoral scanner in the patient's oral cavity.

A 46$^{th}$ implementation may further extend the 45$^{th}$ implementation. In the 46$^{th}$ implementation, the current position comprises at least one of a lingual position, a buccal position, an occlusal position, a position on a left of the patient's oral cavity, a position on a right of the patient's oral cavity, a position at an upper dental arch, or a position at a lower dental arch.

A 47$^{th}$ implementation may further extend any of the 40$^{th}$ through 46$^{th}$ implementations. In the 47$^{th}$ implementation, the method further comprises: receiving a first viewing option selection for the first view, wherein the first viewing option is a dynamic viewing option; and receiving a second viewing option selection for the second view, wherein the second viewing option is a static viewing option.

A 48$^{th}$ implementation may further extend any of the 40$^{th}$ through 47$^{th}$ implementations. In the 48$^{th}$ implementation, the method further comprises: outputting at least one of the first view or the update to the first view to a second display viewable by a patient; generating at least one of an animation or a visualization that interacts with the 3D surface; and outputting at least one of the animation or the visualization to the second display.

A 49$^{th}$ implementation may further extend any of the 29$^{th}$ through 48$^{th}$ implementations. In the 49$^{th}$ implementation, a computer readable storage medium comprises instructions that, when executed by a processing device, cause the processing device to perform the method of any of the 29$^{th}$ through 48$^{th}$ implementations.

A 50$^{th}$ implementation may further extend any of the 29$^{th}$ through 48$^{th}$ implementations. In the 50$^{th}$ implementation, a system comprises a memory to store instructions, and a processing device to execute the instructions to perform the method of any of the 29$^{th}$ through 48$^{th}$ implementations.

A 51$^{st}$ implementation may further extend any of the 29$^{th}$ through 48$^{th}$ implementations. In the 51$^{st}$ implementation, a system comprises the intraoral scanner, to generate the plurality of intraoral scans; and a computing device, operatively connected to the intraoral scanner, to perform the method of any of the 29$^{th}$ rough 48$^{th}$ implementations.

In a 52$^{nd}$ implementation, a method comprises: receiving a plurality of intraoral scans of a dental site generated by an intraoral scanner; generating a three-dimensional (3D) surface of the dental site using the plurality of intraoral scans; determining a first view of the 3D surface, the 3D surface having at least one of a first position or a first orientation in the first view; determining a first position and orientation of a probe head of the intraoral scanner relative to the 3D surface of the dental site; determining a capture volume of the intraoral scanner relative to the 3D surface of the dental site; outputting the first view of the 3D surface of the dental site; outputting a representation of the probe head of the intraoral scanner at the first position and orientation relative to the 3D surface; and outputting at least one of a) a representation of a backmost face of the capture volume of the intraoral scanner relative to the 3D surface of the dental site or b) a representation of an intersection of the capture volume and the 3D surface of the dental site.

A 53$^{rd}$ implementation may further extend the 52$^{nd}$ implementation. In the 53$^{rd}$ implementation, the method further comprises: receiving an additional intraoral scan; updating the 3D surface of the dental site based on the additional intraoral scan; determining a second position and orientation of the probe head of the intraoral scanner relative to the 3D surface of the dental site based at least in part on the additional intraoral scan; outputting the representation of the probe head of the intraoral scanner at the second position and orientation relative to the 3D surface; and outputting at least one of a) a representation of a backmost face of the capture volume of the intraoral scanner relative to the 3D surface of the dental site as shown in the first view, or b) an intersection of the capture volume and the 3D surface of the dental site.

A $54^{th}$ implementation may further extend the $52^{nd}$ or $53^{rd}$ implementation. In the $54^{th}$ implementation, the method further comprises: determining a trajectory of the intraoral scanner between the plurality of intraoral scans and the additional intraoral scan; and performing a smoothing operation on the trajectory, wherein the second position and orientation of the probe head is determined based at least in part on a result of performing the smoothing operation on the trajectory.

A $55^{th}$ implementation may further extend any of the $52^{nd}$ through $54^{th}$ implementations. In the $55^{th}$ implementation, the 3D surface retains at least one of the first position or the first orientation in the first view with the update to the 3D surface.

A $56^{th}$ implementation may further extend any of the $52^{nd}$ through $55^{th}$ implementations. In the $56^{th}$ implementation, the method further comprises: receiving user input to hide or show the representation of the probe head; and hiding or showing the representation of the probe head in accordance with the user input.

A $57^{th}$ implementation may further extend any of the $52^{nd}$ through $56^{th}$ implementations. In the $57^{th}$ implementation, the representation of the probe head is at least one of partially transparent or a wire frame representation.

A $58^{th}$ implementation may further extend any of the $52^{nd}$ through $57^{th}$ implementations. In the $58^{th}$ implementation, the method further comprises: outputting a representation of the capture volume of the intraoral scanner relative to the 3D surface of the dental site as shown in the first view.

A $59^{th}$ implementation may further extend any of the $52^{nd}$ through $58^{th}$ implementations. In the $59^{th}$ implementation, the method further comprises: determining a suggested next position of the probe head of the intraoral scanner relative to the 3D surface of the dental site; and outputting a new representation of the probe head of the intraoral scanner at the suggested next position relative to the 3D surface of the dental site as shown in the first view, wherein the representation of the probe head is shown using a first visualization and the new representation of the probe head is concurrently shown using a second visualization that is different from the first visualization.

A $60^{th}$ implementation may further extend any of the $52^{nd}$ through $59^{th}$ implementations. In the $60^{th}$ implementation, the 3D surface has a first zoom setting in the first view of the 3D surface, the method further comprising: determining a second view of the 3D surface, the 3D surface having at least one of a second position, a second orientation, or a second zoom setting in the second view; and outputting the second view of the 3D surface to the display concurrently to the first view of the 3D surface being output to the display, wherein the first view is output to a first region of the display and the second view is output to a second region of the display.

A $61^{st}$ implementation may further extend any of the $52^{nd}$ through $60^{th}$ implementations. In the $61^{st}$ implementation, a computer readable medium comprises instructions that, when executed by a processing device, cause the processing device to perform the method of any of the $52^{nd}$ through $60^{th}$ implementations.

A $62^{nd}$ implementation may further extend any of the $52^{nd}$ through $60^{th}$ implementations. In the $52^{nd}$ implementation, a system comprises a memory to store instructions and a processing device to execute the instructions to perform the method of any of the $52^{nd}$ through $60^{th}$ implementations.

A $63^{rd}$ implementation may further extend any of the $52^{nd}$ through $60^{th}$ implementations. In the $63^{rd}$ implementation, a system comprises: the intraoral scanner, to generate the plurality of intraoral scans; and a computing device, operatively connected to the intraoral scanner, to perform the method of any of the $52^{nd}$ rough $60^{th}$ implementations.

In a $64^{th}$ implementation, a method comprises: receiving a plurality of intraoral scans of a dental site generated by an intraoral scanner; generating a three-dimensional (3D) model of the dental site using the plurality of intraoral scans; determining a trajectory of a virtual camera that, when followed, shows the 3D model of the dental site from a plurality of view settings and a plurality of zoom settings of the virtual camera; and automatically presenting the 3D model of the dental site according to the determined trajectory of the virtual camera.

A $65^{th}$ implementation may further extend the $64^{th}$ implementation. In the $65^{th}$ implementation, determining the trajectory comprises selecting the trajectory from a set of available trajectories based on at least one of an identity of a user of the intraoral scanner, a treatment to be performed on at least one tooth of the dental site, or one or more properties of the dental site.

A $66^{th}$ implementation may further extend the $64^{th}$ or $65^{th}$ implementation. In the $66^{th}$ implementation, determining the trajectory comprises: determining one or more intraoral areas of interest (AOIs) on the dental site; and determining one or more zoomed-in views of each of the one or more AOIs.

A $67^{th}$ implementation may further extend the $66^{th}$ implementation. In the $67^{th}$ implementation, determining the one or more AOIs comprises determining one or more voids having at least a threshold size.

A $68^{th}$ implementation may further extend the $67^{th}$ implementation. In the $68^{th}$ implementation, the method further comprises emphasizing the one or more voids using a first visualization that is different from a second visualization used for a remainder of the 3D model.

A $69^{th}$ implementation may further extend the $67^{th}$ or $68^{th}$ implementation. In the $69^{th}$ implementation, the method further comprises: determining a position and orientation of the intraoral scanner relative to the 3D model that, when used during intraoral scanning, would result in a new intraoral scan that would provide surface data for the one or more voids; and outputting a representation of the intraoral scanner at the determined position and orientation relative to the 3D model of the dental site.

A $70^{th}$ implementation may further extend any of the $67^{th}$ through $69^{th}$ implementations. In the $70^{th}$ implementation, the method further comprises: determining a trajectory of the intraoral scanner relative to the 3D model that, when used during intraoral scanning, would result in a new plurality of intraoral scans that would provide surface data for the one or more voids; and outputting a representation of the intraoral scanner moving according to the determined trajectory relative to the 3D model.

A $71^{st}$ implementation may further extend the $70^{th}$ implementation. In the $71^{st}$ implementation, determining the one or more AOIs comprises: identifying a preparation tooth; and determining a margin line around the preparation tooth.

A $72^{nd}$ implementation may further extend any of the $66^{th}$ through $71^{st}$ implementations. In the $72^{nd}$ implementation, determining the one or more AOIs comprises determining one or more teeth in the 3D model of the dental site having an amount of scanned gums around the one or more teeth that is below a threshold.

A 73rd implementation may further extend any of the 64th through 72nd implementations. In the 73rd implementation, the method further comprises: determining an identity of a user of the intraoral scanner; determining viewing preferences of the user; and determining the trajectory of the virtual camera based on the viewing preferences.

A 74th implementation may further extend any of the 64th through 73rd implementations. In the 74th implementation, determining the trajectory of the virtual camera comprises: inputting data from the 3D model into a trained machine learning model, wherein the trained machine learning model outputs the trajectory of the virtual camera.

A 75th implementation may further extend any of the 64th through 74th implementations. In the 75th implementation, the method further comprises: determining the trajectory of the virtual camera based on one or more zoom operations and one or more rotation operations manually performed by a user for one or more previous 3D models of dental sites.

A 76th implementation may further extend any of the 64th through 75th implementations. In the 76th implementation, determining that the scanning of the dental site is complete comprises detecting that no new intraoral scans have been received for a threshold amount of time.

A 77th implementation may further extend any of the 64th through 76th implementations. In the 77th implementation, determining that the scanning of the dental site is complete comprises receiving a user input indicating that the scanning of the dental site is complete.

A 78th implementation may further extend any of the 64th through 77th implementations. In the 78th implementation, determining that the scanning of the dental site is complete comprises: inputting at least one of the plurality of intraoral scans or a 3D surface generated from the plurality of intraoral scans into a trained machine learning model that generates an output indicating whether or not the scanning of the dental site is complete.

A 79th implementation may further extend any of the 64th through 78th implementations. In the 79th implementation, determining that the scanning of the dental site is complete comprises detecting that the intraoral scanner has been removed from a patient's oral cavity.

An 80th implementation may further extend any of the 64th through 79th implementations. In the 80th implementation, the method further comprises: determining one or more speed settings for updating at least one of view settings or the zoom settings for viewing the 3D model of the dental site along the determined trajectory of the virtual camera; and automatically following the determined trajectory of the virtual camera according to the one or more speed settings.

An 81st implementation may further extend any of the 64th through 80th implementations. In the 81st implementation, the dental site comprises a dental arch.

An 82nd implementation may further extend any of the 64th through 81st implementations. In the 82nd implementation, the dental site comprises a preparation tooth.

An 83rd implementation may further extend and of the 64th through 82nd implementations. In the 83rd implementation, a computer readable medium comprises instructions that, when executed by a processing device, cause the processing device to perform the method of any of the 64th through 82nd implementations.

An 84th implementation may further extend any of the 64th through 82nd implementations. In the 84th implementation, a system comprises: the intraoral scanner, to generate the plurality of intraoral scans; and a computing device, operatively connected to the intraoral scanner, to perform the method of any of the 64th rough 82nd implementations.

An 85th implementation may further extend any of the 64th through 82nd implementations. In the 85th implementation, a system includes a memory to store instructions and a processing device to execute the instructions to perform the method of any of the 64th through 82nd implementations.

In an 86th implementation, a method comprises: generating a recording of one or more intraoral scanning sessions performed by a user of an intraoral scanner, the recording comprising at least one of inertial measurement data generated by the intraoral scanner during the one or more scanning sessions, intraoral scans generated during the one or more scanning sessions, or one or more three-dimensional (3D) model of a dental site generated based on the intraoral scans; analyzing the recording of the one or more intraoral scanning sessions; determining, as a result of the analyzing, one or more scanning quality metric values associated with the one or more intraoral scanning sessions; determining that a scanning quality metric value of the one or more scanning quality metric values is below a scanning quality metric value threshold; determining one or more scanning technique adjustments that would cause the scanning quality metric value to increase; and outputting a suggestion for the user to implement the one or more scanning technique adjustments for future intraoral scanning sessions.

An 87th implementation may further extend the 86th implementation. In the 87th implementation, the method further comprises: determining one or more scanning quality metric values for one or more additional users based on recordings of one or more additional intraoral scanning sessions of the one or more additional users; and ranking the user and the one or more additional users according to the one or more scanning quality metric values.

An 88th implementation may further extend the 86th or 87th implementation. In the 88th implementation, the method further comprises: automatically generating a video showing typical scanning mistakes associated with the one or more scanning quality metric values that are below the scanning quality metric value threshold.

An 89th implementation may further extend any of the 86th through 88th implementations. In the 89th implementation, determining the one or more scanning quality metric values associated with the one or more intraoral scanning sessions comprises: determining one or more first scanning quality metric values associated with a first intraoral scanning session performed at a first time; determining one or more second scanning quality metric values associated with a second intraoral scanning session performed at a second time; comparing the one or more second scanning quality metric values to the one or more first scanning quality metric values to determine differences between the one or more second quality metric values and the one or more first scanning quality metric values; and outputting an indication of scanning technique improvement or scanning technique decline based on a result of the comparing.

A 90th implementation may further extend any of the 86th through 89th implementations. In the 90th implementation, the method further comprises: generating a customized improvement plan for the user based on the one or more scanning quality metric values associated with the one or more intraoral scanning sessions.

A 91st implementation may further extend any of the 86th through 90th implementations. In the 91st implementation, the customized improvement plan comprises a customized training video showing techniques for improving the scanning quality metric value of the one or more scanning quality metric values.

A 92$^{nd}$ implementation may further extend any of the 86$^{th}$ through 91$^{st}$ implementations. In the 92$^{nd}$ implementation, the method further comprises: inputting data from at least one of the 3D model of the dental site of a patient or the intraoral scans associated with the patient into a trained machine learning model, wherein the trained machine learning model outputs a customized intraoral scanning plan for future scanning of the patient.

A 93$^{rd}$ implementation may further extend any of the 86$^{th}$ through 92$^{nd}$ implementations. In the 93$^{rd}$ implementation, the method further comprises: generating a report comprising the one or more scanning quality metric values and associated target scanning quality metric values.

A 94$^{th}$ implementation may further extend any of the 86$^{th}$ through 93$^{rd}$ implementations. In the 94$^{th}$ implementation, the method further comprises: receiving negative patient feedback on the one or more intraoral scanning sessions; wherein the one or more scanning technique adjustments address the negative patient feedback.

A 95$^{th}$ implementation may further extend any of the 86$^{th}$ through 94$^{th}$ implementations. In the 86$^{th}$ implementation, a computer readable medium comprises instructions that, when executed by a processing device, cause the processing device to perform the method of any of the 86$^{th}$ through 93$^{rd}$ implementations.

A 96$^{th}$ implementation may further extend any of the 86$^{th}$ through 94$^{th}$ implementations. In the 96$^{th}$ implementation, a system comprises: the intraoral scanner; and a computing device, operatively connected to the intraoral scanner, to perform the method of any of the 86$^{th}$ through 94$^{th}$ implementations.

A 97$^{th}$ implementation may further extend any of the 86$^{th}$ through 94$^{th}$ implementations. In the 97$^{th}$ implementation, a system comprises a memory to store instructions and a processing device to execute the instructions to perform the method of any of the 86$^{th}$ through 94$^{th}$ implementations.

In a 98$^{th}$ implementation, a method comprises: receiving a plurality of intraoral scans during an intraoral scanning session of a patient's oral cavity, the plurality of intraoral scans having been generated by an intraoral scanner; generating a three-dimensional (3D) surface of a dental site within the patient's oral cavity using the plurality of intraoral scans; determining a current position of a probe head of the intraoral scanner relative to the three-dimensional surface based at least in part on a most recent intraoral scan of the plurality of intraoral scans; determining one or more suggested scanning parameters for one or more next intraoral scans of the intraoral scanning session; and displaying the one or more suggested scanning parameters for the one or more next intraoral scans of the intraoral scanning session on a display.

A 99$^{th}$ implementation may further extend the 98$^{th}$ implementation. In the 99$^{th}$ implementation, the method further comprises: determining an identity of a user of the intraoral scanner; determining past intraoral scanning performance of the user; and determining a customized intraoral scanning plan for the user for the intraoral scanning session based at least in part upon the past intraoral scanning performance.

A 100$^{th}$ implementation may further extend the 99$^{th}$ implementation. In the 100$^{th}$ implementation, for the customized intraoral scanning plan a patient's oral cavity is divided into a plurality of regions, wherein the customized intraoral scanning plan comprises: a progression between regions; and for use within each region of the plurality of regions or for transitions between the plurality of regions, at least one of a respective speed of movement of the intraoral scanner, a respective angle of the probe head of the intraoral scanner relative to a dental site in the patient's oral cavity, or a respective distance between the probe head of the intraoral scanner and the dental site.

A 101$^{st}$ implementation may further extend any of the 98$^{th}$ through 100$^{th}$ implementations. In the 101$^{st}$ implementation, the method further comprises determining an identity of a patient undergoing intraoral scanning; determining one or more clinical conditions of the patient; and determining a customized intraoral scanning plan for the patient based at least in part upon the one or more clinical conditions.

A 102$^{nd}$ implementation may further extend the 101$^{st}$ implementation. In the 102$^{nd}$ implementation, the for the customized intraoral scanning plan a patient's oral cavity is divided into a plurality of regions, wherein the customized intraoral scanning plan comprises: a progression between regions; and for use within each region of the plurality of regions or for transitions between the plurality of regions, at least one of a respective speed of movement of the intraoral scanner, a respective angle of the probe head of the intraoral scanner relative to a dental site in the patient's oral cavity, or a respective distance between the probe head of the intraoral scanner and the dental site.

A 103$^{rd}$ implementation may further extend any of the 98$^{th}$ through 102$^{nd}$ implementations. In the 103$^{rd}$ implementation, the one or more suggested scanning parameters for the one or more next intraoral scans comprises at least one of a next position of the probe head of the intraoral scanner relative to the 3D surface, a next orientation of the probe head relative to the 3D surface, a next distance between the probe head and the 3D surface, or a speed of movement between a current position of the probe head and the next position of the probe head.

A 104$^{th}$ implementation may further extend the 103$^{rd}$ implementation. In the 104$^{th}$ implementation, the method further comprises: outputting a representation of the probe head of the intraoral scanner moving from the current position of the probe head to the next position of the probe head relative to the 3D surface of the dental site according to the one or more suggested scanning parameters.

A 105$^{th}$ implementation may further extend any of the 98$^{th}$ through 104$^{th}$ implementations. In the 105$^{th}$ implementation, determining the one or more suggested scanning parameters for the one or more next intraoral scans comprises: determining that an amount of gums around one or more teeth in the 3D surface is below a threshold; and determining that an adjustment of an angle of the probe head relative to the dental site will increase the amount of gums shown in the one or more next intraoral scans, wherein the one or more suggested scanning parameters comprise the adjustment of the angle of the probe head.

A 106$^{th}$ implementation may further extend any of the 98$^{th}$ through 105$^{th}$ implementations. In the 106$^{th}$ implementation, determining the one or more suggested scanning parameters for the one or more next intraoral scans of the intraoral scanning session comprises: inputting data from at least one of the 3D surface of the dental site or the plurality of intraoral scans into a trained machine learning model, wherein the trained machine learning model outputs the one or more suggested scanning parameters for the one or more next intraoral scans.

A 107$^{th}$ implementation may further extend any of the 98$^{th}$ through 106$^{th}$ implementations. In the 107$^{th}$ implementation, determining the one or more suggested scanning parameters for the one or more next intraoral scans of the intraoral scanning session comprises: determining an angle of the probe head relative to the dental site; determining whether the angle of the probe head is within a target angle range for the probe head; and responsive to determining that the angle of the probe head is outside of the target angle range, determining one or more angle adjustments for the probe head, wherein the one or more suggested scanning parameters comprise the one or more angle adjustments.

A 108th implementation may further extend any of the 98th through 107th implementations. In the 108th implementation, determining the one or more suggested scanning parameters for the one or more next intraoral scans of the intraoral scanning session comprises: determining a ratio of distal surfaces to mesial surfaces represented in the 3D surface of the dental site; determining, based on the ratio of the distal surfaces to the mesial surfaces, whether the distal surfaces or the mesial surfaces are dominant; responsive to determining that the distal surfaces are dominant, determining one or more first angle adjustments for the probe head that will increase an amount of captured mesial surfaces; and responsive to determining that the mesial surfaces are dominant, determining one or more second angle adjustments for the probe head that will increase an amount of captured distal surfaces; wherein the one or more suggested scanning parameters comprise the one or more first angle adjustments or the one or more second angle adjustments.

A 109th implementation may further extend any of the 98th through 108th implementations. In the 109th implementation, the method further comprises determining an identity of at least one tooth in the 3D surface.

A 110th implementation may further extend the 109th implementation. In the 110th implementation, the identity of the at least one tooth is determined based on inputting at least one of the 3D surface or one or more intraoral scans of the plurality of intraoral scans into a trained machine learning model, wherein the trained machine learning model outputs the identity of the tooth.

A 111th implementation may further extend the 109th or 110th implementation. In the 109th implementation, the method further comprises: determining a tooth morphology for the at least one tooth, the tooth morphology comprising at least one of an identification of a mesial surface of the at least one tooth, an identification of a distal surface of the at least one tooth, or an identification of an occlusal surface of the at least one tooth.

A 112th implementation may further extend any of the 98th through 111th implementations. In the 112th implementation, the method further comprises: determining one or more unscanned regions of the patient's oral cavity, the one or more suggested scanning parameters for one or more next intraoral scans of the intraoral scanning session comprising one or more positions of the probe head usable to scan the one or more unscanned regions.

A 113th implementation may further extend any of the 98th through 112th implementations. In the 113th implementation, the method further comprises: determining a quality metric value for one or more regions of the 3D surface; and determining that the quality metric value is below a threshold; wherein the one or more suggested scanning parameters for one or more next intraoral scans are suggested scanning parameters that will cause the quality metric value for the one or more regions to increase.

A 114th implementation may further extend any of the 98th through 113th implementations. In the 114th implementation, the method further comprises: determining one or more intraoral areas of interest (AOIs) on the dental site, wherein the one or more suggested scanning parameters for one or more next intraoral scans are suggested scanning parameters that will result in rescanning of the one or more AOIs.

A 115th implementation may further extend the 114th implementation. In the 115th implementation, determining the one or more AOIs comprises determining one or more voids having at least a threshold size.

A 116th implementation may further extend any of the 98th through 115th implementations. In the 116th implementation, the method further comprises: determining a scanning speed associated with the plurality of intraoral scans; and determining that the scanning speed is outside of a target scanning speed range; wherein the one or more suggested scanning parameters for the one or more next intraoral scans are suggested scanning parameters that will cause the scanning speed to fall within the target scanning speed range.

A 117th implementation may further extend any of the 98th through 116th implementations. In the 117th implementation, the method further comprises: determining a trajectory of the intraoral scanner; determining that a difficult to scan region is upcoming in the intraoral scanning session based on a previously generated 3D model of the dental site, the 3D surface of the dental site, and the determined trajectory; and outputting an alert to slow down a speed of the probe head for the difficult to scan region.

A 118th implementation may further extend any of the 98th through 117th implementations. In the 118th implementation, the method further comprises: determining a difficult to scan region of the dental site based on a previously generated 3D model of the dental site; and determining the one or more suggested scanning parameters for scanning the difficult to scan region based at least in part on the previously generated 3D model of the dental site.

A 119th implementation may further extend any of the 98th through 118th implementations. In the 119th implementation, a computer readable medium comprises instructions that, when executed by a processing device, cause the processing device to perform the method of any of the 98th through 117th implementations.

A 120th implementation may further extend any of the 98th through 118th implementations. In the 120th implementation, a system comprises: the intraoral scanner; and a computing device, operatively connected to the intraoral scanner, to perform the method of any of the 98th through 118th implementations.

A 121st implementation may further extend any of the 98th through 118th implementations. In the 121st implementation, a system comprises: a memory to store instructions and a processing device to execute the instructions to perform the method of any of the 98th through 118th implementations.

BRIEF DESCRIPTION OF THE DRAWINGS

Embodiments of the present disclosure are illustrated by way of example, and not by way of limitation, in the figures of the accompanying drawings.

FIG. 32B is a flow chart illustrating an embodiment for a method of training a machine learning model to automatically generate a review trajectory for reviewing a 3D model.

FIG. 32C is a flow chart illustrating an embodiment for a method of determining a trajectory for displaying a 3D model of a dental site based at least in part on user identity and/or patient information.

FIG. 32D is a flow chart illustrating an embodiment for a method of determining a trajectory for displaying a 3D model of a dental site using a trained machine learning model.

DETAILED DESCRIPTION

Figure 1:
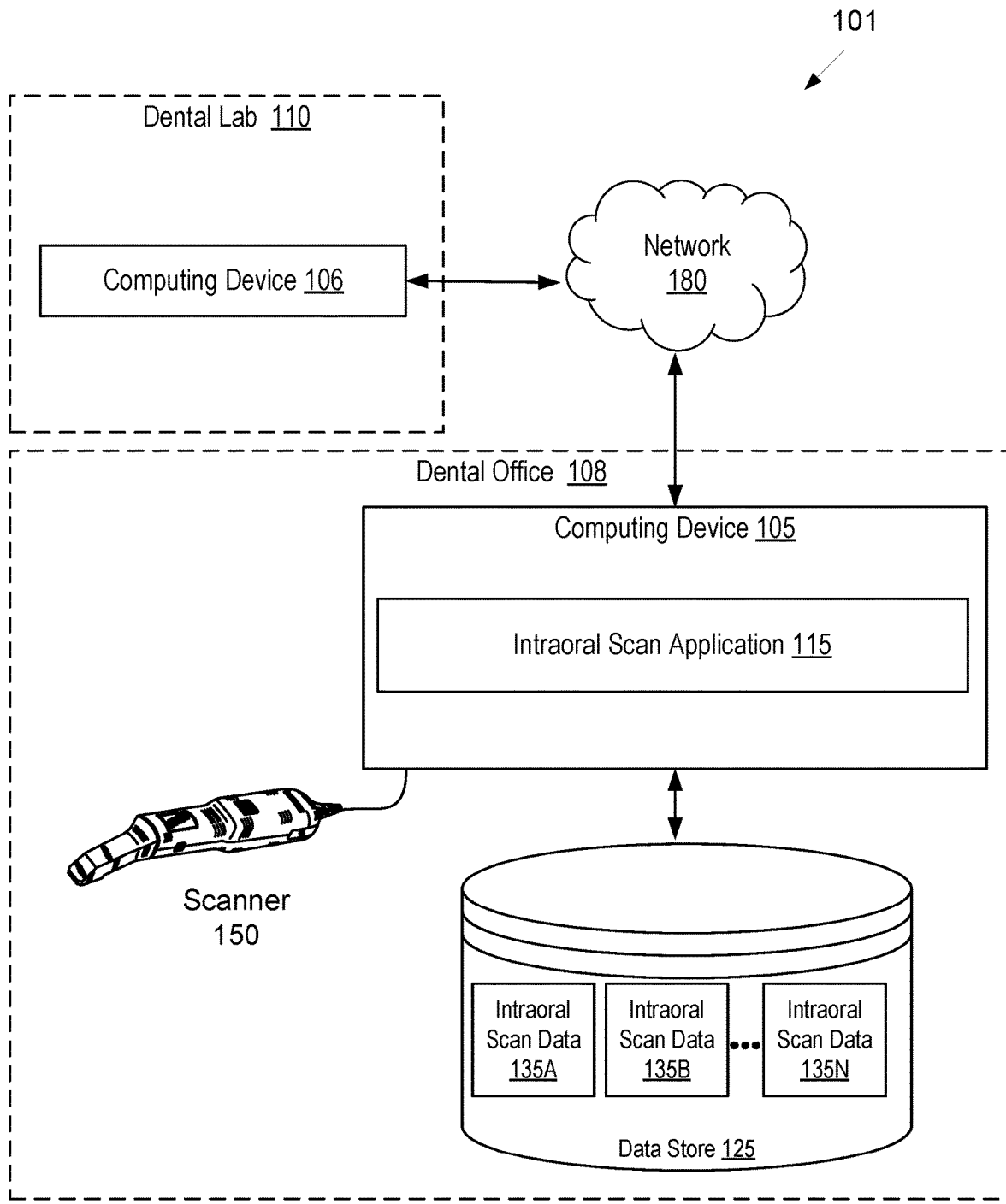
FIG. 1 illustrates one embodiment of a system for performing intraoral scanning and/or generating a virtual three-dimensional model of an dental site.

Described herein are methods and systems for simplifying the process of performing intraoral scanning and for providing useful real time visualizations of intraoral objects (e.g., dental sites) associated with the intraoral scanning process during intraoral scanning as well as useful visualizations of intraoral objects after intraoral scanning is complete. Examples of real time and post-scanning visualizations that may be provided in embodiments include representations of 3D surfaces of dental sites, representations of an intraoral scanner relative to the 3D surface(s), representations of suggested positions/orientations of the intraoral scanner relative to the 3D surfaces, combined 2D images of a combined field of view of multiple cameras of the intraoral scanner, and so on. In embodiments, an intraoral scan application can continuously adjust one or more views of a 3D surface and/or an intraoral scanner during intraoral scanning. Smoothing operations may be performed to ensure that transitions between different views of the 3D surface and/or intraoral scanner are not jerky or jumpy, providing an improved user experience. A user may elect one or more viewing modes, including a viewing mode to keep the 3D surface stationary but show a representation of the intraoral scanner moving and a viewing mode to keep the intraoral scanner and/or a field of view of the intraoral scanner stationery but show a representation of the 3D surface moving during the intraoral scanning. Users may also select an option to show multiple views of the 3D surface during and/or after intraoral scanning, where different views may show different orientations, positions, magnifications, amounts, etc. of the 3D surface.

Some embodiments relate to generating a combined image from multiple input images using novel view synthesis, which is the problem of generating novel camera perspectives of a scene given a fixed set of images of the same scene (or overlapping parts of the same scene). Novel view synthesis methods thus deal with image and video synthesis conditioned on camera position. In classical computer vision, image-based rendering (IBR) methods typically rely on optimization-based multi-view stereo methods to reconstruct scene geometry and warp observations into the coordinate frame of the novel view. However, this may result in view-dependent effects, and may result in ghosting-like artifacts and holes. One technique described herein, which may be referred to as a neural image-based rendering technique, has been particularly adapted for use as described herein. For example, these techniques are adapted for use with intraoral scanning (and comparable medical/dental scanning) inputs, and may be particularly well suited for generating novel views of biological structures, in particular dental structures (e.g., teeth), which may have opacity in both visible light and other penetrating (e.g., near-IR) wavelengths. These techniques may be used with or without machine learning, which may be trained on reconstructing a learned representation of the scene from the observations, learning end-to-end with a differentiable renderer. This enables learning of priors on geometry, appearance and other scene properties in a learned feature space. Although some techniques described herein may be neural rendering techniques, classical approaches may alternatively or additionally be used. The novel view synthesis for generation of combined intraoral 2D images may be performed in real-time (i.e., fast enough that a user does not notice any lag), and can be performed using a graphical processing unit (GPU) rather than a central processing unit (CPU) in embodiments.

Also described are methods and systems for assessing a scanning quality of an intraoral scanning session and/or for grading or assessing a user of an intraoral scanner based on the intraoral scanning that they perform. Feedback may then be provided to the user of the intraoral scanner during intraoral scanning and/or after intraoral scanning to improve the quality of their intraoral scanning.

Also described are methods and systems for determining a trajectory for showing a 3D model of a dental site (e.g., after intraoral scanning is complete), and for displaying the 3D model according to the determined trajectory. This may include determining multiple positions, orientations and/or zoom settings (also referred to as magnification settings) of a virtual camera, as well as speeds for transitioning between the multiple positions, orientations and/or zoom settings. For example, a review trajectory for a 3D model of a full dental arch may include: rotate full view of 3D model from occlusal view, rotate full view of 3D model from buccal view, rotate full view of 3D model from lingual view, zoom in so that only a portion of 3D model is shown, and repeat rotation sequence. In another example, a review trajectory for a 3D model of a preparation tooth may include: rotate the view around the preparation tooth, zoom in at margin line regions, and rotate view around margin line with increased magnification. This may enable a doctor to automatically view a 3D model of a dental site without manually interacting with controls for viewing the 3D model (e.g., without manually zooming in, zooming out, panning, rotating, etc. a view of the 3D model).

Various embodiments are described herein. It should be understood that these various embodiments may be implemented as stand-alone solutions and/or may be combined. Accordingly, references to an embodiment, or one embodiment, may refer to the same embodiment and/or to different embodiments. Some embodiments are discussed herein with reference to intraoral scans and intraoral images. However, it should be understood that embodiments described with reference to intraoral scans also apply to lab scans or model/impression scans. A lab scan or model/impression scan may include one or more images of a dental site or of a model or impression of a dental site, which may or may not include height maps, and which may or may not include intraoral two-dimensional (2D) images (e.g., 2D color images).

FIG. 1 illustrates one embodiment of a system 101 for performing intraoral scanning and/or generating a three-dimensional (3D) surface and/or a virtual three-dimensional model of a dental site. System 101 includes a dental office 108 and optionally one or more dental lab 110. The dental office 108 and the dental lab 110 each include a computing device 105, 106, where the computing devices 105, 106 may be connected to one another via a network 180. The network 180 may be a local area network (LAN), a public wide area network (WAN) (e.g., the Internet), a private WAN (e.g., an intranet), or a combination thereof.

Computing device 105 may be coupled to one or more intraoral scanner 150 (also referred to as a scanner) and/or a data store 125 via a wired or wireless connection. In one embodiment, multiple scanners 150 in dental office 108 wirelessly connect to computing device 105. In one embodiment, scanner 150 is wirelessly connected to computing device 105 via a direct wireless connection. In one embodiment, scanner 150 is wirelessly connected to computing device 105 via a wireless network. In one embodiment, the wireless network is a Wi-Fi network. In one embodiment, the wireless network is a Bluetooth network, a Zigbee network, or some other wireless network. In one embodiment, the wireless network is a wireless mesh network, examples of which include a Wi-Fi mesh network, a Zigbee mesh network, and so on. In an example, computing device 105 may be physically connected to one or more wireless access points and/or wireless routers (e.g., Wi-Fi access points/routers). Intraoral scanner 150 may include a wireless module such as a Wi-Fi module, and via the wireless module may join the wireless network via the wireless access point/router.

Computing device 106 may also be connected to a data store (not shown). The data stores may be local data stores and/or remote data stores. Computing device 105 and computing device 106 may each include one or more processing devices, memory, secondary storage, one or more input devices (e.g., such as a keyboard, mouse, tablet, touchscreen, microphone, camera, and so on), one or more output devices (e.g., a display, printer, touchscreen, speakers, etc.), and/or other hardware components.

In embodiments, scanner 150 includes an inertial measurement unit (IMU). The IMU may include an accelerometer, a gyroscope, a magnetometer, a pressure sensor and/or other sensor. For example, scanner 150 may include one or more micro-electromechanical system (MEMS) IMU. The IMU may generate inertial measurement data (also referred to as movement data), including acceleration data, rotation data, and so on.

Computing device 105 and/or data store 125 may be located at dental office 108 (as shown), at dental lab 110, or at one or more other locations such as a server farm that provides a cloud computing service. Computing device 105 and/or data store 125 may connect to components that are at a same or a different location from computing device 105 (e.g., components at a second location that is remote from the dental office 108, such as a server farm that provides a cloud computing service). For example, computing device 105 may be connected to a remote server, where some operations of intraoral scan application 115 are performed on computing device 105 and some operations of intraoral scan application 115 are performed on the remote server.

Some additional computing devices may be physically connected to the computing device 105 via a wired connection. Some additional computing devices may be wirelessly connected to computing device 105 via a wireless connection, which may be a direct wireless connection or a wireless connection via a wireless network. In embodiments, one or more additional computing devices may be mobile computing devices such as laptops, notebook computers, tablet computers, mobile phones, portable game consoles, and so on. In embodiments, one or more additional computing devices may be traditionally stationary computing devices, such as desktop computers, set top boxes, game consoles, and so on. The additional computing devices may act as thin clients to the computing device 105. In one embodiment, the additional computing devices access computing device 105 using remote desktop protocol (RDP). In one embodiment, the additional computing devices access computing device 105 using virtual network control (VNC). Some additional computing devices may be passive clients that do not have control over computing device 105 and that receive a visualization of a user interface of intraoral scan application 115. In one embodiment, one or more additional computing devices may operate in a master mode and computing device 105 may operate in a slave mode.

Intraoral scanner 150 may include a probe (e.g., a hand held probe) for optically capturing three-dimensional structures. The intraoral scanner 150 may be used to perform an intraoral scan of a patient's oral cavity. An intraoral scan application 115 running on computing device 105 may communicate with the scanner 150 to effectuate the intraoral scan. A result of the intraoral scan may be intraoral scan data 135A, 135B through 135N that may include one or more sets of intraoral scans and/or sets of intraoral 2D images. Each intraoral scan may include a 3D image or point cloud that may include depth information (e.g., a height map) of a portion of a dental site. In embodiments, intraoral scans include x, y and z information.

Intraoral scan data 135A-N may also include color 2D images and/or images of particular wavelengths (e.g., near-infrared (NIRI) images, infrared images, ultraviolet images, etc.) of a dental site in embodiments. In embodiments, intraoral scanner 150 alternates between generation of 3D intraoral scans and one or more types of 2D intraoral images (e.g., color images, NIRI images, etc.) during scanning. For example, one or more 2D color images may be generated between generation of a fourth and fifth intraoral scan by outputting white light and capturing reflections of the white light using multiple cameras.

Intraoral scanner 150 may include multiple different cameras (e.g., each of which may include one or more image sensors) that generate 2D images (e.g., 2D color images) of different regions of a patient's dental arch concurrently. These 2D images may be stitched together to form a single 2D image representation of a larger field of view that includes a combination of the fields of view of the multiple cameras. Intraoral 2D images may include 2D color images, 2D infrared or near-infrared (NIRI) images, and/or 2D images generated under other specific lighting conditions (e.g., 2D ultraviolet images). The 2D images may be used by a user of the intraoral scanner to determine where the scanning face of the intraoral scanner is directed and/or to determine other information about a dental site being scanned.

The scanner 150 may transmit the intraoral scan data 135A, 135B through 135N to the computing device 105. Computing device 105 may store the intraoral scan data 135A-135N in data store 125.

According to an example, a user (e.g., a practitioner) may subject a patient to intraoral scanning. In doing so, the user may apply scanner 150 to one or more patient intraoral locations. The scanning may be divided into one or more segments (also referred to as roles). As an example, the segments may include a lower dental arch of the patient, an upper dental arch of the patient, one or more preparation teeth of the patient (e.g., teeth of the patient to which a dental device such as a crown or other dental prosthetic will be applied), one or more teeth which are contacts of preparation teeth (e.g., teeth not themselves subject to a dental device but which are located next to one or more such teeth or which interface with one or more such teeth upon mouth closure), and/or patient bite (e.g., scanning performed with closure of the patient's mouth with the scan being directed towards an interface area of the patient's upper and lower teeth). Via such scanner application, the scanner 150 may provide intraoral scan data 135A-N to computing device 105. The intraoral scan data 135A-N may be provided in the form of intraoral scan data sets, each of which may include 2D intraoral images (e.g., color 2D images) and/or 3D intraoral scans of particular teeth and/or regions of an dental site. In one embodiment, separate intraoral scan data sets are created for the maxillary arch, for the mandibular arch, for a patient bite, and/or for each preparation tooth. Alternatively, a single large intraoral scan data set is generated (e.g., for a mandibular and/or maxillary arch). Intraoral scans may be provided from the scanner 150 to the computing device 105 in the form of one or more points (e.g., one or more pixels and/or groups of pixels). For instance, the scanner 150 may provide an intraoral scan as one or more point clouds. The intraoral scans may each comprise height information (e.g., a height map that indicates a depth for each pixel).

The manner in which the oral cavity of a patient is to be scanned may depend on the procedure to be applied thereto. For example, if an upper or lower denture is to be created, then a full scan of the mandibular or maxillary edentulous arches may be performed. In contrast, if a bridge is to be created, then just a portion of a total arch may be scanned which includes an edentulous region, the neighboring preparation teeth (e.g., abutment teeth) and the opposing arch and dentition. Alternatively, full scans of upper and/or lower dental arches may be performed if a bridge is to be created.

By way of non-limiting example, dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity (dental site), or a real or virtual model thereof, or directed to the design and preparation of the dental site to receive such a prosthesis. A prosthesis may include any restoration such as crowns, veneers, inlays, onlays, implants and bridges, for example, and any other artificial partial or complete denture. The term orthodontic procedure refers, inter alia, to any procedure involving the oral cavity and directed to the design, manufacture or installation of orthodontic elements at a dental site within the oral cavity, or a real or virtual model thereof, or directed to the design and preparation of the dental site to receive such orthodontic elements. These elements may be appliances including but not limited to brackets and wires, retainers, clear aligners, or functional appliances.

In embodiments, intraoral scanning may be performed on a patient's oral cavity during a visitation of dental office 108. The intraoral scanning may be performed, for example, as part of a semi-annual or annual dental health checkup. The intraoral scanning may also be performed before, during and/or after one or more dental treatments, such as orthodontic treatment and/or prosthodontic treatment. The intraoral scanning may be a full or partial scan of the upper and/or lower dental arches, and may be performed in order to gather information for performing dental diagnostics, to generate a treatment plan, to determine progress of a treatment plan, and/or for other purposes. The dental information (intraoral scan data 135A-N) generated from the intraoral scanning may include 3D scan data, 2D color images, NIRI and/or infrared images, and/or ultraviolet images, of all or a portion of the upper jaw and/or lower jaw. The intraoral scan data 135A-N may further include one or more intraoral scans showing a relationship of the upper dental arch to the lower dental arch. These intraoral scans may be usable to determine a patient bite and/or to determine occlusal contact information for the patient. The patient bite may include determined relationships between teeth in the upper dental arch and teeth in the lower dental arch.

For many prosthodontic procedures (e.g., to create a crown, bridge, veneer, etc.), an existing tooth of a patient is ground down to a stump. The ground tooth is referred to herein as a preparation tooth, or simply a preparation. The preparation tooth has a margin line (also referred to as a finish line), which is a border between a natural (unground) portion of the preparation tooth and the prepared (ground) portion of the preparation tooth. The preparation tooth is typically created so that a crown or other prosthesis can be mounted or seated on the preparation tooth. In many instances, the margin line of the preparation tooth is sub-gingival (below the gum line).

Intraoral scanners may work by moving the scanner 150 inside a patient's mouth to capture all viewpoints of one or more tooth. During scanning, the scanner 150 is calculating distances to solid surfaces in some embodiments. These distances may be recorded as images called 'height maps' or as point clouds in some embodiments. Each scan (e.g., optionally height map or point cloud) is overlapped algorithmically, or 'stitched', with the previous set of scans to generate a growing 3D surface. As such, each scan is associated with a rotation in space, or a projection, to how it fits into the 3D surface.

During intraoral scanning, intraoral scan application 115 may register and stitch together two or more intraoral scans generated thus far from the intraoral scan session to generate a growing 3D surface. In one embodiment, performing registration includes capturing 3D data of various points of a surface in multiple scans, and registering the scans by computing transformations between the scans. One or more 3D surfaces may be generated based on the registered and stitched together intraoral scans during the intraoral scanning. The one or more 3D surfaces may be output to a display so that a doctor or technician can view their scan progress thus far. As each new intraoral scan is captured and registered to previous intraoral scans and/or a 3D surface, the one or more 3D surfaces may be updated, and the updated 3D surface(s) may be output to the display. A view of the 3D surface(s) may be periodically or continuously updated according to one or more viewing modes of the intraoral scan application. In one viewing mode, the 3D surface may be continuously updated such that an orientation of the 3D surface that is displayed aligns with a field of view of the intraoral scanner (e.g., so that a portion of the 3D surface that is based on a most recently generated intraoral scan is approximately centered on the display or on a window of the display) and a user sees what the intraoral scanner sees. In one viewing mode, a position and orientation of the 3D surface is static, and an image of the intraoral scanner is optionally shown to move relative to the stationary 3D surface. Other viewing modes may include zoomed in viewing modes that show magnified views of one or more regions of the 3D surface (e.g., of intraoral areas of interest (AOIs)). Other viewing modes are also possible.

In embodiments, separate 3D surfaces are generated for the upper jaw and the lower jaw. This process may be performed in real time or near-real time to provide an updated view of the captured 3D surfaces during the intraoral scanning process.

When a scan session or a portion of a scan session associated with a particular scanning role (e.g., upper jaw role, lower jaw role, bite role, etc.) is complete (e.g., all scans for an dental site or dental site have been captured), intraoral scan application 115 may generate a virtual 3D model of one or more scanned dental sites (e.g., of an upper jaw and a lower jaw). The final 3D model may be a set of 3D points and their connections with each other (i.e. a mesh). To generate the virtual 3D model, intraoral scan application 115 may register and stitch together the intraoral scans generated from the intraoral scan session that are associated with a particular scanning role. The registration performed at this stage may be more accurate than the registration performed during the capturing of the intraoral scans, and may take more time to complete than the registration performed during the capturing of the intraoral scans. In one embodiment, performing scan registration includes capturing 3D data of various points of a surface in multiple scans, and registering the scans by computing transformations between the scans. The 3D data may be projected into a 3D space of a 3D model to form a portion of the 3D model. The intraoral scans may be integrated into a common reference frame by applying appropriate transformations to points of each registered scan and projecting each scan into the 3D space.

In one embodiment, registration is performed for adjacent or overlapping intraoral scans (e.g., each successive frame of an intraoral video). Registration algorithms are carried out to register two adjacent or overlapping intraoral scans and/or to register an intraoral scan with a 3D model, which essentially involves determination of the transformations which align one scan with the other scan and/or with the 3D model. Registration may involve identifying multiple points in each scan (e.g., point clouds) of a scan pair (or of a scan and the 3D model), surface fitting to the points, and using local searches around points to match points of the two scans (or of the scan and the 3D model). For example, intraoral scan application 115 may match points of one scan with the closest points interpolated on the surface of another scan, and iteratively minimize the distance between matched points. Other registration techniques may also be used.

Intraoral scan application 115 may repeat registration for all intraoral scans of a sequence of intraoral scans to obtain transformations for each intraoral scan, to register each intraoral scan with previous intraoral scan(s) and/or with a common reference frame (e.g., with the 3D model). Intraoral scan application 115 may integrate intraoral scans into a single virtual 3D model by applying the appropriate determined transformations to each of the intraoral scans. Each transformation may include rotations about one to three axes and translations within one to three planes.

Intraoral scan application 115 may generate one or more 3D models from intraoral scans, and may display the 3D models to a user (e.g., a doctor) via a graphical user interface (GUI). The 3D models can then be checked visually by the doctor. The doctor can virtually manipulate the 3D models via the user interface with respect to up to six degrees of freedom (i.e., translated and/or rotated with respect to one or more of three mutually orthogonal axes) using suitable user controls (hardware and/or virtual) to enable viewing of the 3D model from any desired direction. In some embodiments, a trajectory of a virtual camera imaging the 3D model is automatically computed, and the 3D model is shown according to the determined trajectory. Accordingly, the doctor may review (e.g., visually inspect) the generated 3D model of a dental site and determine whether the 3D model is acceptable (e.g., whether a margin line of a preparation tooth is accurately represented in the 3D model) without manually controlling or manipulating a view of the 3D model. For example, in some embodiments, the intraoral scan application 115 automatically generates a sequence of views of the 3D model and cycles through the views in the generated sequence. This may include zooming in, zooming out, panning, rotating, and so on.

Figure 2A:
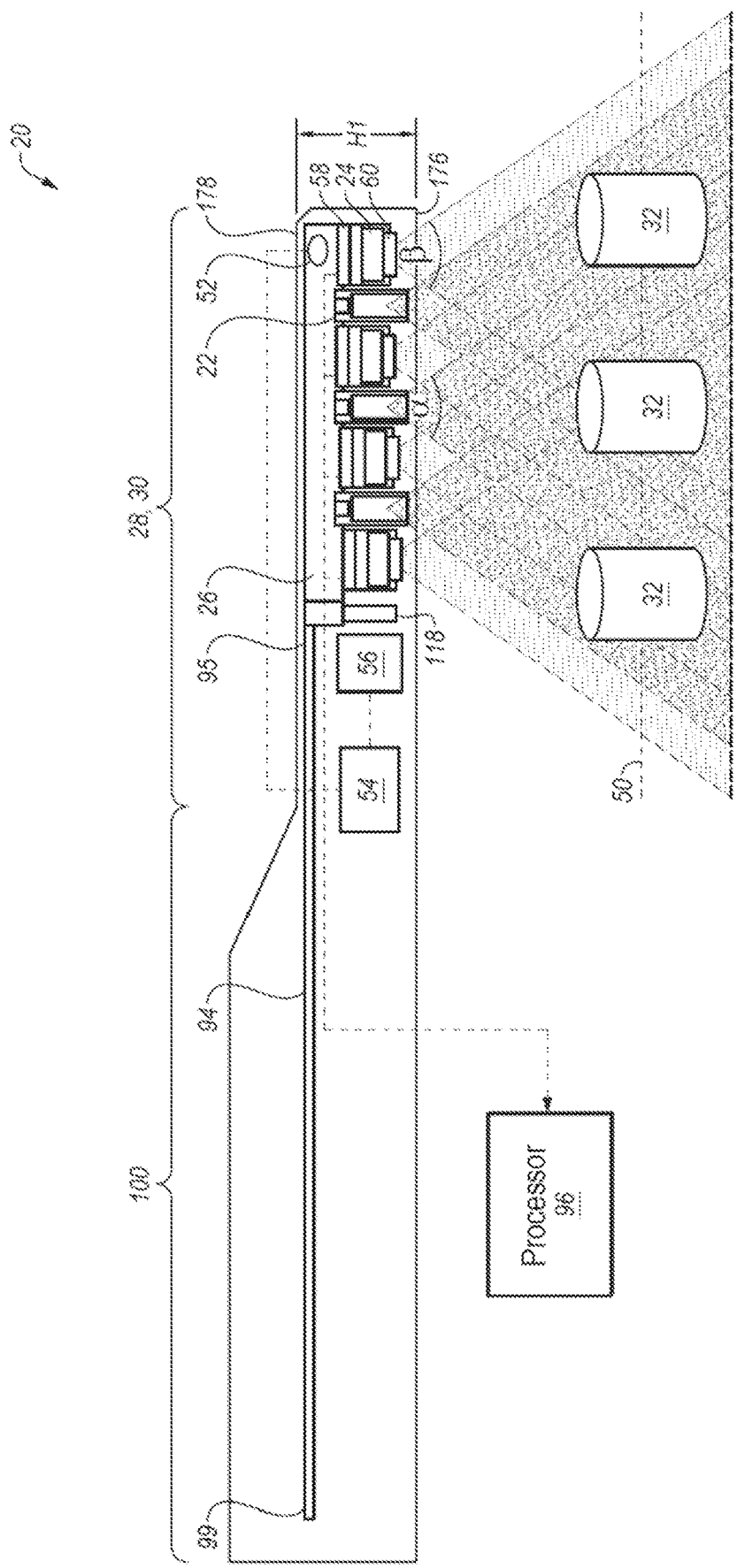
FIG. 2A is a schematic illustration of a handheld intraoral scanner with a plurality cameras disposed within a probe at a distal end of the intraoral scanner, in accordance with some applications of the present disclosure.

Reference is now made to FIG. 2A, which is a schematic illustration of an intraoral scanner 20 comprising an elongate handheld wand, in accordance with some applications of the present disclosure. The intraoral scanner 20 may correspond to intraoral scanner 150 of FIG. 1 in embodiments. Intraoral scanner 20 includes a plurality of structured light projectors 22 and a plurality of cameras 24 that are coupled to a rigid structure 26 disposed within a probe 28 at a distal end 30 of the intraoral scanner 20. In some applications, during an intraoral scanning procedure, probe 28 is inserted into the oral cavity of a subject or patient.

For some applications, structured light projectors 22 are positioned within probe 28 such that each structured light projector 22 faces an object 32 outside of intraoral scanner 20 that is placed in its field of illumination, as opposed to positioning the structured light projectors in a proximal end of the handheld wand and illuminating the object by reflection of light off a mirror and subsequently onto the object. Alternatively, the structured light projectors may be disposed at a proximal end of the handheld wand. Similarly, for some applications, cameras 24 are positioned within probe 28 such that each camera 24 faces an object 32 outside of intraoral scanner 20 that is placed in its field of view, as opposed to positioning the cameras in a proximal end of the intraoral scanner and viewing the object by reflection of light off a mirror and into the camera. This positioning of the projectors and the cameras within probe 28 enables the scanner to have an overall large field of view while maintaining a low profile probe. Alternatively, the cameras may be disposed in a proximal end of the handheld wand.

In some applications, cameras 24 each have a large field of view β (beta) of at least 45 degrees, e.g., at least 70 degrees, e.g., at least 80 degrees, e.g., 85 degrees. In some applications, the field of view may be less than 120 degrees, e.g., less than 100 degrees, e.g., less than 90 degrees. In one embodiment, a field of view β (beta) for each camera is between 80 and 90 degrees, which may be particularly useful because it provided a good balance among pixel size, field of view and camera overlap, optical quality, and cost. Cameras 24 may include an image sensor 58 and objective optics 60 including one or more lenses. To enable close focus imaging, cameras 24 may focus at an object focal plane 50 that is located between 1 mm and 30 mm, e.g., between 4 mm and 24 mm, e.g., between 5 mm and 11 mm, e.g., 9 mm-10 mm, from the lens that is farthest from the sensor. In some applications, cameras 24 may capture images at a frame rate of at least 30 frames per second, e.g., at a frame of at least 75 frames per second, e.g., at least 100 frames per second. In some applications, the frame rate may be less than 200 frames per second.

A large field of view achieved by combining the respective fields of view of all the cameras may improve accuracy due to reduced amount of image stitching errors, especially in edentulous regions, where the gum surface is smooth and there may be fewer clear high resolution 3D features. Having a larger field of view enables large smooth features, such as the overall curve of the tooth, to appear in each image frame, which improves the accuracy of stitching respective surfaces obtained from multiple such image frames.

Similarly, structured light projectors 22 may each have a large field of illumination a (alpha) of at least 45 degrees, e.g., at least 70 degrees. In some applications, field of illumination a (alpha) may be less than 120 degrees, e.g., than 100 degrees.

For some applications, in order to improve image capture, each camera 24 has a plurality of discrete preset focus positions, in each focus position the camera focusing at a respective object focal plane 50. Each of cameras 24 may include an autofocus actuator that selects a focus position from the discrete preset focus positions in order to improve a given image capture. Additionally or alternatively, each camera 24 includes an optical aperture phase mask that extends a depth of focus of the camera, such that images formed by each camera are maintained focused over all object distances located between 1 mm and 30 mm, e.g., between 4 mm and 24 mm, e.g., between 5 mm and 11 mm, e.g., 9 mm-10 mm, from the lens that is farthest from the sensor.

In some applications, structured light projectors 22 and cameras 24 are coupled to rigid structure 26 in a closely packed and/or alternating fashion, such that (a) a substantial part of each camera's field of view overlaps the field of view of neighboring cameras, and (b) a substantial part of each camera's field of view overlaps the field of illumination of neighboring projectors. Optionally, at least 20%, e.g., at least 50%, e.g., at least 75% of the projected pattern of light are in the field of view of at least one of the cameras at an object focal plane 50 that is located at least 4 mm from the lens that is farthest from the sensor. Due to different possible configurations of the projectors and cameras, some of the projected pattern may never be seen in the field of view of any of the cameras, and some of the projected pattern may be blocked from view by object 32 as the scanner is moved around during a scan.

Rigid structure 26 may be a non-flexible structure to which structured light projectors 22 and cameras 24 are coupled so as to provide structural stability to the optics within probe 28. Coupling all the projectors and all the cameras to a common rigid structure helps maintain geometric integrity of the optics of each structured light projector 22 and each camera 24 under varying ambient conditions, e.g., under mechanical stress as may be induced by the subject's mouth. Additionally, rigid structure 26 helps maintain stable structural integrity and positioning of structured light projectors 22 and cameras 24 with respect to each other.

Figure 2C:
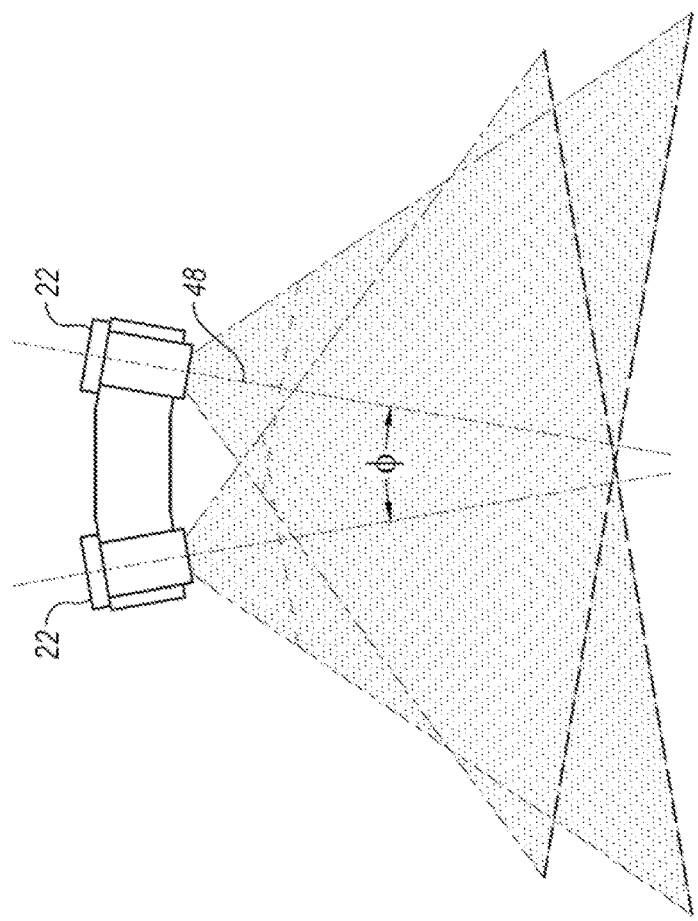
FIGS. 2B-2C comprise schematic illustrations of positioning configurations for cameras and structured light projectors of an intraoral scanner, in accordance with some applications of the present disclosure.
Figure 2B:
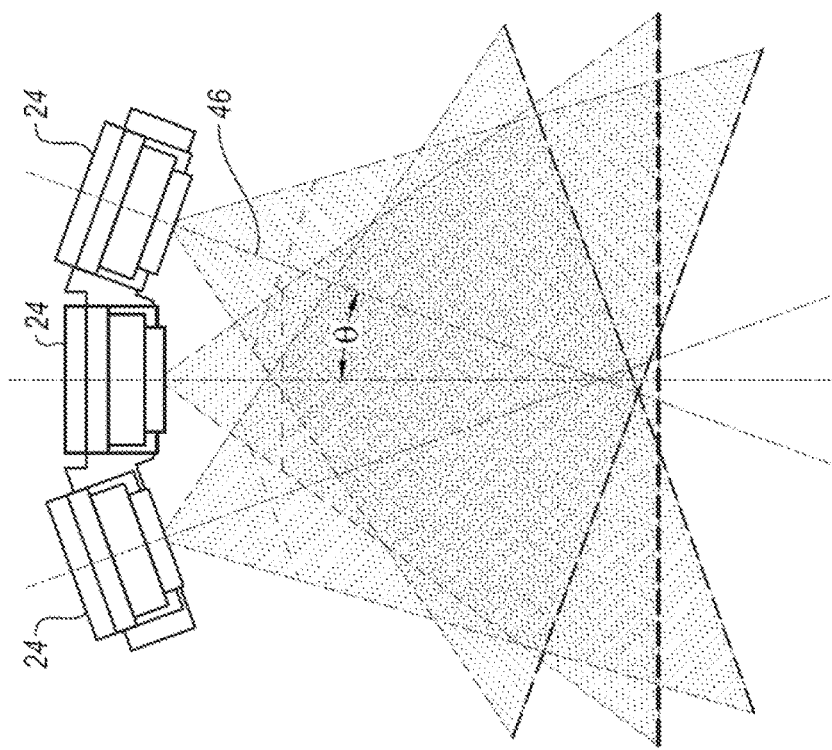

Reference is now made to FIGS. 2B-2C, which include schematic illustrations of a positioning configuration for cameras 24 and structured light projectors 22 respectively, in accordance with some applications of the present disclosure. For some applications, in order to improve the overall field of view and field of illumination of the intraoral scanner 20, cameras 24 and structured light projectors 22 are positioned such that they do not all face the same direction. For some applications, such as is shown in FIG. 2B, a plurality of cameras 24 are coupled to rigid structure 26 such that an angle θ (theta) between two respective optical axes 46 of at least two cameras 24 is 90 degrees or less, e.g., 35 degrees or less. Similarly, for some applications, such as is shown in FIG. 2C, a plurality of structured light projectors 22 are coupled to rigid structure 26 such that an angle φ (phi) between two respective optical axes 48 of at least two structured light projectors 22 is 90 degrees or less, e.g., 35 degrees or less.

Figure 2D:
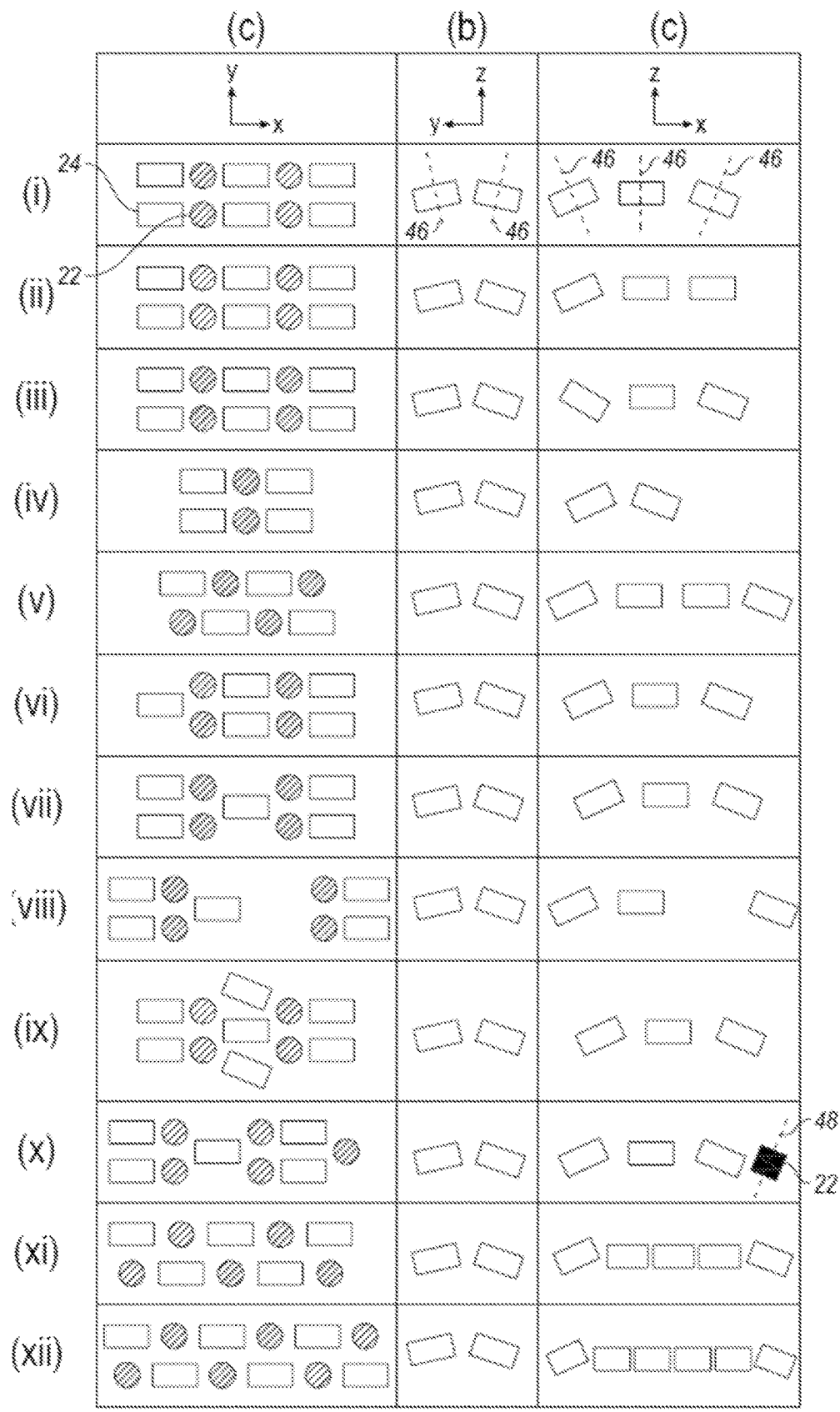
FIG. 2D is a chart depicting a plurality of different configurations for the position of structured light projectors and cameras in a probe of an intraoral scanner, in accordance with some applications of the present disclosure.

Reference is now made to FIG. 2D, which is a chart depicting a plurality of different configurations for the position of structured light projectors 22 and cameras 24 in probe 28, in accordance with some applications of the present disclosure. Structured light projectors 22 are represented in FIG. 2D by circles and cameras 24 are represented in FIG. 2D by rectangles. It is noted that rectangles are used to represent the cameras, since typically, each image sensor 58 and the field of view β (beta) of each camera 24 have aspect ratios of 1:2. Column (a) of FIG. 2D shows a bird's eye view of the various configurations of structured light projectors 22 and cameras 24. The x-axis as labeled in the first row of column (a) corresponds to a central longitudinal axis of probe 28. Column (b) shows a side view of cameras 24 from the various configurations as viewed from a line of sight that is coaxial with the central longitudinal axis of probe 28 and substantially parallel to a viewing axis of the intraoral scanner. Similarly to as shown in FIG. 2B, column (b) of FIG. 2D shows cameras 24 positioned so as to have optical axes 46 at an angle of 90 degrees or less, e.g., 35 degrees or less, with respect to each other. Column (c) shows a side view of cameras 24 of the various configurations as viewed from a line of sight that is perpendicular to the central longitudinal axis of probe 28.

Typically, the distal-most (toward the positive x-direction in FIG. 2D) and proximal-most (toward the negative x-direction in FIG. 2D) cameras 24 are positioned such that their optical axes 46 are slightly turned inwards, e.g., at an angle of 90 degrees or less, e.g., 35 degrees or less, with respect to the next closest camera 24. The camera(s) 24 that are more centrally positioned, i.e., not the distal-most camera 24 nor proximal-most camera 24, are positioned so as to face directly out of the probe, their optical axes 46 being substantially perpendicular to the central longitudinal axis of probe 28. It is noted that in row (xi) a projector 22 is positioned in the distal-most position of probe 28, and as such the optical axis 48 of that projector 22 points inwards, allowing a larger number of spots 33 projected from that particular projector 22 to be seen by more cameras 24.

In embodiments, the number of structured light projectors 22 in probe 28 may range from two, e.g., as shown in row (iv) of FIG. 2D, to six, e.g., as shown in row (xii). Typically, the number of cameras 24 in probe 28 may range from four, e.g., as shown in rows (iv) and (v), to seven, e.g., as shown in row (ix). It is noted that the various configurations shown in FIG. 2D are by way of example and not limitation, and that the scope of the present disclosure includes additional configurations not shown. For example, the scope of the present disclosure includes fewer or more than five projectors 22 positioned in probe 28 and fewer or more than seven cameras positioned in probe 28.

In an example application, an apparatus for intraoral scanning (e.g., an intraoral scanner 150) includes an elongate handheld wand comprising a probe at a distal end of the elongate handheld wand, at least two light projectors disposed within the probe, and at least four cameras disposed within the probe. Each light projector may include at least one light source configured to generate light when activated, and a pattern generating optical element that is configured to generate a pattern of light when the light is transmitted through the pattern generating optical element. Each of the at least four cameras may include a camera sensor (also referred to as an image sensor) and one or more lenses, wherein each of the at least four cameras is configured to capture a plurality of images that depict at least a portion of the projected pattern of light on an intraoral surface. A majority of the at least two light projectors and the at least four cameras may be arranged in at least two rows that are each approximately parallel to a longitudinal axis of the probe, the at least two rows comprising at least a first row and a second row.

In a further application, a distal-most camera along the longitudinal axis and a proximal-most camera along the longitudinal axis of the at least four cameras are positioned such that their optical axes are at an angle of 90 degrees or less with respect to each other from a line of sight that is perpendicular to the longitudinal axis. Cameras in the first row and cameras in the second row may be positioned such that optical axes of the cameras in the first row are at an angle of 90 degrees or less with respect to optical axes of the cameras in the second row from a line of sight that is coaxial with the longitudinal axis of the probe. A remainder of the at least four cameras other than the distal-most camera and the proximal-most camera have optical axes that are substantially parallel to the longitudinal axis of the probe. Each of the at least two rows may include an alternating sequence of light projectors and cameras.

In a further application, the at least four cameras comprise at least five cameras, the at least two light projectors comprise at least five light projectors, a proximal-most component in the first row is a light projector, and a proximal-most component in the second row is a camera.

In a further application, the distal-most camera along the longitudinal axis and the proximal-most camera along the longitudinal axis are positioned such that their optical axes are at an angle of 35 degrees or less with respect to each other from the line of sight that is perpendicular to the longitudinal axis. The cameras in the first row and the cameras in the second row may be positioned such that the optical axes of the cameras in the first row are at an angle of 35 degrees or less with respect to the optical axes of the cameras in the second row from the line of sight that is coaxial with the longitudinal axis of the probe.

In a further application, the at least four cameras may have a combined field of view of 25-45 mm along the longitudinal axis and a field of view of 20-40 mm along a z-axis corresponding to distance from the probe.

Returning to FIG. 2A, for some applications, there is at least one uniform light projector 118 (which may be an unstructured light projector that projects light across a range of wavelengths) coupled to rigid structure 26. Uniform light projector 118 may transmit white light onto object 32 being scanned. At least one camera, e.g., one of cameras 24, captures two-dimensional color images of object 32 using illumination from uniform light projector 118.

Processor 96 may run a surface reconstruction algorithm that may use detected patterns (e.g., dot patterns) projected onto object 32 to generate a 3D surface of the object 32. In some embodiments, the processor 96 may combine at least one 3D scan captured using illumination from structured light projectors 22 with a plurality of intraoral 2D images captured using illumination from uniform light projector 118 in order to generate a digital three-dimensional image of the intraoral three-dimensional surface. Using a combination of structured light and uniform illumination enhances the overall capture of the intraoral scanner and may help reduce the number of options that processor 96 needs to consider when running a correspondence algorithm used to detect depth values for object 32. In one embodiment, the intraoral scanner and correspondence algorithm described in U.S. application Ser. No. 16/446,181, filed Jun. 19, 2019, is used. U.S. application Ser. No. 16/446,181, filed Jun. 19, 2019, is incorporated by reference herein in its entirety. In embodiments, processor 92 may be a processor of computing device 105 of FIG. 1. Alternatively, processor 92 may be a processor integrated into the intraoral scanner 20.

For some applications, all data points taken at a specific time are used as a rigid point cloud, and multiple such point clouds are captured at a frame rate of over 10 captures per second. The plurality of point clouds are then stitched together using a registration algorithm, e.g., iterative closest point (ICP), to create a dense point cloud. A surface reconstruction algorithm may then be used to generate a representation of the surface of object 32.

For some applications, at least one temperature sensor 52 is coupled to rigid structure 26 and measures a temperature of rigid structure 26. Temperature control circuitry 54 disposed within intraoral scanner 20 (a) receives data from temperature sensor 52 indicative of the temperature of rigid structure 26 and (b) activates a temperature control unit 56 in response to the received data. Temperature control unit 56, e.g., a PID controller, keeps probe 28 at a desired temperature (e.g., between 35 and 43 degrees Celsius, between 37 and 41 degrees Celsius, etc.). Keeping probe 28 above 35 degrees Celsius, e.g., above 37 degrees Celsius, reduces fogging of the glass surface of intraoral scanner 20, through which structured light projectors 22 project and cameras 24 view, as probe 28 enters the intraoral cavity, which is typically around or above 37 degrees Celsius. Keeping probe 28 below 43 degrees, e.g., below 41 degrees Celsius, prevents discomfort or pain.

In some embodiments, heat may be drawn out of the probe 28 via a heat conducting element 94, e.g., a heat pipe, that is disposed within intraoral scanner 20, such that a distal end 95 of heat conducting element 94 is in contact with rigid structure 26 and a proximal end 99 is in contact with a proximal end 100 of intraoral scanner 20. Heat is thereby transferred from rigid structure 26 to proximal end 100 of intraoral scanner 20. Alternatively or additionally, a fan disposed in a handle region 174 of intraoral scanner 20 may be used to draw heat out of probe 28.

FIGS. 2A-2D illustrate one type of intraoral scanner that can be used for embodiments of the present disclosure. However, it should be understood that embodiments are not limited to the illustrated type of intraoral scanner. In one embodiment, intraoral scanner 150 corresponds to the intraoral scanner described in U.S. application Ser. No. 16/910,042, filed Jun. 23, 2020 and entitled "Intraoral 3D Scanner Employing Multiple Miniature Cameras and Multiple Miniature Pattern Projectors", which is incorporated by reference herein. In one embodiment, intraoral scanner 150 corresponds to the intraoral scanner described in U.S. application Ser. No. 16/446,181, filed Jun. 19, 2019 and entitled "Intraoral 3D Scanner Employing Multiple Miniature Cameras and Multiple Miniature Pattern Projectors", which is incorporated by reference herein.

In some embodiments an intraoral scanner that performs confocal focusing to determine depth information may be used. Such an intraoral scanner may include a light source and/or illumination module that emits light (e.g., a focused light beam or array of focused light beams). The light passes through a polarizer and through a unidirectional mirror or beam splitter (e.g., a polarizing beam splitter) that passes the light. The light may pass through a pattern before or after the beam splitter to cause the light to become patterned light. Along an optical path of the light after the unidirectional mirror or beam splitter are optics, which may include one or more lens groups. Any of the lens groups may include only a single lens or multiple lenses. One of the lens groups may include at least one moving lens.

The light may pass through an endoscopic probing member, which may include a rigid, light-transmitting medium, which may be a hollow object defining within it a light transmission path or an object made of a light transmitting material, e.g. a glass body or tube. In one embodiment, the endoscopic probing member includes a prism such as a folding prism. At its end, the endoscopic probing member may include a mirror of the kind ensuring a total internal reflection. Thus, the mirror may direct the array of light beams towards a teeth segment or other object. The endoscope probing member thus emits light, which optionally passes through one or more windows and then impinges on to surfaces of intraoral objects.

The light may include an array of light beams arranged in an X-Y plane, in a Cartesian frame, propagating along a Z axis, which corresponds to an imaging axis or viewing axis of the intraoral scanner. As the surface on which the incident light beams hits is an uneven surface, illuminated spots may be displaced from one another along the Z axis, at different $(X_i, Y_i)$ locations. Thus, while a spot at one location may be in focus of the confocal focusing optics, spots at other locations may be out-of-focus. Therefore, the light intensity of returned light beams of the focused spots will be at its peak, while the light intensity at other spots will be off peak. Thus, for each illuminated spot, multiple measurements of light intensity are made at different positions along the Z-axis. For each of such $(X_i, Y_i)$ location, the derivative of the intensity over distance (Z) may be made, with the Z yielding maximum derivative, $Z_0$, being the in-focus distance.

The light reflects off of intraoral objects and passes back through windows (if they are present), reflects off of the mirror, passes through the optical system, and is reflected by the beam splitter onto a detector. The detector is an image sensor having a matrix of sensing elements each representing a pixel of the scan or image. In one embodiment, the detector is a charge coupled device (CCD) sensor. In one embodiment, the detector is a complementary metal-oxide semiconductor (CMOS) type image sensor. Other types of image sensors may also be used for detector. In one embodiment, the detector detects light intensity at each pixel, which may be used to compute height or depth.

Alternatively, in some embodiments an intraoral scanner that uses stereo imaging is used to determine depth information.

Figure 3:
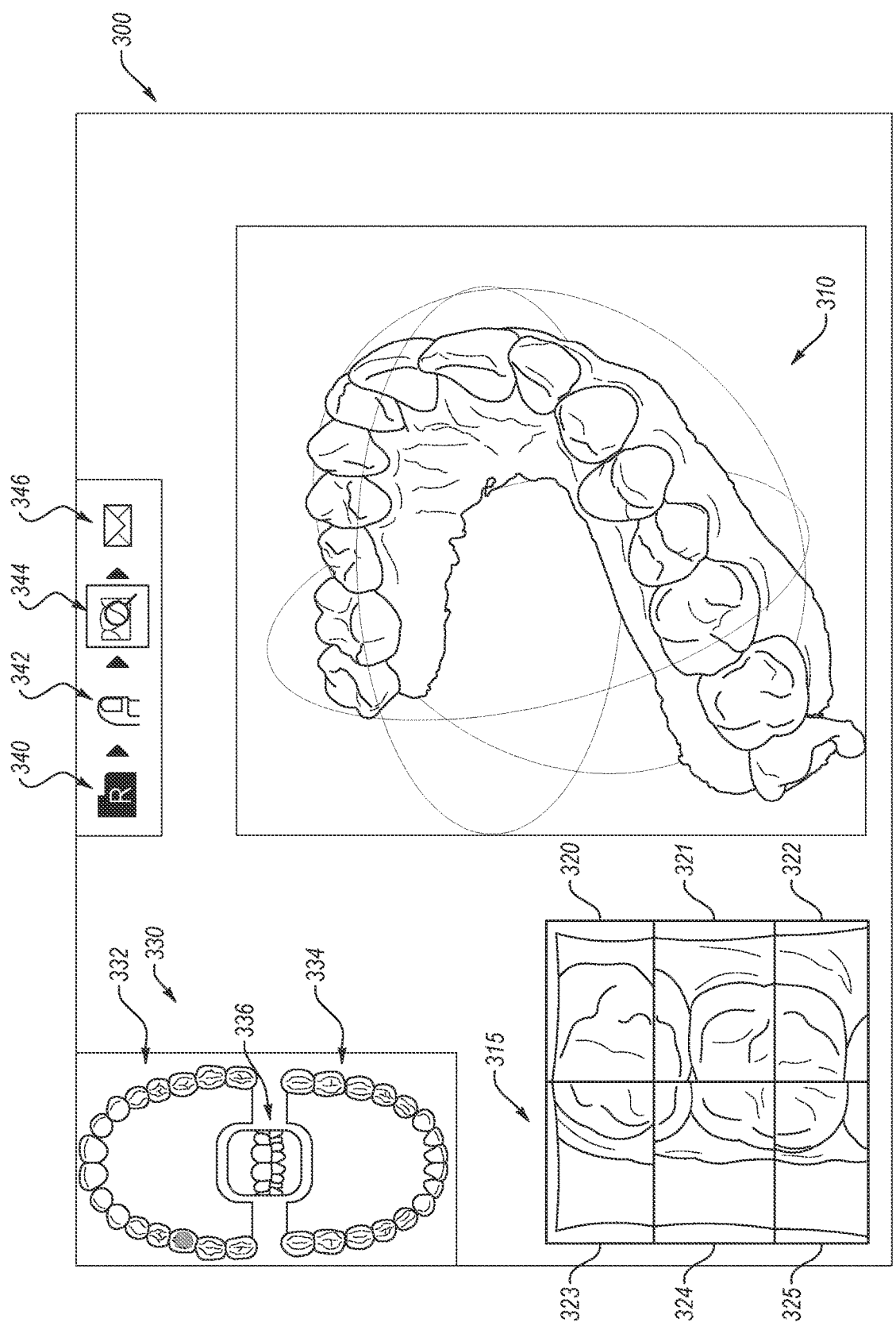
FIG. 3 illustrates a view of a graphical user interface of an intraoral scan application that includes a 3D surface and a combined 2D image of a current field of view of an intraoral scanner, in accordance with embodiments of the present disclosure.

FIG. 3 illustrates a view of a graphical user interface 300 for an intraoral scan application that includes a 3D surface 310 and a combined 2D image 315 of a current field of view (FOV) of an intraoral scanner, in accordance with embodiments of the present disclosure. The 3D surface 310 is generated by registering and stitching together multiple intraoral scans captured during an intraoral scanning session. As each new intraoral scan is generated, that scan is registered to the 3D surface and then stitched to the 3D surface. Accordingly, the 3D surface becomes more and more accurate with each intraoral scan, until the 3D surface is complete. A 3D model may then be generated based on the intraoral scans.

During intraoral scanning, it can be challenging for a user of the intraoral scanner to determine where the FOV of the scanner is currently positioned in the patient's mouth. This is especially true for intraoral scanners that include multiple cameras, where each of the cameras may generate a different 2D image (e.g., a color 2D image) of a different region and/or perspective of a scanned intraoral object. Accordingly, in embodiments multiple 2D images that are generated at or around the same time, each by a different camera, may be used to generate a single combined 2D image (e.g., a combined viewfinder image) that shows a current FOV of the intraoral scanner. In some embodiments, the combined 2D image is generated without using any 3D surface data of the dental site. For example, the combined 2D image may be generated based on projecting a set of 2D images onto a plane having a predetermined shape, angle and/or distance from a surface of a probe head of an intraoral scanner. Alternatively, 3D surface data may be used to generate a rough estimate of the surface being scanned, and the set of 2D images may be projected onto that rough estimate of the surface being scanned. Alternatively, previous 3D surface data that has already been processed using robust algorithms for accurately determining a shape of the 3D surface may be used along with motion data to estimate surface parameters of a surface onto which the set of 2D images are projected. In any case, the projected 2D images may be merged into the combined image.

The GUI for the intraoral scan application may show the combined 2D image 315 in a region of the GUI's display. The 2D images and the combined 2D image may be generated at a frame rate of about 20 frames per second (updated every 50 milliseconds) to about 15 frames per second (updated every 66 milliseconds). In one embodiment, the 2D images and combined 2D image are generated every 20-100 milliseconds. As shown, the combined 2D image 315 is constructed from a combination of intraoral 2D images 320, 321, 322, 323, 324, and 325. In the illustrated example, the edges of the various 2D images 320-325 do not perfectly align, and each individual 2D image 320-325 is discernable in the combined 2D image 315. In alternative embodiments, data from the various 2D images 320-325 may be properly aligned in the single combined 2D image, and the separate 2D images 320-325 may not be discernable.

In one embodiment, as shown, a scan segment indicator 330 may include an upper dental arch segment indicator 332, a lower dental arch segment indicator 334 and a bite segment indicator 336. While the upper dental arch is being scanned, the upper dental arch segment indicator 332 may be active (e.g., highlighted). Similarly, while the lower dental arch is being scanned, the lower dental arch segment indicator 334 may be active, and while a patient bite is being scanned, the bite segment indicator 336 may be active. A user may select a particular segment indicator 332, 334, 336 to cause a 3D surface associated with a selected segment to be displayed. A user may also select a particular segment indicator 332, 334, 336 to indicate that scanning of that particular segment is to be performed. Alternatively, processing logic may automatically determine a segment being scanned, and may automatically select that segment to make it active.

The GUI of the dental diagnostics hub may further include a task bar with multiple modes of operation or phases of intraoral scanning. Selection of a patient selection mode 340 may enable a doctor to input patient information and/or select a patient already entered into the system. Selection of a scanning mode 342 enables intraoral scanning of the patient's oral cavity. After scanning is complete, selection of a post processing mode 344 may prompt the intraoral scan application to generate one or more 3D models based on intraoral scans and/or 2D images generated during intraoral scanning, and to optionally perform an analysis of the 3D model(s). Examples of analyses that may be performed include analyses to detect areas of interest, to assess a quality of the 3D model(s), and so on. The intraoral scan application may additionally automatically generate a viewing trajectory for viewing the 3D model(s), and may show the 3D model(s) according to the determined viewing trajectory. Once the doctor is satisfied with the 3D models, they may generate orthodontic and/or prosthodontic prescriptions. Selection of an prescription fulfillment mode 346 may cause the generated orthodontic and/or prosthodontic prescriptions to be sent to a lab or other facility to cause a prosthodontic device (e.g., a crown, bridge, denture, etc.) or orthodontic device(e.g., an orthodontic aligner) to be generated.

Figure 4:
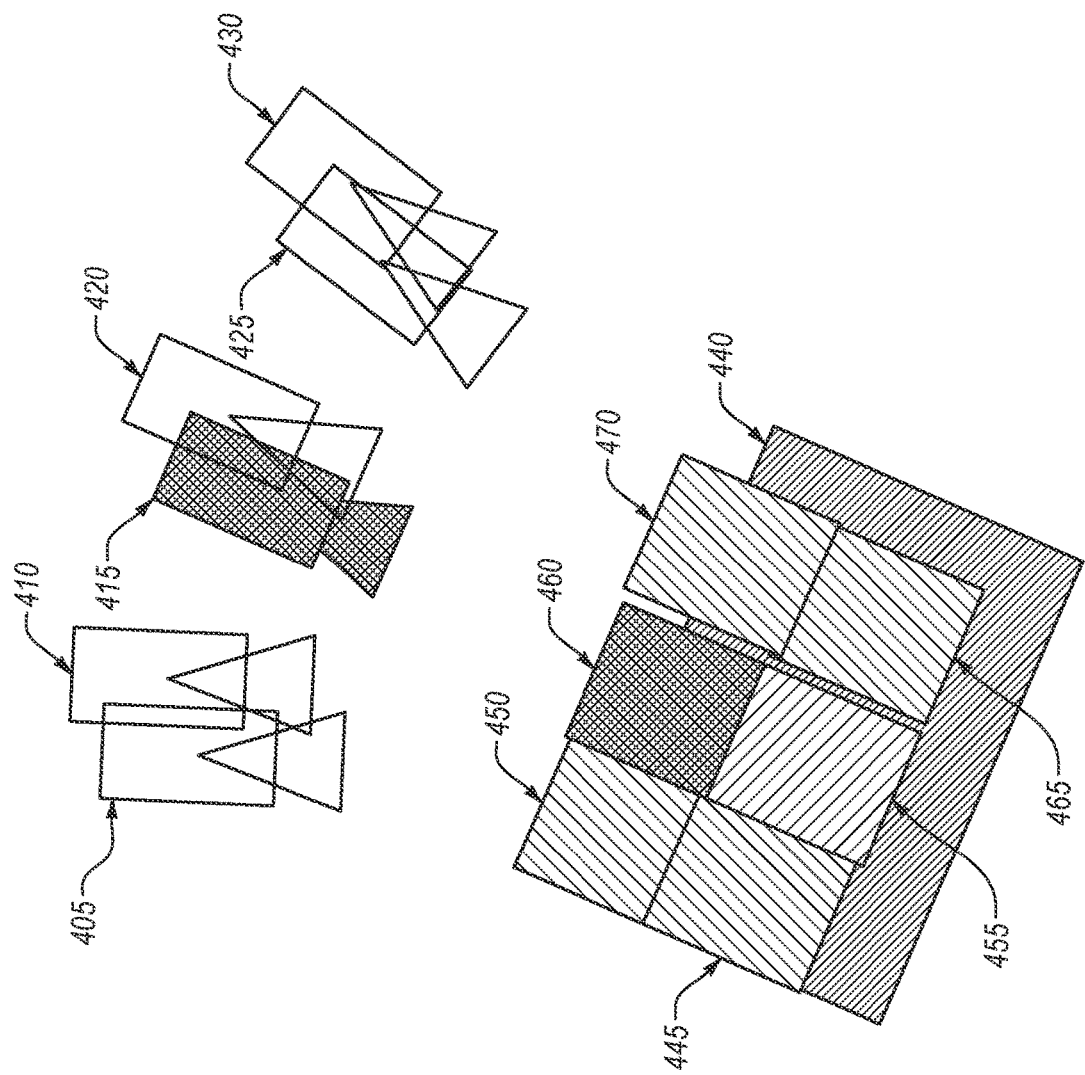
FIG. 4 illustrates projection of images of a plurality of cameras of an intraoral scanner onto a surface, in accordance with embodiments of the present disclosure.

As previously discussed, an intraoral scanner such as intraoral scanner 20 of FIG. 2A may include multiple cameras, each with a different position and orientation. Thus, a point of view of each of these cameras may be different, and each of the images may be on a different plane. FIG. 4 illustrates projection of images 445, 450, 455, 460, 465, 470 of a plurality of cameras 405, 410, 415, 420, 425, 430 of an intraoral scanner onto a surface 440, in accordance with embodiments of the present disclosure. As shown, each of the cameras 405-430 has a different orientation. The orientations and positions of the cameras may be determined by performing a calibration procedure, after which the relative positions and orientations of each of the cameras becomes known. Image 445 is generated by camera 405, image 450 is generated by camera 410, image 455 is generated by camera 415, image 460 is generated by camera 420, image 465 is generated by camera 425, and image 470 is generated by camera 430. Since each camera has a unique position, orientation, and field of view (and each image is in a unique plane), the parameters for projecting each image 445-470 onto the surface 440 are unique. Projection of the multiple images from the different points of view onto a common surface 440 enables these images to be merged into a single combined 2D image. The single combined 2D images may be orthogonal to a viewing axis of the intraoral scanner in embodiments.

The surface 440 onto which the multiple images are projected may be a plane or a more complex surface. For example, in some embodiments an actual 3D surface being imaged can be determined or estimated, and the images can be projected onto that actual 3D surface. In one embodiment, a height map of the 3D surface from a coordinate system which is located at a center of a viewing window of the intraoral scanner may be generated by projecting the 3D surface onto a plane that is orthogonal to the viewing window, and assigning height values to each pixel. Additionally, in some embodiments different surfaces may be determined for different images. For example, a first surface may be determined to project a first image onto and a second surface may be determined to project a second image onto. Additionally, or alternatively, a first surface may be determined for projecting a first portion of an image onto, and a second surface may be determined for projecting a second surface onto.

In order to connect the multiple 2D images with a maximal accuracy, the scanned 3D surface should be known (e.g., the depth of each pixel in the 2D images should be known), and the 2D images can then be projected to the actual scanned 3D surface. However, it takes time to stitch intraoral scans to the 3D surface and accurately determine an update to the 3D surface. For example, there may be a delay of about 200-300 milliseconds between when 2D images are generated and when a 3D surface associated with those 2D images is known. However, it may be desirable to generate and present a combined 2D image immediately (e.g., in under 50-100 milliseconds) without waiting for the 3D surface to be known. Accordingly, the 3D surface may be estimated, or a predetermined surface to project the 2D images onto may be used.

FIGS. 5A-5D illustrate multiple different planes (referred to as projection planes) onto which images may be projected, in accordance with embodiments of the present disclosure. Note that projection planes are one type of projection surface onto which images may be projected. In some embodiments, projection planes are orthogonal to a viewing axis of an intraoral scanner. In some embodiments, projection planes are at an acute or obtuse angle relative to a viewing axis of an intraoral scanner. A projection plane may have a predetermined distance from a probe head of an intraoral scanner (e.g., from a surface of one or more cameras of the intraoral scanner). For example, most scanned dental sites have surfaces that are between about 1-15 mm (e.g., about 5-10 mm, or about 7-8 mm) from a surface of a probe head. A projection plane may have a predetermined distance that is based on the average or standard distance of surfaces of scanned dental sites from the intraoral scanner.

Figure 5D:
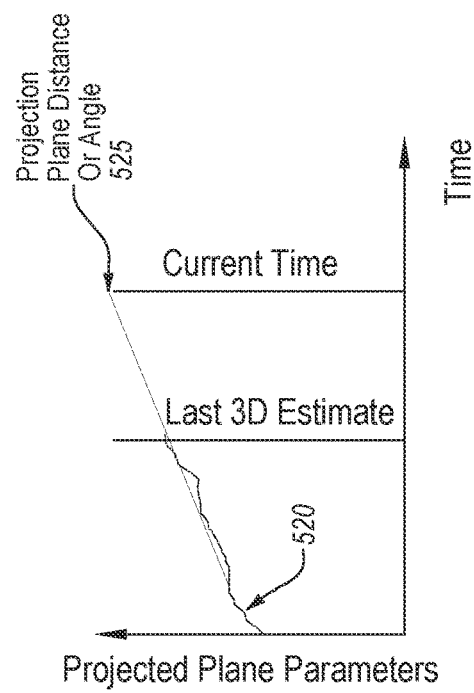
FIGS. 5A-5D illustrate multiple different planes onto which images may be projected, in accordance with embodiments of the present disclosure.

In other embodiments, a distance of a projection plane from the intraoral scanner may be determined based on one or more previously generated intraoral scans. Such intraoral scans include depth information, but it takes time to calculate such depth information from the scans. In embodiments, processing logic may determine an average distance between points on a surface of a scanned dental site and the intraoral scanner, and determine a distance for a projection plane 505 based on such an average as shown in FIG. 5A. The average may be based on a single intraoral scan or on multiple intraoral scans. For example, the average may be computed using a moving average of distances within a moving window. In other embodiments, as shown in FIG. 5B, processing logic may compute one or more distance percentiles from previously determined distance information from intraoral scans, and determine a distance for a projection plane 510 based on such a determined distance percentile, such as an upper presential, a $10^{th}$ percentile, a $20^{th}$ percentile, a $50^{th}$ percentile, a $60^{th}$ percentile, a $75^{th}$ percentile, a $90^{th}$ percentile, and so on.

An intraoral scan application may determine one or more distances between a scanning face of the probe of the scanner and a dental object being scanned. The intraoral scan application may determine, for example, an average distance, a maximum distance, a minimum distance, one or more distance percentiles, and so on based on an intraoral scan or based on a set of recent intraoral scans (e.g., a past 2-10 intraoral scans). The set of recent intraoral scans may exclude one or more most recent scans that have yet to be processed. Distances may be determined using structured light, confocal imaging, stereo imaging, and/or other techniques for 3D imaging. Processing logic may compute statistics on determined distances from an intraoral scan or multiple intraoral scans, such as a minimum distance, a maximum distance, an average distance, a median distance, one or more distance percentiles (e.g., a 90% percentile, a 75% percentile, a 50% percentile, a $20^{th}$ percentile, a $10^{th}$ percentile, and so on). One of more such distance statistics may be used to determine a scan distance value, which may be used to set a distance for a projection surface.

Figure 5C:
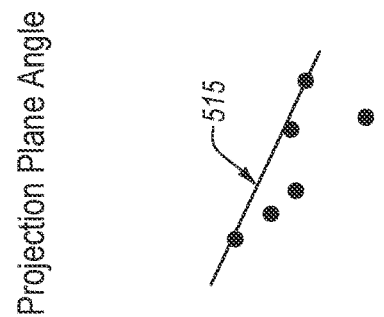
Figure 5B:
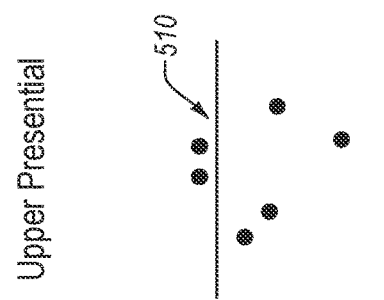
Figure 5A:
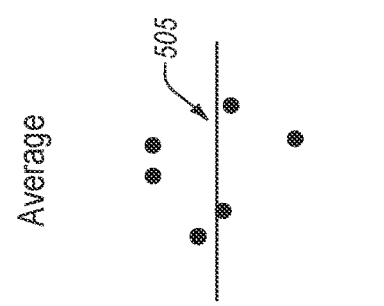

In some embodiments, as shown in FIG. 5C, a projection plane angle other than 90 degrees from the imaging axis of the intraoral scanner may be determined. For example, a general slope may be determined based on multiple distances determined for different points on a surface from a single intraoral scan or from multiple intraoral scans. A projection plane angle may then be computed for a projection plane 515 based on those distances.

In some embodiments, as shown in FIG. 5D, one or more projection parameters 520 for a projection plane may be determined based on projection plane parameters as deduced from a plurality of intraoral scans generated within a time window (e.g., in a last 10 seconds, last 5 seconds, last 1 second, etc.). Projection plane parameters 520 such as distance and/or angle of a projection plane relative to an intraoral scanner may be determined for multiple different times based on intraoral scans. A change in the projection parameter and/or a rate of change in the projection parameter may be determined based on the multiple estimates and known times at which the data used for the estimates was generated. The change and/or rate of change for the projection plane parameters may then be projected to a current time, for which distance information may not yet be available. Based on the projection of the change and/or rate of change of the projection change parameter to the current time, a current projection plane parameter (e.g., projection plane distance and/or projection plane angle 525) may be estimated for the current time. This current projection plane parameter may then be used for a projection plane to project a current set of intraoral 2D images onto.

In one embodiment, processing logic performs neural image-based rendering, which is a hybrid between classical image-based rendering (IBR) and deep neural networks that can replace manual heuristics with learned components. A classical IBR method uses a set of captured images and a proxy geometry to create new images, e.g., from a different viewpoint. The proxy geometry is used to re-project image content from the captured images to the new target image domain. In the target image domain, the projections from the source images are blended to composite the final image. This simplified process gives accurate results only for diffuse objects with precise geometry reconstructed with a sufficient number of captured views. However, artifacts such as ghosting, blur, holes, or seams can arise due to view-dependent effects, imperfect proxy geometry or too few source images. To address these issues, neural image-based rendering methods replace the heuristics often found in classical BR methods with learned blending functions or corrections that take into account view-dependent effects.

The methods and apparatuses herein may generate novel views from received scan data (e.g., the received plurality of 2D images and corresponding camera position information). Any of these methods and apparatuses may include image-based rendering (IBR) for synthesizing novel views (e.g., of teeth) from sampled views, using contributing images of the received images. This method may allow for the generating of novel images from a set of images (e.g., the received plurality of scanned 2D images, as may be provided by an intraoral scanner).

The contributing images may each be broken into multi-plane layers. The layers may be sampled evenly in disparity within the contributing image camera view's frustum. For example, these layers may be formed by re-projecting each plane/layer onto the sensor plane of a novel view camera and alpha compositing the planes from back to front, encoding a local light field. The adjacent layers of the contributing images may then be blended. Thus, in some variations the contributing images may be projected into multiple layers (which may also be referred to as planes) that are parallel to the new viewpoint that they are to produce (e.g., the surface or screen that will be project onto). Then this can be blended, as described above.

The methods described herein may be automated using a machine learning agent (e.g., a novel view generating machine learning agent) that may perform all or some of these steps, including, for example, dividing each contributing image into multi-plane layers, and blending the adjacent layers of the multi-plane layers of the contributing images. In particular, the blending may be performed by a machine learning agent. The machine learning agent may be trained on a training dataset, for example, a dental dataset. In some variations the machine learning agent may be trained on a dataset (e.g., a scanned dental dataset) in which a known point, having a known camera position, is removed from the dataset and is used as the target point. The actual image at that known (now target) point may be used. Given the large number of images at known camera positions (one of which is a combined image that may be constructed from a 3D model), many such target training points (images) may be generated, allowing multiple iterations (e.g., thousands, tens of thousands, hundreds of thousands, etc.). Novel view generation may relate to the production of new views from a given set of images (where the camera location of each image is also known). The new view or views may be created for a novel camera location of a virtual camera for which an image was not captured. The novel camera location may be at a center of a combined FOV of the multiple cameras, and may be oriented orthogonal to a longitudinal axis of the intraoral scanner. For example, novel view generation be used to create new views from multiple (e.g., 3, 4, 5, 6, etc.) images for display and/or for use in generating a combined image. The plurality of images, such as images taken with an intraoral scanner, which may also record the camera location to a high degree of accuracy, e.g., using built-in accelerometer or other position sensor(s). These images (which may form an image "soup" including a plurality of images) may be acquired during the scan and additional novel views may be generated from this image soup after post processing.

The generation of novel images of the teeth may be particularly desirable when the plurality of images, e.g., in the scan data, are taken while the teeth are very close to the imaging camera (e.g., the intraoral scanner). For example, a pinhole of a camera (of an scanner) may be, e.g., located ~7 mm above the teeth in some variations, as compared to other scanners (where the teeth may be scanned ~90 mm from the teeth), even where the scanner has a very wide angle (which may result in perspective distortions). For example, a typical intraoral scanner may have a view that spans just a single tooth (where the camera is scanned, e.g., between 1-20 mm from the teeth) or two teeth (where the camera is scanned, e.g., between 25-100 mm from the teeth). Thus, even if the field of view is large enough to cover more than one tooth (e.g., 2-3 teeth) the field of view may be sufficiently narrow so as to limit the perspective of the tooth or teeth within the patient's dentition (e.g., the upper and/or lower dental arch), which may make it difficult to understand from the received images alone the relative position and orientation of the tooth in the jaw and to understand clinical findings in the image. However, despite the relatively small field of view, the scan images acquired may have a very high signal to noise, sharpness, resolution, and other optical properties. In addition, many of these scanned image data sets may include many hundreds and thousands of images.

As a result, the methods and apparatuses described herein, which may permit the formation of relatively large field of view combined images from collection of acquired images (e.g., the image soup) for post processing, or from currently (in real-time) scanned multiple images, where the scanner includes multiple, offset imaging cameras (e.g., in some variations 6 or more images may be concurrently imaged), may be used to generate novel or synthetic images. For example, in some variations a scanner that is capable of scanning multiple images concurrently, from different offset positions on the scanner (e.g., the wand of the scanner) may be configured, as described herein, to display a novel, synthetic image from a point that is between the multiple cameras on the scanner, including at a central region; this may be particularly helpful where the cameras are offset (e.g., on the sides) of the scanner. Displaying an image from the tip and/or center of the scanning tool (e.g., wand) may be more intuitive than displaying one or more images from cameras on the side of the scanning tool.

Figure 17:
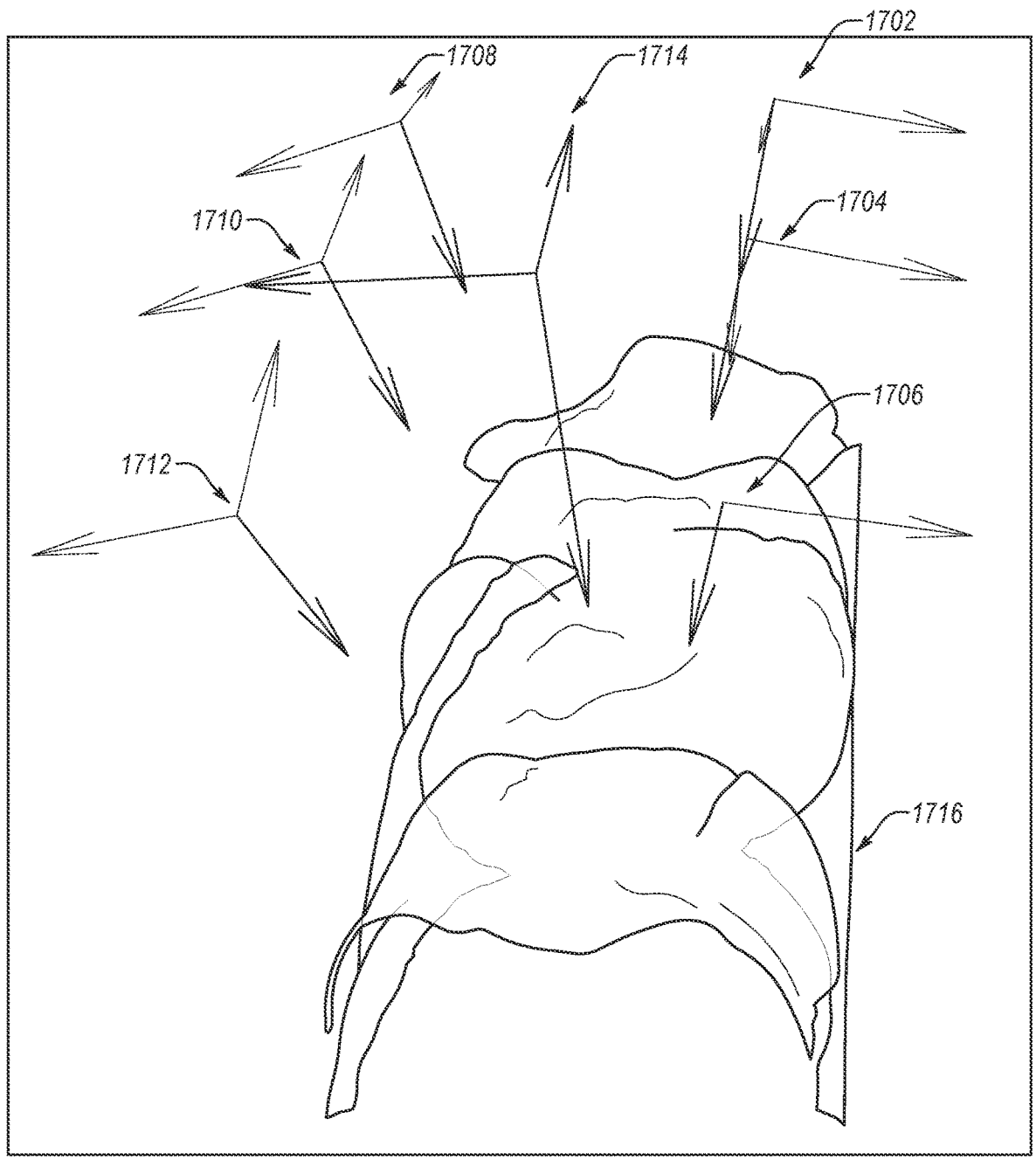
FIG. 17 illustrates reference frames of multiple cameras of an intraoral scanner and a reference frame for a combined image generated from 2D images captured by the multiple cameras, in accordance with an embodiment of the present disclosure.

As an initial step, the novel viewpoint may be identified. For example, a novel view direction corresponding to a viewing or imaging axis of the intraoral scanner may be chosen from the received scan data. FIG. 17 shows the selection of a novel view direction 1714 as compared to six other camera view directions 1702, 1704, 1706, 1708, 1710, 1712. Contributing images from the image data set may be transformed into multi-plane layers, for example, by projecting to a grid which contains a number of planes parallel to the screen of the novel viewing camera. Each point in the screen may correspond to a pixel on the novel view image. In some variations, after the contributing images from the input images are projected on the grid they may result in a tensor having a size based on image width, image height and number of projection planes. The adjacent layers of the transformed multi-layered contributing images may then be blended to form the novel viewpoint image.

As mentioned above, in any of these methods and apparatuses, a machine learning agent may be trained and used, e.g., to blend the layers of the contributing images. For example, a machine learning agent may be trained using the plurality of scan images received (e.g., from the intraoral scanner), by a "leave one out" method, in which one image is removed and the camera position for the removed image is used as the true ("ground truth") image when using three neighboring images and trying to predict the image which was removed.

FIGS. 6-13 are flow charts illustrating various methods related to generation of a combined 2D image from a set of 2D images of an intraoral scanner. Each image in the set of 2D images is generated by a different camera, which may have a unique position and orientation relative to the other cameras. Thus, the various cameras may have different fields of view, which may or may not overlap with the fields of view of other cameras. Each camera may generate images having a different perspective than the other images generated by the other cameras. The methods may be performed by a processing logic that may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by a computing device of a scanning system and/or by a server computing device (e.g., by computing device 105 of FIG. 1 or computing device 4000 of FIG. 40).

Figure 6:
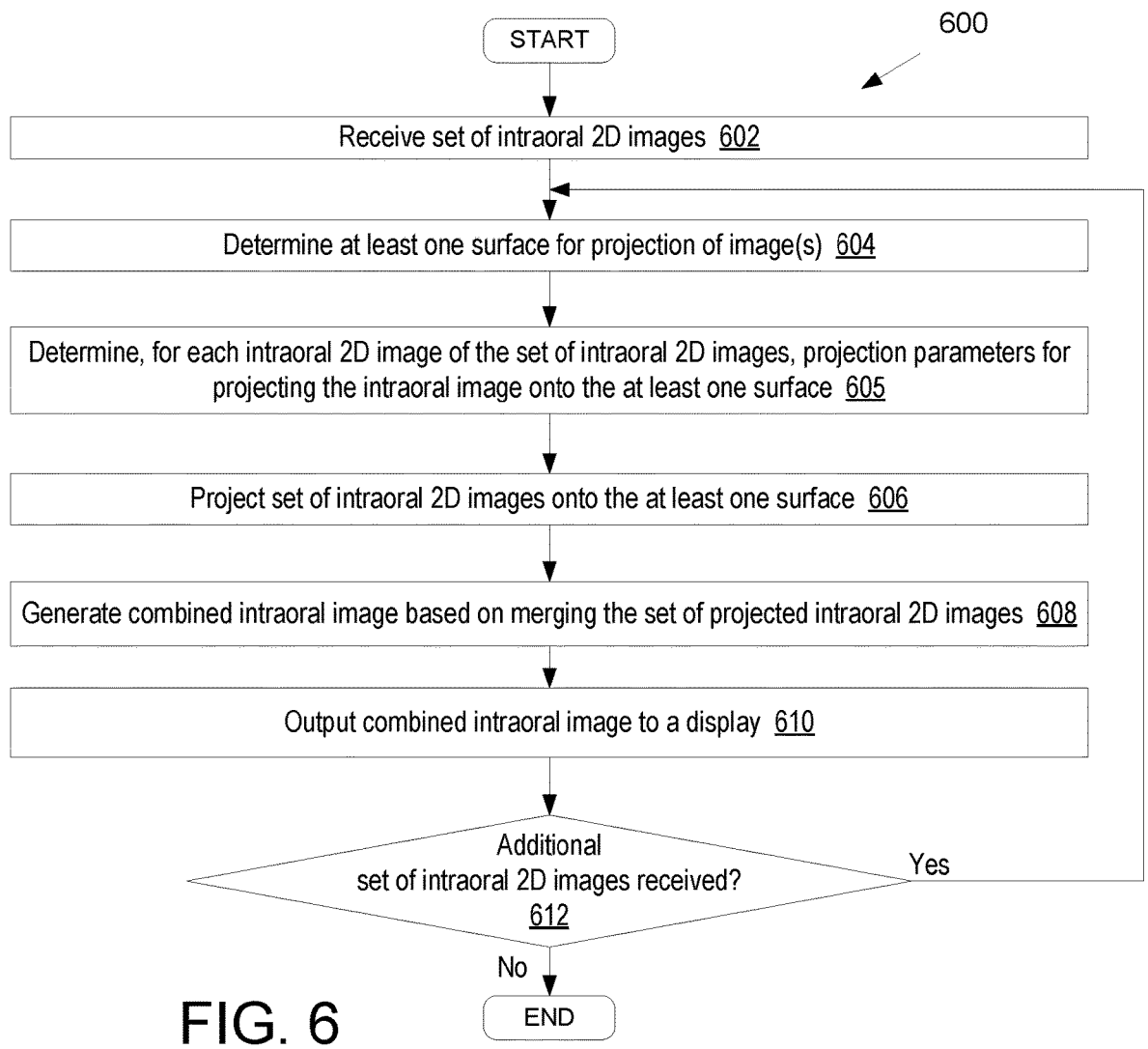
FIG. 6 illustrates a flow chart of an embodiment for a method of generating a combined image from a plurality of disparate images generated by cameras of an intraoral scanner, in accordance with embodiments of the present disclosure.

FIG. 6 illustrates a flow chart of an embodiment for a method 600 of generating a combined image from a plurality of disparate images generated by cameras of an intraoral scanner, in accordance with embodiments of the present disclosure. The combined image may be, for example, a combined viewfinder image that shows a current field of view of an intraoral scanner. At block 602 of method 600, processing logic receives a set of intraoral 2D images. The intraoral 2D images may be color 2D images in embodiments. Alternatively, the 2D images may be monochrome images, NIRI images, or other type of images. Each of the images in the set of images may have been generated by a different camera or camera at the same time or approximately the same time. For example, the set of images may correspond to images 445-470 of FIG. 4 or images 320-325 of FIG. 3.

At block 604, processing logic determines at least one surface (also referred to as a projection surface) to project the set of 2D images onto. The different 2D images may show a dental site from different angles and positions. Projection of the images from the set of images onto the surface transforms those images into images associated with a reference viewing axis (e.g., of a single virtual camera) that is orthogonal to the surface (or at least a point on the surface) onto which the images are projected. The intraoral 2D images may be projected onto a single surface or onto multiple surfaces. The surface or surfaces may be a plane, a non-flat (e.g., curved) surface, a surface having a shape of a smoothed function, a 3D surface representing a shape of a dental site depicted in the intraoral 2D images, 3D surface that is an estimate of a shape of the dental site, or surface having some other shape. The surface may be, for example, a plane having a particular distance from the intraoral scanner and a particular angle or slope relative to the intraoral scanner's viewing axis. The surface or surfaces may have one or more surface parameters that define the surface, such as distance from the intraoral scanner (e.g., distance from a particular point such as a camera, window or mirror on the intraoral scanner along a viewing axis), angle relative to the intraoral scanner (e.g., angle relative to the viewing axis of the intraoral scanner), shape of the surface, and so on. The surface parameters such as distance from scanner may be pre-set or user selectable in some embodiments. For example, the distance may be a pre-set distance of 1-15 mm from the intraoral scanner. In one embodiment, the surface onto which the images are projected is a plane that is orthogonal to a viewing axis of the intraoral scanner. In one embodiment, processing logic projects a 3D surface or an estimate of a 3D surface based on recently received intraoral scans onto the plane to generate a height map. Height values may be used to help select image data to use for pixels of a combined 2D image.

In some embodiments, different regions of an image are projected onto different surfaces. For example, if it is known that a first region of a dental site is approximately at a first distance from the intraoral scanner and a second region of the dental site is approximately at a second distance from the intraoral scanner, then a first region of an image that depicts the first region of the dental site may be projected onto a first surface having the first distance from the intraoral scanner and a second region of the image that depicts the second region of the dental site may be projected onto a second surface having the second distance from the intraoral scanner. In some embodiments, different images are projected onto different surfaces. In some embodiments, one or more of the images are projected onto multiple surfaces, and a different combined image is generated for each of the surfaces. A best combined image (associated with a particular surface) may then be selected based on an alignment of edges and/or projected image borders between the projections of the 2D images onto the respective surfaces. The surface that resulted in a closest alignment of edges and/or borders between the 2D images may be selected as the surface to use for generation of the combined image, for example. Techniques for surface determination are described in greater detail below with reference to FIGS. 7-11.

At block 605, processing logic determines, for each intraoral 2D image of the set of intraoral 2D images, projection parameters for projecting the intraoral image onto the at least one surface. Each camera may have a unique known orientation relative to the surface, resulting in a unique set of projection parameters for projecting images generated by that camera onto a determined surface.

At block 606, processing logic projects the set of intraoral 2D images onto the at least one surface. Each projection of a 2D image onto the surface may be performed using a unique set of projection parameters determined at block 605.

At block 608, processing logic generates a combined intraoral image based on merging the set of projected intraoral 2D images. Merging the images into a single combined image may include performing image registration between the images and stitching the images together based on a result of the registration. In one embodiment, the 2D images were projected onto a height map. Processing logic may determine, for every point on the height map, and for every image that provides data for that point, an angle between a chief ray of a camera that generated the image and an axis orthogonal to the height map. Processing logic may then select a value for that point from the image associated with the camera having a smallest angle between the chief ray and the axis orthogonal to the height map. In other words, processing logic takes, for every point on the height map, its value from the camera for which its camera direction (chief ray) is the closest to the direction from the camera pinhole to the point on the height map.

Merging the set of images may include, for example, simply aligning the image boundaries of the images with one another (e.g., by tiling the images in a grid). Merging the set of images may additionally or alternatively include performing one or more blending operations between the images. For example, in some instances the lines and/or edges within a first image may not line up with lines and/or edges in an adjacent second image being merged with the first image. A weighted or unweighted average may be used to merge the edges and/or lines within the images. In one embodiment, an unweighted average is applied to the center of an overlap between two adjacent images. Processing logic can smoothly adjust the weightings to apply in generating the average of the two overlapping 2D images based on a distance from the center of the overlapped region. As points that are closer to an outer boundary of one of the images are considered, that one image may be assigned a lower weight than the other image for averaging those points. In one embodiment, Poisson blending is performed to blend the projected 2D images together.

In one embodiment, processing logic determines outer boundaries of each intraoral 2D image of the set of intraoral 2D images that has been projected onto the surface. Processing logic then determines one or more image boundaries in a first 2D image of the set of 2D images that fail to line up in an overlapping region with one or more image boundaries in an adjacent second 2D image of the set of 2D images. Processing logic then adjusts at least one of the first 2D image or the second 2D image to cause the one or more image boundaries in the first intraoral 2D image to line up with the one or more image boundaries in the adjacent second intraoral 2D image. This may include, for example, re-scaling one or both of the 2D images, stretching or compressing one or both of the 2D images along one or more axis, and so on.

In one embodiment, merging of the projected 2D images includes deforming one or more of the images to match gradients at the boundaries of adjacent images. For example, some regions of the initially projected images may not register properly due to the various camera angles or perspectives associated with the images. In one implementation, processing logic uses a global optimization method to identify the appropriate image deformation required to match the boundaries of adjacent images. Once the deformation has been identified, processing logic can apply a deformation to one or more of the projected images to deform those images. Processing logic may then blend the images (one or more of which may be a deformed image) to produce a final combined image. In one implementation, processing logic uses Poisson blending to use target gradients from non-blended images to produce a blended image with gradients that best match those target gradients.

As discussed, some regions of the projected images may not register properly due to the various camera angles or perspectives associated with those images. Accordingly, it may be necessary to register and/or deform the projected images to match gradients at the boundaries of adjacent images. The deformation may include several distinct steps, such as a global optimization followed by a local optimization along the image boundaries only. In one example, a global optimization technique (such as projective image alignment by using Enhanced Correlation Coefficient, or ECC, maximization) can be used to identify the appropriate image deformation required to match the boundaries of adjacent images. After applying the deformation identified in the global optimization, the image boundaries may still not match. Next a local optimization along the image boundaries only can be used to identify an appropriate deformation along the image boundaries required to match the boundaries of adjacent images. The identified boundary deformation can be analytically extended to the interior of each image to deform the images in a smooth and realistic manner. The resulting deformed images can be blended to produce a combined image. Other techniques for merging the projected 2D images are discussed below with reference to FIG. 12.

At block 610, processing logic outputs the combined intraoral image to a display. The combined intraoral image may be, for example, a viewfinder image that shows a field of view of the intraoral scanner.

In some instances, a user may move the intraoral scanner within a patient's oral cavity using jerky or non-steady motions, or may move the scanner more quickly than images are generated. This may cause the image showing the FOV of the intraoral scanner to appear jerky, which may make it more difficult for a user to visually follow the motion of the scanner. In embodiments, processing logic generates an intermediate combined intraoral image based on performing interpolation between two or more adjacent in time combined intraoral images. The interpolation may be performed using just the data from the combined images themselves. Alternatively, motion of the intraoral scanner may be determined using data from an IMU and/or based on analysis of multiple images and/or intraoral scans taken at different periods of time. The determined motion of the intraoral scanner may be used together with two or more combined images and/or intraoral scans to generate the intermediate combined image. The intermediate combined image may then be output to the display before the combined image representing a current field of view of the intraoral scanner. This may cause the movement of imaged surfaces between combined images to appear more smooth.

In one embodiment, movement data is generated by an inertial measurement unit (IMU) of the intraoral scanner. The IMU may generate inertial measurement data, including acceleration data, rotation data, and so on. The inertial measurement data may identify changes in position in up to three dimensions (e.g., along three axes) and/or changes in orientation or rotation about up to three axes. The movement data from the IMU may be used to perform dead reckoning of the scanner 150. In embodiments, movement data from the IMU is particularly accurate for detecting rotations of the scanner 150. Data from the IMU may not take into account a patient's head motions, which would affect a relative position and orientation of 3D scans even in the absence of any movement of the scanner 150. In embodiments patient motions are identified and accounted for in estimating relative positions and orientations between 3D scans.

In one embodiment, movement data is generated by extrapolating changes in position and orientation (e.g., current motion) based on recent intraoral scans that successfully registered together. Processing logic may compare multiple intraoral images (e.g., 2D intraoral images) and/or intraoral scans and determine a distance between a same point or sets of points that are represented in each of the multiple intraoral images and/or intraoral scans. For example, movement data may be generated based on the transformations performed to register and stitch together multiple intraoral scans. Processing logic may determine times at which each of the images and/or scans was generated and the distances between the features in the images and/or scans to determine a rate of change of the distances between the features (e.g., a speed of the intraoral scanner between scans). This information may be used to estimate a motion of the scanner. In one embodiment, processing logic may determine times at which each of the images and/or scans was generated and the transformations between scans to determine a rate of rotation and/or movement between scans. In embodiments, movement data determined based on intraoral scans and/or 2D images is particularly accurate for translations.

At block 612, processing logic determines whether an additional set of intraoral images has been received. If so, the method returns to block 604 and operations 604-610 are repeated for the new set of intraoral 2D images. This process may continue until at block 612 a determination is made that no new intraoral 2D images have been received, at which the method may end. The intraoral scanner may periodically or continuously generate new sets of intraoral images, which may be used to generate a combined 2D image in real time or near-real time. Thus, the user of the intraoral scanner may be continuously updated with a combined image showing the current field of view of the intraoral scanner.

Figure 7:
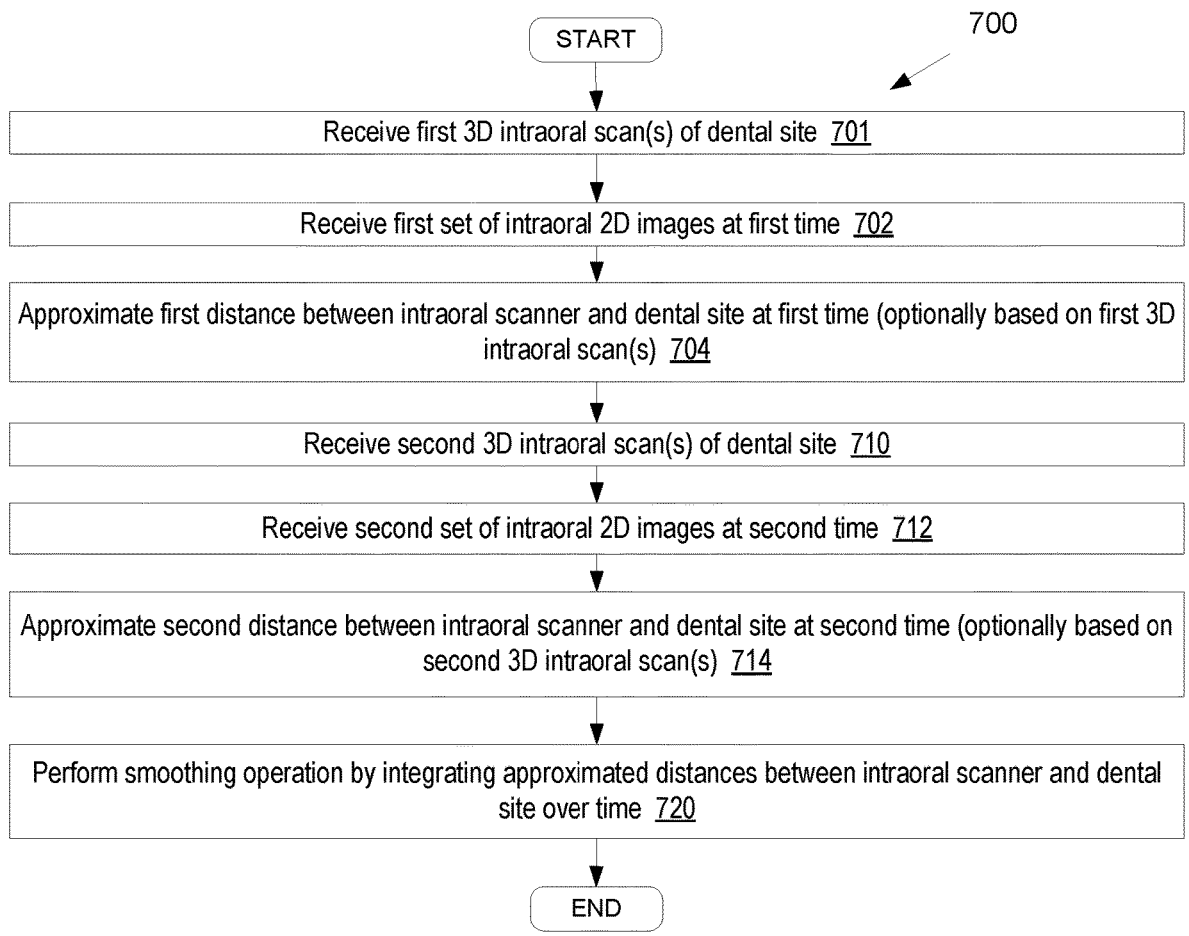
FIG. 7 illustrates a flow chart of an embodiment for a method of determining a surface to project images onto, in accordance with embodiments of the present disclosure.

FIG. 7 illustrates a flow chart of an embodiment for a method 700 of determining a surface to project images onto, in accordance with embodiments of the present disclosure. Method 700 may be performed, for example, at block 604 of method 600 in an embodiment.

At block 701 of method 700, processing logic receives one or more first intraoral scans of a dental site. At block 702, processing logic receives a first set of intraoral 2D images of the dental site. The first set of intraoral 2D images may have been generated at a first time. At block 704, processing logic approximates one or more first distance between the intraoral scanner and the dental site at the first time. The first 3D intraoral scans may have been generated at or around the first time. Accordingly, distance information from the first 3D intraoral scans may be used to determine distances of points in the first set of 2D images from the intraoral scanner. In one embodiment, the first set of 2D images are registered with the first 3D intraoral scans or to a 3D surface generated from the first 3D intraoral scans. Accordingly, there may be a pixel to pixel (or point to point) correlation between pixels in the images from the first set of 2D images and points in the first 3D intraoral scans or 3D surface. Alternatively, one or more distance statistics (e.g., average, median, percentile, etc.) may be determined based on the intraoral scans and/or 3D surface, and these distance statistics may be applied to the first set of 2D images.

At block 710, processing logic receives one or more second intraoral scans of the dental site. At block 712, processing logic receives a second set of intraoral 2D images of the dental site. The second set of intraoral 2D images may have been generated at a second time. At block 714, processing logic approximates one or more second distance between the intraoral scanner and the dental site at the second time. The second 3D intraoral scans may have been generated at or around the second time. Accordingly, distance information from the second 3D intraoral scans may be used to determine distances of points in the second set of 2D images from the intraoral scanner. In one embodiment, the second set of 2D images are registered with the second 3D intraoral scans or to a 3D surface generated from the second 3D intraoral scans. Accordingly, there may be a pixel to pixel (or point to point) correlation between pixels in the images from the second set of 2D images and points in the second 3D intraoral scans or 3D surface. Alternatively, one or more distance statistics (e.g., average, median, percentile, etc.) may be determined based on the second intraoral scans and/or 3D surface, and these distance statistics may be applied to the second set of 2D images.

In some instances, a user of the intraoral scanner may move the scanner within a patient's oral cavity with jerky and/or unsteady motions. This may cause updates in position and orientation of the 3D surface to appear jumpy. This is especially noticeable when the intraoral scanner is rotated substantially or shifted substantially between generation of a previous intraoral scan and generation of a current intraoral scan. Accordingly, processing logic may perform a smoothing operation by integrating the approximated distances and/or other surface parameters determined for the first and second times over time and/or extrapolating into the future or to a current time. In some embodiments, a linear interpolation is performed on a virtual camera position and orientation between scans. Processing logic may generate one or multiple intermediate updates to a view of the 3D surface, and show a sequence of the one or multiple intermediate updates before showing a current update reflecting a current position and orientation of the virtual camera. In some instances, the actual position and orientation of the virtual camera associated with some intraoral scans may not be shown. The smoothing operation may modify one or more parameters of the surface so that individual points that are higher than adjacent points are reduced and/or individual points that are lower than adjacent points are increased, leading to a smoother signal. The smoothing operation may be performed by approximating a function that attempts to capture patterns in the data, while leaving out noise or other fine-scale phenomena and/or structures. Examples of smoothing functions that may be used include a Kalman filter, a Kernel smoother, exponential smoothing, local regression, a moving average, a least squares filter, and so on. Accordingly, the determined surface distance may not correspond to an actual current surface distance.

Figure 8:
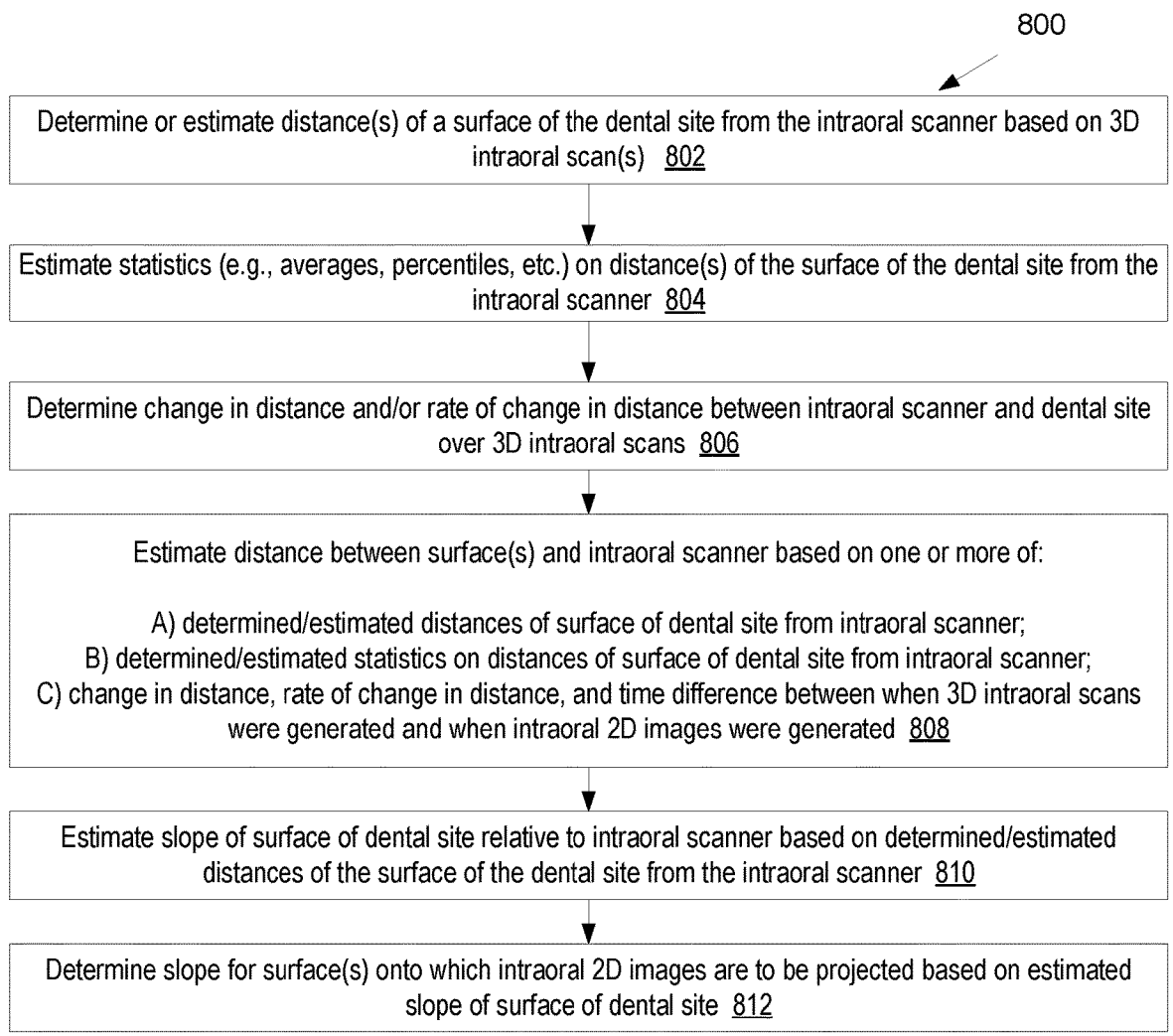
FIG. 8 illustrates a flow chart of an embodiment for a method of determining a surface to project images onto, in accordance with embodiments of the present disclosure.

FIG. 8 illustrates a flow chart of an embodiment for a method 800 of determining a surface to project images onto, in accordance with embodiments of the present disclosure.

Method 800 may be performed, for example, at block 604 of method 600 in an embodiment.

At block 802 of method 800, processing logic determines or estimates a surface of the dental site being scanned from an intraoral scanner scanning the dental site based on one or more 3D intraoral scans generated by the intraoral scanner. This may include rapidly processing a most recent intraoral scan to determine distances for a plurality of points in the intraoral scan. The distances may be rough estimates for distances, and distances may not be determined for all points in the intraoral scan in embodiments. Accuracy may be sacrificed in some embodiments to increase a speed of determining the distances.

At block 804, processing logic estimates statistics on distances of the surface of the dental site from the intraoral scanner. The distance statistics may be determined from the distances determined or estimated at block 802. Examples of statistics that may be computed include an average distance, a moving average of distance, one or more distance percentiles (e.g., a $50^{th}$ percentile to a $90^{th}$ percentile), a distance median, and so on. At block 806, processing logic may determine a change in distance and/or a rate of change in distance between the intraoral scanner and the dental site over the 3D intraoral scans.

At block 808, processing logic may then estimate a distance to use for a projection surface, where the distance is the distance of the projection surface from the intraoral scanner (e.g., from a face of the intraoral scanner along a viewing axis). The distance may be estimated based on the distances and/or distance statistics and/or changes in distance and/or rates of change in distance determined at block 802, 804 and/or 806. In one embodiment, the distance to use for the surface is determined based on the determined or estimated distance(s) of the surface of the dental site from the intraoral scanner. In one embodiment, the distance to use for the surface is determined based on the estimated statistics. For example, the average distance may be used for the distance of the surface from the scanner, or an $80^{th}$ percentile of the distance may be used for the distance of the surface from the scanner. In one embodiment, the distance to use for the surface is determined based on the determined change in distance and/or rate of change in distance between the intraoral scanner and the dental site. A most recently computed distance may have been determined from a recent intraoral scan. The last recorded distance may be projected to a current time based on the determined change in distance and/or rate of change in distance and a time difference between when the 3D intraoral scans used to compute the distance was generated and when the current 2D images were generated.

In one embodiment, at block 810 processing logic determines a slope of the dental site relative to the intraoral scanner based on the determined or estimated distances of the surface of the dental site from the intraoral scanner. In one embodiment, processing logic determines the slope for the surface(s) onto which the 2D images are to be projected based on the estimated slope of the surface of the dental site.

Figure 9:
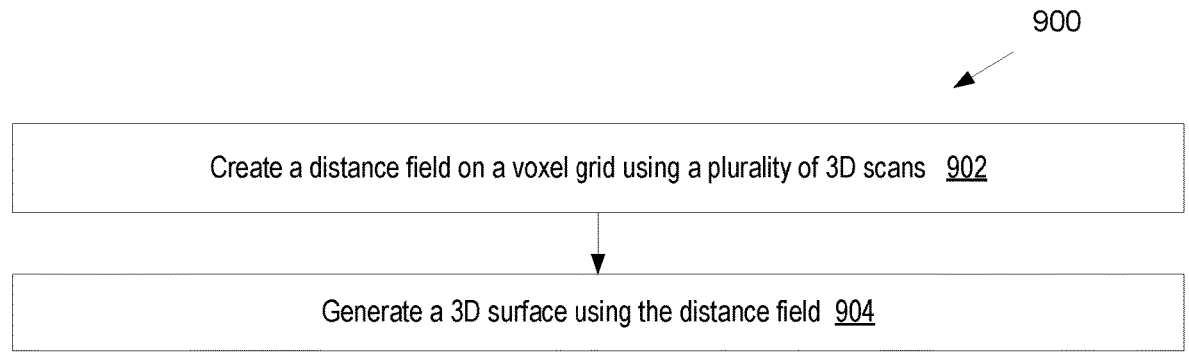
FIG. 9 illustrates a flow chart of an embodiment for a method of determining a surface to project images onto, in accordance with embodiments of the present disclosure.

FIG. 9 illustrates a flow chart of an embodiment for a method 900 of determining a surface to project images onto, in accordance with embodiments of the present disclosure. Method 900 may be performed, for example, at block 604 of method 600 in an embodiment. Method 900 may represent a quick merge algorithm that quickly computes an estimate of a 3D surface of a scanned dental object based on merging together multiple intraoral scans in a manner that is much faster or that requires fewer resources (e.g., processor resources) than a standard registration and stitching algorithm.

At block 902 of method 900, processing logic may execute a first stage of a 3D surface generation algorithm. For the first stage, processing logic creates a distance field on a voxel grid using one or a plurality of received 3D intraoral scans. Each of the 3D scans may include a point cloud. For a 3D scan, each of the points in the point cloud of the 3D scan may include coordinates. The points may additionally include normals (e.g., vectors normal to a surface at the point) and/or weights. Alternatively, the normals and weights may be computed. Each voxel in the voxel grid may have a weight and a distance to a plane. The distance to the plane may be computed as a dot product between a) a distance from the point to a voxel and b) a normal of the point. For each point of the point cloud, processing logic identifies n nearest voxels, and updates the weight and distance to the plane for each of the voxels, where n may be an integer value (e.g., 10-50, 20-30, or 27). If a voxel's distance to the plane changes sign after an update, then processing logic marks edges between this voxel and its neighboring voxels. The first stage may be performed based on data from a point cloud based on a single intraoral scan or a point cloud based on a combination of multiple intraoral scans.

At block 904, processing logic may execute a second stage of the 3D surface generation algorithm. For the second stage, processing logic generates a 3D surface using the distance field. In one embodiment, the 3D surface is created using a margin cubes algorithm at places where the distance field changes sign. The second stage may be executed (and the 3D surface or a portion thereof may be generated) after one or several executions of the first stage. In the second stage, for each marked edge processing logic checks that weights for both voxels that form the edge are above a weight threshold and distances have different signs. If both conditions are true, then processing logic creates or updates a vertex of the 3D surface on this edge. If, however, the vertex already exists, then processing logic removes the vertex of the 3D surface from the edge. In some embodiments, no weight threshold is used. However, use of the weight threshold reduces noise of a generated 3D surface. Subsequently the margin cubes algorithm may be applied to create triangles of the 3D surface based on the computed vertices.

In one embodiment, processing logic performs one or more operations to remove noise from the 3D surface. After processing logic generates a 3D surface, processing logic may detect disconnected components and mark components which have a size that is below a size threshold. For each vertex of non-marked components, processing logic may find a pair of voxels and add them into a set of unremovable voxels. For each vertex of marked components, processing logic may find a pair of voxels and clear them if they are not found in the set of unremovable voxels. Accordingly, in a next iteration, those marked components will no longer be generated and included in the 3D surface.

In one embodiment, processing logic executes at least two threads. A first thread may receive a point cloud (e.g., an intraoral scan), add it to previously received point clouds, determine a 3D surface, and send the 3D surface for rendering. The second thread, if it is not busy, may receive a signal from the first thread, and generate a snapshot of all voxels. The second thread may then work in the background and build the 3D surface from scratch based on the snapshot, while the first thread continues to update the 3D surface based on information from additional intraoral scans. After rebuilding the 3D surface, the second thread generates a new grid of voxels, and sends that new grid of voxels back to the first thread. If the first thread receives a new grid from the second thread, then processing logic subtracts the saved snapshot from all voxels and adds voxels from the new grid. The first thread then generates the 3D surface and sends the 3D surface for rendering.

Figure 10:
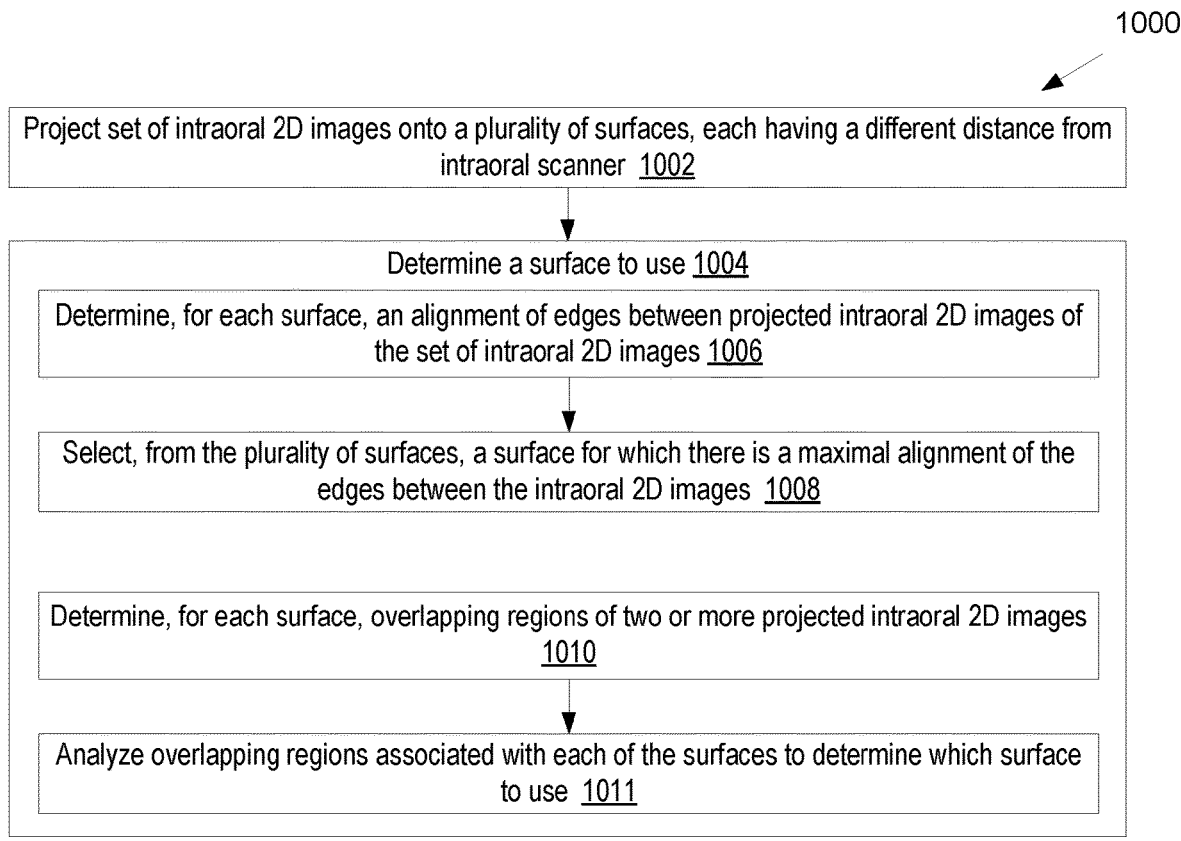
FIG. 10 illustrates a flow chart of an embodiment for a method of determining a surface to project images onto, in accordance with embodiments of the present disclosure.

FIG. 10 illustrates a flow chart of an embodiment for a method 1000 of determining a surface to project images onto, in accordance with embodiments of the present disclosure. Method 1000 may be performed, for example, at block 604 of method 600 in an embodiment.

At block 1002 of method 1000, processing logic projects a set of intraoral 2D images onto a plurality of surfaces. Each of the plurality of surfaces may have a different distance from the intraoral scanner. In one embodiment, each of the surfaces is a plane that is parallel to the other surfaces. In one embodiment, different surfaces have different shapes. For example, some surfaces may be planes, and other surfaces may be based on smooth functions. The smoothness of a function is a property measured by the number of continuous derivatives it has over some domain. At the very minimum, a function could be considered smooth if it is differentiable everywhere (hence continuous). Surfaces may be based, for example, on low power polynomials. Examples of surfaces other than planes that may be used include a half cylinder and a parametric surface. In one embodiment, different surfaces have different angles or orientations relative to a viewing axis of the intraoral scanner.

At block 1004, processing logic determines a surface to use from the plurality of surfaces. In one embodiment, at block 1006 processing logic determines, for each surface onto which a set of images has been projected, an alignment of edges and/or image boundaries between the projected images. An alignment score may then be determined for each surface based on the alignment of the edges and/or image boundaries. At block 1008, processing logic may then select, from the plurality of surfaces, a surface for which there is a maximal alignment of the edges and/or image boundaries between the projected images. This may include selecting a surface associated with a highest alignment score. For example, the alignment score may be inversely proportional to an amount of misalignment between projected images.

In one embodiment, at block 1010 processing logic determines, for each surface onto which the set of images has been projected, overlapping regions of two or more projected images that were projected onto that surface. At block 1011, processing logic may then analyze the overlapping regions associated with the various surfaces to determine which surface to use. This may include determining an alignment between the projected images (e.g., between edges within the projected images and/or image boundaries of the projected images) within the overlapping regions. Processing logic may then determine which of the surfaces results in a maximal alignment within the overlapping regions, and select that surface for use.

Figure 11:
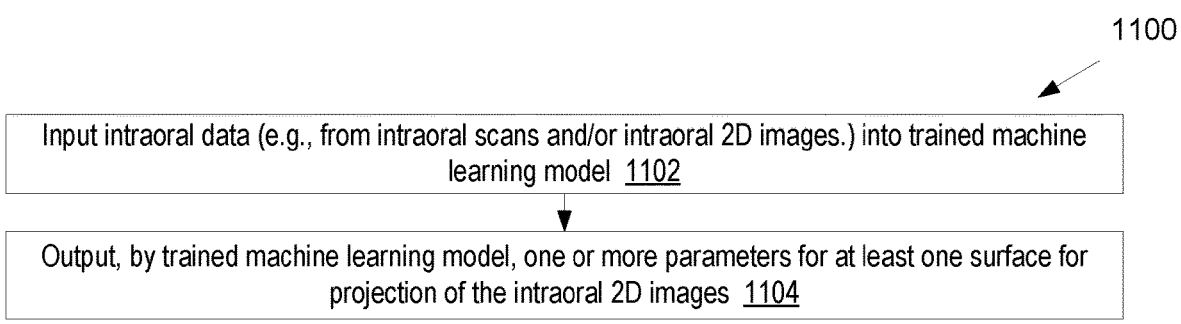
FIG. 11 illustrates a flow chart of an embodiment for a method of determining a surface to project images onto using a trained machine learning model, in accordance with embodiments of the present disclosure.

FIG. 11 illustrates a flow chart of an embodiment for a method 1100 of determining a surface to project images onto using a trained machine learning model, in accordance with embodiments of the present disclosure. Method 1100 may be performed, for example, at block 604 of method 600 in an embodiment.

At block 1102 of method 1100, processing logic may input a set of intraoral scans into a trained machine learning model. At block 1104, the machine learning model may then output one or more parameters for at least one surface for projection of the intraoral 2D images. The output surface parameters may include a distance of the surface from an intraoral scanner, a slope of the surface, a shape of the surface (e.g., a plane, a surface generated from a smooth function, a complex surface approximating a shape of a scanned dental site, and so on).

Figure 12:
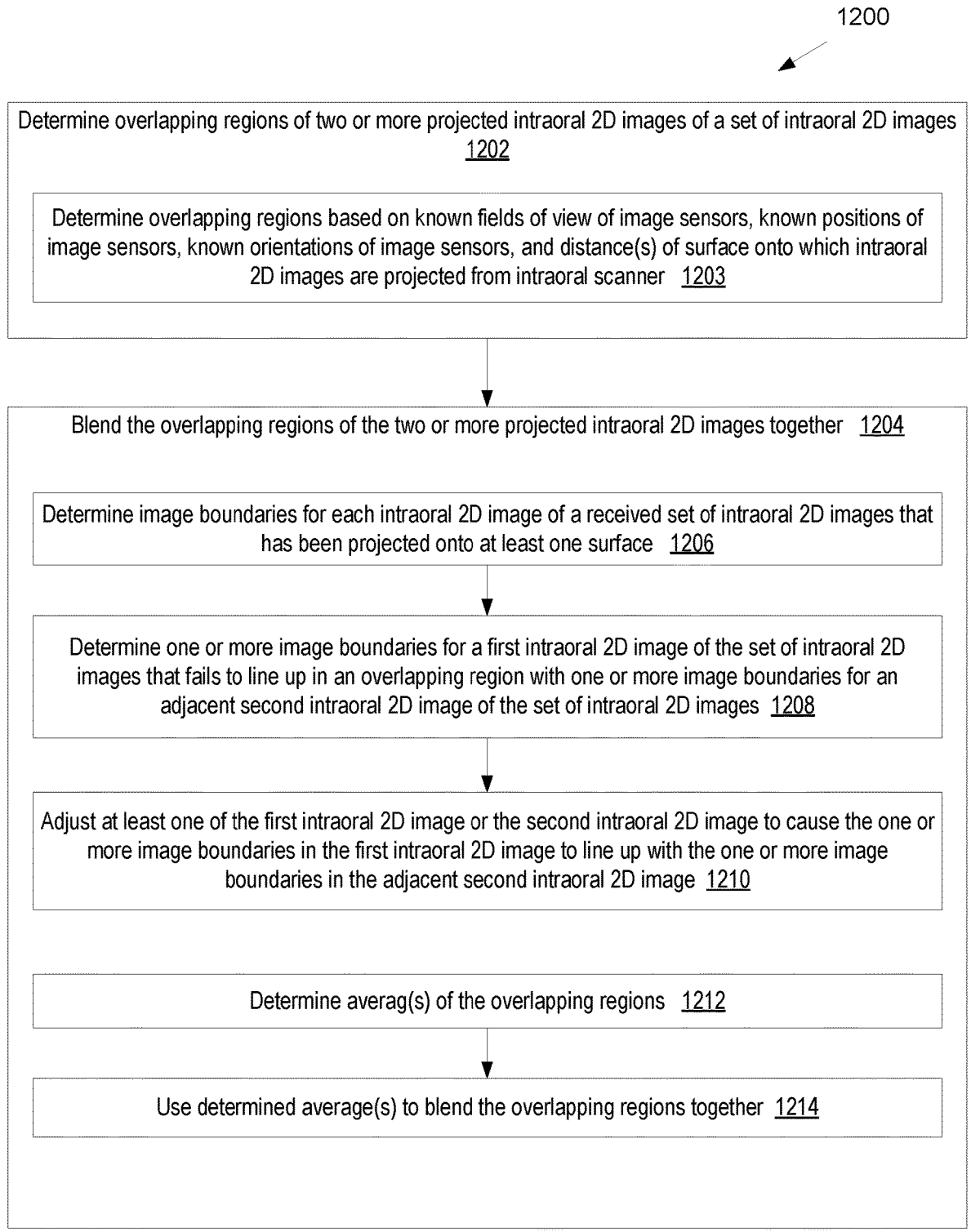
FIG. 12 illustrates a flow chart of an embodiment for a method of merging multiple 2D images generated by different cameras of an intraoral scanner into a combined 2D image, in accordance with embodiments of the present disclosure.

FIG. 12 illustrates a flow chart of an embodiment for a method 1200 of merging multiple 2D images generated by different cameras of an intraoral scanner into a combined 2D image, in accordance with embodiments of the present disclosure. Method 1200 may be performed, for example, at block 608 of method 600. Data from a first projected image may overlap data from a second projected image, and may diverge from the data from the second projected image. To stitch together the projected images, the discrepancies between overlapping regions in these two images should be remedied.

At block 1202 of method 1200, processing logic determines overlapping regions of two or more projected intraoral 2D images of a set of projected intraoral 2D images. The overlapping regions may be determined based to performing an image registration between the projected intraoral 2D images. Additionally, or alternatively, processing logic may determine overlapping regions based on known fields of view of cameras, known positions of the cameras, known orientations of the cameras, and known distance(s) from the intraoral scanner of the surface onto which the intraoral 2D images were projected.

At block 1204, processing logic blends the overlapping regions of the two or more intraoral 2D images together. Additionally, in some embodiments processing logic may deform or adjust one or more non-overlapping regions of an image as well. As mentioned, there may be discrepancies between the projected intraoral images at the overlapping regions of the projected intraoral images. One technique of remedying the discrepancies is to average the data of the first projected image with the data of the second projected image for the overlapping regions. A weight may be assigned to each image, and the averaging of the images may be performed using a weighted average.

In one embodiment, at block 1206 processing logic determines image boundaries for each projected intraoral 2D image of the received set of intraoral 2D images that has been projected onto a surface. At block 1208, processing logic determines one or more image boundaries of a first projected image that fails to line up with image boundaries of an overlapping second projected image at an overlapping region between the two projected images. At block 1210, processing logic adjusts at least one of the projected image or the second projected image to cause the one or more image boundaries of the first projected image and the second projected image to line up.

In one embodiment, at block 1212 processing logic determines differences between the projected images and averages of the differences within the overlapping regions. At block 1214, processing logic may then use the determined averages to blend the overlapping regions together. For example, processing logic may determine averages for edges within the overlapping region of the projected images, and may use those averages to adjust the shape, size and/or positioning of those edges. Weighted or unweighted averages may be used to perform the blending. In one embodiment, the weighting for a weighted average is based on distance from a center of the two overlapping images. Accordingly, for regions that are closer to a center of the first image, the first image may be assigned a higher weight than the second image. For regions that are closer to a center of the second image, the second image may be assigned a higher weight than the first image.

Figure 13:
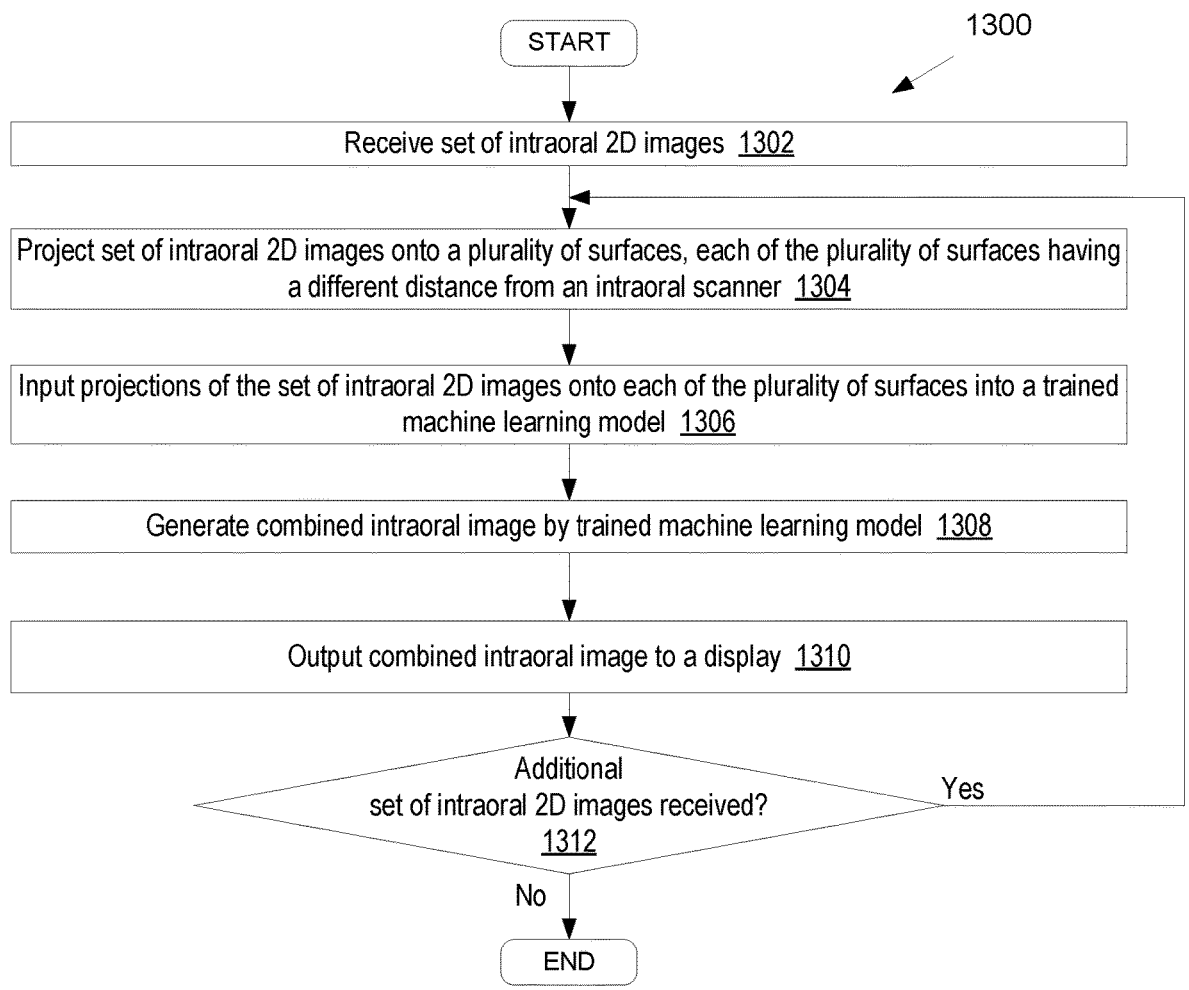
FIG. 13 illustrates a flow chart of an embodiment for a method of generating a combined 2D image from a set of 2D images using a trained machine learning model, in accordance with embodiments of the present disclosure.

FIG. 13 illustrates a flow chart of an embodiment for a method 1300 of generating a combined 2D image from a set of 2D images using a trained machine learning model, in accordance with embodiments of the present disclosure. Method 1300 may perform novel view synthesis in embodiments based on use of a trained machine learning model.

At block 1302 of method 1300, processing logic receives a set of intraoral 2D images. At block 1304, processing logic projects the set of intraoral 2D images onto a plurality of surfaces, each of the plurality of surfaces having a different distance from the intraoral scanner. In one embodiment, the plurality of surfaces comprise a plurality of parallel planes associated with a position and orientation of a virtual camera, where the planes are perpendicular to a viewing axis of the virtual camera.

At block 1306, processing logic inputs the projections of the set of intraoral 2D images onto the plurality of surfaces into a trained machine learning model. At block 1408, the trained machine learning model generates and outputs a combined intraoral image. The trained machine learning model may determine from the input image projections how to blend the images together to generate a photo-realistic combined image from a perspective of the virtual camera. At block 1310, processing logic outputs the combined intraoral image to a display. The operations of blocks 1302-1310 may be performed rapidly (e.g., within microseconds to milliseconds) during an intraoral scanning session, and may show a user of the intraoral scanner a current field of view of the intraoral scanner.

At block 1312, processing logic determines whether an additional set of intraoral 2D images has been received (e.g., which would occur if scanning continues). If no additional set of intraoral 2D images is received, the method may end. If an additional set of intraoral 2D images is received, then the operations of blocks 1304-1310 may be repeated for the additional set of intraoral 2D images.

Figure 14:
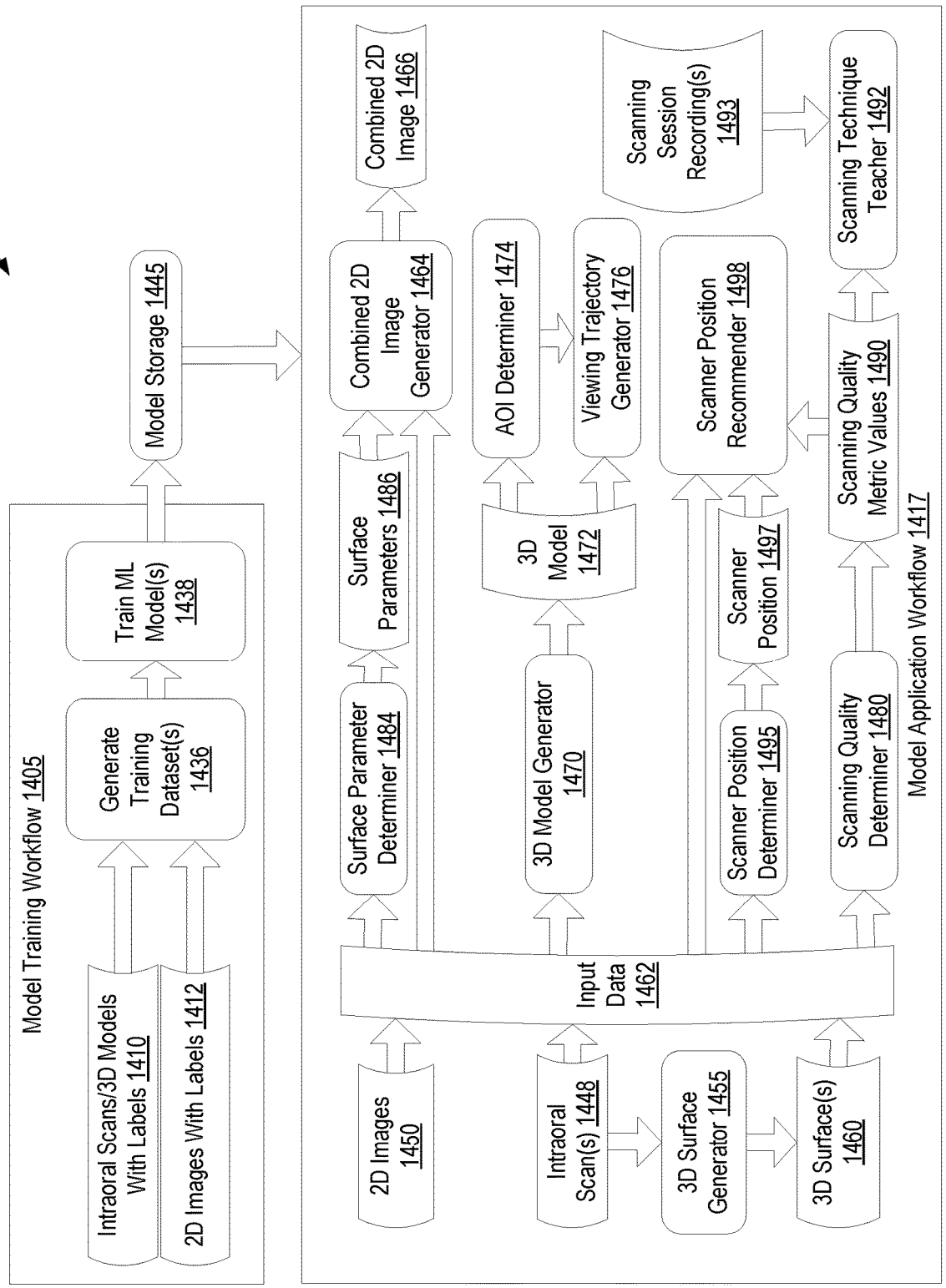
FIG. 14 illustrates a model training workflow and a model application workflow for an intraoral scan application, in accordance with an embodiment of the present disclosure.

FIG. 14 illustrates a model training workflow 1405 and a model application workflow 1417 for an intraoral scan application, in accordance with an embodiment of the present disclosure. In embodiments, the model training workflow 1405 may be performed at a server which may or may not include an intraoral scan application, and the trained models are provided to an intraoral scan application (e.g., on computing device 105 of FIG. 1), which may perform the model application workflow 1417. The model training workflow 1405 and the model application workflow 1417 may be performed by processing logic executed by a processor of a computing device. One or more of these workflows 1405, 1417 may be implemented, for example, by one or more machine learning modules implemented in an intraoral scan application 115 or other software and/or firmware executing on a processing device of computing device 4000 shown in FIG. 40.

The model training workflow 1405 is to train one or more machine learning models (e.g., deep learning models) to perform one or more classifying, segmenting, detection, recognition, image generation, prediction, parameter generation, etc. tasks for intraoral scan data (e.g., 3D scans, height maps, 2D color images, NIRI images, etc.) and/or 3D surfaces generated based on intraoral scan data. The model application workflow 1417 is to apply the one or more trained machine learning models to perform the classifying, segmenting, detection, recognition, image generation, prediction, parameter generation, etc. tasks for intraoral scan data (e.g., 3D scans, height maps, 2D color images, NIRI images, etc.) and/or 3D surfaces generated based on intraoral scan data. One or more of the machine learning models may receive and process 3D data (e.g., 3D point clouds, 3D surfaces, portions of 3D models, etc.). One or more of the machine learning models may receive and process 2D data (e.g., 2D images, height maps, projections of 3D surfaces onto planes, etc.).

Multiple different machine learning model outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

I) Scan view classification—this can include classifying intraoral scans or sets of intraoral scans as depicting a lingual side of a jaw, a buccal side of a jaw, or an occlusal view of a jaw. Other views may also be determinable, such as right side of jaw, left side of jaw, and so on. Additionally, this can include identifying a molar region vs. a bicuspid region, identifying mesial surfaces, distal surfaces and/or occlusal surfaces, and so on.

II) Scanning quality ranking—this can include assigning one or more scanning quality metric values to individual scans, 3D surfaces, regions of 3D surfaces, 3D models, regions of 3D models, etc. Scanning quality metric values above a threshold may be determined to be a scanning success in embodiments. Portions or regions with scanning quality metric values that are below a threshold may be flagged for rescanning in embodiments.

III) Scanning completion identification—this can include determining when scanning of an upper jaw is complete, when scanning of a lower jaw is complete and/or when scanning of a bite is complete based on intraoral scans, sets of intraoral scans, and/or 3D surfaces generated from multiple intraoral scans. This can also include determining when scanning is complete overall. Once scanning of a segment is complete, processing logic may automatically generate a 3D model of the segment (e.g., a dental arch). Once scanning of all segments is complete (e.g., upper dental arch, lower dental arch and bite), processing logic may automatically perform post processing, perform occlusal contact analysis, perform diagnosis, and so on.

IV) 3D model viewing trajectory generation—this can include determining from a 3D model of a dental arch (or one or more projections of the 3D model) a viewing trajectory for the 3D model.

V) Intraoral area of interest (AOI) identification/marking—this can include performing pixel-level or patch-level identification/classification of intraoral areas of interest on an intraoral scan, a 3D surface and/or 3D model. Example of AOIs include voids, conflicting surfaces, blurry surfaces, surfaces with insufficient data density, surfaces associated with scanning quality metric values that are below a threshold, and so on.

VI) Generation of intraoral 2D images—this can include receiving an input of multiple 2D images taken by different cameras at a same time or around a same time and generating a combined intraoral 2D image that includes data from each of the intraoral 2D images. The cameras may have different orientations, making merging of the intraoral 2D images non-trivial.

VII) Detecting insertion into/withdrawal from oral cavity—this can include determining based on one or more 2D images whether or not a scanner is in an oral cavity, whether a scanner is being inserted into an oral cavity and/or whether a scanner is being withdrawn from an oral cavity.

VIII) Tooth number classification—this can include performing pixel level identification/classification and/or group/patch-level identification/classification of each tooth from 3D surface data. Teeth can be classified using one or more standard tooth numbering schemes, such as the American Dental Association (ADA) teeth numbering.

Note that for any of the above identified tasks associated with intraoral scans/3D surfaces/3D models, though they are described as being performed based on an input of intraoral scans, 3D surface and/or 3D models, it should be understood that these tasks may also be performed based on 2D images such as color images, NIRI images, and so on. Any of these tasks may be performed using ML models with multiple input layers or channels, where a first layer may include an intraoral scan/3D surface (or projection of a 3D surface)/3D model (or projection of a 3D model), a second layer may include a 2D color image, a third layer may include a 2D NIRI image, and so on. In another example, a first layer or channel may include a first 3D scan, a second layer or channel may include a second 3D scan, and so on.

One type of machine learning model that may be used to perform some or all of the above asks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, a generative adversarial network (GAN) is used for one or more machine learning models. A GAN is a class of artificial intelligence system that uses two artificial neural networks contesting with each other in a zero-sum game framework. The GAN includes a first artificial neural network that generates candidates and a second artificial neural network that evaluates the generated candidates. The GAN learns to map from a latent space to a particular data distribution of interest (a data distribution of changes to input images that are indistinguishable from photographs to the human eye), while the discriminative network discriminates between instances from a training dataset and candidates produced by the generator. The generative network's training objective is to increase the error rate of the discriminative network (e.g., to fool the discriminator network by producing novel synthesized instances that appear to have come from the training dataset). The generative network and the discriminator network are co-trained, and the generative network learns to generate images that are increasingly more difficult for the discriminative network to distinguish from real images (from the training dataset) while the discriminative network at the same time learns to be better able to distinguish between synthesized images and images from the training dataset. The two networks of the GAN are trained once they reach equilibrium. The GAN may include a generator network that generates artificial intraoral images and a discriminator network that segments the artificial intraoral images.

In one embodiment, one or more machine learning model is a conditional generative adversarial (cGAN) network, such as pix2pix. These networks not only learn the mapping from input image to output image, but also learn a loss function to train this mapping. GANs are generative models that learn a mapping from random noise vector z to output image y, $G: z \rightarrow y$. In contrast, conditional GANs learn a mapping from observed image x and random noise vector z, to y, $G: \{x, z\} \rightarrow y$. The generator G is trained to produce outputs that cannot be distinguished from "real" images by an adversarially trained discriminator, D, which is trained to do as well as possible at detecting the generator's "fakes". The generator may include a U-net or encoder-decoder architecture in embodiments. An example of a cGAN machine learning architecture that may be used is the pix2pix architecture described in Isola, Phillip, et al. "Image-to-image translation with conditional adversarial networks." arXiv preprint (2017).

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

For the model training workflow 1405, a training dataset containing hundreds, thousands, tens of thousands, hundreds of thousands or more intraoral scans, images and/or 3D models should be used to form a training dataset. In embodiments, up to millions of cases of patient dentition may be available for forming a training dataset, where each case may include various labels of one or more types of useful information. Each case may include, for example, data showing a 3D model, intraoral scans, height maps, color images, NIRI images, etc. of one or more dental sites, data showing pixel-level or patch-level segmentation of the data (e.g., 3D model, intraoral scans, height maps, color images, NIRI images, etc.) into various dental classes (e.g., tooth, gingiva, etc.), data showing pixel-level or patch-level classifications (e.g., presence or absence of an AOI, type of AOI such as void, conflicting surface, blurry surface, preparation tooth, margin line, interproximal region between adjacent teeth, scan body, and so on, one or more scanning quality metric values, etc.), data showing one or more assigned classifications for the data (e.g., surface parameters for a surface to project 2D images onto), data showing viewing trajectories for a 3D model, and so on. This data may be processed to generate one or multiple training datasets 1436 for training of one or more machine learning models. The machine learning models may be trained, for example, to automatically generate a viewing trajectory for an input 3D model, to automatically identify intraoral AOIs on an input 3D model, to determine surface parameters of a surface to project 2D images onto, to generate a combined 2D image from a set of 2D images generated by different cameras of an intraoral scanner, and so on. Such trained machine learning models can be added to an intraoral scan application, and can be applied to improve a user experience.

In one embodiment, generating one or more training datasets 1436 includes gathering one or more intraoral scans and/or 3D models with labels 1410 and/or one or more 2D images with labels 1412. The labels that are used may depend on what a particular machine learning model will be trained to do. For example, to train a machine learning model to perform identification of AOIs and/or classification of types of AOIs (e.g., AOI determiner 1474), a training dataset 1436 may include 3D models, projections of 3D models onto one or more planes, and/or intraoral scans with pixel-level labels of various types of AOIs. In another example, to train a machine learning model to generate a viewing trajectory for viewing a 3D model, a training dataset may include 3D models and the viewing trajectories for those 3D models (and optionally labels of locations of one or more AOIs on the 3D models).

Processing logic may gather a training dataset 1436 comprising 2D or 3D images, intraoral scans, 3D surfaces, 3D models, height maps, etc. of dental sites (e.g., of dental arches) having one or more associated labels. One or more images, scans, surfaces, and/or models and optionally associated probability maps or pixel/patch-level labels in the training dataset 1436 may be resized in embodiments. For example, a machine learning model may be usable for images having certain pixel size ranges, and one or more image may be resized if they fall outside of those pixel size ranges. The images may be resized, for example, using methods such as nearest-neighbor interpolation or box sampling. The training dataset may additionally or alternatively be augmented. Training of large-scale neural networks generally uses tens of thousands of images, which are not easy to acquire in many real-world applications. Data augmentation can be used to artificially increase the effective sample size. Common techniques include random rotation, shifts, shear, flips and so on to existing images to increase the sample size.

To effectuate training, processing logic inputs the training dataset(s) 1436 into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the images, scans and/or 3D surfaces (or data from the images, scans or 3D surfaces) into the machine learning model one at a time. Each input may include data from an image, intraoral scan and/or 3D surface in a training data item from the training dataset. The training data item may include, for example, a set of 2D images and an associated combined 2D image that includes data from the set of 2D images, which may be input into the machine learning model.

The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer.

Processing logic may then compare the generated output to the known label that was included in the training data item. Processing logic determines an error (i.e., a classification error) based on the differences between the output probability map and/or label(s) and the provided probability map and/or label(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

As an example, in one embodiment, a machine learning model (e.g., AOI determiner) is trained to classify regions of 3D surfaces or 3D models into one or more types of AOIs. A similar process may be performed to train machine learning models to perform other tasks such as those set forth above. A set of many (e.g., thousands to millions) 3D models and/or intraoral scans of dental arches with labeled AOI classes (including an AOI class indicating that no AOI is present) may be collected. In an example, each point in the 3D models may include a label having a first value for a first label representing no AOI, a second value for a second label representing a first type of AOI, and a third value for a third label representing a third type of AOI, and so on. One of the three values may be 1, and the other two values may be 0, for example.

AOI determiner 1474 may include one or more machine learning models that operate on 3D data or may include one or more machine learning models that operate on 2D data. If AOI determiner 1474 includes a machine learning model that operates on 2D data, then for each 3D model with labeled classes, a set of images (e.g., height maps) may be generated. Each image may be generated by projecting the 3D model (or a portion of the 3D model) onto a 2D surface or plane. Different images of a 3D model may be generated by projecting the 3D model onto different 2D surfaces or planes in some embodiments. For example, a first image of a 3D model may be generated by projecting the 3D model onto a 2D surface that is in a top down point of view, a second image may be generated by projecting the 3D model onto a 2D surface that is in a first side point of view (e.g., a buccal point of view), a third image may be generated by projecting the 3D model onto a 2D surface that is in a second side point of view (e.g., a lingual point of view), and so on. Each image may include a height map that includes a depth value associated with each pixel of the image. For each image, a probability map or mask may be generated based on the labeled dental classes in the 3D model and the 2D surface onto which the 3D model was projected. The probability map or mask may have a size that is equal to a pixel size of the generated image. Each point or pixel in the probability map or mask may include a probability value that indicates a probability that the point represents one or more classes. For example, there may be two classes, including a first class representing an absence of an AOI and a second class representing a presence of an AOL. Points that have a first class may have a value of (1,0) (100% probability of first dental class and 0% probability of second class), and points that have a second class may have a value of (0,1). If a machine learning model is being trained to perform image-level classification/prediction as opposed to pixel-level classification/segmentation, then a single value or label may be associated with a generated image as opposed to a map having pixel-level values.

A training dataset may be gathered, where each data item in the training dataset may include an image (e.g., an image comprising a height map) or a 3D surface and an associated probability map (which may be a 2D map if associated with an image or a 3D map if associated with a 3D surface) and/or other label. Additional data may also be included in the training data items. Accuracy of segmentation can be improved by means of additional classes, inputs and multiple views support. Multiple sources of information can be incorporated into model inputs and used jointly for prediction. Multiple classes can be predicted concurrently from a single model or using multiple models. Multiple problems can be solved simultaneously: AOI identification, scanning quality metric value determination, etc. Accuracy is higher than traditional image and signal processing approaches.

A default method may be based on depth info only and still allows distinguishing several classes such as types of AOIs, and so on. However, sometimes depth info is not enough for good accuracy. In such cases color info may help. In one embodiment, color info is used as an additional 3 layers (e.g., RGB), thus, getting 4 layers input for the network.

Once one or more trained ML models 1438 are generated, they may be stored in model storage 1445, and may be added to an intraoral scan application (e.g., intraoral scan application 115). Intraoral scan application 115 may then use the one or more trained ML models 1438 as well as additional processing logic to present a data-rich graphical user interface to a user.

In one embodiment, model application workflow 1417 includes one or more trained machine learning models that function as a combined 2D image generator 1464, an AOI determiner 1474, a viewing trajectory generator 1476 and/or a scanning quality determiner 1480. These logics may be implemented as separate machine learning models or as a single combined machine learning model in embodiments. For example, AOI determiner 1474 and viewing trajectory generator 1476 may share one or more layers of a deep neural network. However, each of these logics may include distinct higher level layers of the deep neural network that are trained to generate different types of outputs. Additionally, in some embodiments one or more of these logics is implemented without using machine learning (e.g., based on rules-based logics). The illustrated example is shown with only some of the functionality that is set forth in the list of tasks above for convenience. However, it should be understood that any of the other tasks may also be added to the model application workflow 1417.

For model application workflow 1417, according to one embodiment, an intraoral scanner generates a sequence of intraoral scans 1448 as well as one or more types of 2D images 1450, such as NIRI 2D images and color 2D images. A 3D surface generator 1455 may perform registration between the intraoral scans 1448, stitch the intraoral scans together, and generate a 3D surface 1460 from the intraoral scans. As further intraoral scans are generated, these may be registered and stitched to a 3D surface 1460, increasing a size of the 3D surface 1460 and an amount of data for the 3D surface 1460. Input data 1462 may include one or more of the intraoral scans 1448, the 2D images 1450, and/or a generated 3D surface 1460.

Input data 1462 (e.g., a set of 2D images generated by multiple cameras at approximately a same time) may be input into surface parameter determiner 1484, which may include a trained neural network. Based on the input data 1462, surface parameter determiner 1484 outputs information on surface parameters 1486 of a surface onto which the multiple 2D images will be projected. The output surface parameters 1486 may include a distance of a surface from the intraoral scanner, a shape of the surface, a slope of the surface, and so on. In some embodiments, input data into the surface parameter determiner 1484 further includes data from one or more intraoral scans 1448 and/or a 3D surface 1460.

Input data 1462 may additionally or alternatively be input into a combined 2D image generator 1464. The input data 1462 may be processed before being input into the combined 2D image generator 1464. In one embodiment, each intraoral 2D image 1450 is projected onto multiple different surfaces, and the projections of the 2D images are input into the combined 2D image generator 1464 (e.g., as a tensor). The combined 2D image generator 1464 may then generate a combined 2D image 1466 based on the input.

In one embodiment, combined 2D image generator 1464 receives surface parameters 1486 from surface parameter determiner 1484 and a set of 2D images. The combined 2D image generator 1464 may then project the images from the set of 2D images onto a surface having the received surface parameters 1486, and output a combined 2D image 1466 that is a merging of the multiple projected 2D images. In such an embodiment, combined 2D image generator 1464 may not include a trained machine learning model.

Input data 1462 may be input into 3D model generator 1470, which may output a 3D model 1472 based on performing registration between each of the intraoral scans 1448 and stitching those intraoral scans together. The 3D model 1472 generated by 3D model generator 1470 may have a higher accuracy than the 3D surfaces 1460 generated by 3D surface generator 1455.

AOI determiner 1474 may receive the 3D model 1472, intraoral scans and/or 2D images as an input, and may process the 3D model, intraoral scans and/or 2D images to identify one or more AOIs on the 3D model 1472, intraoral scans and/or 2D images. The AOIs may include areas that a doctor will be interested in viewing more closely, such as those that are of clinical importance. Examples of clinically significant AOIs include preparation teeth, margin lines around preparation teeth, cracked teeth, lesions, areas of malocclusion (e.g., areas with tooth crowding), areas indicative of tooth wear, areas indicative of tooth decay (e.g., caries), areas indicative of receding gums, areas indicative of foreign objects (e.g., studs, bridges, implants, restorative objects, etc.), and so on. The AOIs may additionally or alternatively include areas that may require rescanning. Examples of such AOIs include voids (e.g., areas for which scan data is missing), areas with a low density of information, areas of conflicting surface data (e.g., areas with overlapping surfaces of multiple intraoral scans that fail to match), blurry areas, areas around teeth in which an insufficient amount of gums have been scanned, unclear gum line, unclear patient bite, unclear margin line (e.g., margin line of one or more preparation teeth), and so on. An identified void may be a void in a 3D surface. Examples of surface conflict include double incisor edge and/or other physiologically unlikely tooth edge, and/or bite line shift.

The AOI determiner 1474 may, in identifying an AOI, analyze intraoral scans (e.g., 3D image point clouds), 3D surfaces, 2D images and/or one or more virtual 3D models of the patient alone and/or relative to reference data. The analysis may involve direct analysis (e.g., pixel-based and/or other point-based analysis), the application of machine learning, and/or the application of image recognition. Such reference data may include past data regarding the at-hand patient (e.g., intraoral images and/or virtual 3D models), pooled patient data, and/or pedagogical patient data, some or all of which may be stored in a data store.

The data regarding the at-hand patient may include X-rays, 2D intraoral images, 3D intraoral scans, 2D models, and/or virtual 3D models corresponding to the patient visit during which the scanning occurs. The data regarding the at-hand patient may additionally include past X-rays, 2D intraoral images, 3D intraoral scans, 2D models, and/or virtual 3D models of the patient (e.g., corresponding to past visits of the patient and/or to dental records of the patient).

The pooled patient data may include X-rays, 2D intraoral images, 3D intraoral scans, 2D models, and/or virtual 3D models regarding a multitude of patients. Such a multitude of patients may or may not include the at-hand patient. The pooled patient data may be anonymized and/or employed in compliance with regional medical record privacy regulations (e.g., the Health Insurance Portability and Accountability Act (HIPAA)). The pooled patient data may include data corresponding to scanning of the sort discussed herein and/or other data. The pedagogical patient data may include X-rays, 2D intraoral images, 3D intraoral scans, 2D models, virtual 3D models, and/or medical illustrations (e.g., medical illustration drawings and/or other images) employed in educational contexts. The pedagogical patient data may include volunteer data and/or cadaveric data.

AOI determiner 1474 may analyze patient scan data from later in a patient visit during which the scanning occurs (e.g., one or more later-in-the-visit 3D surfaces and/or one or more later-in-the-visit 3D models of the patient) relative to additional patient scan data in the form of data from earlier in that patient visit (e.g., one or more earlier-in-the-visit 3D scans and/or one or more earlier-in-the-visit 3D models of the patient). AOI determiner 1474 may additionally or alternatively analyze patient scan data relative to reference data in the form of dental record data of the patient and/or data of the patient from prior to the patient visit (e.g., one or more prior-to-the-visit 3D image point clouds and/or one or more prior-to-the-visit virtual 3D models of the patient). AOI determiner 1474 may additionally or alternatively analyze patient scan data relative to pooled patient data and/or pedagogical patient data.

In an example, AOI determiner 1474 may generate a first virtual model of a dental site based on a first scan session of the dental site taken at a first time and later generate a second virtual model of the dental site based on a second scan session of the dental site taken at a second time. The AOI determiner 1474 may then compare the first virtual model to the second virtual model to determine a change in the dental site and identify an AOI to represent the change.

Identifying of areas of interest concerning missing and/or flawed scan data may involve the AOI determiner 1474 performing direct analysis, for instance determining one or more pixels or other points to be missing from patient scan data and/or one or more virtual 3D models of the patient. Identification of areas of interest concerning missing and/or flawed scan data may additionally or alternatively involve employing pooled patient data and/or pedagogical patient data to ascertain patient scan data and/or virtual 3D models as being incomplete (e.g., possessing discontinuities) relative to that which is indicated by the pooled patient data and/or pedagogical patient data.

AOI determiner 1474 may determine how to present and/or call out the identified areas of interest. AOI determiner 1474 may provide indications or indicators regarding areas of interest. Therefore, areas of interest may be determined, and indicators of the areas of interest may be provided, during and/or after an intraoral scan session. Such indications may be provided prior to and/or without construction of an intraoral virtual 3D model. Alternatively, indications may be provided after construction of an intraoral virtual 3D model of a dental site. The indications may be presented (e.g., via a graphical user interface) to a user (e.g., a doctor) in connection with and/or apart from one or more depictions of teeth and/or gingivae of a patient. Indication presentation in connection with depictions of patient teeth and/or gingivae may involve the indications being placed so as to correlate an indication with the corresponding portion of the teeth and/or gingivae. The indications may be provided in the form of flags, markings, contours, text, images, and/or sounds (e.g., in the form of speech). Such a contour may be placed (e.g., via contour fitting) so as to follow an extant tooth contour and/or gingival contour. As an illustration, a contour corresponding to flawed scan data indication may be placed so as to follow a contour of the teeth and/or gingiva that were generated using flawed scan data. In placing indications (e.g., flags) the AOI determiner 1474 may or may not take into account factors such as available lighting, available angle, available zoom, available axes of rotation, and/or other factors corresponding to user viewing of the teeth and/or gingiva depiction (e.g., the virtual 3D model or 3D surface), and may seek indication (e.g., flag) placement which seeks to optimize user viewing in view of these factors). AOI determiner 1474 may key the indications (e.g., via color, symbol, icon, size, text, and/or number). The keying of an indication may serve to convey information about that indication. The conveyed information may include classification of an AOI, a size of an AOI and/or an importance rank of an AOI. Accordingly, different flags or indicators may be used to identify different types of AOIs. AOI determiner 1474 may determine a classification, size and/or importance rank of an AOI, and may then determine a color, symbol, icon, text, etc. for an indicator of that AOI based on the classification, size and/or importance rank. In embodiments, importance of an AOI may be determined based on one or more scan quality metric values associated with the AOI.

In one embodiment, AOI determiner 1474 identifies AOIs and/or flags or otherwise provides identification of AOIs (e.g., flags AOIs) as described in U.S. Pat. No. 9,510,757, filed May 6, 2015 and issued Dec. 6, 2016, which is incorporated by reference herein.

AOI determiner 1474 may include a trained machine learning model that has been trained to perform pixel-level and/or patch-level classification of any such areas of interest. The operations of such a trained machine learning model are described below with reference to FIG. 33A. Alternatively, AOI determiner 1474 may not include a machine learning model (e.g., may use image processing and/or rules-based logics to identify AOIs). Additionally, or alternatively, a combination of one or more trained ML models and one or more rules-based logics may be used.

In one embodiment, AOI determiner 1474 is able to identify tooth numbers (e.g., optionally according to the American Dental Association (ADA) teeth numbering system) associated with AOIs based on the input data, dental class data and/or 3D models. In one embodiment, AOI determiner 1474 includes a trained machine learning model that has been trained to determine tooth numbers. In one embodiment, to determine the tooth position on the dental arch for the AOI, processing logic prompts a user to input the tooth number. The user may input the tooth number, and the input tooth number may then be stored. In one embodiment, AOI determiner 1474 determines a tooth morphology for one or more identified teeth. The tooth morphology may include an identification of a mesial surface, an identification of a distal surface and/or an identification of an occlusal surface of a tooth in a 3D surface and/or in an intraoral scan or 2D image.

Viewing trajectory generator 1476 may receive the 3D model 1472 or a 3D surface as an input, and may process the 3D model or 3D surface to generate a viewing trajectory for viewing of the 3D model or 3D surface. Viewing trajectory generator 1476 may include a trained machine learning model that has been trained to generate a viewing trajectory for a 3D model based on an input of the 3D model. In some embodiments, viewing trajectory generator 1476 further receives the output of AOI determiner 1474 indicating locations of AOIs as an input. This enables the viewing trajectory generated by viewing trajectory generator 1476 to include one or more views of the 3D surface that focus on one or more of the AOIs. For example, the viewing trajectory may include zoomed-in views that rotate around one or more of the AOIs.

Input data 1462 may be input into scanning quality determiner 1480, which may or may not include a trained neural network. In one embodiment, scan quality determiner 1480 and AOI determiner 1474 are combined into a single logic, which may use one or more trained machine learning models to determine scanning quality metric values and/or identify AOIs. Based on the input data 1462, scanning quality determiner 1480 may output one or more scanning quality metric values 1490, which may include a classification of an overall scanning quality and/or one or more specific scanning quality metric values, each related to a different scanning quality metric. Some scanning quality metric values may be associated with a quality of a 3D model that is ultimately produced (e.g., based on scan angle, scan distance, etc.). Other scanning quality metric values may be associated with clinical importance, but might not affect a quality of the 3D model, such as amount of gums scanned around teeth, whether a palette was scanned, etc. Examples of scanning quality metrics include scanning speed, angle of scanner to dental site being scanned, distance of scanner from dental site, amount and/or size of voids, dirtiness of an optical surface of the scanner (e.g., of a window or mirror) and so on. Scanning quality determiner 1480 may receive intraoral scans, 3D surfaces (or projections of 3D surfaces onto multiple planes) and/or 3D models (or projections of 3D models onto multiple planes) as an input. If an intraoral scan is input into scanning quality determiner 1480, then scanning quality determiner 1480 may output one or more scanning quality metric values 1490 for the intraoral scan. If a 3D surface or 3D model is input into the scanning quality determiner 1480, then scanning quality determiner 1480 may output scanning quality metric values 1490 associated with different regions or areas of the 3D surface or 3D model.

Scanning quality determiner 1480 may include one or multiple trained machine learning models trained to identify and/or classify different problems. For example, scanning quality determiner 1480 may output a blurriness rating or value for scans and/or 3D surfaces, may identify surfaces as being covered with blood and/or saliva (e.g., via a blood/saliva scan quality metric value), may classify moving tissue (e.g., via a moving tissue scan quality metric value), may output a data density value or rating for regions of a 3D surface, may identify teeth with insufficient scanned gingiva around the teeth, and so on. Scanning quality determiner 1480 may additionally or alternatively detect dirty optical surfaces, and output a cleanliness or dirtiness rating or value associated with the detected dirty optical surfaces. In one embodiment, scanning quality determiner 1480 detects dirty optical surfaces as set forth in co-pending U.S. patent application Ser. No. 17/230,825, filed Apr. 14, 2021 and entitled "Smart Scanning for Intraoral Scanners," which is incorporated by reference herein.

In some implementations of model application workflow 1417, a dirty scanner determiner of scanning quality determiner 1480 automatically detects one or more dirty optical surfaces of a scanner. The dirty scanner determiner may or may not use a trained ML model to detect dirty optical surfaces. Instead of, or in addition to, the use of an ML model to identify dirty regions of optical surfaces, scanning quality determiner 1480 may use image processing techniques to identify dirty regions of optical surfaces. In one embodiment, scan quality determiner 1480 determines dirty regions of optical surfaces based on depth information from intraoral scans. If a region of an optical surface is marred by grime, dirt, blood, and so on, then a detected depth of pixels associated with that region will generally be much less than depths of pixels that are not associated with dirty regions. Detected depths (or heights) may be compared to one or more depth thresholds (or one or more height thresholds), and dirty regions may be detected for depths that are at or below the one or more depth thresholds (or at or above one or more height thresholds).

Scanning quality determiner 1480 may determine sizes of dirty regions and/or a percentage of an optical surface that is dirty. If dirty regions have sizes that exceed a size threshold are detected and/or a percentage of the optical surface that is dirty exceeds a threshold, then scanning quality determiner 1480 may determine that the scanner (or a sleeve or attachment on the scanner) is dirty.

Scanning quality determiner 1480 may determine sizes of moving tissue and/or a percentage of an intraoral scan that is obscured by moving tissue. If detected moving tissue has a size that exceeds a size threshold or a percentage of total scan that exceeds a percentage threshold, then Scanning quality determiner 1480 may determine that the intraoral scan is a low quality scan. A moving tissue scan quality metric value may be used as a moving tissue score. Alternatively, a moving tissue score may be computed based on the moving tissue scan quality metric value (e.g., as an inverse of the moving tissue scan quality metric value). For example, an increased amount of detected moving tissue may result in a lower moving tissue score. A moving tissue scanning quality metric value may be based on an amount and/or percentage of moving tissue detected in an intraoral scan.

In some implementations of model application workflow 1417, a dental object classifier (e.g., which may be a blood/saliva detector) of scanning quality determiner 1480 automatically detects blood and/or saliva in intraoral scans and/or 2D images. Blood and/or saliva may be identified using a trained machine learning model or without the use of a machine learning model. For example, a machine learning model may have been trained to identify blood and/or saliva based on a training dataset of intraoral scans/surfaces and/or 2D images with and without blood and/or saliva on teeth. The machine learning model may output an indication of an amount of blood and/or saliva detected in an input intraoral scan and/or image. In one embodiment, the machine learning model outputs pixel-level or patch-level classifications of "blood/saliva" and "no blood/saliva." For example, the machine learning model may output a map with a number of points or pixels that matches a number of points or pixels of one or more input images and/or scans that were input. Each point or pixel in the map may be classified as blood/saliva or no blood/saliva. Processing logic may determine a percentage of the intraoral scan and/or image that has a blood/saliva classification, and assign a blood/saliva metric value based on this percentage. If the blood/saliva metric value exceeds a threshold, this may indicate that the intraoral scan is of low quality and additional scans of a region of a dental site represented in the intraoral scan should be rescanned. In one embodiment, a region of a 3D surface generated from a portion of an intraoral that was identified as having blood and/or saliva may be marked as such on the 3D surface. This may inform a user that the region of the 3D surface is showing blood and/or saliva and not the underlying surface of the dental site. In one embodiment, the marking for the blood and/or saliva may include a visualization such as a color, transparency, fill pattern, etc. that differs from a visualization of a remainder of the 3D surface. For example, the blood/saliva may be shown in red to indicate blood.

In some implementations of model application workflow 1417, a scan speed determiner of scanning quality determiner 1480 automatically determines a scan speed associated with intraoral scans. Moving the scanner too quickly may result in blurry intraoral scans and/or a low amount of overlap between scans. Moving the scanner too slowly increases the time that it takes to complete intraoral scanning. Accordingly, it can be beneficial to scan within a scan speed range between an upper scan speed threshold and a lower scan speed threshold. Scanning quality determiner 1480 may use motion data, 2D intraoral images and/or intraoral scans, including the timing of when such motion data, 2D intraoral images and/or intraoral scans were generated, to determine a scan speed associated with one or more intraoral scans. A value indicative of a detected scan speed may be determined.

In some implementations of model application workflow 1417, a scan distance determiner of scanning quality determiner 1480 automatically determines a scanner distance associated with one or more intraoral scans. Scan quality may be highest when a scanner probe is within a range of distances from an object being scanned. For example, the probe of the scanner too far from a surface being scanned may reduce a density of data points for the scanned surface and/or may reduce a scan quality. The scan distance determiner may determine one or more distances between a scanning face of the probe of the scanner and a dental object being scanned. The scan distance determiner may determine, for example, an average distance, a maximum distance, a minimum distance, one or more distance percentiles, and so on based on an intraoral scan or based on a set of most recent intraoral scans (e.g., a past 2-10 intraoral scans). Distances may be determined using structured light, confocal imaging, stereo imaging, and/or other techniques for 3D imaging. Processing logic may compute statistics on determined distances from an intraoral scan, such as a minimum distance, a maximum distance, an average distance, a median distance, one or more distance percentiles (e.g., a 90% percentile, a 75% percentile, a 50% percentile, a $20^{th}$ percentile, a 10$^{th}$ percentile, and so on). One of more such distance statistics may be used to determine a scan distance value.

In some implementations of model application workflow 1417, a scan angle determiner of scanning quality determiner 1480 automatically determines a scanner angle associated with one or more intraoral scans, where the scanner angle represents an angle between a viewing axis of the intraoral scanner and a surface being scanned. Scan quality may be highest when a scanner probe is within a range of angles relative to an object being scanned. For example, the probe of the scanner with too great an angle relative to a surface being scanned result in a lower scan quality. The scan angle determiner may determine one or more angles between a scanning face (or a viewing axis orthogonal to the scanning face) of the probe of the scanner and a dental object being scanned. The scan angle determiner may determine, for example, an average angle, a maximum angle, a minimum angle, one or more angle percentiles, and so on based on an intraoral scan. Processing logic may compute statistics on determined angles from an intraoral scan, such as a minimum angle, a maximum angle, an average angle, a median angle, one or more angle percentiles (e.g., a 90% percentile, a 75% percentile, a 50% percentile, and so on), etc. One or more such angle statistics may be used to determine a scan angle value.

Scanning technique teacher 1492 may provide one or more suggestions to a user of the intraoral scanner for modifying their scanning technique based on the determined scanning quality metric values 1490 based on AOIs identified by AOI determiner 1474 and/or based on one or more recordings of scanning sessions (or a recording of a current intraoral scanning session as performed thus far). The scanning quality metric values may be associated with a 3D model or 3D surface as a whole or with particular regions of a 3D model or 3D surface. Scanning quality metric values may additionally be associated with intraoral scans and/or 2D images. Scanning quality metric values, and ultimately suggestions for improving a scan quality or achieving an optimal scan quality, may be determined after intraoral scanning is complete (e.g., based on a 3D model of a dental site) or during an intraoral scanning session (e.g., based on a 3D surface generated thus far). Additionally, in some instances suggestions for performing intraoral scanning may be generated at the start of an intraoral scanning session based on past performance of a user of the intraoral scanner and/or based on a 3D model of a dental site of a patient to be scanned. A 3D model of the dental site may be generated based on a prior intraoral scan of the dental site. Alternatively, one or more 2D images may have been generated of the dental site (e.g., based on images captured by a camera or mobile phone). These images may be used to generate an approximate or estimated 3D model of the dental site, which may be analyzed to assess any difficult to scan regions, AOIs, etc. and to generate a scanning plan for scanning the dental site. The 3D model may be used to determine any issues with the dental site and a geometry of the dental site, which can be used to determine where a user can speed up scanning, where the user should slow down scanning, what angles of the scanner should be used, and so on.

In one embodiment, scanning technique teacher 1492 determines whether scanning quality metric values meet certain criteria, and if so scanning technique teacher 1492 does not output any recommendations. If any of the scanning quality metric values fails to satisfy one or more criteria, scanning technique teacher 1492 may then determine and output scanning suggestions. Past data and/or current data may be assessed to determine an ideal scanning process with respect to a fastest scanning process that still yields acceptable results, a scanning process that results in a highest resolution, a scanning process that best captures interproximal spaces between teeth or that best captures an incisal edge of front teeth (a historically challenging region to scan), a scanning process that most accurately captures a patient bite, and so on. In an example, a user may wait too long to remove a retraction cord from around a preparation tooth before scanning a margin line of the preparation tooth, resulting in the gingiva collapsing over the margin line before the margin line is fully scanned. The scanning technique teacher may identify such a situation from a recorded scanning session, and suggest a change in procedure so that the margin line is scanned more quickly after the retraction cord is removed.

Scanning technique teacher 1492 may additionally or alternatively receive one or more scanning session recordings 1493, which may have been generated during one or more intraoral scanning sessions. A scanning session recording may include a sequence of some or all of the intraoral scans and/or 2D images generated during an intraoral scanning session. Scanning quality metric values may be assigned to each of the intraoral scans in a scanning session recording and/or to regions of a 3D model that is ultimately generated. The scanning session recording may additionally include motion data generated by an IMU and/or based on registration of intraoral scans together. The scanning session may provide a complete picture of how scanning was performed for a particular scanning session, such as what portion of a patient's mouth scanning started at, what direction the scanner was moved, distance and/or angle of the scanner relative to a scanned dental site, scanning speed, a dirtiness of the intraoral scanner, and so on. Scanning technique teacher 1492 may analyze such data to determine, for example, whether a user waited too long to clean the intraoral scanner or replace a protective sleeve of the intraoral scanner during scanning, or whether the user had problems capturing scans in particular regions of a patient's mouth, or whether the user holds the scanner at a suboptimal angle relative to the patient's teeth, and so on. Scanning technique teacher 1492 may then provide suggestions on how to remedy any identified deficiencies in the user's scanning technique. By implementing these suggestions, the user may improve their scanning technique. Scanning technique teacher 1492 may provide a user (e.g., a doctor) with training guidance as to scanning technique, and/or may highlight scan assistance indications of the sort discussed hereinabove (e.g., ones corresponding to missing and/or flawed scan data) which have occurred in the past and/or have been reoccurring for that user. Additionally, or alternatively, scanning technique teacher 1492 may output scanning quality metric values to a dashboard during scanning (e.g., when the scanning quality metric values fall below a threshold), may vibrate the intraoral scanner when scanning quality metric values fail to satisfy scanning quality criteria, may output an audio signal when scanning quality metric values fail to satisfy scanning quality criteria, and so on to alert a user to adjust their scanning technique (e.g., to slow down the scan speed, to position the probe head closer to a dental site, to adjust an angle of the probe head, and so on).

In embodiments, scanning technique teacher 1492 may generate a video that scan be played back to show an intraoral scanning session from start to finish. Each frame of the video may include a 3D surface as generated at a certain point in time during the intraoral scanning session. The video may be a 2D video or a 3D video. For a 2D video, the video may show a set view point of the 3D surface for each frame. For a 3D video, each frame may include a 3D surface that can be navigated by a user. For example, a user may pan, rotate, zoom in, zoom out, etc. for each frame of the 3D video. Scanning technique teacher may annotate the video with flags and indicators that identify AOIs associated with low scan quality and/or other problems with a user's scanning technique. An intraoral scanner that generated the intraoral scans during the intraoral scanning session may have a known position and orientation relative to any generated intraoral scan. Accordingly, the position and orientation of the intraoral scanner may be determined relative to the 3D surface for each frame of the video. In embodiments, a representation of the intraoral scanner at the determined position and orientation relative to the 3D surface is shown in the video. The representation of the intraoral scanner may or may not be shown based on user input. Additionally, a scan volume may be computed, and the scan volume may be shown in frames of the video. Additionally, or alternatively, a back face of the scan volume and/or an intersection of the scan volume with the 3D surface may be shown.

In some embodiments, a recommended trajectory of the intraoral scanner may be determined. Scanning technique teacher 1492 may then add to the video a representation of the intraoral scanner moving according to a suggested trajectory, which may deviate from an actual trajectory of the intraoral scanner during the recorded intraoral scanning session. Accordingly, the scanning technique teacher may show the operator of the intraoral scanner how they performed the scanning verses how they should have performed the scanning. The representation of the intraoral scanner moving according the suggested trajectory may be shown instead of or in addition to the representation of the actual trajectory of the intraoral scanner during scanning.

A database of scanning sessions of many users may be generated. Entries in the database may be classified per indication (e.g., dental issues and/or treatments), and may be sorted based on indication. From the entries in the database, scanning technique teacher 1492 may grade scanning performance of a user and indicate what they do well and what they need to improve. Scanning technique teacher 1492 may track user progress in a number of categories, and may provide a dashboard and/or a report for each user indicating their scanning quality metric values for each of the categories, including trends, averages, and so on. A user may access the dashboard and/or report to see what they are doing well, what they are improving, and what they still need to improve further. Based on the report for a user, a customized improvement plan may be generated for that user. Each time a user logs into the system, a customized tip of the day or week can be generated for that user or for a group of users, where the tip may be based on their actual scanning history and areas to be improved. Individual and group dashboards may be provided to enable users to see how they compare to others in their office, in their practice area, in a particular location (e.g., a city, county, state or country), and so on.

Scanning technique teacher 1492 may consider, relative to a training guidance data pool, scan data (e.g., 3D image point clouds) and/or one or more virtual 3D models arising from scanning performed by that user which led to scan quality metric values that failed to satisfy one or more scan quality criteria. Such scan quality metric values that failed to satisfy one or more scan quality criteria may trigger scanning technique teacher 1492 to output one or more scan assistance indications. The training guidance data pool may include, with respect to the scanning performances of multiple users (e.g., multiple practitioners), scan data and/or one or more virtual 3D models (e.g., one which led to scan assistance indications) along with information describing scanning technique changes which might have prevented and/or mitigated the circumstances which led to the scan assistance indications. The scan data and/or one or more virtual 3D models of the training guidance data pool may be anonymized and/or employed in compliance with regional medical record privacy regulations. Scanning technique teacher 1492 may match the scan data and/or one or more virtual 3D models arising from scanning performed by the user to scan data and/or virtual 3D models of the training guidance data pool, access corresponding information describing scanning technique changes, and present such scanning change technique information to the user (e.g., via a user interface).

As an illustration, the training guidance data pool might, for scan data and/or one or more virtual 3D models which led to double incisor edge scan assistance indications such as ones corresponding to particular angles of scanning, include information indicating that having performed scanning with a specified angular change might have been preventative and/or mitigating. For instance, such data might, for scan data and/or one or more virtual 3D models which led to double incisor edge scan assistance indications in a fashion indicative of scanning at a 35 degree-to-surface angle—instead of a desired 45 degree-to-surface angle—include information indicating that an angular increase of ten degrees-to-surface might be preventative and/or curative. Moreover, such data might for scan data and/or one or more virtual 3D models which led to double incisor edge scan assistance indications in a fashion indicative of scanning with a 40 degree-to-surface angle—instead of the desired 45 degree-to-surface angle—include information indicating that an angular increase of five degrees-to-surface might be preventative and/or curative.

As another illustration, the training guidance data pool might, for scan data and/or one or more virtual 3D models which led to missing and/or flawed scan data scan assistance indications (e.g., ones corresponding to particular geometrical areas, width-height dimensions, width-to-height or other dimensional relationships, and/or oral locations), include information indicating that having performed scanning at one or more specified speeds, cadences, angles, and/or distances-from-surface might have been preventative and/or mitigating.

Scanning technique teacher 1492 may with respect to particular users (e.g., practitioners) keep historical record (e.g., according to user identifier) of scan assistance indications over time. Scanning technique teacher 1492 may employ this historical record to highlight scan assistance indications which have occurred in the past and/or have been reoccurring for a particular user, to identify improvements and/or declines in user scanning technique over time, and/or to provide scanning technique training guidance which takes into account multiple scanning performances of the user. Scanning technique teacher 1492 may or may not consider the noted training guidance data pool information describing scanning technique changes which may be preventative and/or mitigating.

Scanning technique teacher 1492 may track and provide suggestions for how to avoid multiple types of mistakes. In an example, scanning technique teacher 1492 may determine that a scan speed was too high or too low for certain areas of a patient's oral cavity. In another example, scanning technique teacher 1492 may determine that a user's hand (and thus the intraoral scanner) was too shaky during scanning of certain areas of a patient's oral cavity (e.g., based on movement data from an IMU of the intraoral scanner). In another example, scanning technique teacher 1492 may determine that an intraoral scanner was held at a suboptimal orientation relative to a scanned surface for an area of the dental site. In another example, scanning technique teacher 1492 may identify one or more areas that have voids, a low data point density, surface conflict, blurriness, and so on, and that thus need further attention. In another example, scanning technique teacher 1492 may identify an excessive amount of blood and/or saliva on one or more areas of the dental site. In another example, scanning technique teacher 1492 may determine that a distance of the intraoral scanner's probe head was too far from a scanned surface for one or more areas of the dental site. In another example, scanning technique teacher 1492 may determine that an insufficient amount of gingiva was scanned around one or more teeth on the patient's dental arch. For example, it may be recommended to scan at least 3 mm of gingiva around each tooth of the dental arch. Each of these and other scanning metrics may be quantified, and scanning quality metric values may be determined and assigned to one or more regions of a generated 3D surface or 3D model.

The analysis of scanning technique may be performed relative to a recommended use of the intraoral scanner and/or target scanning quality metric values for each of the scanning quality metrics. Determined scanning technique of a user may be compared to an ideal operation of the intraoral scanner, to dental office or dental organization preferences, to historical scanning sessions associated with optimal results, and so on. Scanning quality metric values may be determined based on a strength or quality of scans, the strength of quality of registration and/or stitching, based on a final quality of a generated 3D model, based on the quality of margin lines, based on the quality of interproximal spaces between teeth, based on an orientation of a probe head of the intraoral scanner towards critical areas (e.g., interproximal regions, margin lines, etc.), based on the quality of a prosthodontic or orthodontic appliance ultimately manufactured based on the 3D model and/or based on patient comfort in embodiments.

As one illustration, scanning technique teacher 1492 may in providing indication (e.g., flagging) regarding missing and/or flawed scan data recognize that a particular user has received same and or similar indication in the past. For instance, scanning technique teacher 1492 may ascertain that the user has received missing and/or flawed scan data at a given location multiple times, and/or has received missing and/or flawed scan data of similar tenor multiple times (e.g., although at differing locations, the user has repeatedly received indication reelecting double incisor edges suggestive of scanning at other than a 45-degrees-from-surface angle). Where scanning technique teacher 1492 so finds an at-hand indication to be one for which same and/or similar indication has been received in the past, scanning technique teacher 1492 may act to highlight the indication (e.g., via a particular color).

As another illustration, with respect to a particular user and double incisor edge scan assistance indications, scanning technique teacher 1492 may, by consideration of such historical record and such training guidance data pool scanning technique change information, ascertain that the user's scanning technique is changing in such a fashion that the employed scanning is not yet the called-for 45 degrees-to-surface, but that the employed scanning angle is becoming over time closer to 45 degrees-to-surface. In so doing the training module 120 may perform matching with training guidance data pool information in the vein of the noted differing degrees-to-surface scanning angles leading to double incisor edge scan assistance indication (e.g., matching older user data to pool data regarding 60-degree-to-surface scanning angle but more recent user data to pool data regarding 40-degree-to-surface scanning angle). In one embodiment, scanning technique teacher 1492 performs one or more techniques set forth in U.S. Pat. No. 9,510,757, filed May 6, 2015 and issued Dec. 6, 2016, which is incorporated by reference herein.

Scanning technique teacher 1492 may analyze an intraoral scanning session and/or a 3D model of a patient after the intraoral scanning session is complete to provide recommendations on how to improve future scanning sessions of the same patient and/or different patients. In some embodiments, one or more past intraoral scanning sessions of a user are analyzed and recommendations for how to perform intraoral scanning for a next intraoral scanning session may be presented at a start of the intraoral scanning session.

In some embodiments, model application workflow 1417 includes a scanner position determiner 1495, which may receive input data (e.g., intraoral scans, 2D images and/or 3D surfaces), and determine a current position of the intraoral scanner in a patient's oral cavity based on the input data. This may include determining whether the scanner is currently scanning an upper dental arch, a lower dental arch, or a patient bite. This may further include determining whether the scanner is currently scanning a right side or a left side of the oral cavity. This may further include determining whether the scanner is currently scanning a lingual area, a buccal area, or an occlusal area. In some embodiments, scanner position determiner 1495 includes a trained machine learning model that has been trained on intraoral scans, 3D surfaces, 2D images, projections of 3D surfaces onto planes, and/or combinations thereof to a) classify an input as depicting one of upper dental arch, lower dental arch, or patient bite, and/or b) to classify the input as depicting one of a left side or a right side of an oral cavity, and/or c) to classify the input as depicting one of a lingual view, a buccal view, or an occlusal view of a dental site. A current position of the intraoral scan relative to a last generated intraoral scan may be known, and thus the determined position associated with the last intraoral scan may be used to determine a current position of the intraoral scanner (scanner position 1497).

A scanner position recommender 1498 may determine one or more suggested next positions and orientations of the intraoral scanner based on the determined scanner position and/or the 3D surface. The scanner position recommender 1498 may additionally receive as an input one or more previous 3D models of the dental site generated during prior patient visits or earlier in a present patient visit. In some embodiments, a rough 3D model may have been generated from multiple 2D color images, which may have been generated by a camera or mobile phone, for example. The one or more previous 3D models may be analyzed to identify one or more difficult to scan areas (e.g., areas with tooth crowding, areas with low clearance, areas that can only be imaged from a narrow range of positions and/or orientations, etc.). In one embodiment, scanner position recommender includes a trained machine learning model that receives as an input a previously generated 3D model of a dental site, a 3D surface of the dental site as generated from a current intraoral scanning session, and/or a current position of the intraoral scanner relative to the 3D surface. Scanner position recommender 1498 may then output a recommended position and orientation for the intraoral scanner, which may be output to a display. In one embodiment, scanner position recommender determines a recommended trajectory for moving the intraoral scanner over a region of the dental site. The recommended trajectory may then be output, showing the intraoral scanner moving according to the recommended trajectory. This may include showing how fast the intraoral scanner should be moved across the trajectory.

Figure 15:
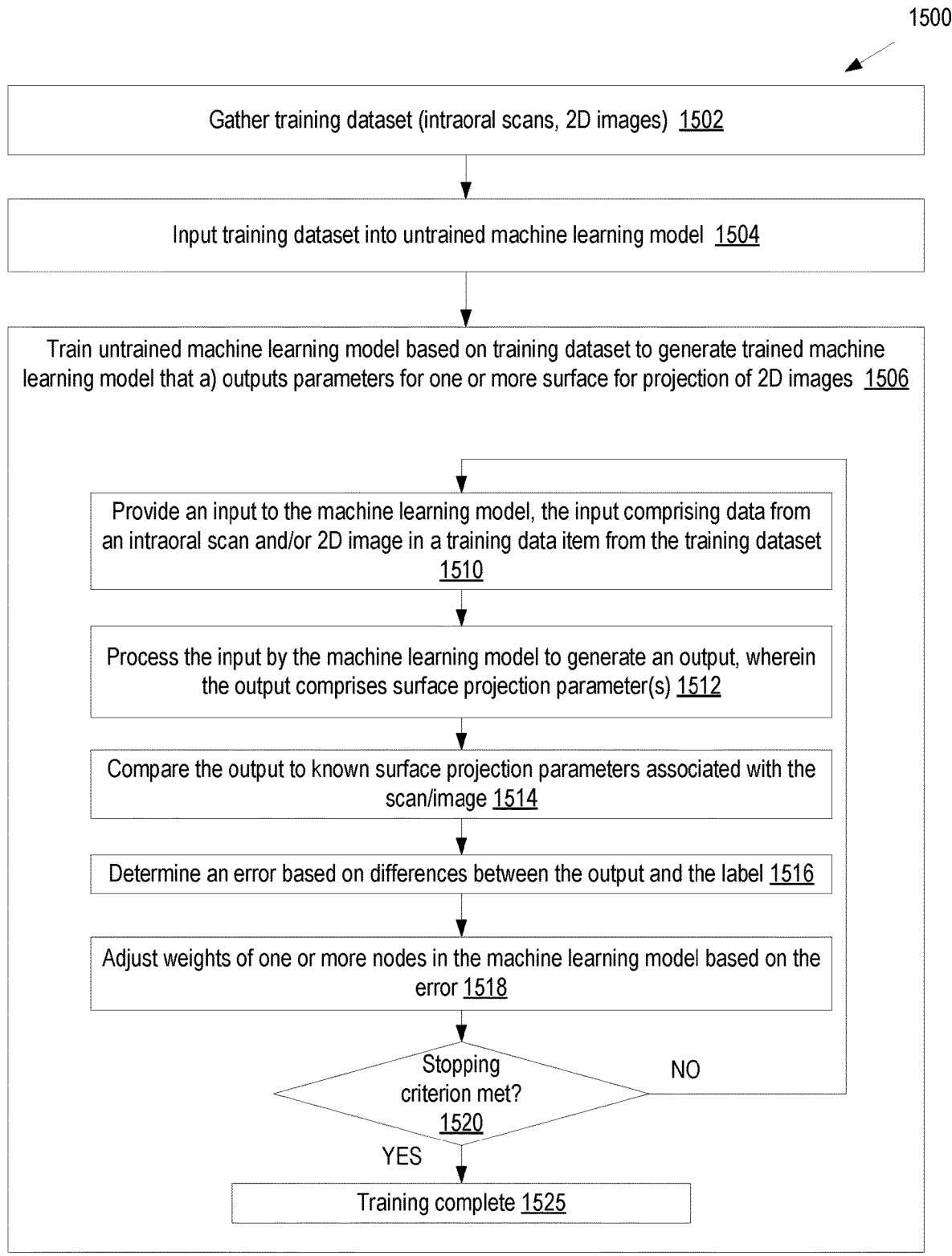
FIG. 15 is a flow chart illustrating an embodiment for a method of training a machine learning model to determine surface projection parameters for projecting 2D images onto.

FIG. 15 is a flow chart illustrating an embodiment for a method 1500 of training a machine learning model to determine surface projection parameters for projecting 2D images onto. Method 1500 may be performed by a processing logic that may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by a computing device of a scanning system and/or by a server computing device (e.g., by computing device 105 of FIG. 1 or computing device 4000 of FIG. 40).

At block 1502 of method 1500, processing logic gathers a training dataset, which may include sets of 2D images of dental sites. Each data item (e.g., set of 2D images) of the training dataset may include one or more labels, where the labels may include surface parameters of the dental sites. In some embodiments, the labels include the actual height information (e.g., height maps) of the dental sites from the same perspective as the 2D images. For example, the labels may include height maps generated by projecting the 3D surface of the dental site onto a plane that corresponds to one or more of the 2D image(s).

At block 1504, data items from the training dataset are input into the untrained machine learning model. At block 1506, the machine learning model is trained based on the training dataset to generate a trained machine learning model that determines surface parameters for a surface onto which input 2D images will be projected to generate a combined 2D image from a common perspective.

In one embodiment, at block 1510 an input of a training data item is input into the machine learning model. The input may include, for example, 2-10 (e.g., 6) intraoral 2D images, each having been generated by a different camera. At block 1512, the machine learning model processes the input to generate an output. The output may include one or more surface parameters such as distance between the intraoral scanner and the surface, an angle of the surface relative to the intraoral scanner, a shape of the surface (e.g., a plane, a curved surface, an irregularly shaped surface, etc.), and so on.

At block 1514, processing logic compares the output surface parameters to known ideal surface parameters associated with the input data item. At block 1516, processing logic determines an error based on differences between the output surface parameters and the known ideal surface parameters. At block 1518, processing logic adjusts weights of one or more nodes in the machine learning model based on the error.

At block 1520, processing logic determines if a stopping criterion is met. If a stopping criterion has not been met, the method returns to block 1510, and another training data item is input into the machine learning model. If a stopping criterion is met, the method proceeds to block 1525, and training of the machine learning model is complete.

Figure 16:
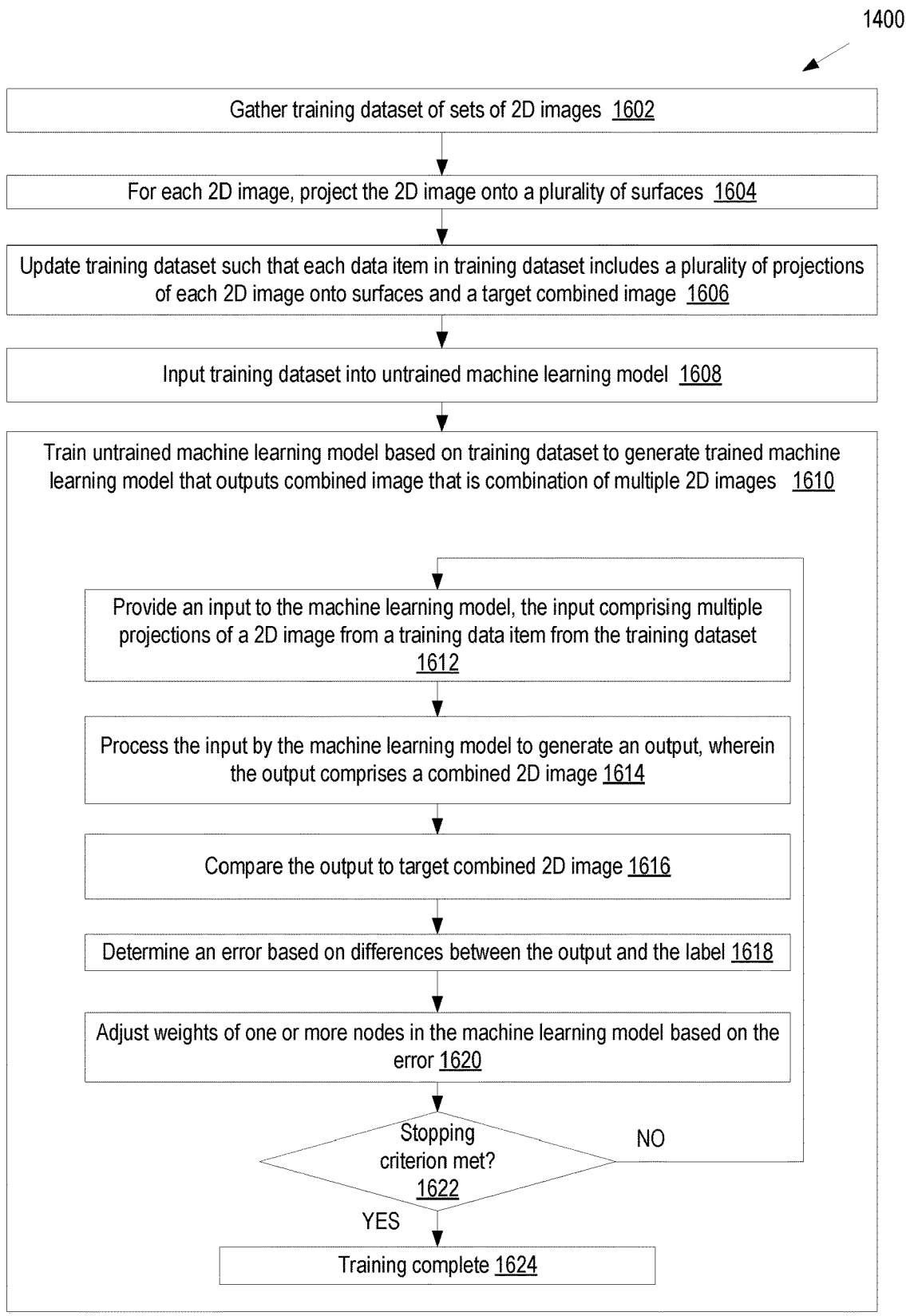
FIG. 16 is a flow chart illustrating an embodiment for a method of training a machine learning model to generate combined 2D images from sets of 2D images.

FIG. 16 is a flow chart illustrating an embodiment for a method 1600 of training a machine learning model to generate combined 2D images from sets of 2D images. Method 1600 may be performed by a processing logic that may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by a computing device of a scanning system and/or by a server computing device (e.g., by computing device 105 of FIG. 1 or computing device 4000 of FIG. 40).

At block 1602 of method 1600, processing logic gathers a training dataset, which may include sets of 2D images of dental sites. Each data item (e.g., set of 2D images) of the training dataset may include one or more labels, where the labels may include a combined 2D image that incorporates data from each of the individual 2D images in the set of 2D images from a common perspective. The common perspective may have a different center and/or a different orientation than the center and/or orientation of any of the cameras that generated the 2D images in the set of 2D images, for example as shown below in FIG. 17. FIG. 17 illustrates reference frames (camera view directions) 1702, 1704, 1706, 1708, 1710, 1712 of multiple cameras of an intraoral scanner and a reference frame 1714 (camera view direction) for a combined image generated from 2D images of a dental site 1716 generated by the multiple cameras, in accordance with an embodiment of the present disclosure. Each of the cameras has a different position and orientation on a probe of the intraoral scanner relative to the other cameras. Thus, the field of view and perspective of each camera is different from each other camera. The reference frame 1714 of the combined image may have a depth (z) axis that is normal to a plane defined by the combined image, and may have x-axis and y-axis 0 values that correspond to a center of the combined image.

At block 1604, for each 2D image, processing logic projects that 2D image onto a plurality of surfaces (e.g., 5-20 parallel planes). Each of the 2D images may be projected onto the same set of surfaces. The surfaces may be parallel surfaces that are all orthogonal to a viewing axis of the intraoral scanner (e.g., that are parallel to a viewing window of the intraoral scanner). Each surface may have a different distance from the probe head of the intraoral scanner. In one embodiment, the distance between each of the surfaces increases with distance from the probe head. For example, a first surface may have a distance of 1 mm, a second surface may have a distance of 2 mm, a third surface may have a distance of 3.5 mm, a fourth surface may have a distance of 6.5 mm, and so on. At block 1606, processing logic updates the training dataset such that each data item in the training dataset includes a plurality of projections of each 2D image onto the surfaces. Each data item may further include a label, which may be an idealized combined 2D image that is the target result of combining the 2D images. The idealized combined image may be generated based on knowledge of the actual shape of the 3D surface represented in the 2D images (e.g., based on projection of the 2D images onto the known 3D surface). By projecting the 2D images onto the multiple planes, a geometric problem of determining the surface shape of the imaged surface no longer needs to be solved by the machine learning model. Rather, the machine learning model just needs to determine which of the planes to use for each region of each of the 2D images, which simplifies the problem that the machine learning model needs to solve, improves a speed of the machine learning model, and may increase an accuracy of the machine learning model.

Figure 18:
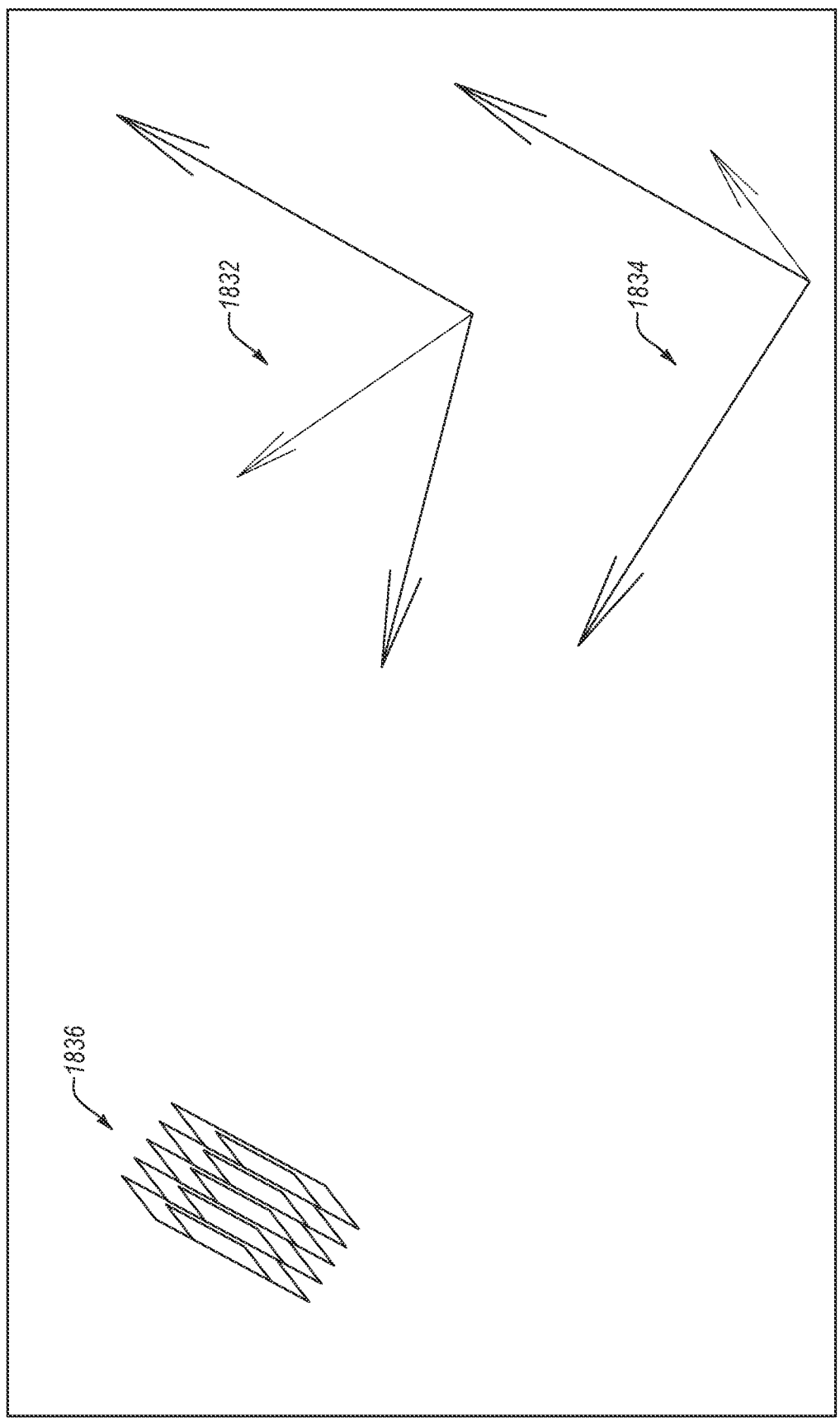
FIG. 18 illustrates reference frames of multiple cameras and surfaces onto which images generated from the multiple cameras are projected, in accordance with an embodiment of the present disclosure.

In one embodiment, each data item includes projections of each image in a set of 2D images onto a plurality of surfaces, as shown in FIG. 18. FIG. 18 illustrates reference frames 1832, 1834 of multiple cameras and surfaces 1836 onto which images generated from multiple cameras are projected, in accordance with an embodiment of the present disclosure. The surfaces 1836 onto which the images were projected may be parallel planes in embodiments. Alternatively, the surfaces may be non-flat surfaces. In one embodiment, the spacing between the parallel planes (or other surfaces) increases with the distance of the planes (or other surfaces) from the scanner. For example, a first plane may have a distance of 1 mm from the scanner, a second plane may have a distance of 1.1 mm, a third plane may have a distance of 1.3 mm, a fourth plane may have a distance of 1.5 mm, a fifth plane may have a distance of 2 mm, a sixth plane may have a distance of 3 mm, and so on.

Returning to FIG. 16, at block 1608, data items from the training dataset are input into the untrained machine learning model. At block 1610, the machine learning model is trained based on the training dataset to generate a trained machine learning model that generates a combined 2D image from an input of a set of 2D images (e.g., from an input of projections of a set of 2D images onto multiple surfaces). In one embodiment, the machine learning model is a GAN. A generator of the GAN may be trained to generate realistic combined 2D images, and a discriminator of the GAN may be trained to discriminate between combined 2D images generated by the generator and combined 2D images that are real (e.g., generated based on a known 3D surface). During training, the generator becomes increasingly proficient with generating realistic combined 2D images, and the discriminator becomes increasingly proficient at distinguishing between real combined 2D images and combined 2D images generated by the generator. Once training is complete, the generator may be used to generate combined 2D images based on an input of a set of 2D images.

In one embodiment, at block 1612 an input of a training data item is input into the machine learning model. The input may include, for example, 2-10 (e.g., 6) intraoral 2D images, each having been generated by a different camera. In one embodiment, the input includes projections of a set of images (e.g., 2-10 images) onto a plurality of surfaces (e.g., a plurality of parallel planes). At block 1612, the machine learning model processes the input to generate an output. The output may include a combined 2D image.

At block 1614, processing logic compares the output surface parameters to a 2D image that represents an actual surface of the dental site represented in the combined 2D image. The 2D surface that is used as the label for the set of 2D images may be generated by determining a field of view encompassed by the set of 2D images, determining a plane, and projecting a 3D surface corresponding to the field of view onto the plane. At block 1616, processing logic determines an error based on differences between the output combined 2D image and the label 2D image. At block 1618, processing logic adjusts weights of one or more nodes in the machine learning model based on the error.

At block 1620, processing logic determines if a stopping criterion is met. If a stopping criterion has not been met, the method returns to block 1612, and another training data item is input into the machine learning model. If a stopping criterion is met, the method proceeds to block 1624, and training of the machine learning model is complete.

FIGS. 19, 22, 25, and 27 are flow charts illustrating various methods related to displaying a 3D surface in a graphical user interface of an intraoral scan application during intraoral scanning. The methods may be performed by a processing logic that may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by a computing device of a scanning system and/or by a server computing device (e.g., by computing device 105 of FIG. 1 or computing device 4000 of FIG. 40).

Figure 19:
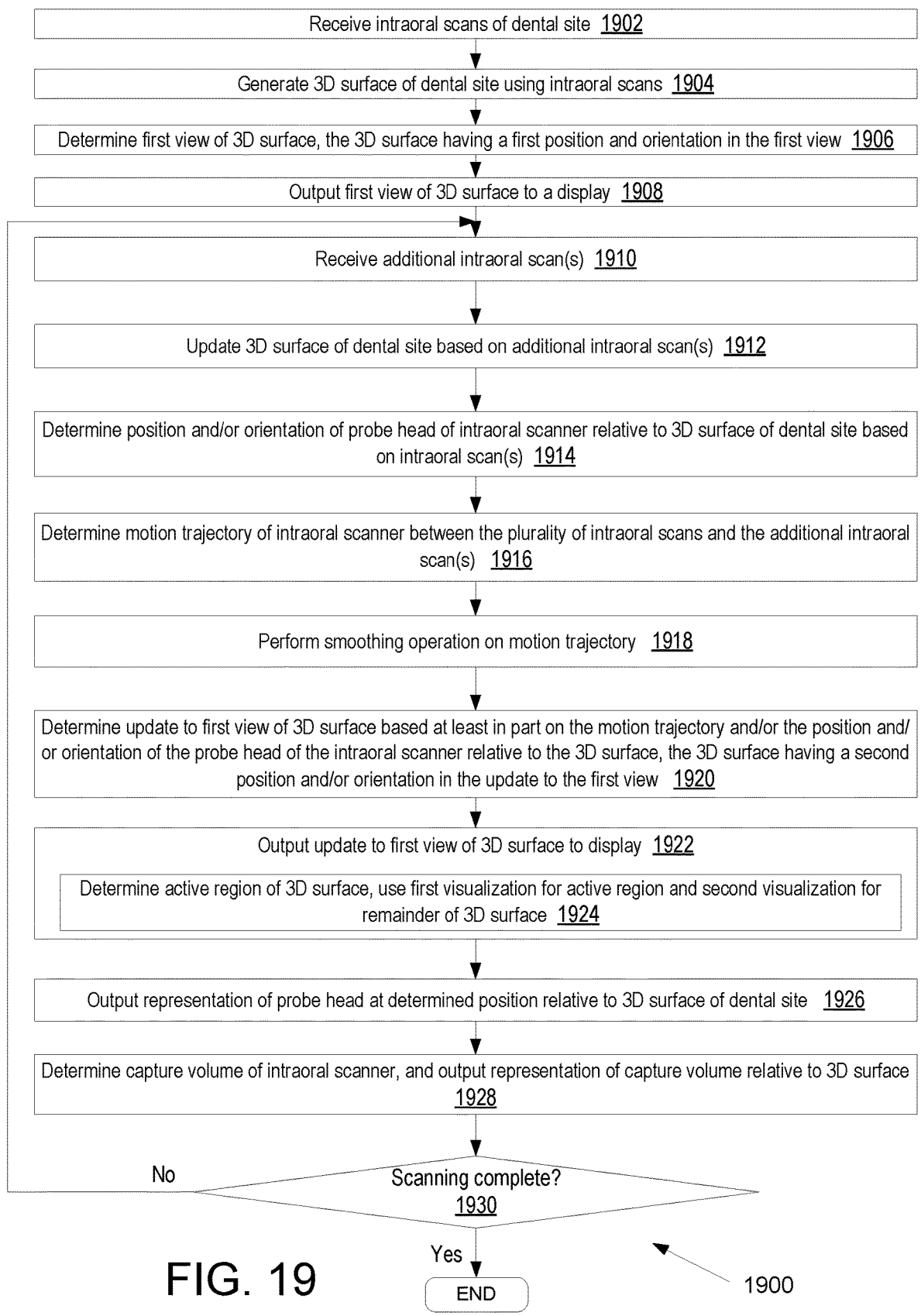
FIG. 19 is a flow chart illustrating an embodiment for a method of generating and updating a 3D surface and a view of the 3D surface during intraoral scanning.

FIG. 19 is a flow chart illustrating an embodiment for a method 1900 of generating and updating a 3D surface and a view of the 3D surface during intraoral scanning. At block 1902 of method 1900, processing logic receives a plurality of intraoral scans of a dental site. At block 1904, processing logic generates a 3D surface of the dental site using the plurality of intraoral scans (e.g., by performing registration between the intraoral scans and stitching the intraoral scans together). At block 1906, processing logic determines a first view of the 3D surface, where the 3D surface has a first position and a first orientation in the first view. At block 1908, processing logic outputs the first view of the 3D surface to a display (e.g., to a GUI of an intraoral scan application).

At block 1910, processing logic receives one or more additional intraoral scans of the dental site. At block 1912, processing logic updates the 3D surface of the dental site using the additional intraoral scan(s) (e.g., by registering and stitching the additional intraoral scan(s) to the 3D surface). At block 1914, processing logic determines a position and/or orientation of a probe head of the intraoral scanner relative to the 3D surface of the dental site based on the additional intraoral scans. The cameras and/or optical system of the intraoral scanner may have a known position and orientation within the intraoral scanner, and a field of view of the intraoral scanner may be known. Accordingly, processing logic may always know a position and orientation of the probe head (and of a remainder of the intraoral scanner) relative to generated intraoral scans and 2D images. Since the intraoral scans are registered to the 3D surface, which includes determining transformations and/or rotations that are applied to the intraoral scan to properly position and orient the intraoral scan with the 3D surface, and the probe head of the intraoral scanner has a known position and orientation relative to the intraoral scan, the position and orientation of the probe head relative to the 3D surface can be easily determined.

In one embodiment, at block 1916 processing logic determines a trajectory of the intraoral scanner between the plurality of intraoral scans and the additional intraoral scan(s). The trajectory may be determined based on inertial measurements generated by an IMU of the intraoral scanner and/or based on determined transformations and/or rotations used to register the intraoral scans together and/or to a 3D surface. In one embodiment, processing logic determines a time difference between when one or more intraoral scans of the plurality of intraoral scans were generated and when the additional intraoral scan was generated. Processing logic may then determine at least one of a position difference or an orientation difference for a portion of the dental site between the one or more intraoral scans and the additional intraoral scan. Processing logic may then estimate a trajectory of the intraoral scanner based on the time difference and at least one of the position difference or the orientation difference.

In some instances, the trajectory may include jerky or unsteady motions. Accordingly, in one embodiment at block

1918 processing logic performs a smoothing operation on the trajectory. The smoothing operation may be any of the smoothing operations discussed elsewhere herein, or other smoothing operations. In an example, the smoothing operation may be performed by integrating position and/or orientation of the intraoral scanner relative to the 3D surface over time and/or extrapolating into the future or to a current time. The smoothing operation may modify one or more of a rate of rotation of the view of the 3D surface about up to three axes and a rate of motion of the 3D surface along up to three axes so that rotation and/or motion speeds that are higher than adjacent points are reduced and/or rotation and/or motion speeds that are lower than adjacent points are increased, leading to a smoother signal. The smoothing operation may be performed by approximating a function that attempts to capture patterns in the data, while leaving out noise or other fine-scale phenomena and/or structures. Examples of smoothing functions that may be used include a Kalman filter, a Kernel smoother, exponential smoothing, local regression, a moving average, and so on.

Figure 30:
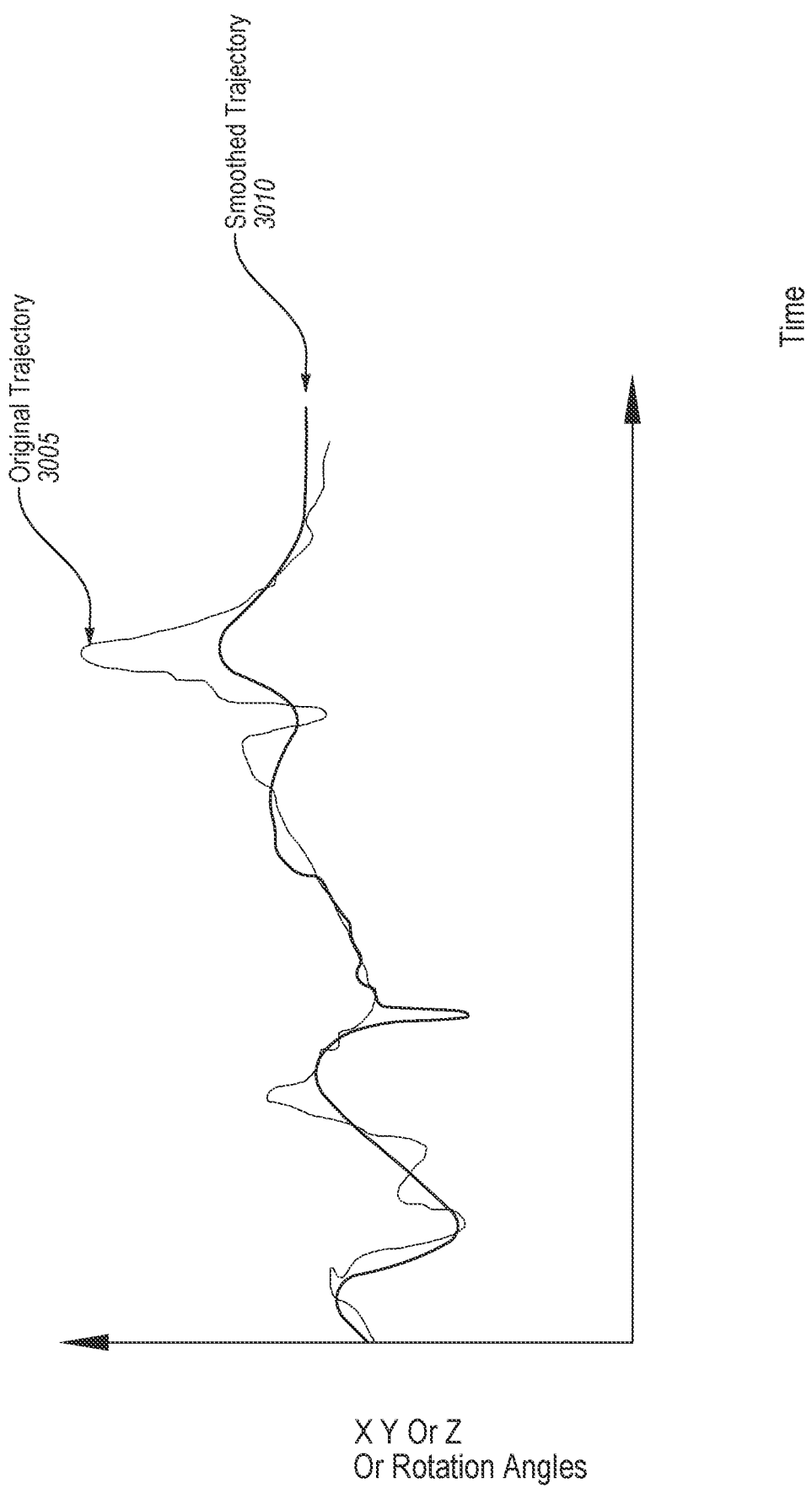
FIG. 30 illustrates a smoothed trajectory of a view of a 3D surface generated during intraoral scanning, in accordance with embodiments of the present disclosure.

FIG. 30 illustrates one example of a smoothed trajectory, including an original trajectory 3005 and a smoothed trajectory 3010. The smoothing may be performed with regards to motion along the x, y and/or z axes as well as rotation about the x, y and/or z axes.

At block 1920, processing logic determines an update to the first view of the 3D surface based at least in part on the trajectory and the determined position and/or orientation of the probe head of the intraoral scanner relative to the 3D surface. In one embodiment, the processing logic updates the first view of the 3D surface so that the 3D surface is oriented such that a viewing axis of the intraoral scanner at the time of generating a most recent intraoral scan used to update the 3D surface is normal to a plane defined by the display (e.g., so that it appears that a user is looking down the viewing axis of the intraoral scanner). In one embodiment, the 3D surface is positioned such that a current field of view of the intraoral scanner is approximately centered on the display of the GUI (or approximately centered in a window of the GUI). In one embodiment, processing logic determines an active region of the 3D surface, where the active region is a region associated with a most recently received intraoral scan that was stitched to the 3D surface. In other words, the active region may be a region that includes data from the most recently received intraoral scan. The active region may represent a region of the 3D model currently being captured (e.g., from intraoral scans received in the last 200 milliseconds). The update to the first view may cause the first view to be repositioned and/or reoriented such that the active region is approximately centered in the display and/or window.

At block 1922, processing logic outputs the update to the first view of the 3D surface to the display. In one embodiment, processing logic may determine an active region of the 3D surface (if the active region wasn't already determined). Processing logic may then use a first visualization for the active region and a second visualization for a remainder of the 3D surface. For example, the active region may be displayed using a first color, a first transparency level, a first line type, a first zoom level (also referred to as magnification level), etc. and a remainder of the 3D surface may be displayed using a second color, a second transparency level, a second line type, a second zoom level, etc. In another example, a window or border may be drawn around the active region. The window or border may correspond to an outer boundary of a field of view of the intraoral scanner. In one embodiment, the intraoral scans are generated continuously (e.g., at a rate of about 60 times per second), where each intraoral scan may include about 300-1000 points (e.g., about 500 points). The active region may be updated initially on receipt of a new intraoral scan and before full processing of the intraoral scan has been performed. Multiple intraoral scans (e.g., about 10-30 or about 20 scans) may be blended together to generate a blended scan that includes an increased number of data points and that is more accurate after a short delay. The active region may then be updated based on the blended scans. These blended scans may then be registered and stitched together with the 3D surface with still further accuracy after an additional minor delay. This enables the 3D surface to be updated in real-time with less accurate data, and to then be updated with increased accuracy as further data is received and further processing is performed on the intraoral scans. In some embodiments, if smoothing of the trajectory was performed at block 1918, then processing logic may generate an intermediate update to the first view of the 3D surface, and may output the intermediate update to the display.

In one embodiment, at block 1926 processing logic outputs a representation of the probe head of the intraoral scanner at the determined position relative to the 3D surface of the dental site. The probe head (and optionally additional portions of the intraoral scanner) may be shown using a transparency, a wire frame, or some other visualization that enables any underlying portions of the 3D surface to still be visible on the display.

In one embodiment, at block 1928 processing logic determines a capture volume of the intraoral scanner. The capture volume may be known for the intraoral scanner. Processing logic may then output a representation of the capture volume relative to the 3D surface of the dental site. Additionally, or alternatively, processing logic may output a graphic showing just a back face of the capture volume. Additionally, or alternatively, processing logic may output a graphic showing a cross section of the capture volume with the 3D surface (e.g., by using a different visualization to call attention to the cross section). This may reduce an amount of the 3D surface that is occluded while still providing useful information to a user as to the boundaries of the capture volume of the intraoral scanner.

At block 1930, processing logic determines whether the intraoral scanning is complete. If so, the method ends. If scanning is not complete, processing logic returns to block 1910, and additional intraoral scans are received.

Figure 20:
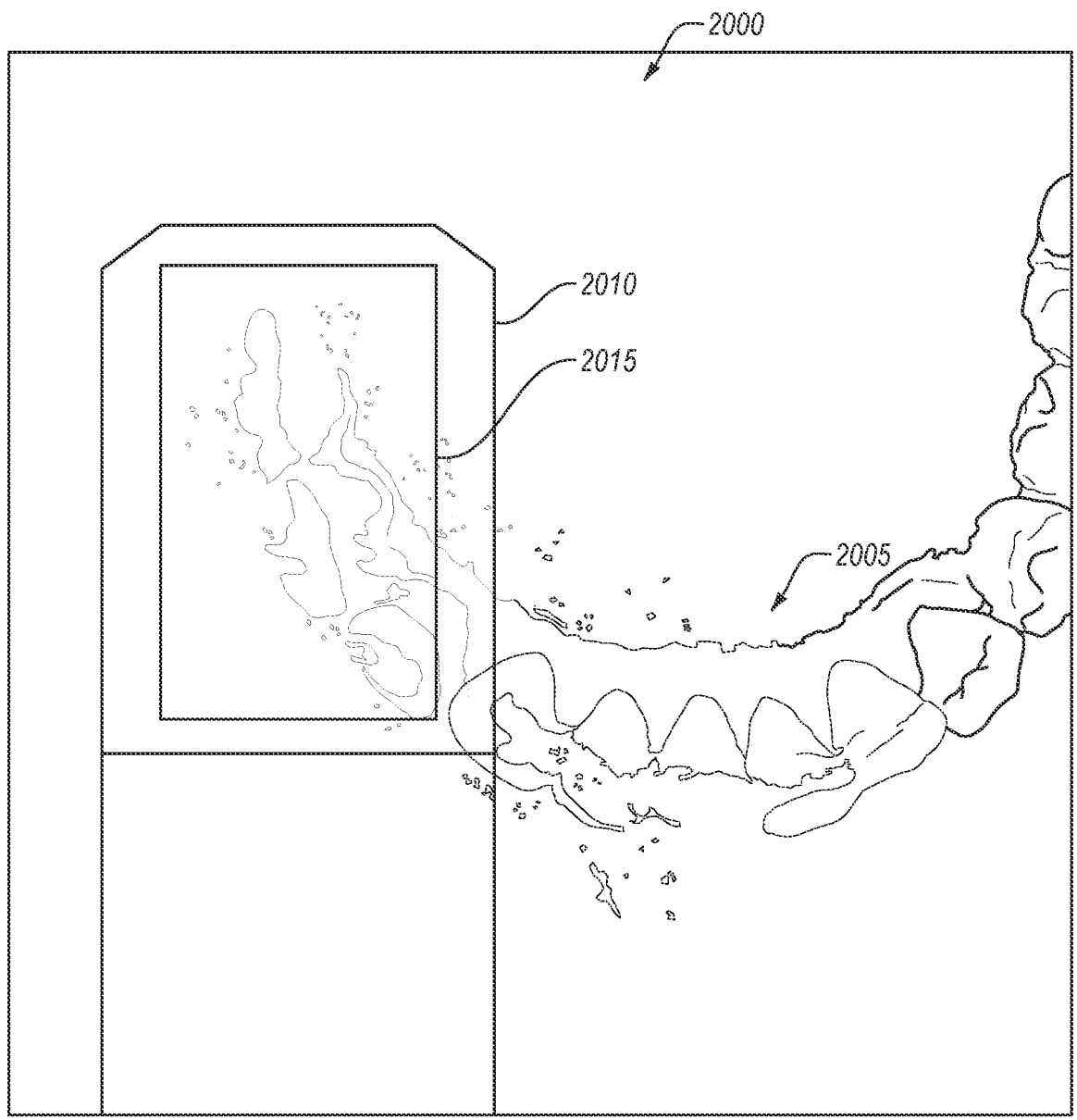
FIGS. 20-21 illustrate views of a 3D surface of a dental site being scanned, where the position and/or orientation of the 3D surface is adjusted between the views, in accordance with an embodiment of the present disclosure.
Figure 21:
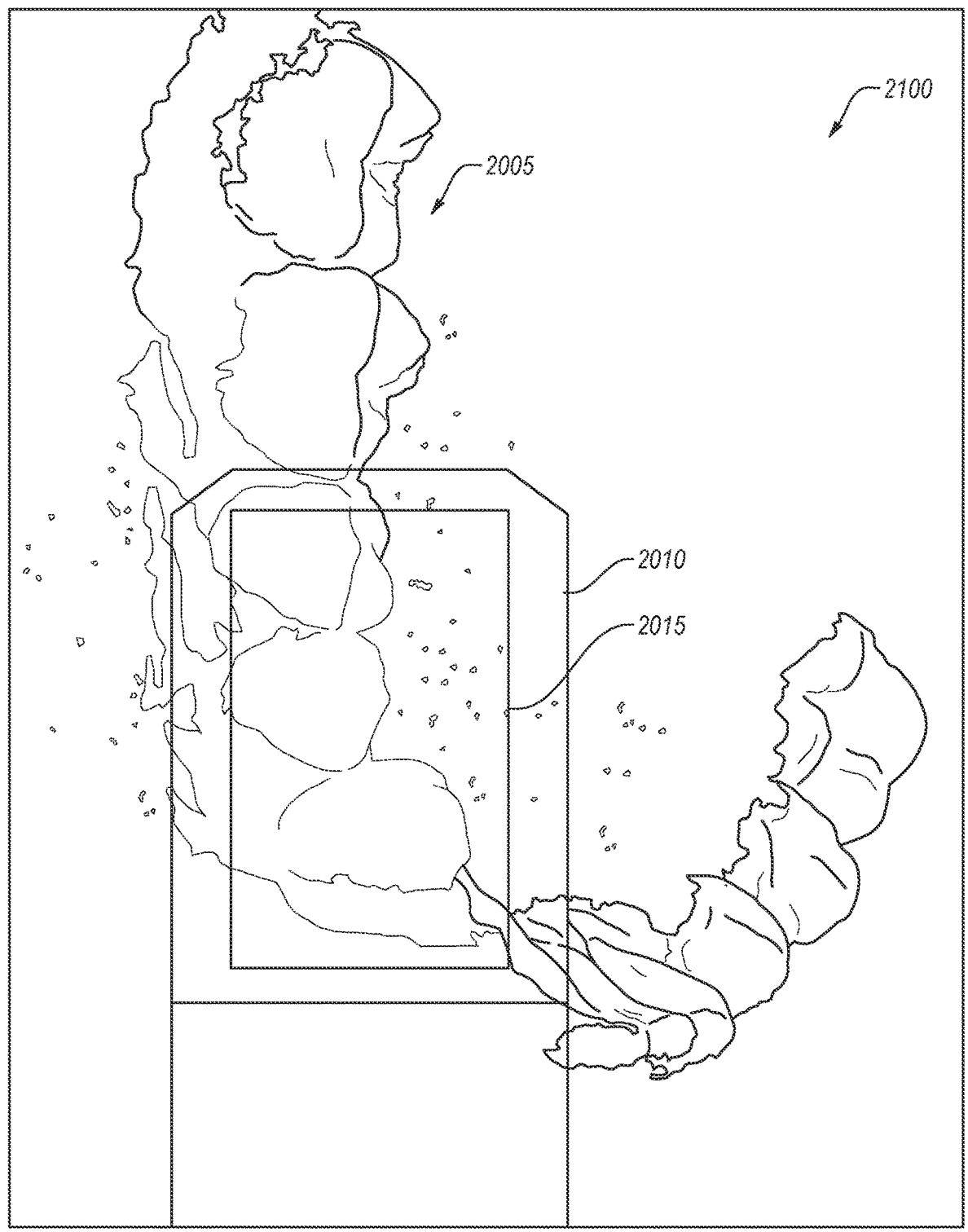

FIGS. 20-21 illustrate views of a 3D surface of a dental site being scanned, where the position and/or orientation of the 3D surface is adjusted between the views, in accordance with an embodiment of the present disclosure. As shown in FIGS. 20-21, a most recent 3D scan that has been stitched to the 3D surface defines a display direction of a virtual camera whose field of view represents the view of the 3D surface on the display. FIG. 20 illustrates a first view of 3D surface 2005 of a dental site in which the 3D surface has a first orientation and position. Also illustrated is a wire frame of a probe head 2010 of an intraoral scanner and a viewing window (also referred to as an exit window) 2015 of the intraoral scanner, where the viewing window may represent a field of view of the intraoral scanner for an object having a zero distance from the intraoral scanner or a set distance from the intraoral scanner. The viewing window may be associated with a coordinate system which is located at a center of the viewing window, where a viewing axis extends from the center of the viewing window and is orthogonal to the viewing window. As shown, the portion of the 3D surface that is within the viewing window (and a small portion of the 3D surface outside of the viewing window 2015) is displayed using a first visualization that is different from a second visualization used for a remainder of the 3D surface. The portion of the 3D surface that is within the viewing window 2015 may represent an active region of the 3D surface. The active region may additionally extend beyond the viewing window 2015 in embodiments. The active region may represent a region of the 3D model currently being captured (e.g., from intraoral scans received in the last 200 milliseconds). As shown, a plane defined by the viewing surface of the intraoral scanner (which is orthogonal to a viewing axis of the intraoral scanner) is coplanar with a plane defined by the display onto which the 3D surface is rendered.

FIG. 21 illustrates a second view 2100 of an updated version of the 3D surface 2005 of FIG. 20, in accordance with an embodiment of the present disclosure. As shown, the 3D surface has been rotated and repositioned on the display such that the 3D surface has a second position and a second orientation. Also illustrated is the wire frame of the probe head 2010 and the viewing window 2015 of the intraoral scanner. The position of and orientation of the probe head 2010 may be unchanged between the different updates to the first view, and instead the 3D surface may continuously be rotated and/or repositioned so that an active region of the 3D surface maintains a same orientation and/or position on the display.

Figure 22:
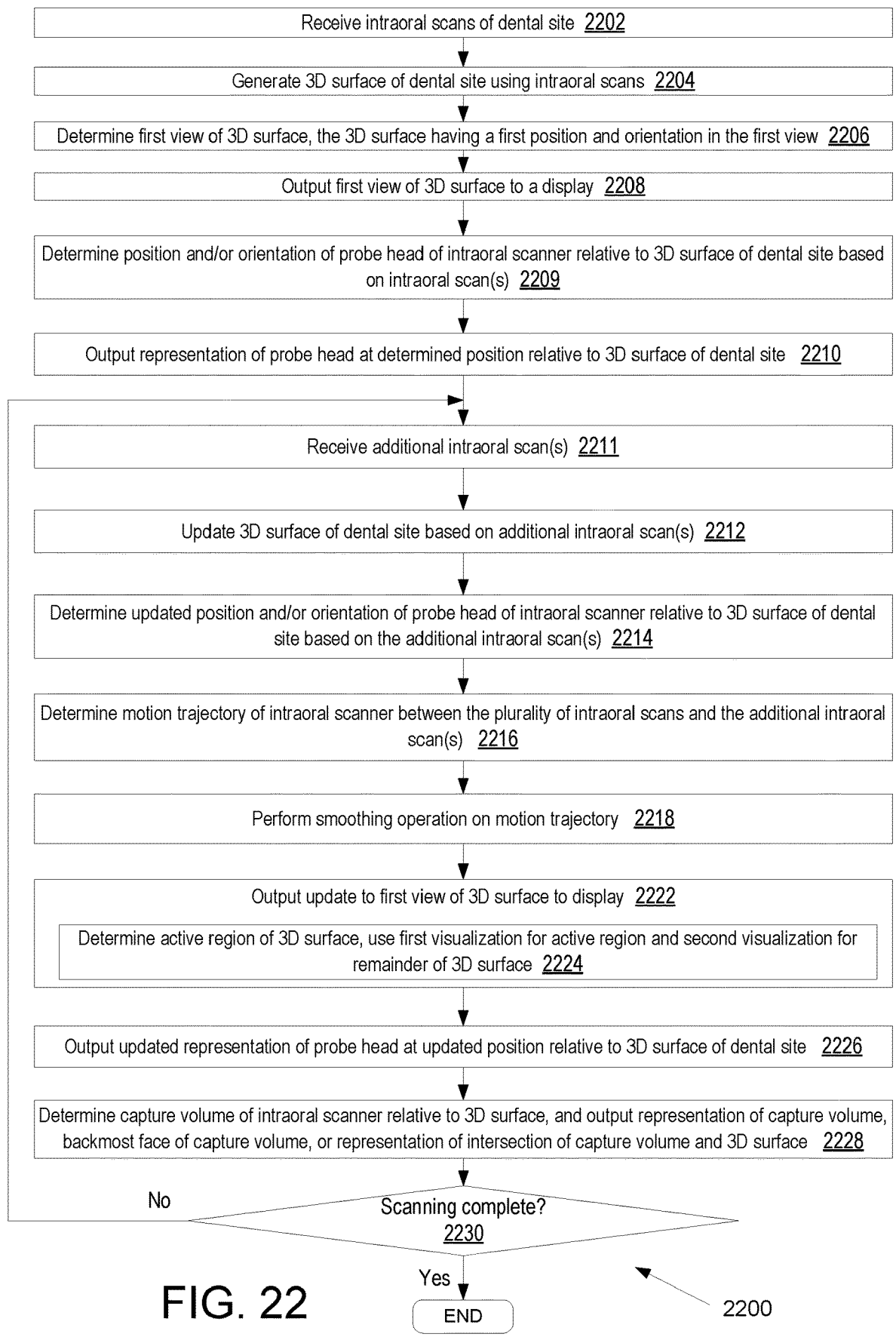
FIG. 22 is a flow chart illustrating an embodiment for a method of generating and updating a 3D surface and a view of the 3D surface during intraoral scanning.

FIG. 22 is a flow chart illustrating an embodiment for a method 2200 of generating and updating a 3D surface and a view of the 3D surface during intraoral scanning. At block 2202 of method 2200, processing logic receives a plurality of intraoral scans of a dental site. At block 2204, processing logic generates a 3D surface of the dental site using the plurality of intraoral scans (e.g., by performing registration between the intraoral scans and stitching the intraoral scans together). At block 2206, processing logic determines a first view of the 3D surface, where the 3D surface has a first position and a first orientation in the first view. At block 2208, processing logic outputs the first view of the 3D surface to a display (e.g., to a GUI of an intraoral scan application).

At block 2209, processing logic determines a position and/or orientation of a probe head of the intraoral scanner relative to the 3D surface of the dental site based on the additional intraoral scan(s). At block 2210, processing logic outputs a representation of the probe head at the determined position and orientation relative to the 3D surface of the dental site. The probe head (and optionally additional portions of the intraoral scanner) may be shown using a set transparency, a wire frame, or some other visualization that enables any underlying portions of the 3D surface to still be visible on the display.

At block 2211, processing logic receives one or more additional intraoral scans of the dental site. At block 2212, processing logic updates the 3D surface of the dental site using the additional intraoral scan(s) (e.g., by registering and stitching the additional intraoral scan(s) to the 3D surface). At block 2214, processing logic determines an updated position and/or orientation of the probe head relative to the 3D surface of the dental site based on the additional intraoral scan(s).

In one embodiment, at block 2216 processing logic determines a trajectory of the intraoral scanner between the plurality of intraoral scans and the additional intraoral scan(s). The trajectory may be determined based on inertial measurements generated by an IMU of the intraoral scanner and/or based on determined transformations and/or rotations used to register the intraoral scans together and/or to a 3D surface. In some instances, the trajectory may include jerky or unsteady motions. Accordingly, in one embodiment at block 2218 processing logic performs a smoothing operation on the trajectory. The smoothing operation may be any of the smoothing operations discussed elsewhere herein, or other smoothing operations. FIG. 30 illustrates one example of a smoothed trajectory, including an original trajectory 3005 and a smoothed trajectory 3010. The smoothing may be performed with regards to motion along the x, y and/or z axes as well as rotation about the x, y and/or z axes.

At block 2222, processing logic outputs, to the display, an update to the first view of the 3D surface that includes the information from the additional intraoral scan(s). In one embodiment, at block 2224 processing logic determines an active region of the 3D surface (if the active region wasn't already determined). Processing logic may then use a first visualization for the active region and a second visualization for a remainder of the 3D surface. For example, the active region may be displayed using a first color, and a remainder of the 3D surface may be displayed using a second color. In another example, a window or border may be drawn around the active region. The window or border may correspond to an outer boundary of a field of view of the intraoral scanner.

At block 2226 processing logic outputs an updated representation of the probe head at an updated position and/or orientation relative to the 3D surface of the dental site. Accordingly, the 3D surface may have a fixed position and/or orientation, and the probe head may be shown to move about the 3D surface as intraoral scanning is performed. In some embodiments, if smoothing of the trajectory was performed at block 2218, then processing logic may generate an intermediate update to the representation of the probe head, and may output the intermediate update to the representation of the probe head.

In one embodiment, at block 2228 processing logic determines a capture volume of the intraoral scanner. The capture volume may be known for the intraoral scanner. Processing logic may then output a representation of the capture volume relative to the 3D surface of the dental site and/or relative to the representation of the probe head. Additionally, or alternatively, processing logic may output a graphic showing just a back face of the capture volume. Additionally, or alternatively, processing logic may output a graphic showing a cross section of the capture volume with the 3D surface (e.g., by using a different visualization to call attention to the cross section).

At block 2230, processing logic determines whether the intraoral scanning is complete. If so, the method ends. If scanning is not complete, processing logic returns to block 2210, and additional intraoral scans are received.

Figure 23B:
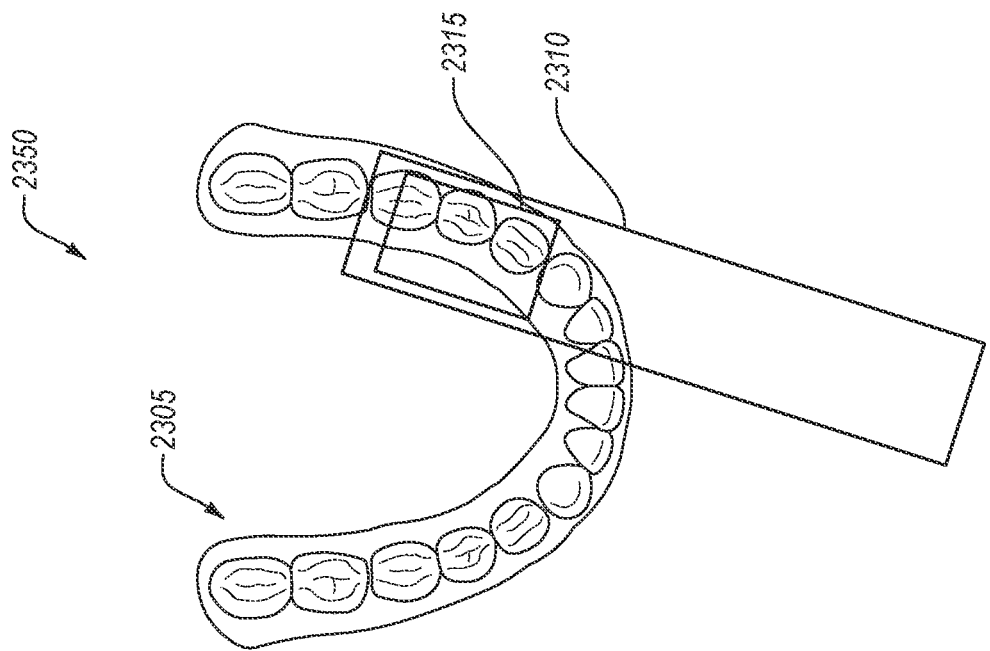
FIGS. 23A-B illustrate views of a 3D surface of a dental site being scanned, where the position and/or orientation of the 3D surface is static in the views but an image of a scanner probe head changes between the views, in accordance with an embodiment of the present disclosure.
Figure 23A:
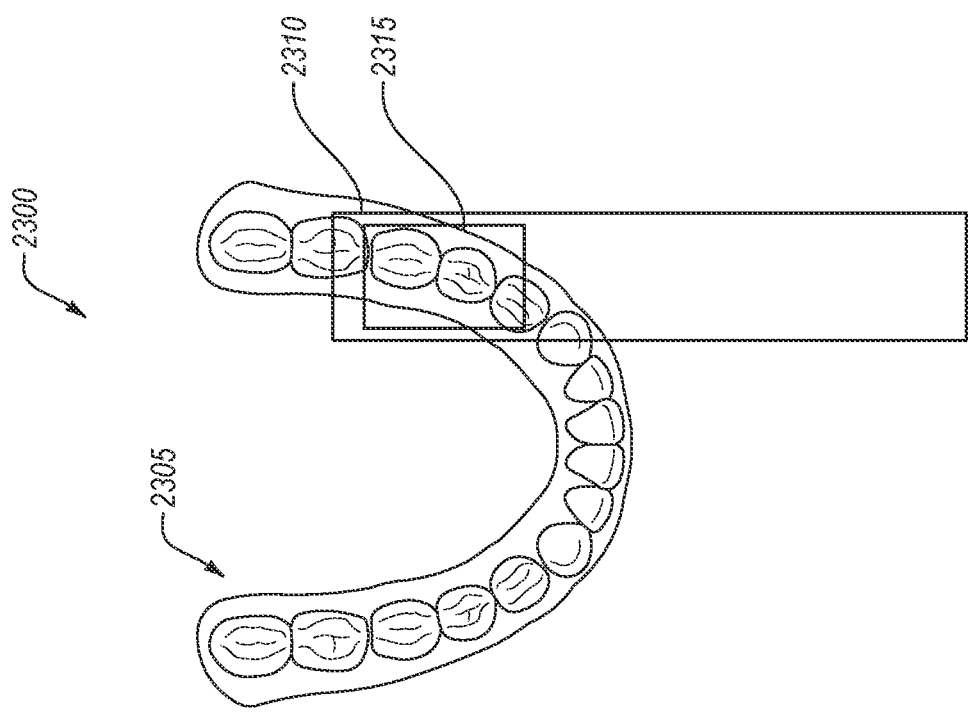

FIGS. 23A-B illustrate views of a 3D surface of a dental site being scanned, where the position and/or orientation of the 3D surface is static in the views but an image of a scanner probe head changes between the views, in accordance with an embodiment of the present disclosure. FIG. 23A illustrates a 3D surface 2305 of a dental site in a first view 2300, along with an outline of a scanner probe head 2310 and a viewing window 2315 of the intraoral scanner. FIG. 23B illustrates the 3D surface 2305 of the dental site in an updated first view 2350, along with an outline of the scanner probe head 2310 and the viewing window 2315 of the intraoral scanner. As shown, the 3D surface 2305 is stationary, but the position and orientation of the probe head 2315 changes between FIGS. 23A and 23B. Accordingly, as new intraoral scans are received, the data from those scans may be added to the 3D surface without changing an orientation of the 3D surface on a display. In embodiments, the camera direction of a virtual camera viewing the 3D surface may not change, but a field of view or distance of the virtual camera (e.g., a zoom or magnification setting) may change so that as the 3D surface grows all of the 3D surface remains visible. Alternatively, the zoom or magnification setting may not change automatically with new intraoral scans.

Figure 24:
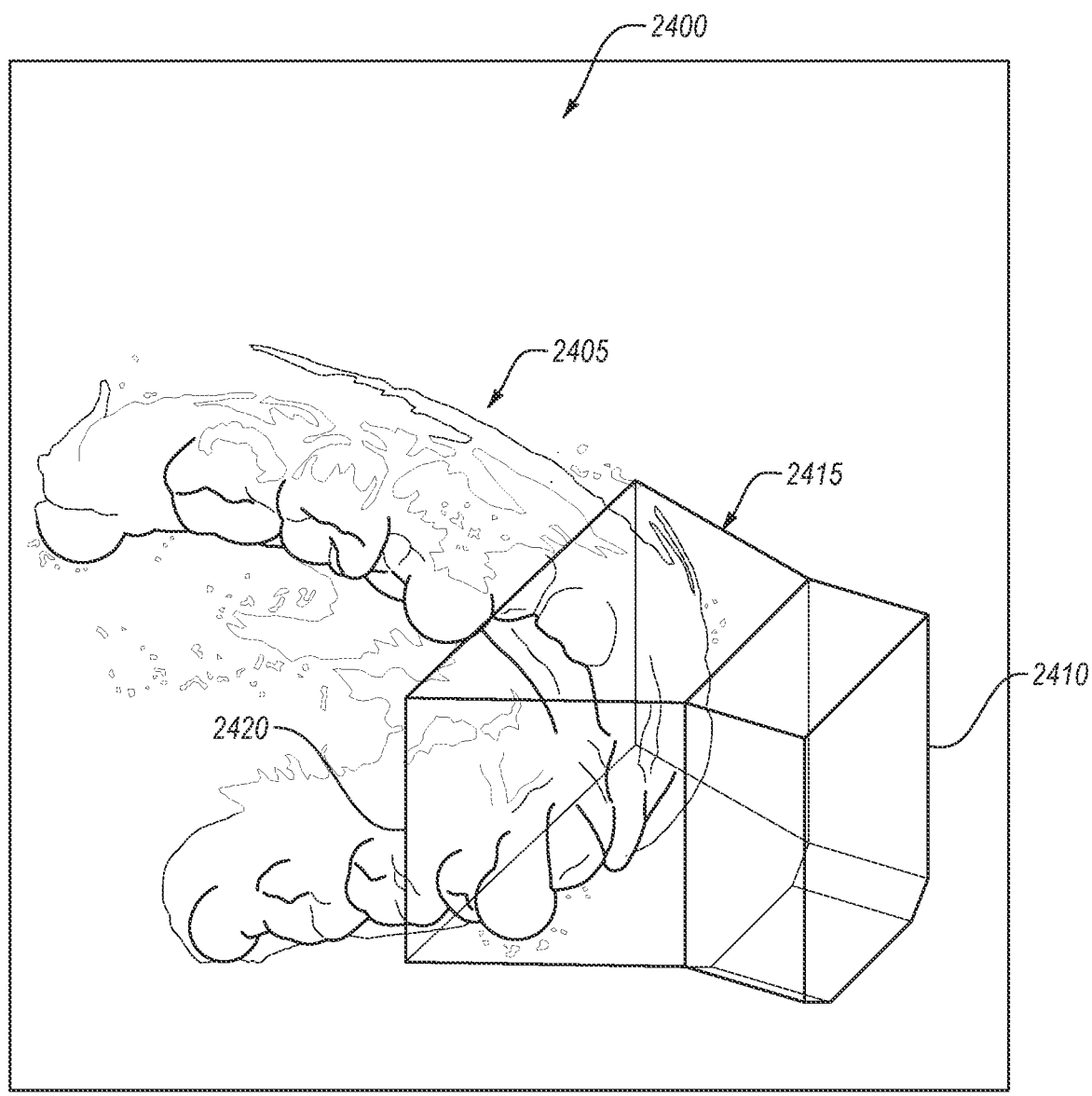
FIG. 24 illustrates a view of a 3D surface of a dental site being scanned, a position and orientation of a probe head of an intraoral scanner relative to the 3D surface, and a scan volume of the intraoral scanner, in accordance with an embodiment of the present disclosure.

FIG. 24 illustrates a view 2400 of a 3D surface 2405 of a dental site being scanned, a position and orientation of a probe head 2410 of an intraoral scanner relative to the 3D surface 2405, and a scan volume 2415 of the intraoral scanner, in accordance with an embodiment of the present disclosure. Visualization of the scan volume 2415 may enable a user to know what portion of the dental site is presently being scanned as well as where the user should move the intraoral scanner next for the intraoral scanning. Rather than showing the entire scan volume, which can potentially be confusing to a user and/or occlude a portion of the 3D surface, just the back surface 2420 of the scan volume may be shown in embodiments. Additionally, or alternatively, an intersection of the scan volume 2415 with the 3D surface 2405 may be shown.

Figure 25:
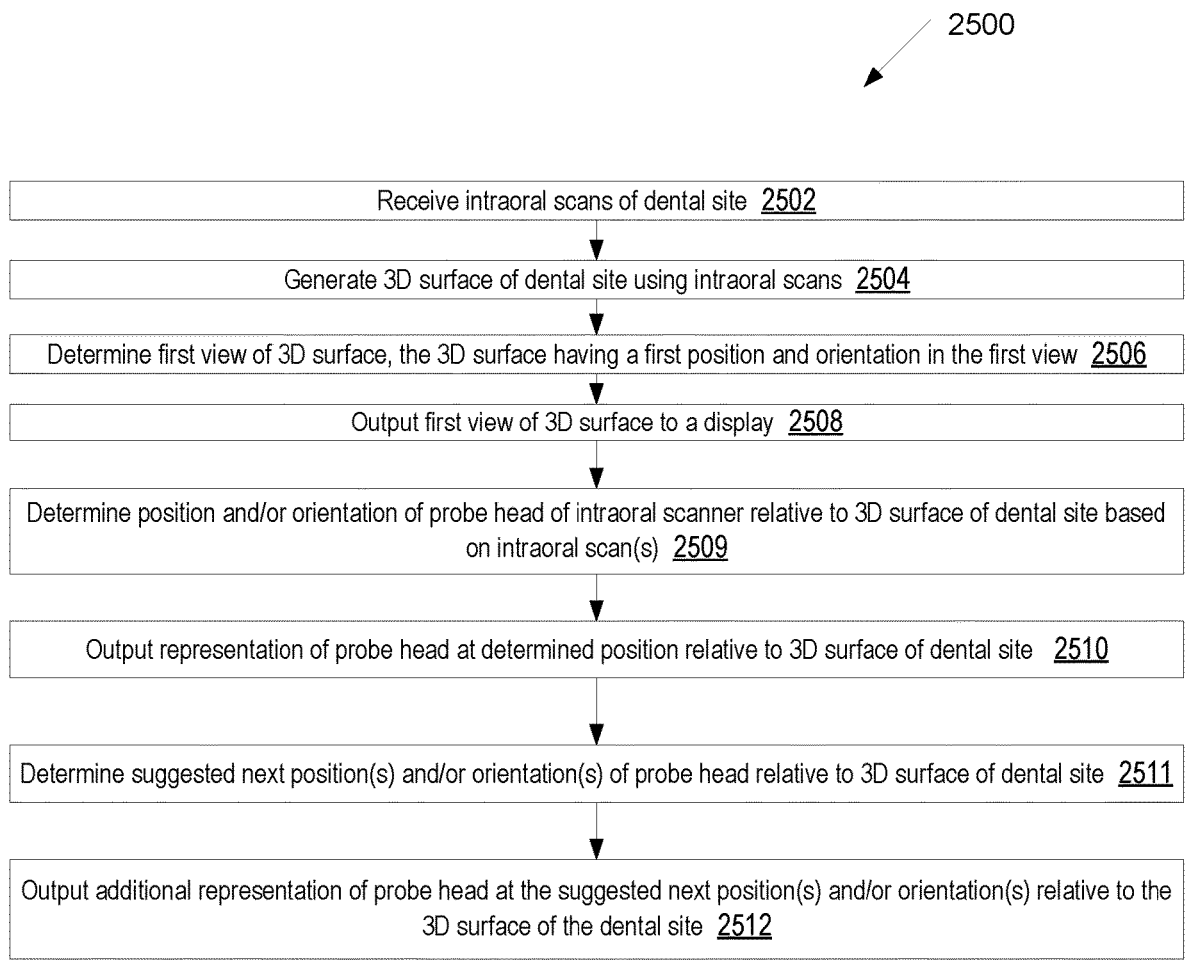
FIG. 25 is a flow chart illustrating an embodiment for a method of guiding a user of an intraoral scanner as to where to position the intraoral scanner during scanning.

FIG. 25 is a flow chart illustrating an embodiment for a method 2500 of guiding a user of an intraoral scanner as to where to position the intraoral scanner during scanning. At block 2502, processing logic receives intraoral scans of a dental site (e.g., of an upper or lower jaw). At block 2504, processing logic generates a 3D surface of the dental site using the intraoral scans. At block 2506, processing logic determines a first view of the 3D surface, the 3D surface having a first position and orientation in the first view. At block 2508, processing logic outputs the first view of the 3D surface to a display.

At block 2509, processing logic determines a position and/or orientation of a probe head of the intraoral scanner relative to the 3D surface of the dental site based on the intraoral scans (e.g., based on a most recent intraoral scan that has been successfully registered and stitched to the 3D surface). At block 2510, processing logic may output, to the display, a representation of the probe head at the determined position and/or orientation relative to the 3D surface.

At block 2511, processing logic determines a suggested next position and/or orientation of the probe head relative to the 3D surface of the dental site. In one embodiment, the suggested next position and orientation of the probe may be determined based on a difficulty to scan a particular upcoming region of the dental site that is yet to be scanned. In some embodiments, one or more previously generated 3D models of the dental site (e.g., generated during previous patient visits) may be accessible to processing logic. Processing logic may assess these one or more 3D models to determine tooth crowding and/or a tooth geometry that is particularly challenging to scan. Accordingly, processing logic may determine a suggested scanning speed, a suggested position and/or orientation of the scanner to capture difficult to scan regions, a sequence of suggested positions and/or orientations of the scanner to capture the difficult to scan regions, and so on. In one embodiment, processing logic determines a suggested trajectory for the intraoral scanner, which may include a sequence of recommended positions and orientations of the intraoral scanner.

At block 2512, processing logic outputs an additional representation of the probe head at the suggested position(s) and/or orientation(s) relative to the 3D surface of the dental site. The representation of the probe head that shows a current position and orientation of the probe head may be shown using a first visualization and the additional representation of the probe head that shows a suggested next position and orientation of the probe head may be shown using a second visualization that is different from the first visualization. The first visualization may include a first color, a first transparency level, a first line type, a first zoom level (also referred to as magnification level), etc., and the second visualization may include a second color, a second transparency level, a second line type, a second zoom level (also referred to as magnification level), etc. In one embodiment, processing logic shows the additional representation of the probe head moving according to the determined recommended trajectory for the intraoral scanner.

Figure 26:
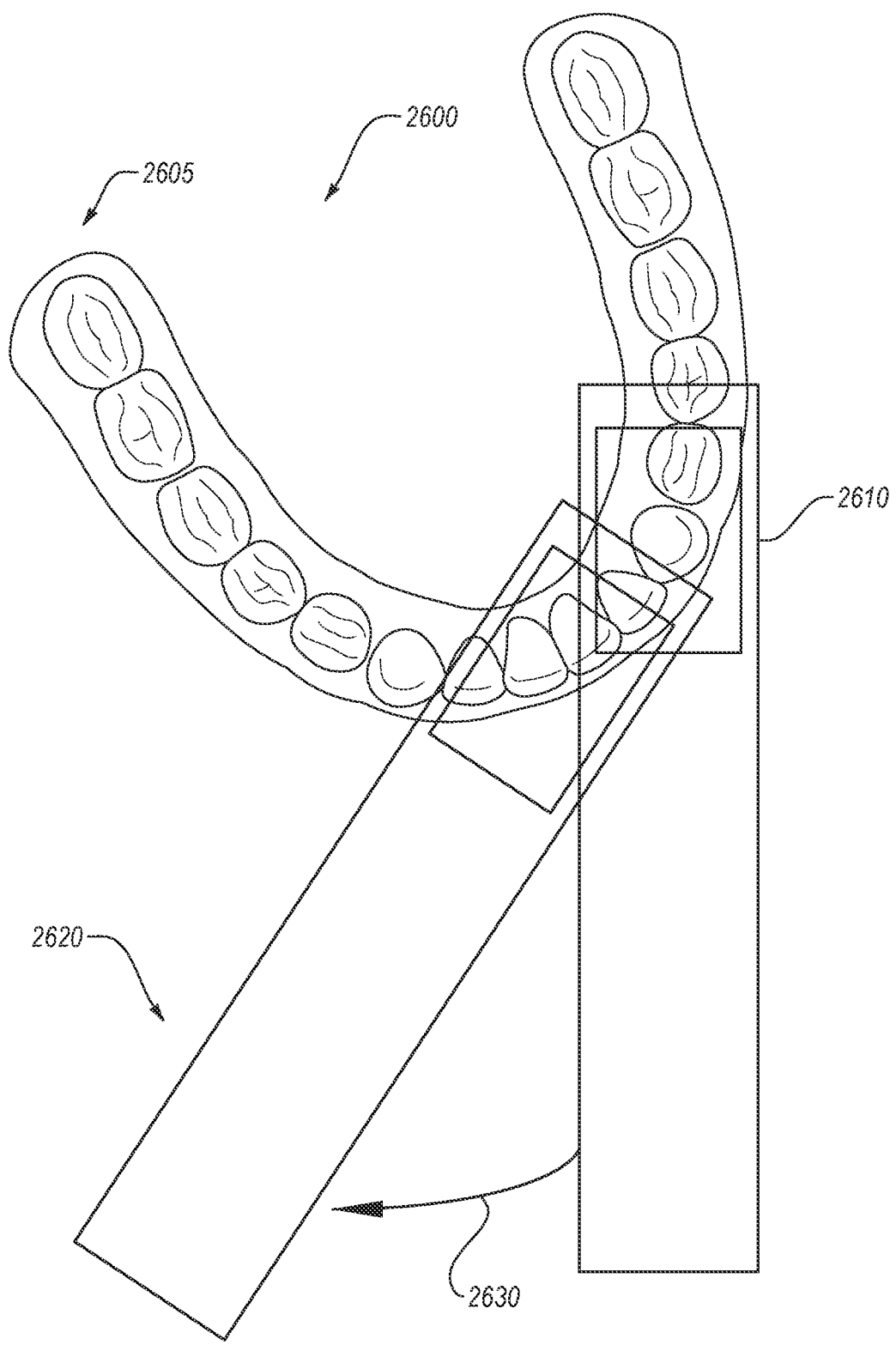
FIG. 26 illustrates a view of a 3D surface of a dental site being scanned, a position and orientation of a probe head of an intraoral scanner relative to the 3D surface, and a suggested next position and orientation of the probe head relative to the 3D surface, in accordance with an embodiment of the present disclosure.

FIG. 26 illustrates a view 2600 of a 3D surface 3605 of a dental site being scanned, a position and orientation of a probe head 2610 of an intraoral scanner relative to the 3D surface 2605, and a suggested next position and orientation of the probe head 2620 relative to the 3D surface, in accordance with an embodiment of the present disclosure. As shown, a first visualization may be used for the current position and orientation of the probe head 2610 and a second visualization may be used for the recommended position and orientation of the probe head 2620. In embodiments, the probe head 2620 is shown to move through a sequence of positions and orientations according to a recommended trajectory 2630.

Figure 27:
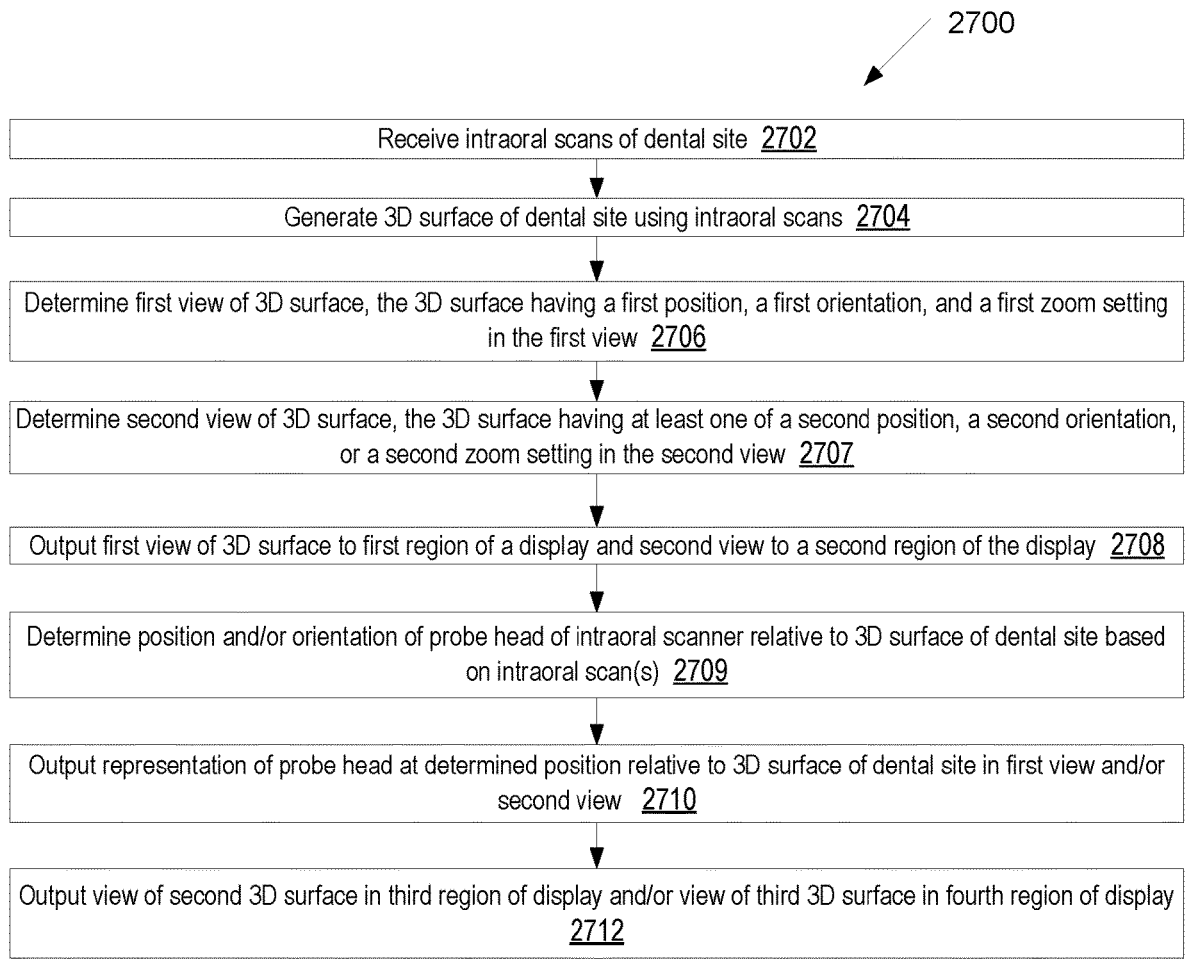
FIG. 27 is a flow chart illustrating an embodiment for a method of displaying a 3D surface of a dental site being scanned during intraoral scanning.

FIG. 27 is a flow chart illustrating an embodiment for a method 2700 of displaying a 3D surface of a dental site being scanned during intraoral scanning. At block 2702, processing logic receives intraoral scans of a dental site (e.g., of an upper or lower jaw). At block 2704, processing logic generates a 3D surface of the dental site using the intraoral scans. At block 2706, processing logic determines a first view of the 3D surface, the 3D surface having a first position, a first orientation and a first zoom setting in the first view. At block 2707, processing logic determines a second view of the 3D surface, the 3D surface having a second position, a second orientation and/or a second zoom setting in the second view. At block 2508, processing logic outputs the first view of the 3D surface to a first region of a display and outputs the second view of the 3D surface to a second region of the display.

At block 2709, processing logic determines a position and/or orientation of a probe head of the intraoral scanner relative to the 3D surface of the dental site based on the intraoral scans (e.g., based on a most recent intraoral scan that has been successfully registered and stitched to the 3D surface. At block 2710, processing logic may output, to the display, a representation of the probe head at the determined position and/or orientation relative to the 3D surface in the first view and/or the second view. In one embodiment, at block 2712 processing logic outputs a view of a second 3D surface in a third region of the display and/or a view of a third 3D surface in a fourth region of the display. For example, the first surface may be a first one of an upper dental arch, a lower dental arch, or a patient bite that includes at least a portion of an upper dental arch and a lower dental arch, the second surface may be a second one of the upper dental arch, the lower dental arch, or the patient bite, and the third surface may be a third one of the upper dental arch, the lower dental arch, or the patient bite.

Figure 28:
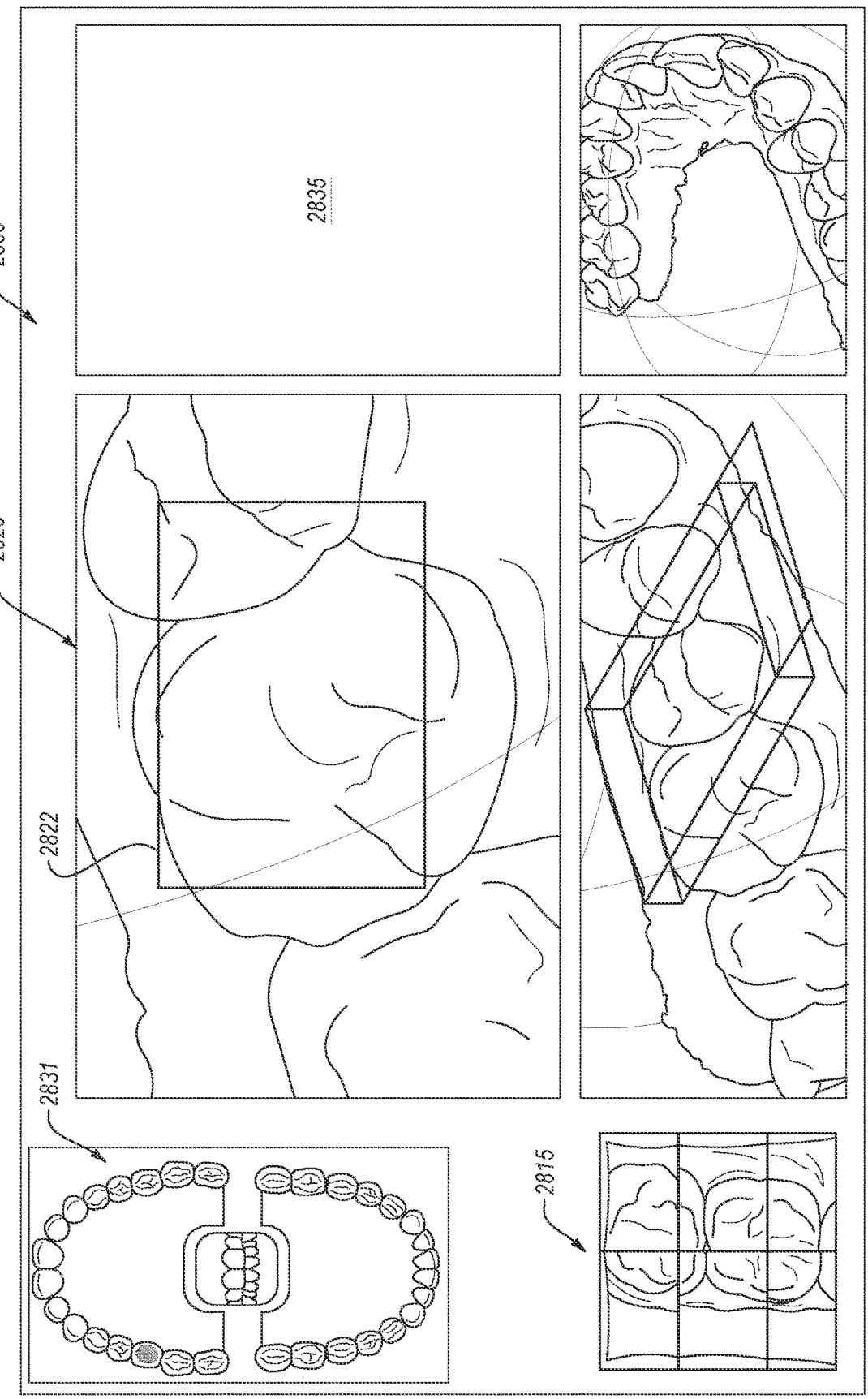
FIG. 28 illustrates a graphical user interface of an intraoral scan application that includes multiple views of a 3D surface and a combined 2D image of a current field of view of an intraoral scanner, in accordance with embodiments of the present disclosure.

FIG. 28 illustrates a graphical user interface (GUI) 2800 of an intraoral scan application that includes multiple views 2820, 2825, 2830, 2835 of a 3D surface and a combined 2D image 2815 of a current field of view of an intraoral scanner, in accordance with embodiments of the present disclosure. The multiple views of the GUI 2800 may be shown during an intraoral scanning session, and some or all of the views may be updated as additional intraoral scan data is received and stitched to the 3D surface. Alternatively, the multiple views may be shown after scanning is complete and a 3D model has been generated.

A first view 2825 may be a static view in which the 3D surface does not automatically move. A representation of a probe head 2826 of an intraoral scanner may be shown relative to the 3D surface in the first view 2825. A second view 2820 may be a zoomed-in view of a portion of the 3D surface (e.g., a zoomed-in partial jaw view), possibly associated with an area of interest or with a current field of view 2822 of the intraoral scanner. A third view 2830 may be a dynamic view in which the 3D surface position and orientation continuously updates in the view and in which an intraoral scanner (not shown in third view 2830) position and orientation remains static. For the third view 2830, a point of view from the intraoral scanner (e.g., scanner view direction) may be shown. A fourth view 2835 may show an area of interest, a different 3D surface than is shown in the first through third views, or some other information regarding a patient's oral cavity. A number of views to present and what to present in each of the views may be user selectable. Additionally, some views (e.g., fourth view 2835) may show a protocol suggested region. In an example, some views may show an upper dental arch and some views may show a lower dental arch. Additionally, some views may be of a patient bite that shows a bite relationship between the upper dental arch and the lower dental arch. Additionally, the size of the windows to use for each of the views and/or the positioning of the windows on a display may be user selectable (e.g., by dragging and dropping windows associated with views in the GUI). In an example, a full jaw view may be shown in one window, a view of a preparation tooth in its pre-treatment state may be shown in an additional window, and a view of the preparation tooth in its current or post-treatment state may be shown in still an additional window.

For any of the views, a user may select whether that view should be a dynamic view (in which the position and orientation of the 3D surface periodically or continuously updates) or a static view (in which the position and orientation of the 3D surface remains static until manually adjusted by the user). A user may also select whether views should be in color or monochrome, and whether or not the views should show near infrared (NIRI) data. A user may also select a magnification level for one or more of the views, or whether the magnification level should be updated automatically to show an entire 3D surface or 3D model (e.g., as more data becomes available). A user may also select whether or not to show a segment indicator 2831, whether or not to show information regarding a current position of the intraoral scanner in the patient's oral cavity (e.g., at upper dental arch, at lower dental arch, at lingual area, at buccal area, at left side of mouth, at right side of mouth, etc.), and so on. Additionally, a user may select what visualizations to use to show an active region of a 3D surface and a remainder of the 3D surface. A user may additionally select whether to show a capture volume of the intraoral scanner, a back surface of the capture volume and/or an intersection of the capture volume and the 3D surface in one or more views. A user may additionally select what visualizations to use to depict an intraoral scanner and/or whether to show a representation of the intraoral scanner relative to the 3D surface. A user may additionally select whether or not to show recommended next positions and orientations of the intraoral scanner relative to the 3D surface and/or what visualizations to use to show the recommended next positions and orientations in one or more views.

In some embodiments, a doctor may select to output one or more views to a second display viewable to a patient. This may enable a patient to view the intraoral scanning as it is performed and to view a 3D model of the patient's dental arches after scanning is complete. The intraoral scan application may generate one or more animation or visualization that interacts with the 3D surface and/or 3D model, and may output the animation to the second display. This may entertain and/or distract the user during the intraoral scanning process. For example, visualizations may be shown of fish swimming about the 3D surface, of the 3D surface on fire, and so on.

Figure 29:
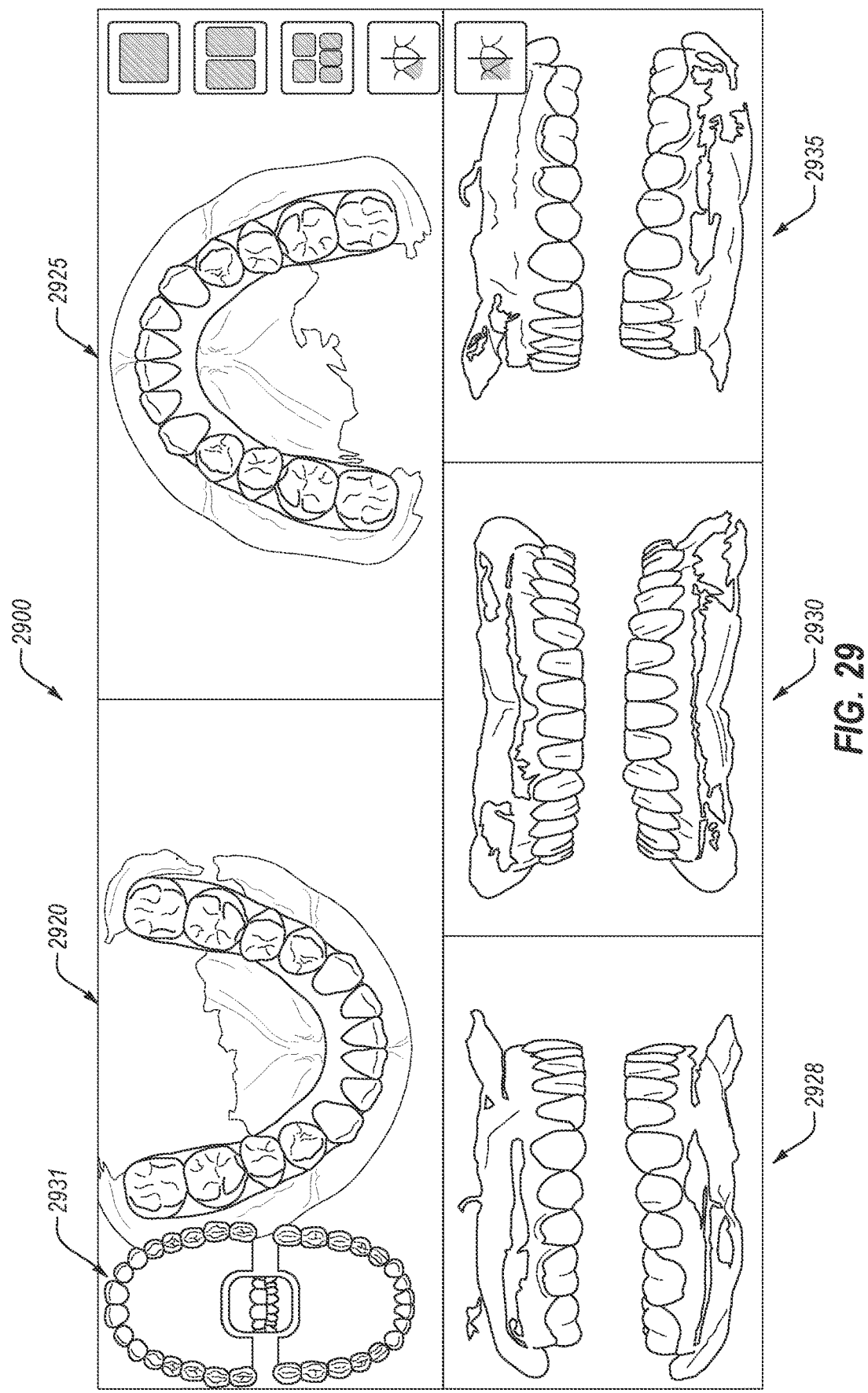
FIG. 29 illustrates a graphical user interface of an intraoral scan application that includes multiple views of an upper jaw and of a lower jaw, in accordance with embodiments of the present disclosure.

FIG. 29 illustrates a graphical user interface (GUI) 2900 of an intraoral scan application that includes multiple views 2920, 2925, 2928, 2930, 2935 of an upper jaw and of a lower jaw, in accordance with embodiments of the present disclosure. The GUI 2900 may show various views of one or more 3D model after scanning is complete and the 3D models have been generated. Alternatively, the GUI 2900 may show a 3D surface during an intraoral scanning session. A first view 2920 and a second view 2925 of the lower jaw are shown having different orientations. A third view 2928 of a upper and lower dental arch (e.g., of a patient bite), a fourth view 2930 of the upper and lower dental arch, and a fifth view 2935 of the upper and lower dental arch, each from a different perspective, are also shown. Also shown is a segment indicator 2931.

FIGS. 31-33B are flow charts illustrating various methods related to generating a viewing trajectory for a 3D surface and displaying the 3D surface in a graphical user interface of an intraoral scan application according to the viewing trajectory. The methods may be performed by a processing logic that may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by a computing device of a scanning system and/or by a server computing device (e.g., by computing device 105 of FIG. 1 or computing device 4000 of FIG. 40).

Figure 31:
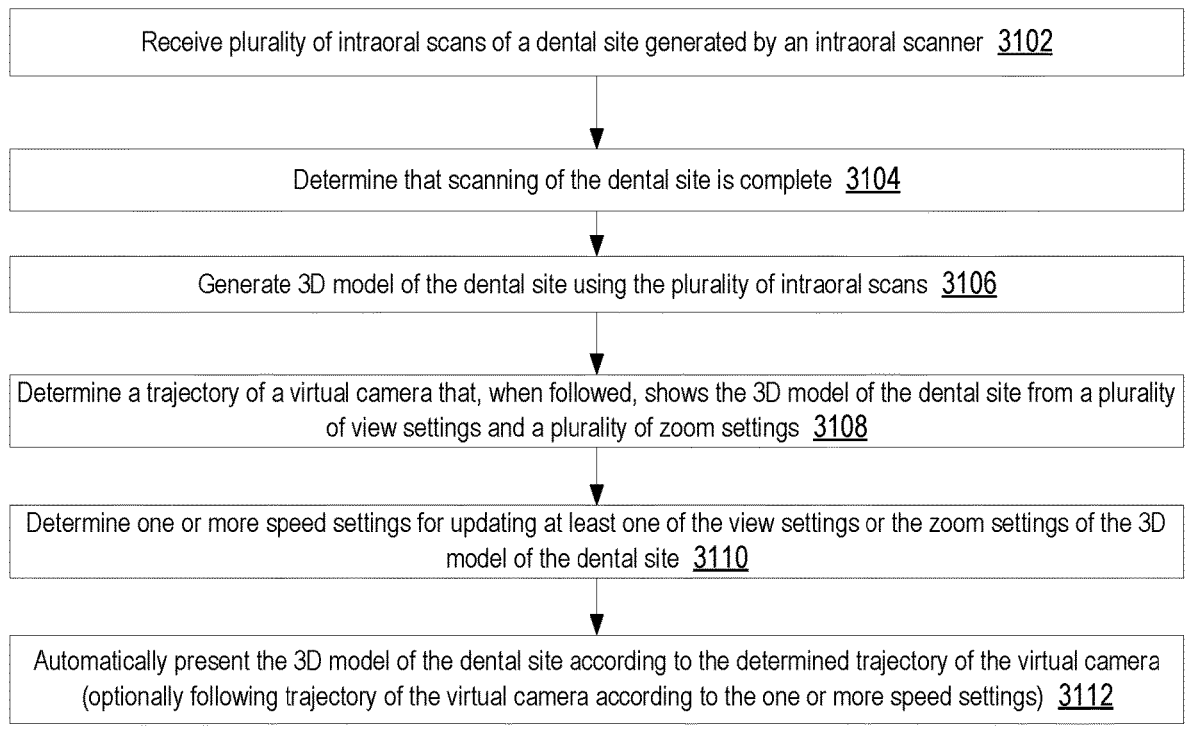
FIG. 31 is a flow chart illustrating an embodiment for a method of determining a trajectory for displaying a 3D model of a dental site.

FIG. 31 is a flow chart illustrating an embodiment for a method 3100 of determining a trajectory for displaying a 3D model of a dental site. Generally after a doctor completes an intraoral scan and a virtual 3D model has been generated, the doctor manually moves the model in 3D to determine whether the model is adequate. In embodiments, processing logic determines and generates a rotation and/or motion path and/or a zoom sequence as the doctor would have done after scanning, and after completion of a preparation. This may then be played back to the doctor automatically. The system may learn expected moves, zooms, rotations, etc., and create a trajectory. The system may possibly additionally or alternatively show multiple views on the screen at once with or without motion. If problem areas have been identified, then the system may generate arrows or other identifiers pointing to and/or emphasizing those problem areas (e.g., like unclear margin line or voids). For visualization of voids, processing logic may show just the edge of the void, or may show a flashing or flickering region associated with the void, for example. The automatically generated trajectory may additionally or alternatively zoom in on the identified problem areas.

At block 3102 of method 3100, processing logic receives a plurality of intraoral scans of a dental site, where the plurality of intraoral scans were generated by an intraoral scanner. The dental site may be a full dental arch (e.g., upper or lower dental arch) or a portion of a dental arch (e.g., a preparation tooth, or a preparation tooth plus adjacent teeth). At block 3104, processing logic may determine that scanning of the dental site is complete. Processing logic may determine that scanning is complete based on inputting the 3D surface into a trained machine learning model that outputs an indication as to whether the 3D surface is complete. The machine learning model may have been trained using a training dataset that includes labeled complete and incomplete 3D surfaces. Processing logic may additionally determine other triggers for generating a 3D model of a dental site. In one embodiment, a break in time between received intraoral scans (e.g., a time period of greater than a threshold time in which no new intraoral scan has been received) may trigger generation of a 3D model. In one embodiment, a 3D model is generated responsive to user input directing processing logic to generate a 3D model. In one embodiment, a 3D model is automatically generated when the intraoral scanner is motionless for a threshold amount of time (e.g., based on data from an IMU of the intraoral scanner). In one embodiment, a 3D model is automatically generated when the intraoral scanner is withdrawn from a patient's oral cavity. Withdrawal of the of the intraoral scanner from the patient's oral cavity may be determined using image processing and/or application of machine learning. For example, 2D images generated by the intraoral scanner may be input into a trained machine learning model that has been trained to determine whether or not 2D images are intraoral images. Other triggers may also cause processing logic to automatically generate a 3D model of the dental site. At block 3106, processing logic may generate a 3D model of the dental site using the plurality of intraoral scans.

At block 3108, processing logic determines a trajectory of a virtual camera that, when followed, shows the 3D model of the dental site from a plurality of view settings and/or a plurality of zoom settings. This may include determining a sequence of views of the 3D model and transitions between the views. The trajectory may include rotating the 3D model, panning the 3D model, zooming in or out on certain areas of the 3D model (e.g., for identified AOIs), and so on. The trajectory may automatically be determined based on historical reviews of 3D models of dental arches by the doctor. In one embodiment, the 3D model is input into a trained ML model that has been trained to generate a review trajectory for a 3D model based on an input of the model. In one embodiment, a machine learning model is trained on the training dataset to receive a 3D model and to output a trajectory for the 3D model. In another embodiment, processing logic includes a set of rules that are applied to automatically generate a trajectory. For example, a trajectory may be generated based on whether an upper or lower dental arch is depicted, whether or not there are any preparation teeth on the dental arch, the locations of the preparation teeth, whether any malocclusions have been detected on the dental arch, the locations and/or types of the malocclusions, whether attachments have been identified, whether brackets have been identified, and so on.

At block 3110, processing logic determines one or more speed settings for updating at least one of the view settings or the zoom settings of the 3D model of the dental site. The speed settings may control how fast processing logic cycles through the views of the trajectory. For example, processing logic may determine that each view associated with an AOI should be shown for a longer period (e.g., 1-3 seconds) and may determine that each view not associated with an AOI should be shown for a shorter period (e.g., 0.2-0.4 seconds).

At block 3112, processing logic automatically presents the 3D model of the dental site according to the automatically determined trajectory of the virtual camera. Processing logic may follow the trajectory of the virtual camera according to the one or more speed settings in embodiments. At any time during the display of the 3D models, the doctor may instruct processing logic to pause the trajectory, rewind the trajectory, speed up the trajectory, slow down the trajectory, and so on. The doctor may also cancel the automatically determined review trajectory and manually manipulate a view of the first and/or second 3D models at any time.

Figure 32A:
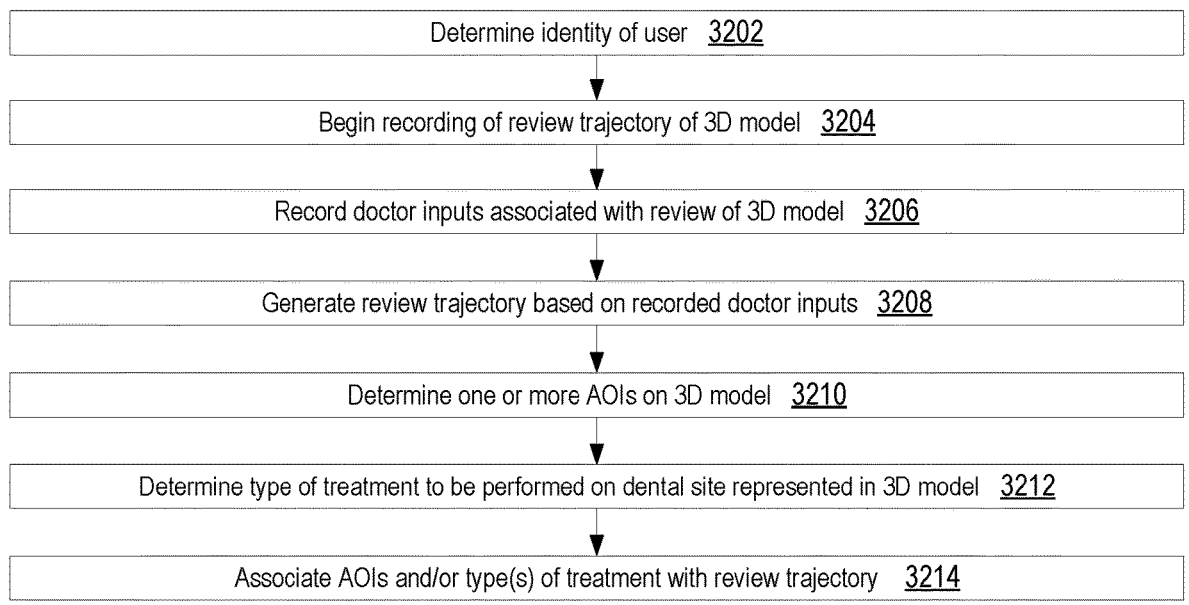
FIG. 32A is a flow chart illustrating an embodiment for a method of recording a review trajectory to be applied to 3D models.

FIG. 32A is a flow chart illustrating an embodiment for a method 3200 of recording a review trajectory to be applied to 3D models. In one embodiment, at block 3202 of method 3200 processing logic determines an identity of a user (e.g., of a doctor). The user identity may be determined based on user input and/or based on biometric information. At block 3204, processing logic begins recording a review trajectory of a virtual camera during review of a 3D model. The doctor may then manually perform one or more zoom, rotation, pan, etc. operations, each of which may be recorded. Processing logic may additionally record the spacing in time between operations to determine how long to display a particular view of the 3D model. Processing logic may record a trajectory of a virtual camera based on one or more zoom operations, panning operations, pause operations, play operations, rotation operations, and so on performed by a user for the 3D model. Based on the recorded viewing information, processing logic may determine each of the views of the 3D model that the doctor manually cycled through. For example, processing logic may determine that a doctor zoomed in on 3D surfaces of preparation teeth, that they rotated around the dental arch about a vertical axis, and so on.

At block 3210, processing logic may determine one or more AOIs on one or more regions of the 3D model. The AOIs may include, for example, preparation teeth, caries, malocclusions, voids, scan bodies, tooth wear, tooth cracks, and so on. In one embodiment, the AOIs are automatically determined using the techniques set forth hereinabove. In one embodiment, the AOIs are manually input by a user. At block 3212, processing logic may determine a type of treatment to be performed on the dental site represented in the 3D model. Type of treatment may include orthodontic treatment and prosthodontic treatment (e.g., for a crown, bridge, dentures, cap, etc.). At block 3214, processing logic may associate the AOIs and/or types of treatment with the review trajectory and/or the 3D surface.

FIG. 32B is a flow chart illustrating an embodiment for a method 3220 of training a machine learning model to automatically generate a review trajectory for reviewing a 3D model. At block 3222, processing logic generates a training dataset from 3D surfaces having labels of reviewing trajectories for reviewing the 3D surfaces. The reviewing trajectories may have been recorded for the 3D surfaces and for one user or many different users according to method 3200 in embodiments. In some embodiments, at least some of the training data items include additional information identifying treatments to be performed and/or already performed on one or more teeth represented in the 3D models. In some embodiments, at least some of the training data items include additional information identifying areas of interest (e.g., preparation tooth, margin line, void, etc.) on the 3D model. The additional information may indicate which tooth or teeth are to be treated, a location of an AOI, etc., and may include pixel-level or patch-level labels of those teeth to be treated and/or AOIs. In one embodiment, the additional information includes coordinates for each region associated with a tooth to be treated and/or an AOI. The coordinates may include, for example, coordinates of a center of the volume of a tooth to be treated and/or AOI and/or a size of the volume (e.g., as a distance from the center). The training dataset may include data items with different trajectories associated with different types of treatments, different doctors, different AOIs, and so on. For example, the training dataset may include treatments with one preparation tooth, with multiple preparation teeth, with preparation teeth in different tooth numbers, with no preparation teeth, with different types of malocclusion, and so on.

At block 3224, processing logic trains a machine learning model (e.g., a deep neural network) to automatically generate a trajectory for viewing a 3D surface based on the training dataset. This may be performed by inputting data items (e.g., 3D models, projections of 3D models, associated 2D images, AOI information and/or treatment information) from the training dataset into a machine learning model, outputting an estimated viewing trajectory by the machine learning model, comparing the estimated viewing trajectory to an actual viewing trajectory that was used for the 3D model, and updating weights of one or more nodes in the machine learning model. This process may be repeated until the machine learning model produces acceptable results, as described in greater detail above.

In embodiments, different machine learning models may be trained for different doctors. For example, a first doctor may have different viewing habits than a second doctor. Accordingly, machine learning models may be customized to generate review trajectories that are tailored for a particular doctor.

FIG. 32C is a flow chart illustrating an embodiment for a method 3230 of determining a review trajectory for a 3D model. At block 3232, processing logic may determine an identity of a user (e.g., of a doctor). At block 3234, processing logic may determine a treatment to be performed on at least one tooth of a dental site associated with a 3D model to be reviewed. Treatment information may have been input into a prescription for a patient, which may be accessed to determine the treatment information. At block 3236, processing logic may determine one or more properties of the dental site. Properties may include a size of the dental site, types and/or locations of AOIs on the 3D model of the dental site, and so on. At block 3238, processing logic may determine one or more viewing preferences of the user (e.g., based on past recorded viewing sessions of 3D models by that user). Alternatively, or additionally, processing logic may select a trained machine learning model associated with the user.

At block 3240, processing logic determines a trajectory for reviewing the 3D model based at least in part on the user identity, the viewing preferences, the determined treatment to be performed on one or more teeth of the dental site and/or the properties of the dental site (e.g., AOIs). In one embodiment, the 3D model and some or all of the additional information (e.g., user identity, treatment, properties of dental site, AOI, etc.) are input into a trained machine learning model, which may output a review trajectory for the 3D model.

In one embodiment, a library of review trajectories exists, where each review trajectory may have one or more associated labels identifying a user, viewing preferences, treatment to be performed, location of treatment to be performed, properties of dental site, AOIs, and so on. In one embodiment, processing logic may compare patient case details (e.g., existence of preparation tooth, location or preparation tooth, upper or lower jaw, etc.) of a current 3D model to patient case details associated with multiple stored virtual camera trajectories. Processing logic may then automatically select the virtual camera trajectory associated with patient case details that most closely match current patient case details. Processing logic may perform a lookup on the library of review trajectories to find a review trajectory that satisfies the determined information (e.g., user identity, viewing preferences, treatment, properties of dental site, etc.), for example. If an exact match is found, then the review trajectory associated with the exact match may be selected. If partial matches are found, then a closest match may be selected. In one embodiment, a user is presented with an option to select from multiple different review trajectory options. The user may then select a desired review trajectory at block 2324 from the presented options. The presented options may be past review trajectories recorded for the particular user, review trajectories of 3D models with similar treatments and/or AOIs, and/or combinations thereof in embodiments.

FIG. 32D is a flow chart illustrating an embodiment for a method 3250 of determining a trajectory for displaying a 3D model of a dental site using a trained machine learning model. At block 3252 of method 3250, processing logic inputs data for a 3D model into a trained machine learning model. In one embodiment, a 3D model of a dental arch is input into the trained machine learning model. In one embodiment, a 3D model of a dental arch and an additional 3D model of a preparation tooth on the dental arch are input into the trained machine learning model. At block 3254, the machine learning model outputs a viewing trajectory for review of the 3D model. The viewing trajectory may be a trajectory of a virtual camera moving about the 3D surface, and may include vectors of motions in up to six degrees of freedom and/or a trajectory loop length.

Figure 33A:
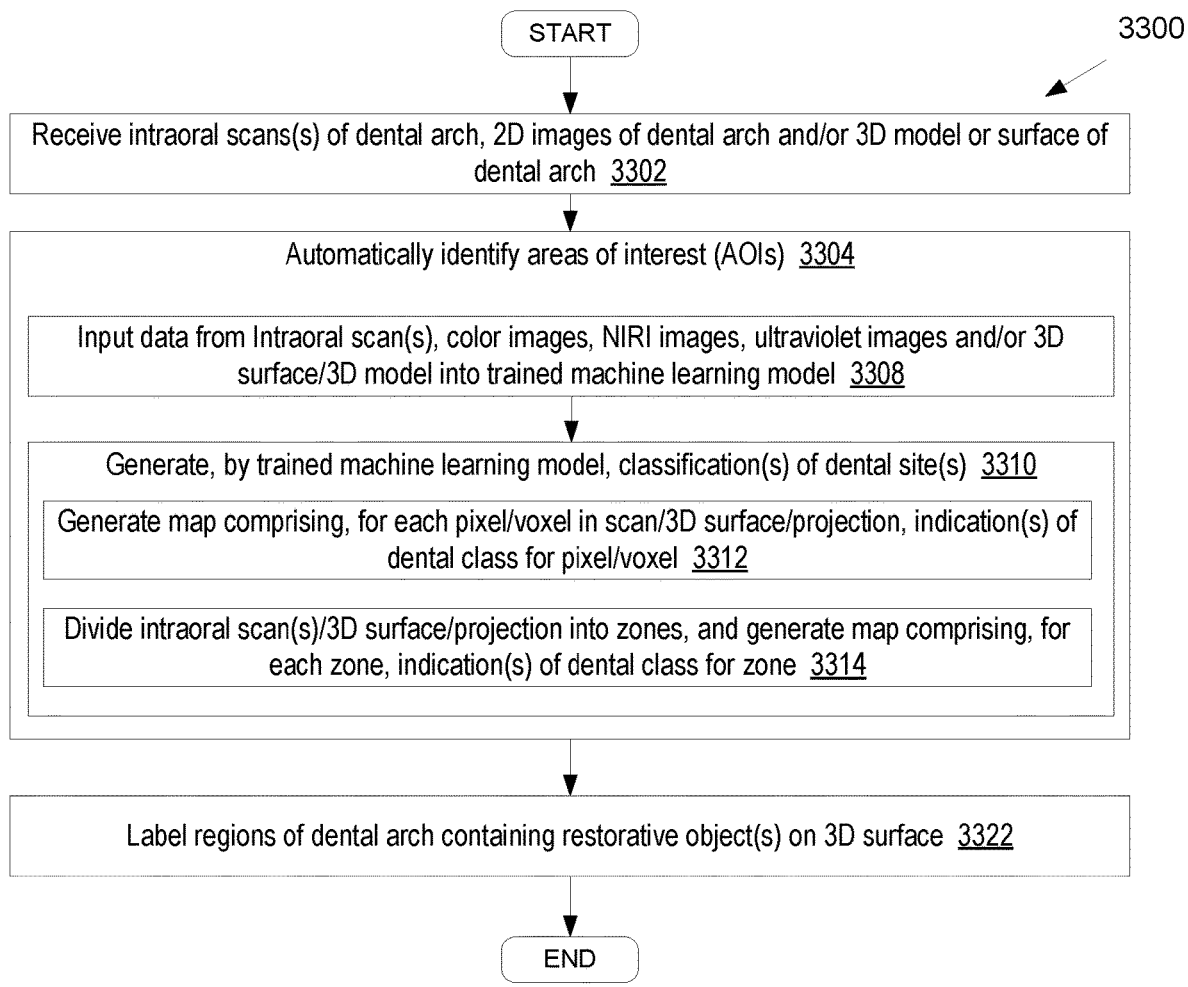
FIG. 33A is a flow chart illustrating an embodiment for a method of automatically identifying intraoral areas of interest.

FIG. 33A is a flow chart illustrating an embodiment for a method 3300 of automatically identifying intraoral areas of interest (e.g., using machine learning). At block 3302, processing logic receives intraoral scans of a dental arch, 2D images of the dental arch and/or a 3D surface or 3D model of the dental arch. At block 3304, processing logic automatically determines classifications of dental sites in the intraoral scans, in the images, and/or in 3D surfaces/3D models formed by stitching together the intraoral scans. Classification of dental sites may be performed on an image/scan-level basis, on a point/voxel/pixel-level basis, or on an intermediate basis (e.g., for patches or zones containing 9 pixels or some other number of pixels). In one embodiment, processing logic classifies scans/images/surfaces/models as containing an AOI or as not containing an AOL. Additionally, or alternatively, processing logic may classify scans/images/surfaces/models as containing specific types of AOIs (e.g., such as preparation teeth, voids, areas with scan quality metric values that fail to satisfy scan quality criteria, areas with an insufficient amount of scanned gingiva around teeth, and so on). Such a classification or classifications may be made using a trained ML model or a rule-based approach. For example, processing logic may determine whether an input includes a representation of an AOI based on processing of the 3D model data using a machine learning model that has been trained to identify AOIs. Alternatively, one or more rule-based algorithms may be used to process the 3D model, and may determine that the 3D model depicts an AOI based on one or more region of the 3D model satisfying criteria of the one or more rule-based algorithms. For example, preparation teeth and scan bodies may have a shape that does not naturally occur in the mouth. A shape of a dental site represented in the intraoral scan data and/or 3D surface data may be analyzed using the rule-based algorithm to determine that it meets the criteria for a preparation tooth or scan body.

One of more AOIs may be associated with detected dental objects or dental classes, such as a preparation, a margin line, a malocclusion, a restorative object, and so on. One or more AOIs may be associated with scanning quality, such as scan speed, scan angle, scanner dirtiness, scan distance, and so on. For example, AOIs may be identified for regions of a 3D model associated with scanning quality metric values that fail to satisfy one or more scanning quality criteria.

Processing logic may determine scan quality metric values and/or scores for each of the regions of the 3D surface/3D model. The values and/or scores may be determined based on the 3D surface regions themselves and/or on information about intraoral scans used to generate the regions of the 3D surface. The values and/or scores may include, for example, a scan speed score and/or value, a scan distance score and/or value, a moving tissue score and/or value, a scanner cleanliness score and/or value, a blood/saliva score and/or value, a data density score and/or value, and so on. In one embodiment, scores are determined based on aggregated scan quality metric values of multiple intraoral scans used to generate regions of the 3D surface/3D model. For example, a particular region of the 3D surface may have been generated using 40 intraoral scans. Processing logic may determine a percentage of the 40 intraoral scans that had scan quality metric values that failed to satisfy one or more criteria. If the determined percentage of intraoral scans associated with a region of the 3D surface having scan quality metric values that failed to satisfy one or more scan quality criteria exceeds a threshold, then the region of the 3D surface may be flagged or identified for attention by the doctor. In one embodiment, processing logic makes separate determinations for each scan quality metric for a region. If a determined percentage of intraoral scans associated with a region of the 3D surface having a value for a scan quality metric that failed to satisfy one or more scan quality criteria exceeds a threshold, then the region of the 3D surface may be flagged or identified as an AOI for failing a particular scan quality criteria associated with that scan quality metric. For example, if a threshold percentage of intraoral scans associated with a region had a scan speed that exceeded a scan speed threshold, then the region of the 3D surface may be flagged as an AOI based on an excessive scan speed. Similarly, if a threshold percentage of intraoral scans associated with a region had a scan distance that exceeded a scan distance threshold, then the region of the 3D surface may be flagged as an AOI based on an excessive scan distance. Processing logic may determine whether any regions have scores and/or values that fail to satisfy one or more criteria (e.g., that exceed a threshold (for values meant to be below the threshold), that are below a threshold (for values meant to exceed the threshold), and so on). Regions that fail to satisfy one or more criteria may be identified as AOIs.

In one embodiment, processing logic performs pixel-level classification or patch-level classification of dental sites to identify pixels or patches (e.g., groups of pixels) depicting AOIs and to identify pixels or patches not depicting AOIs. In one embodiment, processing logic performs pixel-level or patch-level classification (also referred to as zone-level classification) of dental sites to identify pixels or patches/zones depicting AOIs and to identify pixels or patches/cones not depicting AOIs.

At block 3308, processing logic may input data from the intraoral scans (e.g., height maps or point clouds), color images associated with the intraoral scans, 3D surfaces and/or 3D models into a trained ML model. Additionally, or alternatively, processing logic may input one or more projections of the 3D surface or 3D model into a trained ML model, optionally with one or more color images.

At block 3310, the trained ML model(s) may output one or more dental classification based on processing of the input data (e.g., intraoral scan(s), projections, images, 3D surface, 3D model, etc.). The output dental classification(s) may include any of the dental classifications discussed herein above, for example, such as absence or presence of AOIs and/or types of AOIs. In one embodiment, at block 3312 processing logic (e.g., the ML model) generates a map comprising, for each pixel, voxel or point in the intraoral scan, the 3D surface, the 3D model or the projection of the 3D surface or 3D model that was input into the ML model, one or more indications of a dental class for the pixel. In one embodiment, the map includes for each pixel, voxel or point a value indicating a most likely dental class for that pixel/voxel/point. The map may also include, for each pixel/voxel/point, a confidence value indicating a confidence that the determined dental class for that pixel/voxel/point is correct. In one embodiment, the map is a probability map that includes, for each pixel, voxel or point a separate probability value for each of the types of dental classes (e.g., AOI or not AOI).

In one embodiment, at block 3314 processing logic (e.g., the ML model) divides the intraoral scan(s), 3D surface and/or projection(s) of a 3D surface into zones or patches. Processing logic (e.g., the ML model) may then generate a map comprising, for each zone or patch, an indication of a dental class for that zone or patch. This technique essentially reduces a resolution of the input data, which reduces a computational load associated with processing the input data to perform dental classification and/or segmentation.

At block 3322, processing logic may label regions of the dental arch on the 3D surface or 3D model based on the determined dental classifications (e.g., based on whether an AOI has been identified for the region and/or based on a type and/or severity of AOI that has been identified for the region). If dental classifications were determined for intraoral scans or projections of a 3D surface/model onto a plane, then registration information of the intraoral scans or projections to the 3D surface/model may be used to determine points on the 3D surface/model that correspond to pixels in the intraoral scans or projections. These points on the 3D surface/model may then be assigned dental classes (e.g., AOI classifications) according to the dental classes of the corresponding pixels in the intraoral scans or projections.

Different intraoral scans and/or projections of 3D surfaces may have pixels that correspond to the same point on the 3D surface. In some instances these multiple pixels may have different determined dental classes and/or different dental class probabilities. In such instances, processing logic may use a voting function to determine a dental class for each point. For example, each set of probability values from an intraoral scan may indicate a particular dental class. Processing logic may determine the number of votes for each dental class for a point, and may then classify the point as having a dental class that receives the most votes.

Generally the majority vote of the highest probability value of a dental class represents the dental class for that point. However, further processing may be performed in some instances to select a dental class for a point even if that dental class was not a highest probability dental class for that point. For example, one or more cost functions may be applied to select a dental class other than a highest probability dental class for a point. In a further example, processing logic may compute one or more quality scores for a particular dental object, such as a restorative object, a tooth, and so on. Each quality score may be based on a cost value for the dental object (or a segment of the dental object) as computed using a cost function, and the dental object quality scores may be compared to a quality threshold to determine which dental class to assign to a point.

In one embodiment, processing logic generates a matrix that identifies, for each point (e.g., edge, vertex, voxel, etc. on a 3D surface), a probability that the point belongs to an AOI class or a not AOI class. For example, entries in the matrix that have no chance of representing an AOI may have an assigned 0% probability. Processing logic may also generate a matrix that identifies, for each point (e.g., edge, vertex, voxel, etc. on a 3D surface), a probability that the point belongs to a margin line, a void, and so on.

Processing logic may use the cost function to create a closest contour going through points with high probabilities of representing the AOI or other dental class. In one embodiment, a total cost of the contour that is drawn for the AOI or other dental class is the sum of all edges (e.g., vertexes) included in the restorative object or other dental class, adjusted by weights associated with each of the vertexes. Each weight for a vertex may be a function of the probability assigned to that vertex. The cost for that vertex being included in the AOI or other dental class may be approximately $1/(A+P)$, where A is a small constant and P is the probability of the vertex representing the restorative object or other dental class. The smaller the probability for a vertex, the larger the cost of that vertex being included in a region classified as the AOI (or other dental class if being computed to determine a contour of another dental class). Costs may also be computed for segments of the AOI based on a sum of the costs of the vertexes included those segments. When probability is close to 100%, then cost is approximately 1 adjusted by length.

In one embodiment, a path finding operation or algorithm is applied to the 3D model using values from the matrix as a cost basis. Any pathfinding algorithm may be used. Some examples of possible path finding algorithms to use include dynamic programming, Dijkstra's algorithm, A* search algorithm, an incremental heuristic search algorithm, and so on. A pathfinding algorithm may apply a cost function to determine a path of the restorative object.

A pathfinding algorithm that uses probability of representing the AOI in the matrix as a cost basis may search for a path with a maximal cost or a path with a minimal cost. The cost function described above searches for minimum cost using a function that is based on an inverse of probability. Alternatively, a cost function may be used that is based directly on probability, where the maximum cost is searched for. If a pathfinding algorithm is run to maximize cost, then a path between vertexes will be determined that results in a maximum aggregate of probability values. The probability scores of the vertexes may be input into the pathfinding algorithm to find the path that has the maximal cost for the probability score. The path finding algorithm may be used to define a contour that represents the AOI (or other dental object having another dental class).

Figure 33B:
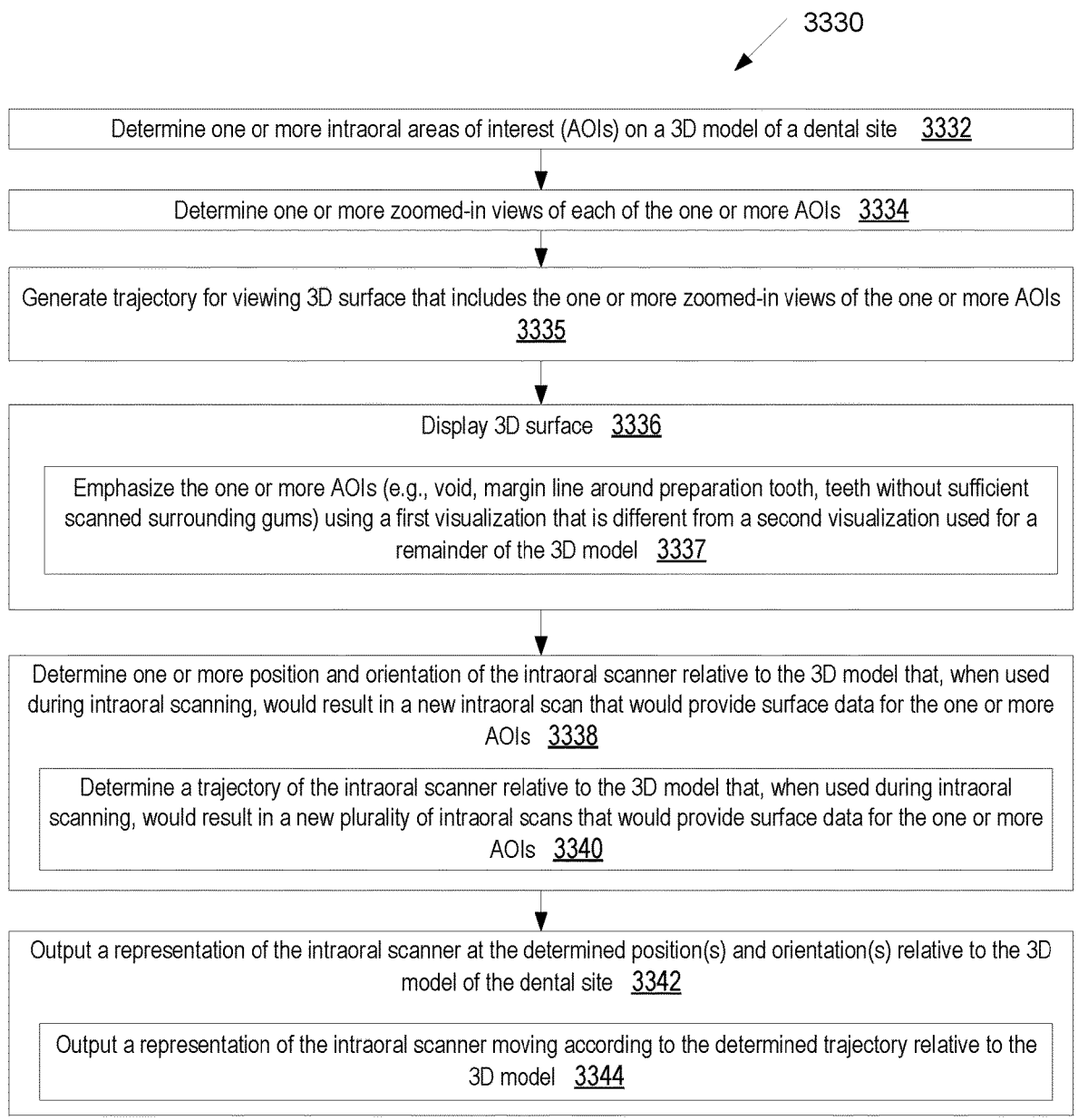
FIG. 33B is a flow chart illustrating an embodiment for a method of determining a trajectory for displaying a 3D model of a dental site based at least in part on detected areas of interest.

FIG. 33B is a flow chart illustrating an embodiment for a method 3330 of determining a trajectory for displaying a 3D model of a dental site based at least in part on detected areas of interest. At block 3332 of method 3330, processing logic determines one or more AOIs on a 3D model of a dental site. In one embodiment, the AOIs are determined according to method 3300. Examples of AOIs include a void, a margin line around a preparation tooth, a preparation tooth, one or more teeth with an insufficient amount of scanned gingiva surrounding the teeth, flawed scan data, blurry region, and so on). AOIs may also be identified for areas that are associated with one or more scanning quality metric values that fail to satisfy scanning quality criteria (e.g., that are outside of established thresholds). For example, AOIs may be identified for areas associated with a scan speed that is too high, a scan distance that is too high, a scan angle that is too high or too low, and so on. At block 3334, processing logic may determine one or more zoomed-in views of each of the one or more AOIs. Alternatively, processing logic may determine zoomed-in views for only particular types of AOIs (e.g., for areas associated with low scan quality, or for areas of clinical importance such as preparation teeth and/or margin lines). At block 335, processing logic may generate a trajectory for viewing the 3D surface that includes the one or more zoomed in views of the one or more AOIs.

At block 3336, processing logic displays the 3D surface on a display (e.g., via a GUI of an intraoral scan application). In one embodiment, processing logic displays the 3D surface according to a determined viewing trajectory. At block 3337, processing logic may emphasize the one or more AOIs using a first visualization that is different from a second visualization used for a remainder of the 3D model. For example AOIs may be highlighted, displayed using a different color than a remainder of the 3D model, displayed using a different transparency level than a remainder of the 3D model, and so on.

Some AOIs are associated with regions of a 3D model that would benefit from rescanning. For example, AOIs may be associated with scanning quality metric values that are below a threshold, or with voids that should be filled. In one embodiment, an AOI comprises one or more teeth in the 3D model of the dental site having an amount of scanned gums around the one or more teeth that is below a threshold. The AOI may correspond to the teeth themselves and/or to the gum region around the teeth that needs to be scanned. It can be beneficial to call a doctor's attention to such areas during his or her review of the 3D model. Additionally, some AOIs may be associated with regions of clinical importance, for which a high accuracy is particularly important. Examples of such areas of interest are those that depict a preparation tooth and/or a margin line around a preparation tooth. It can be beneficial to provide a longer viewing time, a magnified view, a larger number of views, and so on of such areas of interest. At block 3338, processing logic determines one or more position and orientation of the intraoral scanner relative to the 3D model that, when used during intraoral scanning, would result in a new intraoral scan that would provide surface data for the one or more AOIs. In one embodiment, at block 3340 processing logic determines a trajectory of the intraoral scanner relative to the 3D model that, when used during intraoral scanning, would result in a new plurality of intraoral scans that would provide surface data for the one or more AOIs.

At block 3342, processing logic outputs a representation of the intraoral scanner at the determined positions and orientations relative to the 3D model of the dental site. The 3D model may be stationary during presentation of the representation of the intraoral scanner, or may change position and/or orientation during the presentation. In one embodiment, at block 3344 processing logic outputs a representation of the intraoral scanner moving according to the determined trajectory relative to the 3D model. Thus, processing logic may graphically show a user a recommended additional scanning sequence to be performed to improve a quality of the 3D model.

FIGS. 34-39 are flow charts illustrating various methods related to assessing scanning quality for intraoral scanning and/or providing suggestions for improving scanning technique. The methods may be performed by a processing logic that may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by a computing device of a scanning system and/or by a server computing device (e.g., by computing device 105 of FIG. 1 or computing device 4000 of FIG. 40).

In embodiments described herein, an intraoral scan application may periodically or continually determine values of one or more metrics associated with scanning quality and/or with an ability to register scans with previous scans and/or 3D surfaces. Examples of such metrics include a speed of scanner movement metric, an angle of incidence metric, a dirty optical surface metric, a distance between scanner head and dental site metric, and so on. Other metrics include an area of gingiva around a tooth that has been scanned, a presence (and optionally size) and/or absence of a void, and so on. Current values for some or all of these metrics may be shown on a dashboard of a graphical user interface. In some embodiments, values for scanning quality metrics are shown when those values approach one or more thresholds that, if exceeded, reduce an ability of the intraoral scan application to register scans to previous scans and/or 3D surfaces. As additional scans are generated and the values of the metrics are updated, a notice or alarm may be generated if any of the metric values fails to satisfy a scanning quality metric criterion (e.g., a scan quality metric threshold). If any of the metric values falls outside of one or more acceptable ranges associated with high quality scans, then the metric values may be shown in the dashboard. If any of the metric values then later falls within the one or more acceptable ranges associated with high quality scans, then the metric values may be removed from the dashboard. Thus, users of the intraoral scanner may automatically be alerted during a scanning session if one or more aspects of their scanning technique would impair a scanning quality and/or an ability to register and stitch together scans. This enables users to adjust their technique in real time during intraoral scanning responsive to indicators on the dashboard, improving an overall quality of the intraoral scanning and potentially shortening scan time and reducing or eliminating a need to rescan portions of a dental arch. Additionally, scanning quality metric values may be determined for regions of a 3D model that are generated from intraoral scans. The scanning quality metric values may be used to assess an intraoral scanning technique of a user, and to ultimately suggest ways for the user to improve their scanning technique.

Figure 34:
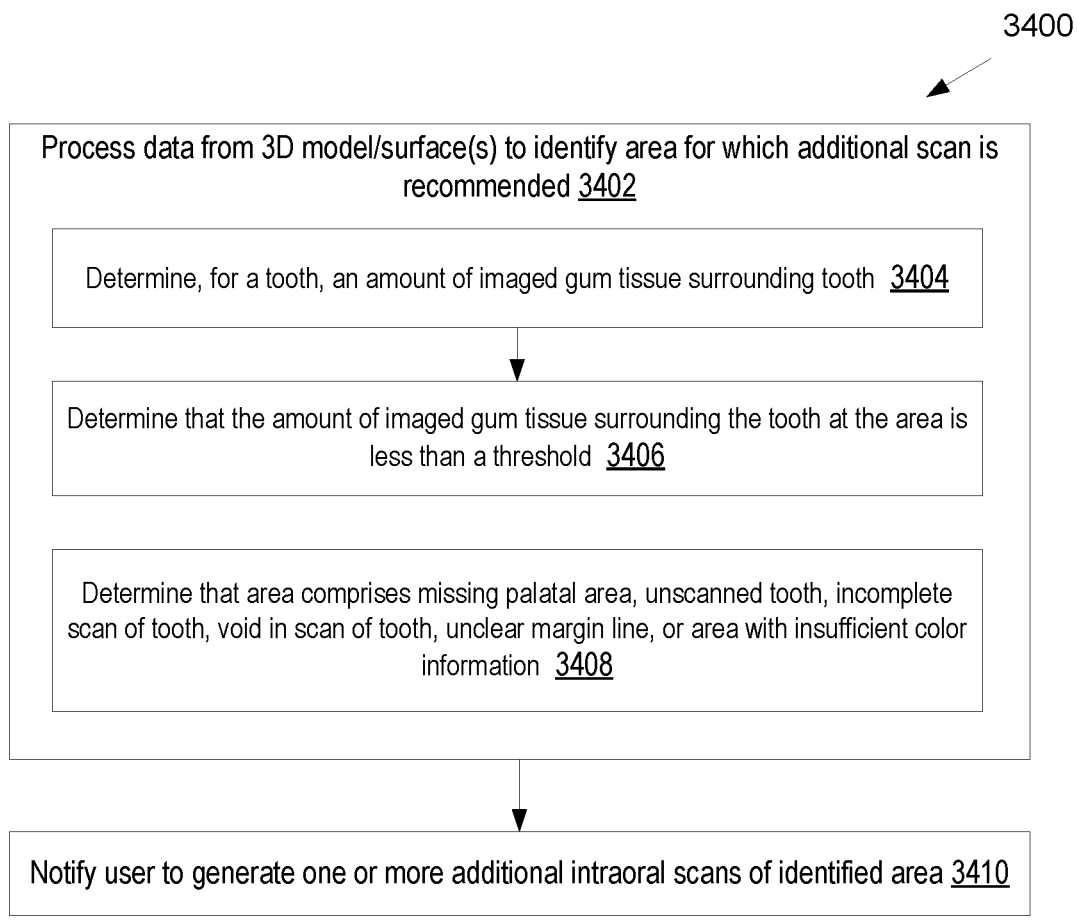
FIG. 34 is a flow chart illustrating an embodiment for a method of determining whether additional scans of a tooth are recommended.

FIG. 34 is a flow chart illustrating an embodiment for a method 3400 of determining whether additional scans of a tooth are recommended. After intraoral scanning is performed for a particular scanning role (e.g., for an upper dental arch, a lower dental arch, a patient bite, etc.), processing logic may automatically determine whether one or more additional intraoral scans are recommended to be generated. For example, if the area of a preparation tooth containing the margin line lacks definition, it may not be possible to properly determine the margin line, and thus the margin of a restoration may not be properly designed. In another example, if not enough gum tissue is imaged around a tooth, then aligners and/or dental prosthesis associated with that tooth may be designed that interfere with the gum tissue around the tooth. Additionally, the quality of one or more automatic determinations, the quality of a generated 3D model of a dental arch and/or the quality of a manufactured dental prosthesis can be affected by the presence or lack of a palatal area, voids, an amount of color information, one or more unclear or conflicting areas, and so on. Method 3400 may detect these and other issues that can negatively impact treatment, and can recommend rescanning of areas where these issues are identified.

At block 3402 of method 3400, processing logic processes data from a 3D model and/or a 3D surface to identify one or more area for which additional scans are recommended. Processing of the data may be performed using image processing and/or the application of machine learning. In one embodiment, one or more portions of the 3D model or 3D surface or one or more projections of the 3D model or 3D surface onto one or more surfaces are input into a trained machine learning model. The trained machine learning model may output a map with two different pixel-level or point-level classifications, where one classification indicates that no further scanning is recommended and another classification indicates that further scanning is recommended. In further embodiments, the ML model may output different classes associated with why further scanning is recommended. For example, the ML model may output an indication of a void, an unclear area, an obscured area, a low confidence area, and so on.

In an example, a part of a margin line of a scanned preparation tooth or a part of another dental object may not be sufficiently clearly defined in the 3D model. For example, during the initial 3D data collection step, for example via scanning, that resulted in the first 3D virtual model being generated, a part of the physical dental surface may have been covered with foreign material, such as for example saliva, blood, or debris. The part of the physical dental surface may also have been obscured by another element such as for example part of the gums, cheek, tongue, dental instruments, artifacts, etc. Alternatively, for example, during the initial 3D data collection step (e.g., via scanning) that resulted in the first virtual 3D model being generated, the region may have been distorted or otherwise defective and may not properly correspond to a physical dental surface (e.g., due to some defect in the actual scanning process). These situations may lead to an unclear or low quality region of the 3D model.

In one embodiment, at block 3404 processing logic determines, for one or more teeth in the 3D model, an amount of imaged gum tissue surrounding the one or more teeth. Such a determination may be made by performing image processing to measure a distance from an outer edge of scanned gingiva around each of the one or more teeth. Processing logic may then compare the determined distances to a distance threshold. If any of the distances are less than the distance threshold, this may be an indication that further scanning of gingiva around a tooth would be beneficial. Accordingly, at block 3406 responsive to determining that an amount of imaged gum tissue around a tooth is less than a threshold (e.g., that a detected distance between an edge of the tooth and a nearest outer edge of scanned gingiva is less than a distance threshold), processing logic may identify the tooth and/or the gingiva around the tooth for further scanning.

In one embodiment, at block 3408 processing logic determines that the identified area comprises a missing palatal area, an incomplete surface of a tooth, a void in a surface of a tooth, an unclear margin line, and/or an area with insufficient color information. These determinations may be made by inputting the 3D surface, a 3D model, a portion of a 3D surface or 3D model, intraoral scans associated with a 3D surface or 3D model, 2D images (e.g., color images) associated with the 3D surface or 3D model and/or one or more projections of the 3D surface or 3D model into a trained ML model, which may output an indication as to whether the 3D surface or 3D model has a missing palatal area, an incomplete surface of a tooth, a void in a surface of a tooth, an unclear margin line, and/or an area with insufficient color information. Additionally, or alternatively, processing logic may perform one or more image processing operations to detect insufficient color information, voids, incomplete surface of a tooth, missing palatal area, and so on.

In one embodiment, processing logic computes a margin line quality score for one or more segments of the margin line. Each margin line quality score may be based on the cost value for the margin line (or a segment of the margin line) as computed using a cost function. In one embodiment, a margin line quality score is determined for the entirety of the margin line. In one embodiment, multiple additional margin line quality scores are computed, where each margin line quality score is for a particular segment of the margin line. Those segments of the margin line that have a margin line quality score below a margin line quality score threshold may be identified for further scanning.

In some embodiments, processing logic may additionally or alternatively determine a clarity value and/or quality value for surfaces that do not include or are not associated with a margin line. Processing logic may mark such surfaces (or portions of surfaces) that have low quality values on the 3D model. For example, the surface quality scores for one or more surface portions may be compared to a quality threshold. Any surfaces (or surface portions) having surface quality scores that are below the quality threshold may be marked or highlighted.

In one embodiment, processing logic 3400 determines which areas to rescan using the techniques set forth in US Publication No. 2021/0059796, which is incorporated by reference herein.

Figure 35:
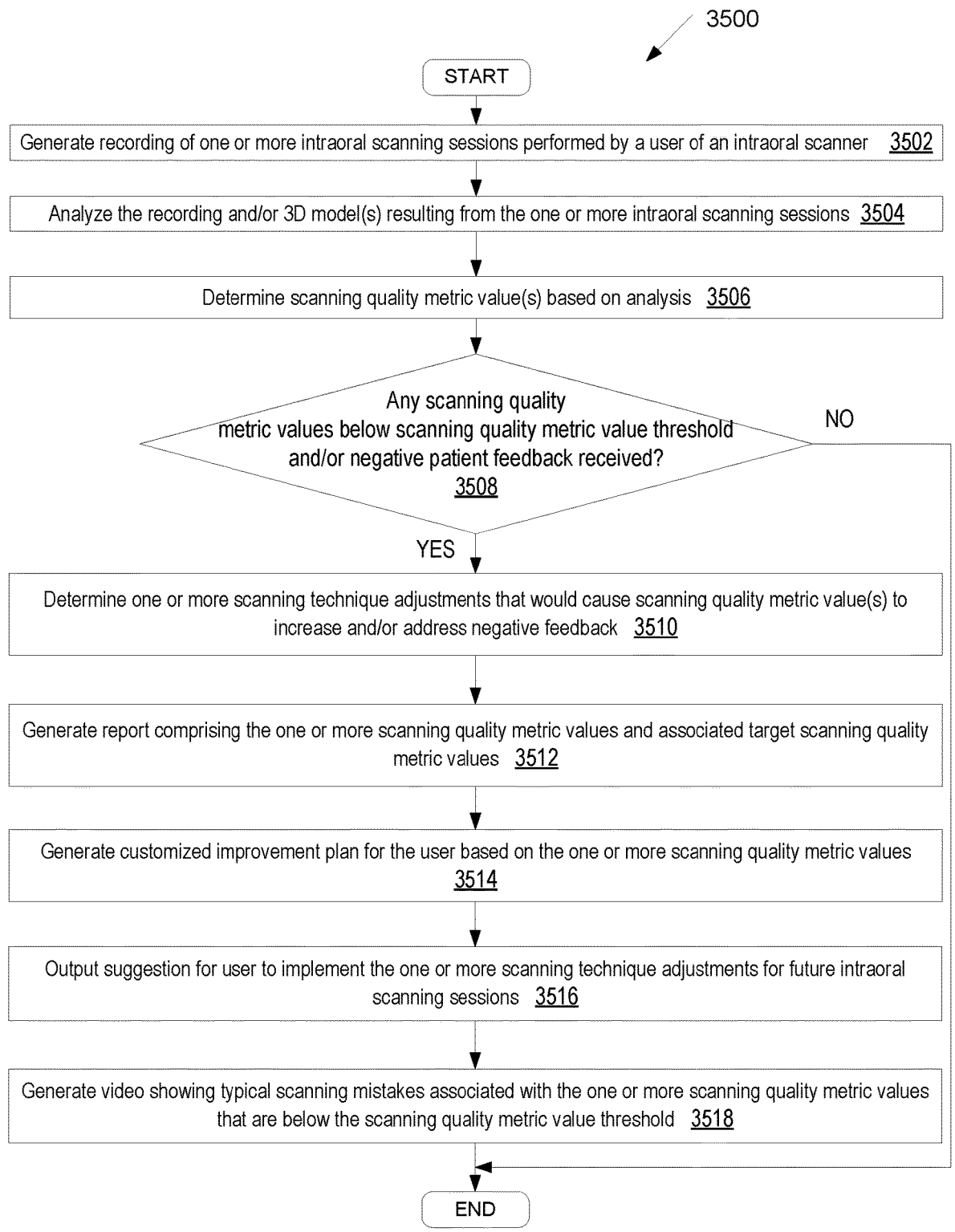
FIG. 35 is a flow chart illustrating an embodiment for a method of assessing a scanning technique of a user of an intraoral scanner.

FIG. 35 is a flow chart illustrating an embodiment for a method 3500 of assessing a scanning technique of a user of an intraoral scanner. At block 3502 of method 3500, processing logic generates a recording of one or more intraoral scanning sessions performed by a user of an intraoral scanner. Each scanned recording session may include a sequence of intraoral scans and/or 2D images, inertial measurement data indicating a motion of the intraoral scanner between generation of each of the intraoral scans and/or 2D images, one or more 3D model generated from the sequence of intraoral scans, and/or other data. At block 3504, processing logic analyzes the recording and/or the 3D models resulting from the one or more intraoral scan sessions. Analysis may include processing the data using one or more trained machine learning models and/or one or more rule-based algorithms. At block 3506, processing logic may determine scanning quality metric values based on the analysis. Such scanning quality metric values may include, for example, a scan speed metric value, a scan distance metric value, a scan angle metric value, a scanner cleanliness metric value, a moving tissue metric value, and/or other scan quality metric values. Processing logic may also determine a number and/or size of voids, and determine a void scan quality metric value based on the number and/or size of voids. Processing logic may also determine an amount of blurriness, and determine a blurriness scan quality metric value based on the determined blurriness. Processing logic may also determine an amount of conflicting scan data, and determiner a conflicting scan data quality metric value based on the determined amount of conflicting scan data. Other scan quality metric values may also be determined. Scan quality metric values may be computed for intraoral scans and/or for regions of the 3D model. In one embodiment, scan quality metric values are determined for intraoral scans, and then the scan quality metric values determined for those scans are used to determine a scan quality metric value for a region of the 3D model associated with those scans. In one embodiment, scan quality metric value statistics are determined for a region of the 3D model based on the scan quality metric values of those intraoral scans used to generate the region. Examples of scan quality metric value statistics that may be determined include averages, percentiles (e.g., $50^{th}$ percentile, $70^{th}$ percentile, $80^{th}$ percentile, $90^{th}$ percentile), medians, standard deviations, and so on.

In some embodiments, patients may also provide patient feedback on their experience during the intraoral scanning session or sessions. They may indicate, for example, whether they felt pain or discomfort during any part of the intraoral scanning session, and or locations in their mouth at which they felt pain or discomfort.

At block 3508, processing logic compares the scanning quality metric values to scan quality criteria, such as scan quality metric value thresholds. If the scan quality metric values fail to satisfy scan quality criteria (e.g., are below scan quality metric value thresholds), then the method continues to block 3510. Additionally, if negative patient feedback was received, the method may continue to block 3510. If at block 3508 processing logic determines that all scan quality metric values satisfy scan quality criteria (e.g., are above scan quality metric value thresholds), and no negative patient feedback was received, the method ends.

At block 3510, processing logic determines one or more scanning technique adjustments that would cause one or more of the scanning quality metric value(s) to increase and/or that would address the negative patient feedback. This may include, for example, slowing down movement of the scanner during intraoral scanning if the scan speed was too high, or adjusting an angle of the intraoral scanner relative to the scanned dental site if the scan angle was too high or too low, or adjusting a distance of the probe head of the scanner from the dental site if the scan distance was too high or too low, for example. Additionally, scanning technique adjustments may include using less force in pressing the intraoral scanner against a patient's cheeks if a patient indicated pain during intraoral scanning while a buccal region of a dental arch was scanned. Scanning technique adjustments may also include increasing a frequency of cleaning a window or mirror of the intraoral scanner. Many other scanning technique adjustments may also be determined.

At block 3512, processing logic generates a report comprising the one or more scanning quality metric values (and optionally patient feedback), and associated target scanning quality metric values. At block 3514, processing logic generates a customized improvement plan for the user based on the one or more scanning quality metric values. A customized improvement plan may target improvements to one or a few scanner quality metrics initially, followed by improvements to one or more other scanner quality metric values. For example, processing logic may determine one or a few scan quality metric values that deviate from scan quality metric value thresholds by a largest amount, and generate a plan that first instructs the user to adjust their scanning technique to improve that one or a few scan quality metrics. In one embodiment, processing logic generates a customized training video showing techniques for improving the scanning quality metric values that failed to satisfy scan quality criteria (e.g., that were below a scan quality threshold). In one embodiment, at block 3516 processing logic outputs a suggestion for a user to implement the one or more scanning technique adjustments for future intraoral scans. Suggestions may be provided according to the customized improvement plan. For example, suggestions may first target improvements to just one scan quality metric, and once the user has improved that metric, further suggestions may target improvements to another scan quality metric. This may continue until the user has a scanning technique that produces intraoral scans and 3D models for which most or all scan quality metric values satisfy scan quality criteria. Processing logic may additionally, or alternatively, output a report comprising the one or more determined scanning quality metric values as well as associated target scanning quality metric values. Scanning quality metric values that fail to meet criteria may be shown with a first visualization (e.g., a first color), scanning quality metric values that were close to failing to meet the criteria may be shown with a second visualization (e.g., a second color), and/or scanning quality metric values that were not close to failing to meet the criteria may be shown with a third visualization (e.g., a third color). In one embodiment, at block 3518 processing logic generates a video showing typical scanning mistakes associated with the one or more scanning quality metric values that are below respective scanning quality metric value thresholds (or that otherwise fail to satisfy scan quality criteria). The video may be customized based on the customized improvement plan determined for the user and/or scan quality metric values of the 3D model/intraoral scans generated by the user. The video may be constructed from stock footage of intraoral scanning procedures showing those scanning mistakes (and optionally how to prevent those scanning mistakes) that most often result in poor scanning quality metric values of the type determined not to meet scan quality criteria at block 3508. The video may then be presented to the user to help them improve their intraoral scanning technique.

Figure 36:
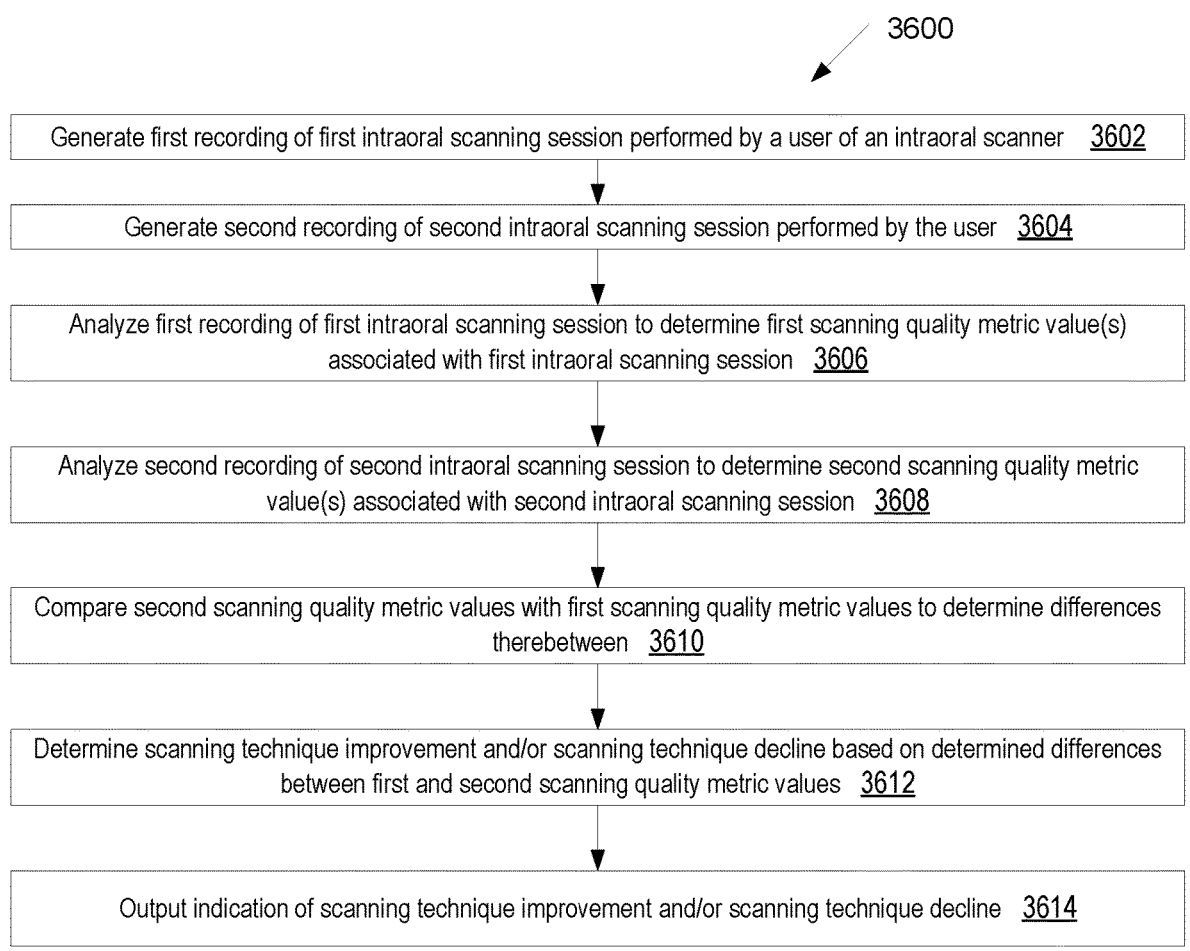
FIG. 36 is a flow chart illustrating an embodiment for a method of assessing a change in scanning technique of a user of an intraoral scanner over time.

FIG. 36 is a flow chart illustrating an embodiment for a method 3600 of assessing a change in scanning technique of a user of an intraoral scanner over time. At block 3602 of method 3600, processing logic generates a first recording of a first intraoral scanning session performed by a user of an intraoral scanner. At block 3604, processing logic generates a second recording of a second intraoral scanning session performed by the user. At block 3606, processing logic analyzes the first intraoral scanning session to determine first scanning quality metric values associated with the first intraoral scanning session. At block 3608, processing logic analyzes the second intraoral scanning session to determine second scanning quality metric values associated with the second intraoral scanning session.

At block 3610, processing logic compares the second scanning quality metric values to the first scanning quality metric values to determine differences therebetween. At block 3612, processing logic determines any scanning technique improvement and/or scanning technique decline based on the determined differences between the first and second scanning quality metric values. At block 3614, processing logic then outputs an indication of determined scanning technique improvement and/or of scanning technique decline.

Figure 37:
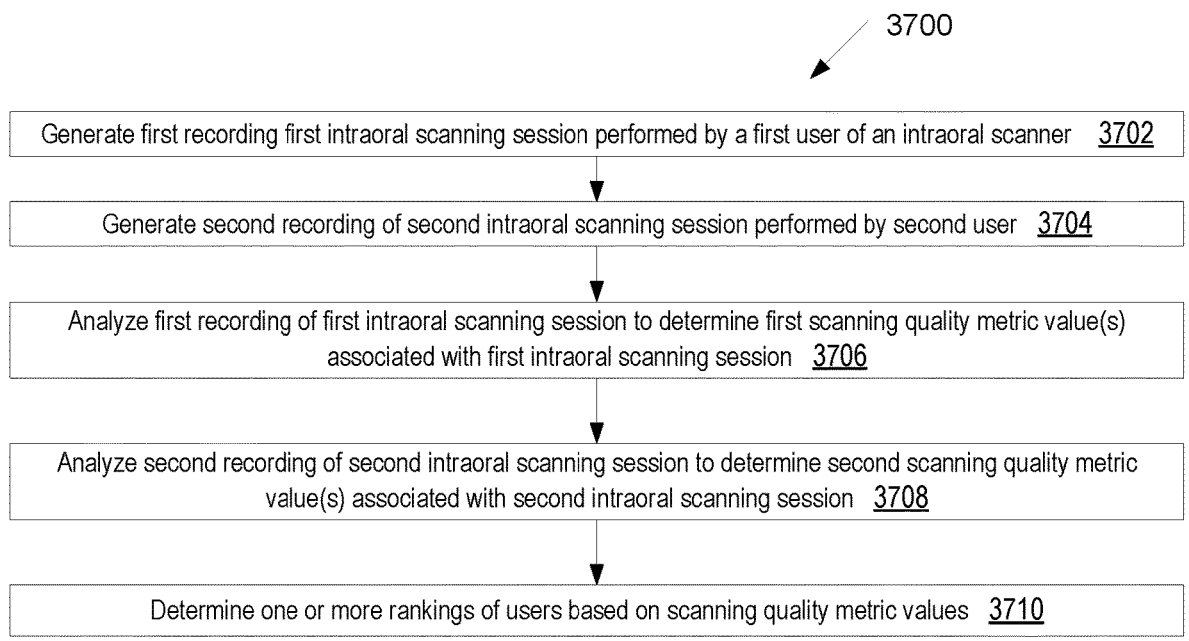
FIG. 37 is a flow chart illustrating an embodiment for a method of assessing scanning techniques of multiple users of an intraoral scanner.

FIG. 37 is a flow chart illustrating an embodiment for a method 3700 of assessing scanning techniques of multiple users of an intraoral scanner. At block 3702 of method 3700, processing logic generates a first recording of a first intraoral scanning session performed by a first user of an intraoral scanner. At block 3704, processing logic generates a second recording of a second intraoral scanning session performed by a second user of the intraoral scanner or a different intraoral scanner. Additional recordings of other intraoral scanning sessions performed by other uses may also be generated. At block 3706, processing logic analyzes the first intraoral scanning session to determine first scanning quality metric values associated with the first intraoral scanning session. At block 3708, processing logic analyzes the second intraoral scanning session to determine second scanning quality metric values associated with the second intraoral scanning session. Any other intraoral scanning session recordings of other users may also be analyzed.

At block 3710, processing logic compares the second scanning quality metric values to the first scanning quality metric values. Additionally, processing logic may compare scanning quality metric values associated with other users to the first scanning quality metric values of the first user and the second scanning quality metric values of the second user. Processing logic may then determine rankings of the first and second users (and any other users) based on the comparison. Rankings may be determined for each scan quality metric. For example, rankings may be determined for scan speed, scan distance, scan angle, scanner cleanliness, voids, user discomfort, and so on. Additionally, overall scan quality scores may be computed for each user based on combinations (which may be weighted or unweighted combinations) of the scan quality metric values associated with the scanning sessions of those users. An overall scan quality score ranking may also be determined between the users.

Figure 38:
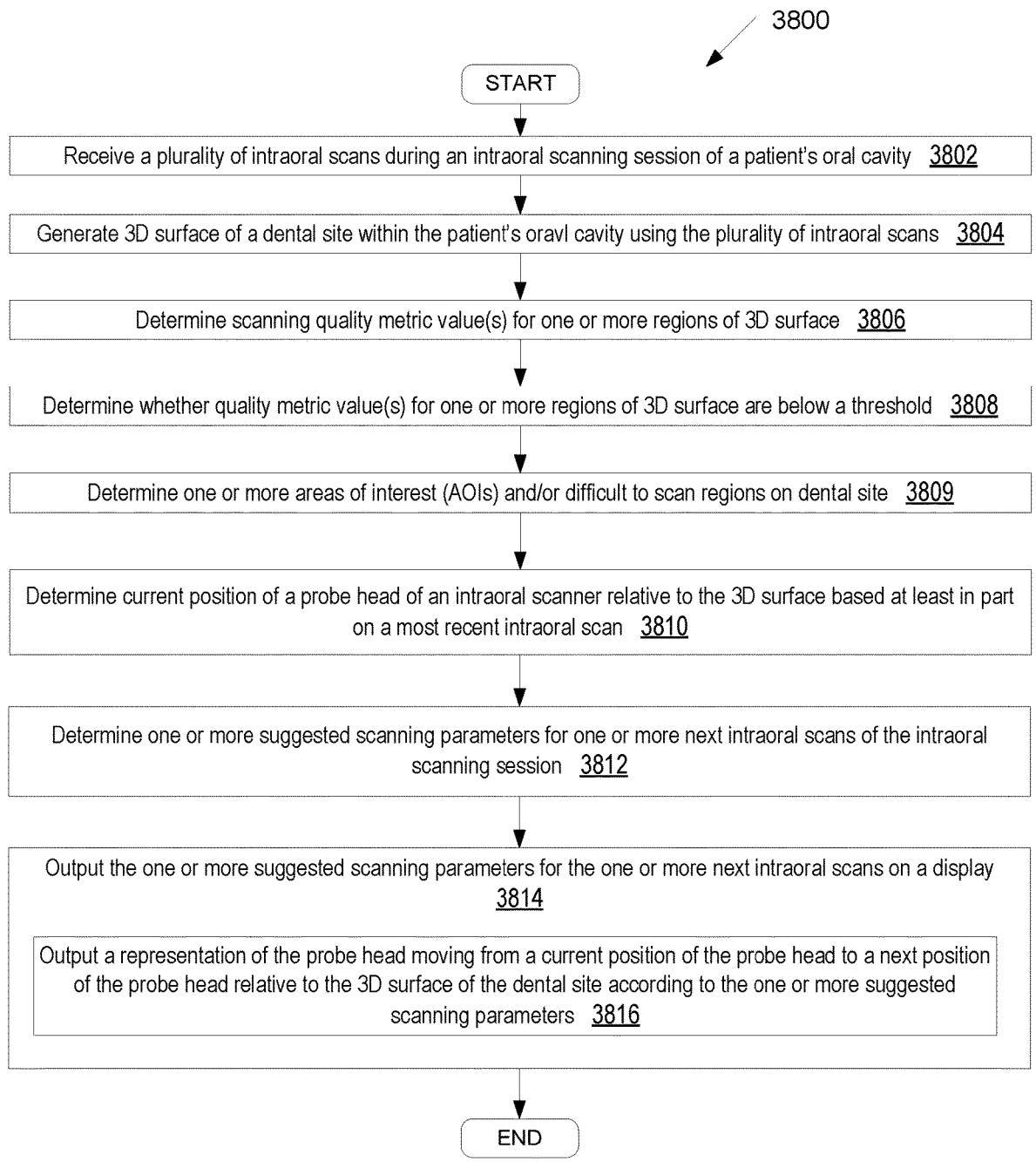
FIG. 38 is a flow chart illustrating an embodiment for a method of determining scanning quality for regions of a 3D surface during intraoral scanning and outputting suggestions for improving the scanning quality.

In addition to determining and recommending how to adjust a scanning technique based on a 3D model after scanning is complete, processing logic may also determine and recommend how to adjust a scanning technique during an intraoral scanning session based on received intraoral scans, received 2D images and/or a 3D surface of a thus-far scanned portion of a dental site. FIG. 38 is a flow chart illustrating an embodiment for a method 3800 of determining scanning quality for regions of a 3D surface during intraoral scanning and outputting suggestions for improving the scanning quality. At block 3802 of method 3800, processing logic receives a plurality of intraoral scans during an intraoral scanning session of a patient's oral cavity. At block 3804, processing logic generates a 3D surface of a dental site within the patient's oral cavity using the plurality of intraoral scans. At block 3806, processing logic determines scanning quality metric values for one or more regions of the 3D surface and/or for one or more received intraoral scans. At block 3808, processing logic determines whether the scanning quality metric values for one or more regions of the 3D surface and/or for one or more intraoral scans is below a scanning quality threshold (or otherwise fail to satisfy one or more scan quality criteria). At block 3809, processing logic may additionally identify one or more areas of interest of the dental site that is yet to be scanned or that has only partially been scanned. Processing logic may additionally or alternatively determine one or more difficult to scan regions that has yet to be scanned or that is only partially scanned. In one embodiment, the AOIs and/or difficult to scan regions are determined based on analysis of a previously generated 3D model of the dental site (e.g., of the patient's dental arch). For example, a doctor may have scanned the patient's dental arches during prior patient visits or earlier in the current patient visit. Processing logic may analyze such a 3D model to identify tooth crowding, areas with little clearance (e.g., the buccal side of the back molars), and so on.

At block 3810, processing logic determines a current position (and optionally one or more past positions) of a probe head of an intraoral scanner relative to the 3D surface based at least in part on a most recent intraoral scan that successfully stitched to the 3D surface. At block 3812, processing logic determines one or more suggested scanning parameters for one or more next intraoral scans of the intraoral scanning session. The scanning parameters may include a relative position and/or orientation of the intraoral scanner probe head relative to a portion of the dental site to be scanned next. Scanning parameters may additionally include a speed with which to move the intraoral scanner, a distance of the scanner from the dental site, an angle of the scanner relative to the dental site, and so on. Processing logic may additionally determine one or more unscanned regions of the patient's oral cavity. Additionally, processing logic may determine scanning quality metric values for already scanned regions, and may identify those regions with one or more scanning quality metric values that are outside of target ranges for the scanning quality metric values. Additionally, processing logic may identify one or more AOIs on the 3D surface.

At block 3814, processing logic outputs the one or more suggested scanning parameters for the one or more next intraoral scans on a display (e.g., in a GUI of an intraoral scan application). The one or more suggested scanning parameters may include, for example, a suggested next position and/or orientation of the probe head of the intraoral scanner relative to the 3D surface, a next distance between the probe head and the 3D surface, a speed of movement between a current position of the probe head and a next position of the probe head, and so on. The suggested next position(s) and/or orientation(s) of the probe head relative to the patient's oral cavity (e.g., dental arch) and/or other suggested scanning parameters may be positions and/or orientations suitable to scan the one or more unscanned regions, to rescan AOIs, and so on. For example, suggested next positions and/or orientations of the probe head relative to the patient's oral cavity may be positions and/or orientations and/or other suggested scanning parameters suitable to rescan already scanned regions with scanning quality metric values that failed to satisfy a scanning quality criterion (e.g., that were outside of target scanning quality metric value ranges). The suggested scanning parameters (e.g., position and/or orientation of the scan head, scan speed, scan distance, scan angle, etc.), when used, may cause one or more of the scan quality metric values to increase for the regions having the unacceptable scan quality metric values. Additionally, or alternatively, the suggested next position(s) and/or orientation(s) of the probe head relative to the patient's oral cavity (e.g., dental arch) and/or other suggested scanning parameters may be positions and/or orientations suitable to re-scan the AOIs. In one embodiment, at block 3816 processing logic outputs a representation of the probe head moving from a current position of the probe head to a next position of the probe head relative to the 3D surface of the dental site according to the one or more suggested scanning parameters.

In one example, processing logic determines a current angle of the probe head relative to the 3D surface, and may determine whether the angle of the probe head is within a target angle range (e.g., 40-60 degrees) relative to the probe head. Responsive to determining that the angle of the probe head is outside of the target angle range, processing logic may determine one or more angle adjustments for the probe head, where the one or more suggested scanning parameters may include the one or more angle adjustments.

In one example, processing logic determines a ratio of distal surfaces to mesial surfaces represented in the 3D surface of the dental site. Based on the ratio of the distal surfaces to the mesial surfaces, processing logic may determine whether the distal surfaces or the mesial surfaces are dominant. Responsive to determining that the distal surfaces are dominant, processing logic may determine one or more first angle adjustments for the probe head that will increase an amount of captured mesial surfaces. Responsive to determining that the mesial surfaces are dominant, processing logic may determine one or more second angle adjustments for the probe head that will increase an amount of captured distal surfaces. Processing logic may then determine one or more suggested scanning parameters that comprise the one or more first angle adjustments or the one or more second angle adjustments.

In one embodiment, processing logic determines a scanning speed associated with one or more intraoral scans and/or one or more regions of the 3D surface. Processing logic may determine that the scanning speed is outside of a scanning speed range, and may suggest one or more scanning parameters for the one or more next intraoral scans that will cause the scanning speed to fall within the target scanning speed range.

In one embodiment, processing logic determines a trajectory of the intraoral scanner during intraoral scanning. Processing logic projects the trajectory into the future, and optionally compares the areas to be scanned to a 3D model of the dental site that was previously generated. Processing logic may determine whether an upcoming area to be scanned is a difficult to scan region or an easy to scan region. If a difficult to scan region is upcoming in the intraoral scanning session, then processing logic may output an alert for a user to slow down a scan speed (e.g., to slow down a speed of the probe head) for scanning of the difficult to scan region. Processing logic may additionally determine one or more suggested scanning parameters for scanning the difficult to scan region (other than scan speed), and may output suggestions to use the one or more suggested scanning parameters.

Figure 39:
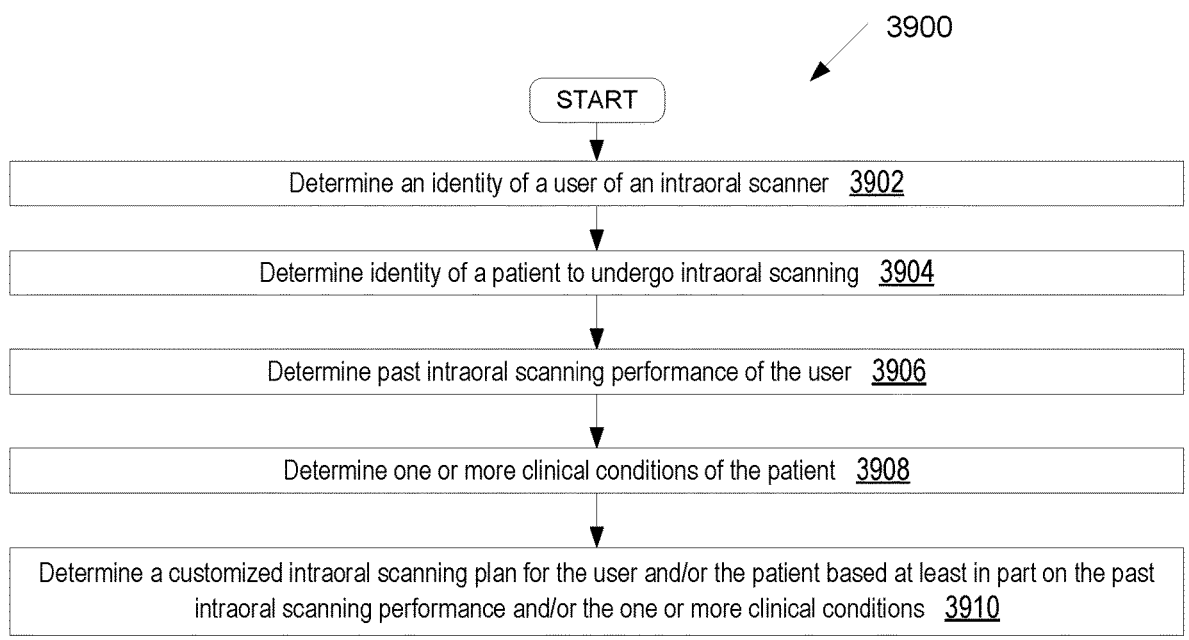
FIG. 39 is a flow chart illustrating an embodiment for a method of determining a customized intraoral scanning plan based on a patient and/or a user of an intraoral scanner.

FIG. 39 is a flow chart illustrating an embodiment for a method 3900 of determining a customized intraoral scanning plan based on a patient and/or a user of an intraoral scanner. At block 3902 of method 3900, processing logic determines an identity of a user of an intraoral scanner. At block 3904, processing logic determines an identity of a patient to undergo intraoral scanning. At block 3906, processing logic determines a past intraoral scanning performance of the user. This may include analyzing previously recorded intraoral scanning sessions performed by the user and/or reviewing scanning quality metric values associated with the previously recorded intraoral scanning sessions. Processing logic may determine, based on the past scanning performance, one or more scanning mistakes that the user may have made in the past.

At block 3908, processing logic determines one or more clinical conditions of the patient. Such a determination may be made based on a review of patient records, or may be input by a doctor. In one embodiment, processing logic assesses one or more previously generated 3D models of the patient's dental arches to identify clinical conditions, such as malocclusions, tooth crowding, and so on. Processing logic may additionally identify tooth angles and geometries, areas of interest, treatment needs of the patient, etc. based on the previously generated 3D model or models.

At block 3910, processing logic determines a customized intraoral scanning plan for the user and/or for the patient based at least in part on the past intraoral scanning performance of the user and/or the one or more determined clinical conditions of the patient. The customized intraoral scanning plan may then be presented to the user. In one embodiment, the customized intraoral scanning plan is presented to the user and continuously updated during intraoral scanning. As the user completes scanning of region of the patient's dental arch, a next region to scan and how to go about scanning that next region may be presented. Accordingly, the user may be guided through the scanning process.

The customized intraoral scanning plan may be divided into multiple regions. The customized intraoral scanning plan may include a progression of the intraoral scanner between the regions. The customized intraoral scanning plan may additionally include, for use within each of the regions or for transitions between the regions, at least one of a respective speed of movement of the intraoral scanner, a respective angle of the probe head of the intraoral scanner relative to a dental site in the patient's oral cavity, or a respective distance between the probe head of the intraoral scanner and the dental site.

Figure 40:
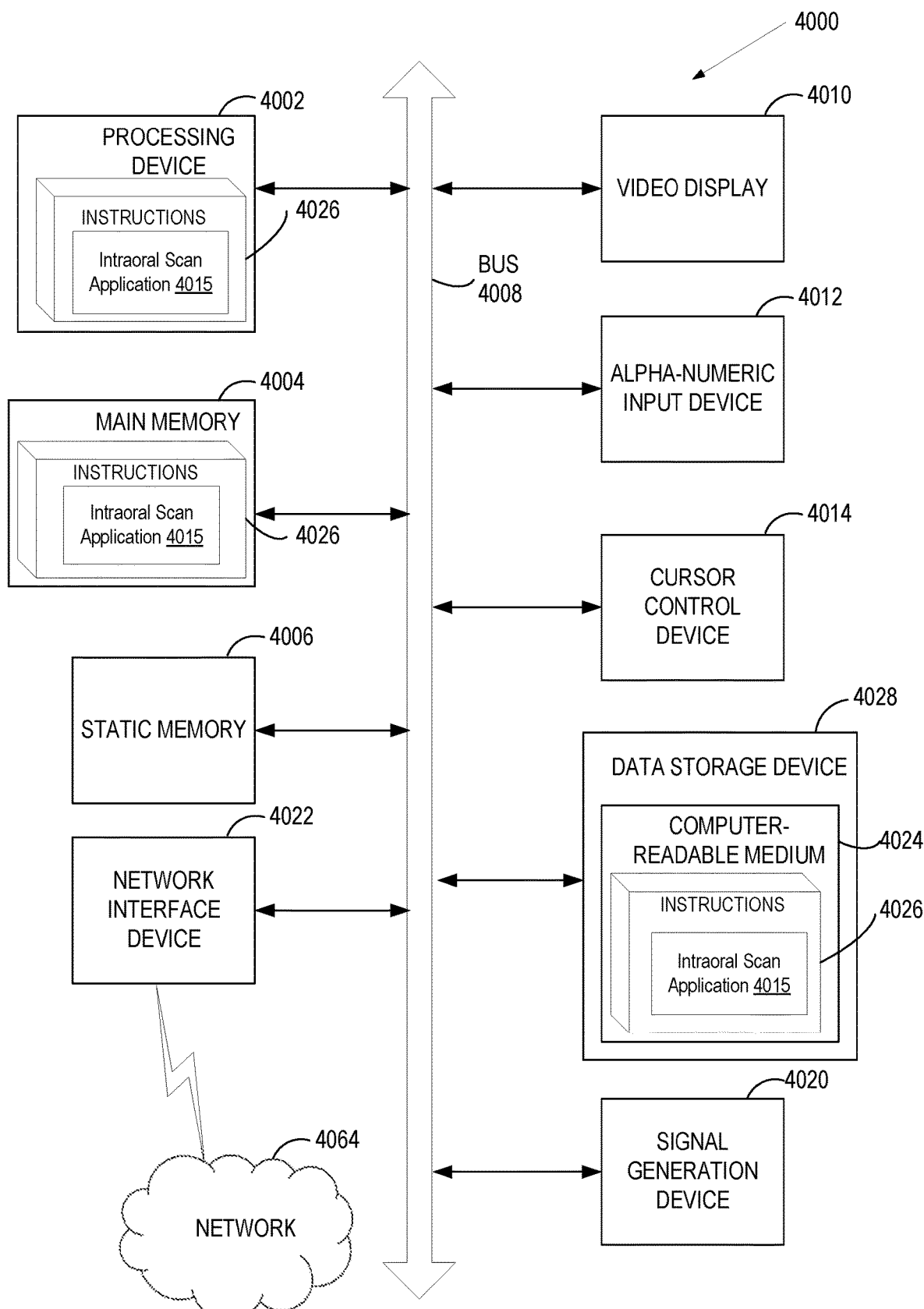
FIG. 40 illustrates a block diagram of an example computing device, in accordance with embodiments of the present disclosure.

FIG. 40 illustrates a diagrammatic representation of a machine in the example form of a computing device 4000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The computing device 4000 may correspond, for example, to computing device 105 and/or computing device 106 of FIG. 1. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 4000 includes a processing device 4002, a main memory 4004 (e.g., read-only memory (ROM), flash memory, dynamic random access memory (DRAM) such as synchronous DRAM (SDRAM), etc.), a static memory 4006 (e.g., flash memory, static random access memory (SRAM), etc.), and a secondary memory (e.g., a data storage device 4028), which communicate with each other via a bus 4008.

Processing device 4002 represents one or more general-purpose processors such as a microprocessor, central processing unit, or the like. More particularly, the processing device 4002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 4002 may also be one or more special-purpose processing devices such as an application specific integrated circuit (ASIC), a field programmable gate array (FPGA), a digital signal processor (DSP), network processor, or the like. Processing device 4002 is configured to execute the processing logic (instructions 4026) for performing operations and steps discussed herein.

The computing device 4000 may further include a network interface device 4022 for communicating with a network 4064. The computing device 4000 also may include a video display unit 4010 (e.g., a liquid crystal display (LCD) or a cathode ray tube (CRT)), an alphanumeric input device 4012 (e.g., a keyboard), a cursor control device 4014 (e.g., a mouse), and a signal generation device 4020 (e.g., a speaker).

The data storage device 4028 may include a machine-readable storage medium (or more specifically a non-transitory computer-readable storage medium) 4024 on which is stored one or more sets of instructions 4026 embodying any one or more of the methodologies or functions described herein, such as instructions for intraoral scan application 4015, which may correspond to intraoral scan application 115 of FIG. 1. A non-transitory storage medium refers to a storage medium other than a carrier wave. The instructions 4026 may also reside, completely or at least partially, within the main memory 4004 and/or within the processing device 4002 during execution thereof by the computing device 4000, the main memory 4004 and the processing device 4002 also constituting computer-readable storage media.

The computer-readable storage medium 4024 may also be used to store dental modeling logic 4050, which may include one or more machine learning modules, and which may perform the operations described herein above. The computer readable storage medium 4024 may also store a software library containing methods for the intraoral scan application 115. While the computer-readable storage medium 4024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:
an intraoral scanner configured to generate a plurality of intraoral scans of a dental site; and
a computing device, configured to:
receive the plurality of intraoral scans of the dental site generated by the intraoral scanner;
generate a three-dimensional (3D) model of the dental site using the plurality of intraoral scans;
determine one or more intraoral areas of interest (AOIs) on the dental site, wherein the one or more AOIs comprise at least one of a preparation tooth, a cracked tooth, a lesion, an area of a malocclusion, an area of tooth wear, a caries, an area of receding gums, or a restorative object;
process the 3D model and the one or more AOIs to determine a viewing trajectory of a virtual camera that, when followed, shows the 3D model of the dental site from a plurality of views of the virtual camera, wherein the viewing trajectory comprises one or more views of the one or more AOIs, wherein determining the viewing trajectory comprises determining, for each view of the plurality of views, positions, orientations, and magnification settings of the virtual camera, and wherein determining the viewing trajectory further comprises determining speeds for transitioning between the plurality of views; and
present the 3D model of the dental site according to the determined viewing trajectory of the virtual camera.

2. The system of claim 1, wherein determining the viewing trajectory comprises selecting the viewing trajectory from a set of available viewing trajectories based on at least one of an identity of a user of the intraoral scanner, a treatment to be performed on at least one tooth of the dental site, or one or more properties of the dental site.

3. The system of claim 1, wherein determining the viewing trajectory further comprises:
determining one or more zoomed-in views of each of the one or more AOIs that together cause rotation of the virtual camera about the one or more AOIs.

4. The system of claim 1, wherein determining the one or more AOIs further comprises determining one or more voids having at least a threshold size.

5. The system of claim 4, wherein the computing device is further configured to:
emphasize the one or more voids using a first visualization that is different from a second visualization used for a remainder of the 3D model.

6. The system of claim 4, wherein the computing device is further configured to:
determine a position and orientation of the intraoral scanner relative to the 3D model that, when used during intraoral scanning, would result in a new intraoral scan that would provide surface data for the one or more voids; and
output a representation of the intraoral scanner at the determined position and orientation relative to the 3D model of the dental site.

7. The system of claim 6, wherein the computing device is further configured to:
determine a trajectory of the intraoral scanner relative to the 3D model that, when used during intraoral scanning, would result in a new plurality of intraoral scans that would provide surface data for the one or more voids; and
output a representation of the intraoral scanner moving according to the determined trajectory relative to the 3D model.

8. The system of claim 1, wherein determining the one or more AOIs comprises:
identifying the preparation tooth; and
determining a margin line around the preparation tooth.

9. The system of claim 3, wherein determining the one or more AOIs comprises determining one or more teeth in the 3D model of the dental site having an amount of scanned gums around the one or more teeth that is below a threshold.

10. The system of claim 1, wherein the computing device is further configured to:
determine an identity of a user of the intraoral scanner;
determine viewing preferences of the user; and
determine the viewing trajectory of the virtual camera based on the viewing preferences.

11. The system of claim 1, wherein determining the viewing trajectory of the virtual camera comprises:
inputting data from the 3D model into a trained machine learning model, wherein the trained machine learning model outputs the viewing trajectory of the virtual camera.

12. The system of claim 1, wherein the computing device is further configured to:
determine the viewing trajectory of the virtual camera based on one or more zoom operations and one or more rotation operations manually performed by a user for one or more previous 3D models of dental sites.

13. The system of claim 1, wherein the computing device is further configured to:
determine that scanning of the dental site is complete; and
generate the 3D model of the dental site responsive to determining that the scanning of the dental site is complete.

14. The system of claim 13, wherein determining that the scanning of the dental site is complete comprises detecting that no new intraoral scans have been received for a threshold amount of time.

15. The system of claim 13, wherein determining that the scanning of the dental site is complete comprises receiving a user input indicating that the scanning of the dental site is complete.

16. The system of claim 13, wherein determining that the scanning of the dental site is complete comprises:
inputting at least one of the plurality of intraoral scans or a 3D surface generated from the plurality of intraoral scans into a trained machine learning model that generates an output indicating whether or not the scanning of the dental site is complete.

17. The system of claim 13, wherein determining that the scanning of the dental site is complete comprises detecting that the intraoral scanner has been removed from a patient's oral cavity.

18. The system of claim 1, wherein the computing device is further configured to:
determine one or more speed settings for updating at least one of view settings or the magnification settings for viewing the 3D model of the dental site along the determined viewing trajectory of the virtual camera; and
automatically follow the determined viewing trajectory of the virtual camera according to the one or more speed settings.

19. The system of claim 1, wherein the dental site comprises a dental arch.

20. The system of claim 1, wherein the dental site comprises a preparation tooth.

21. The system of claim 1, wherein the 3D model of the dental site is automatically presented according to the determined viewing trajectory of the virtual camera.

22. The system of claim 1, wherein the viewing trajectory is unique to the dental site.

23. The system of claim 1, wherein the one or more AOIs comprise one or more regions requiring rescanning, and wherein the computing device is further configured to:
provide visual indications of the one or more regions requiring rescanning.

24. A non-transitory computer readable medium comprising instructions that, when executed by a processing device, cause the processing device to perform operations comprising:
receiving a plurality of intraoral scans of a dental site generated by an intraoral scanner;
generating a three-dimensional (3D) model of the dental site using the plurality of intraoral scans;
determining one or more intraoral areas of interest (AOIs) on the dental site, wherein the one or more AOIs comprise at least one of a preparation tooth, a cracked tooth, a lesion, an area of a malocclusion, an area of tooth wear, a caries, an area of receding gums, or a restorative object;
processing the 3D model and the one or more AOIs to determine a viewing trajectory of a virtual camera that, when followed, shows the 3D model of the dental site from a plurality of views of the virtual camera, wherein the viewing trajectory comprises one or more views of the one or more AOIs, wherein determining the viewing trajectory comprises determining, for each view of the plurality of views, positions, orientations, and magnification settings of the virtual camera, and wherein determining the viewing trajectory further comprises determining speeds for transitioning between the plurality of views; and
presenting the 3D model of the dental site according to the determined viewing trajectory of the virtual camera.

25. The non-transitory computer readable medium of claim 24, wherein the 3D model of the dental site is automatically presented according to the determined viewing trajectory.

26. The non-transitory computer readable medium of claim 24, wherein determining the viewing trajectory comprises:
determining one or more zoomed-in views of each of the one or more AOIs that together cause rotation of the virtual camera about the one or more AOIs.

27. A method comprising:
receiving a plurality of intraoral scans of a dental site generated by an intraoral scanner;
generating a three-dimensional (3D) model of the dental site using the plurality of intraoral scans;
determining one or more intraoral areas of interest (AOIs) on the dental site, wherein the one or more AOIs comprise at least one of a preparation tooth, a cracked tooth, a lesion, an area of a malocclusion, an area of tooth wear, a caries, an area of receding gums, or a restorative object;
processing the 3D model and the one or more AOIs to determine a viewing trajectory of a virtual camera that, when followed, shows the 3D model of the dental site from a plurality of views of the virtual camera, wherein the viewing trajectory comprises one or more views of the one or more AOIs, wherein determining the viewing trajectory comprises determining, for each view of the plurality of views, positions, orientations, and magnification settings of the virtual camera, and wherein determining the viewing trajectory further comprises determining speeds for transitioning between the plurality of views; and
presenting the 3D model of the dental site according to the determined viewing trajectory of the virtual camera.

28. The method of claim 27, wherein determining the viewing trajectory further comprises:
determining one or more zoomed-in views of each of the one or more AOIs that together cause rotation of the virtual camera about the one or more AOIs.

29. The method of claim 27, wherein the one or more AOIs comprise one or more regions requiring rescanning, the method further comprising:
providing visual indications of the one or more regions requiring rescanning.

\* \* \* \* \*